United States Patent [19] [11] 3,996,590
Hammack [45] Dec. 7, 1976

[54] METHOD AND APPARATUS FOR AUTOMATICALLY DETECTING AND TRACKING MOVING OBJECTS AND SIMILAR APPLICATIONS

[76] Inventor: Calvin Miles Hammack, P.O. Box 304, Saratoga, Calif. 95070

[22] Filed: Oct. 10, 1972

[21] Appl. No.: 296,321

Related U.S. Application Data

[63] Continuation-in-part of Ser. No. 86,770, Feb. 2, 1961, Pat. No. 3,706,096, and Ser. No. 817,765, April 21, 1969, Pat. No. 3,691,560, and Ser. No. 74,180, Sept. 21, 1970, Pat. No. 3,795,911, and a continuation-in-part of Ser. No. 278,191, May 6, 1963, abandoned, and Ser. No. 288,429, Sept. 12, 1972, Pat. No. 3,866,229.

[52] U.S. Cl. .............................. 343/112 R; 343/9; 235/150.27
[51] Int. Cl.² .......................................... G01S 3/02
[58] Field of Search ............... 343/9, 15, 112 R; 235/150.27

[56] References Cited

UNITED STATES PATENTS

| 2,403,626 | 7/1946 | Wolff et al. ...................... 343/103 |
| 2,654,884 | 10/1953 | Palmer ................................ 343/9 |
| 2,821,704 | 1/1958 | O'Day ................................ 343/15 |
| 2,857,590 | 10/1958 | Berger ................................ 343/8 |
| 2,866,373 | 12/1958 | Doyle et al. ........................ 343/8 |
| 2,968,034 | 1/1961 | Cafarelli ........................ 343/112 R |
| 3,112,480 | 11/1963 | Lakatos ........................ 343/112 CA |
| 3,120,000 | 1/1964 | Whilmotte ...................... 343/112 S |
| 3,155,937 | 11/1964 | Grimm et al. ................. 343/112 S |
| 3,155,971 | 11/1964 | Hansel ................................ 343/8 |
| 3,226,713 | 12/1965 | Sorkin et al. ................ 343/112 R |
| 3,295,127 | 12/1966 | Kross ............................... 343/7 A |
| 3,706,096 | 12/1972 | Hammack ..................... 343/112 R |
| 3,710,331 | 1/1973 | Kiisk ............................. 343/112 R |

*Primary Examiner*—Maynard R. Wilbur
*Assistant Examiner*—T. M. Blum
*Attorney, Agent, or Firm*—Victor R. Beckman

[57] ABSTRACT

This invention relates to an improvement in the art of navigating, detecting and tracking moving objects, position finding, mapping and such subjects employing a plurality of stations and variational measurements.

62 Claims, 76 Drawing Figures

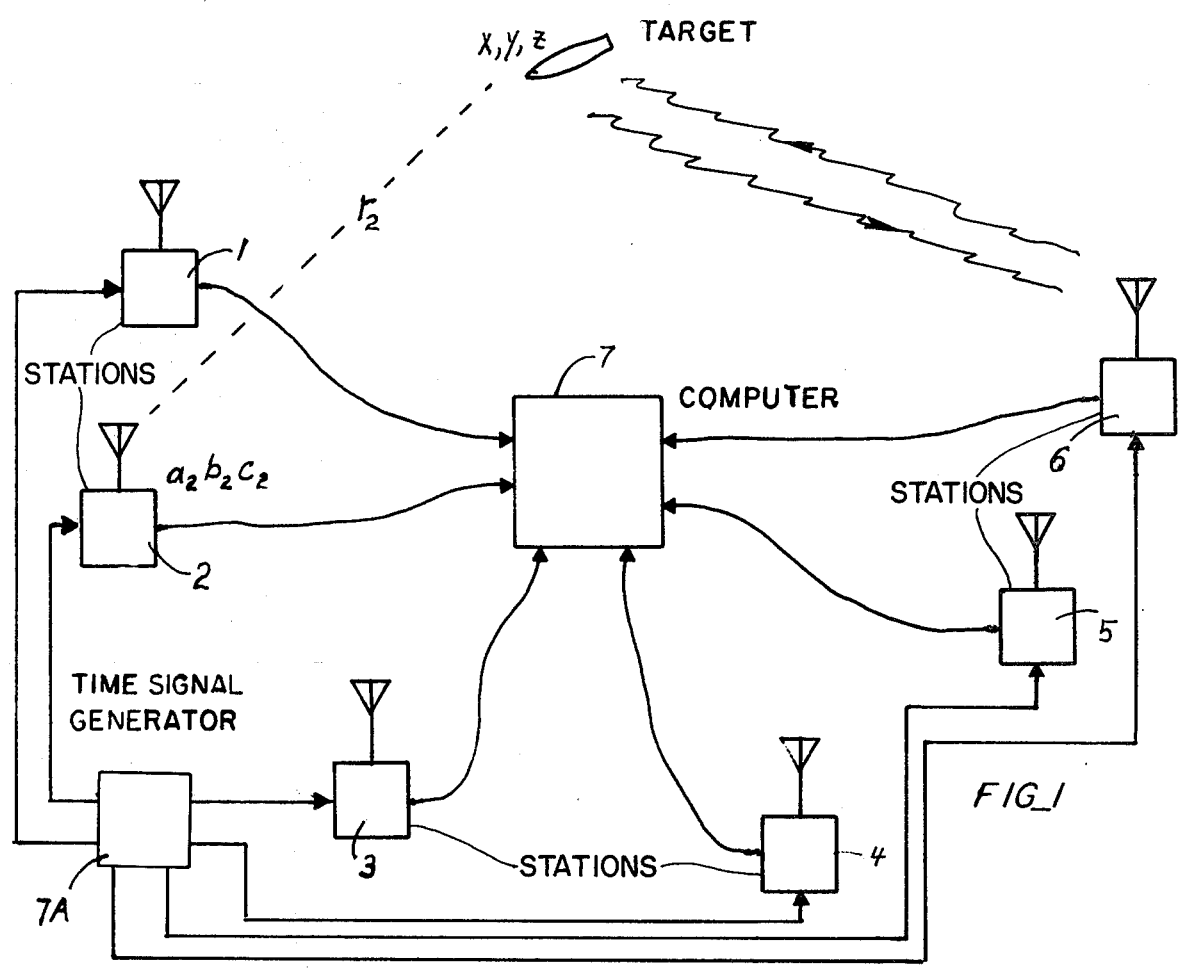
FIG_1
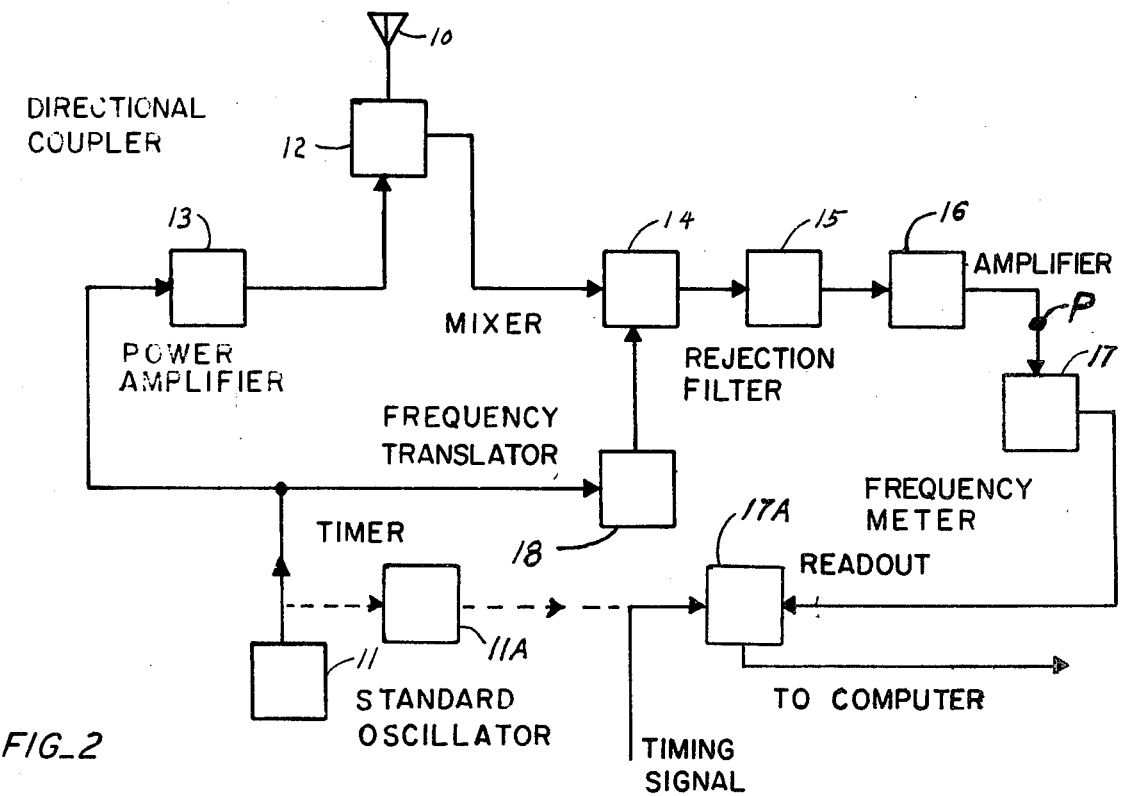
FIG_2

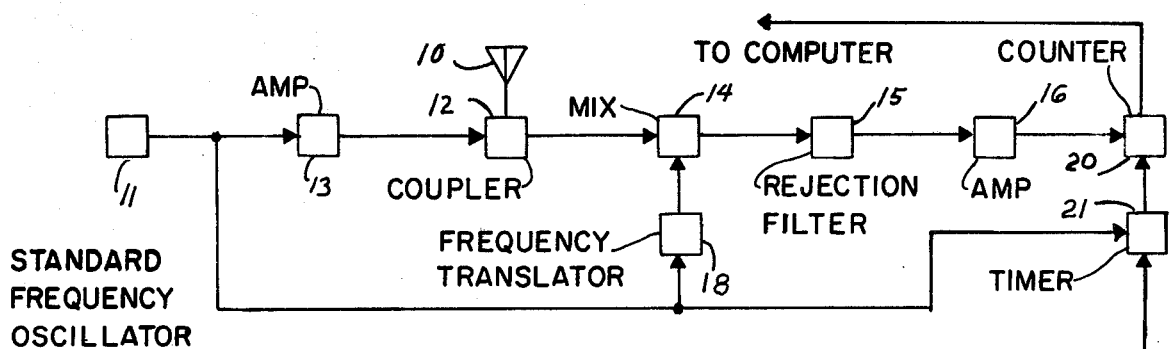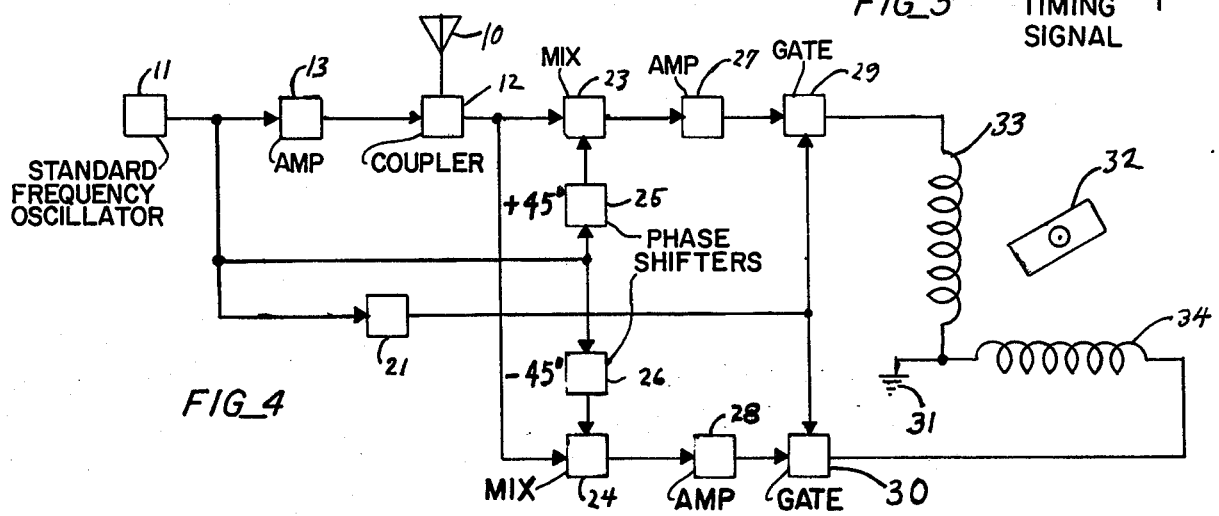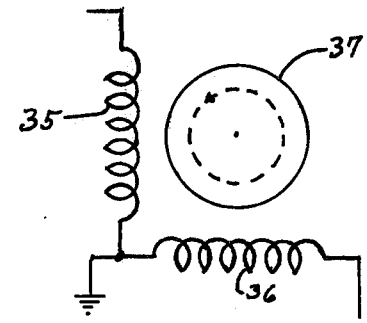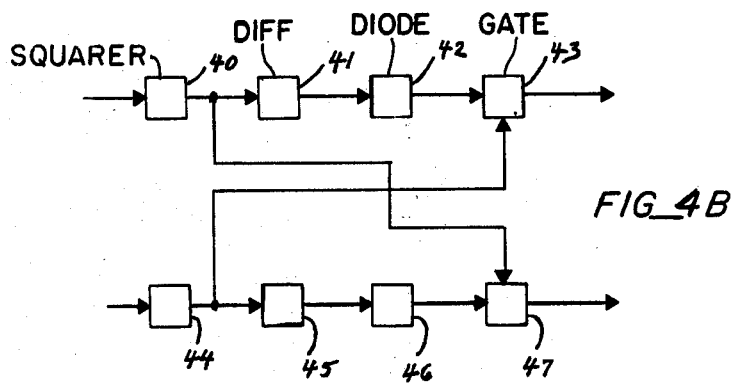

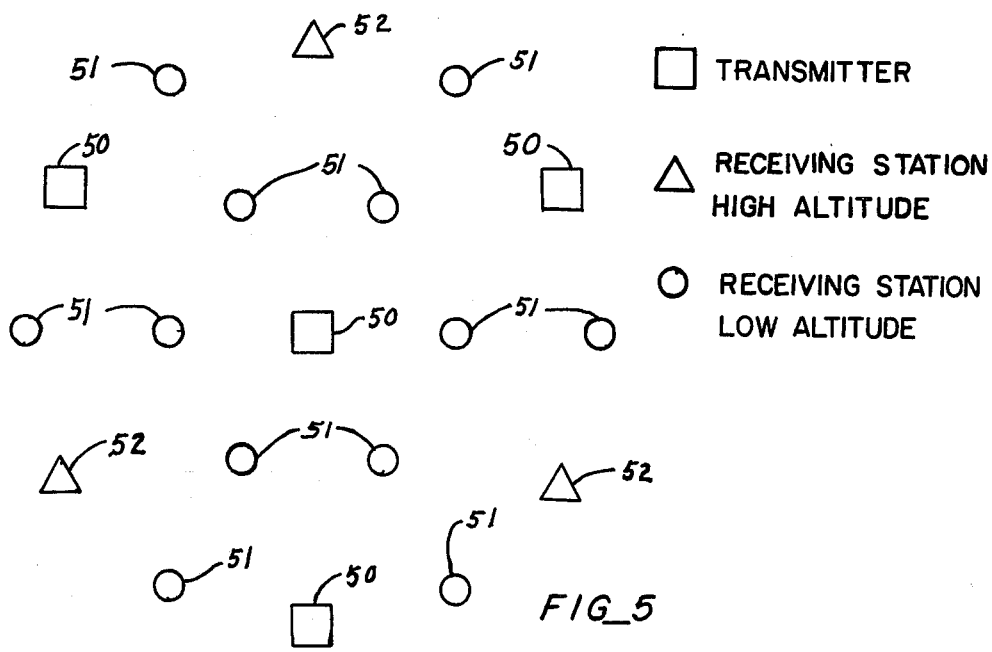
FIG_5
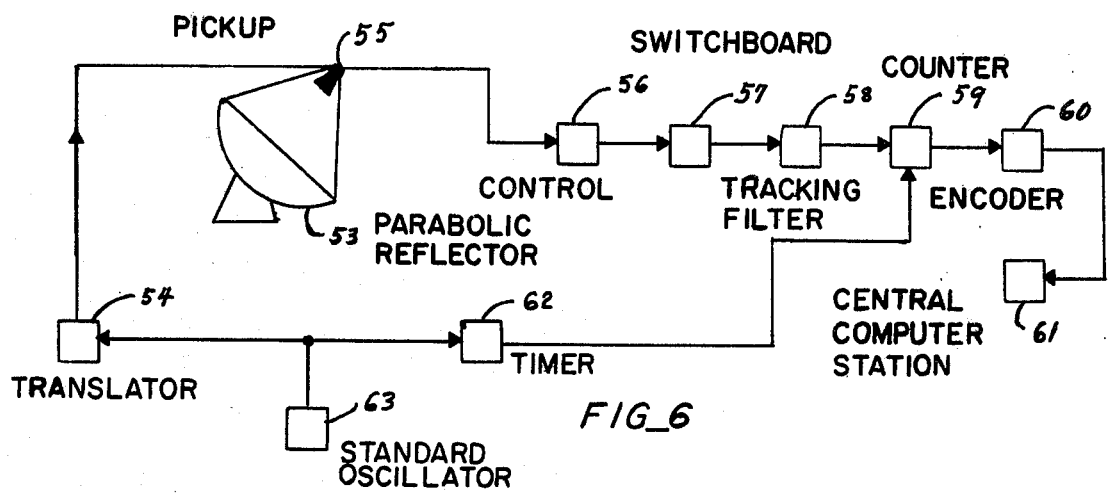
FIG_6

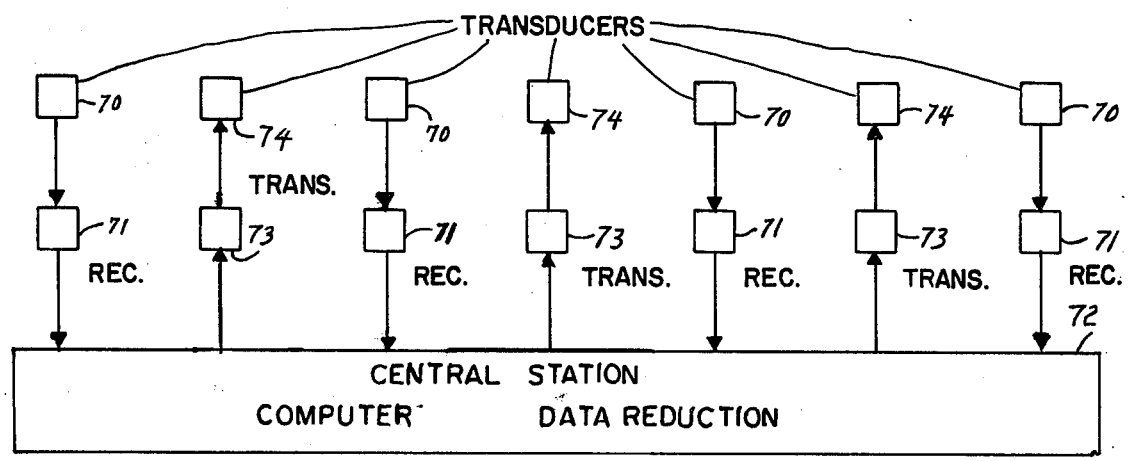
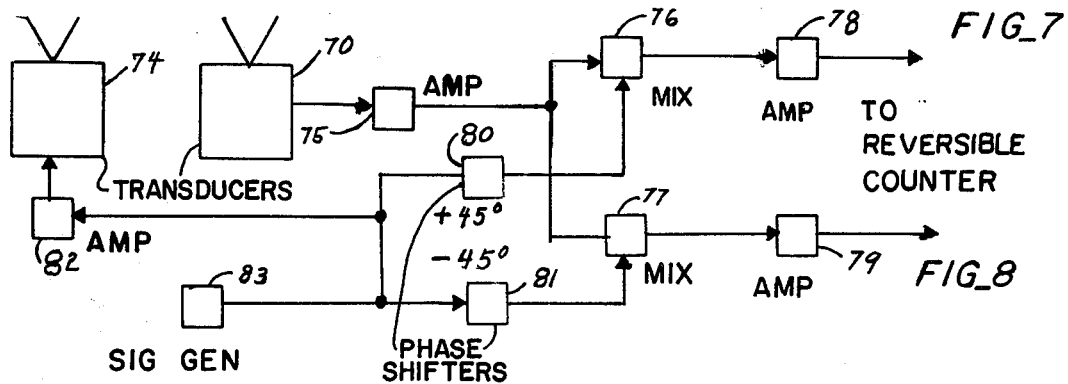
FIG_7
FIG_8
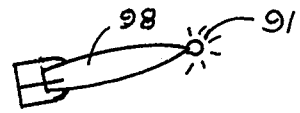
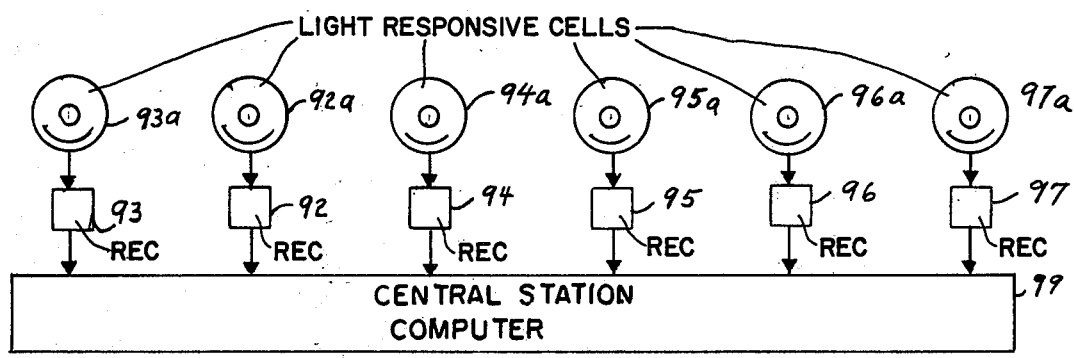
FIG_9
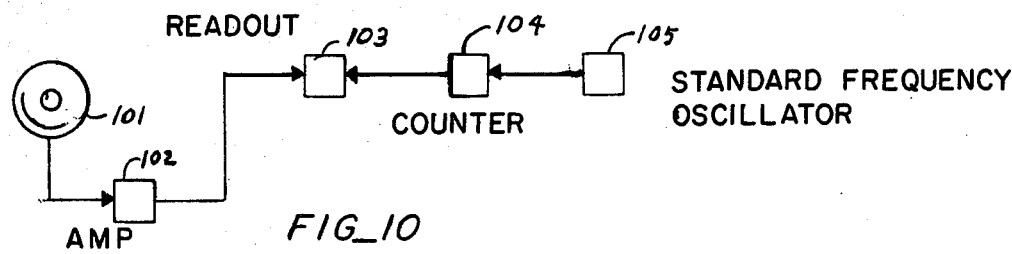
FIG_10

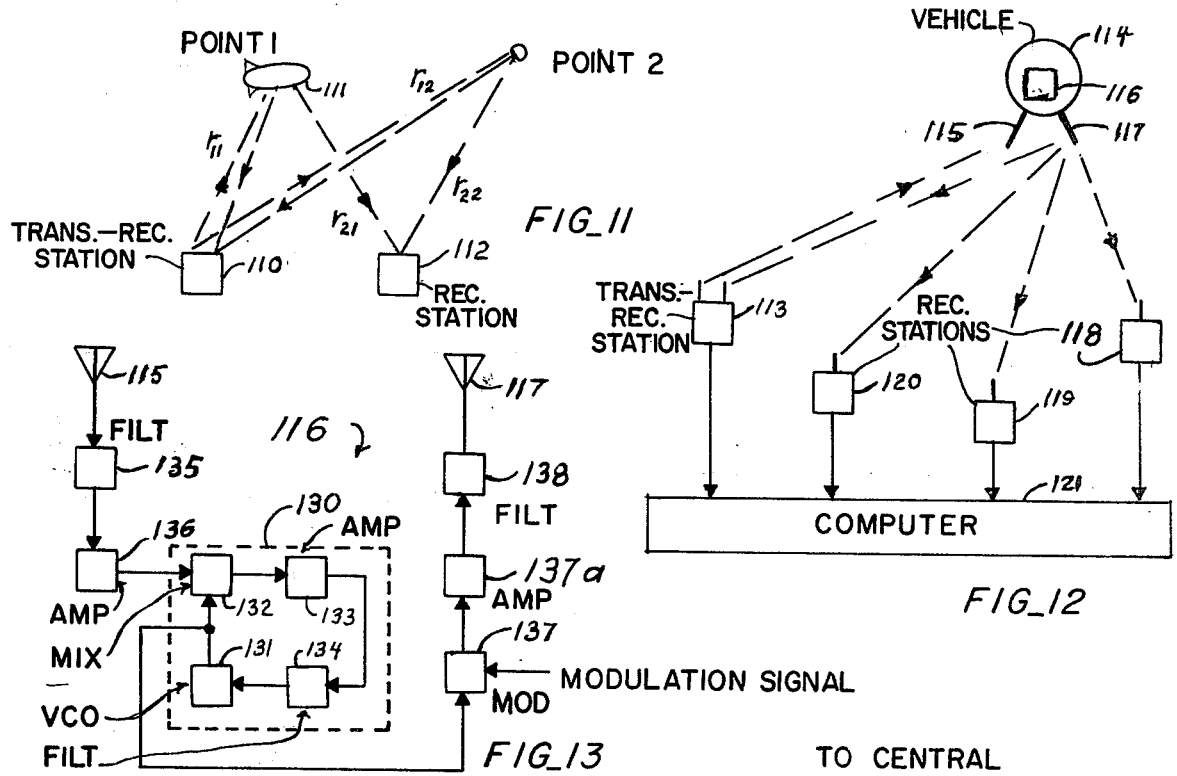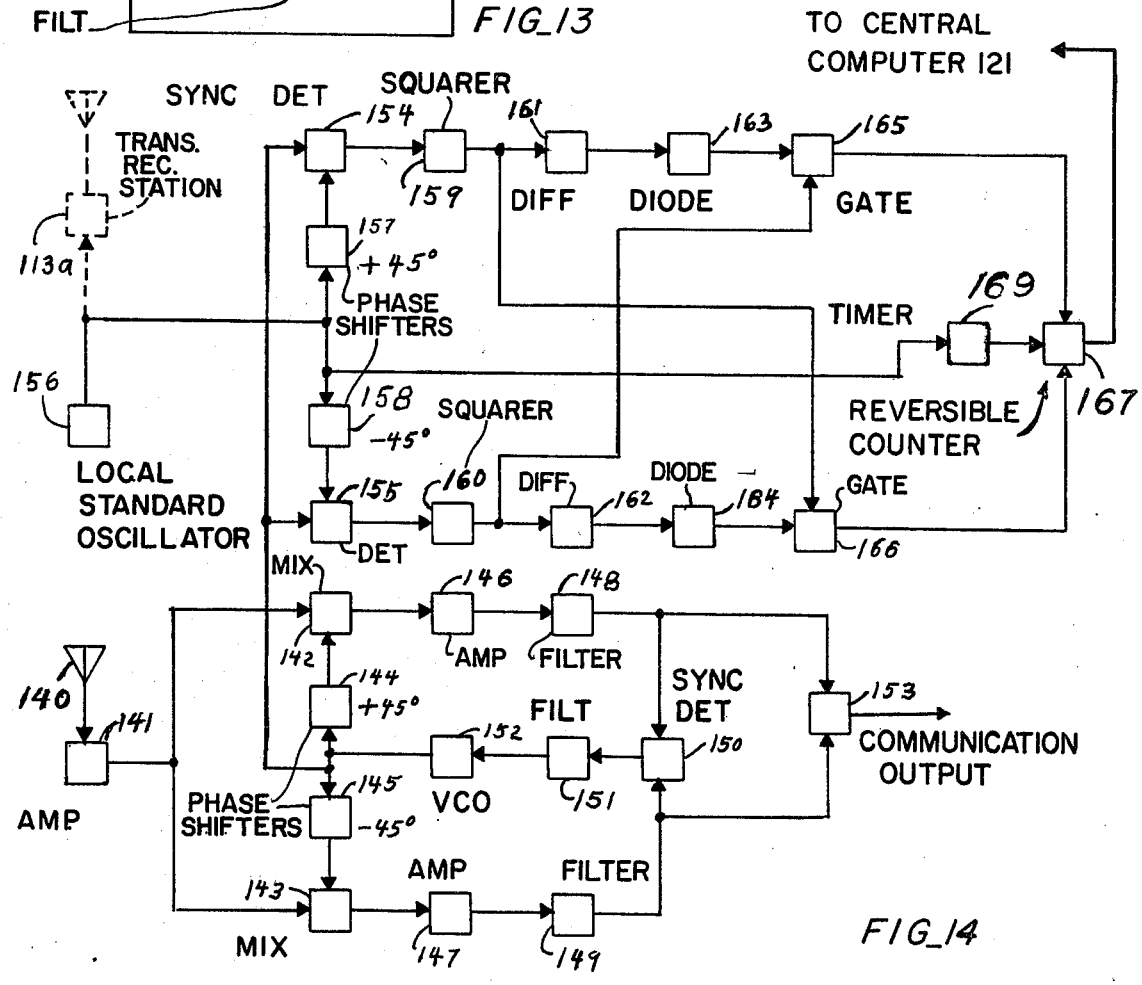

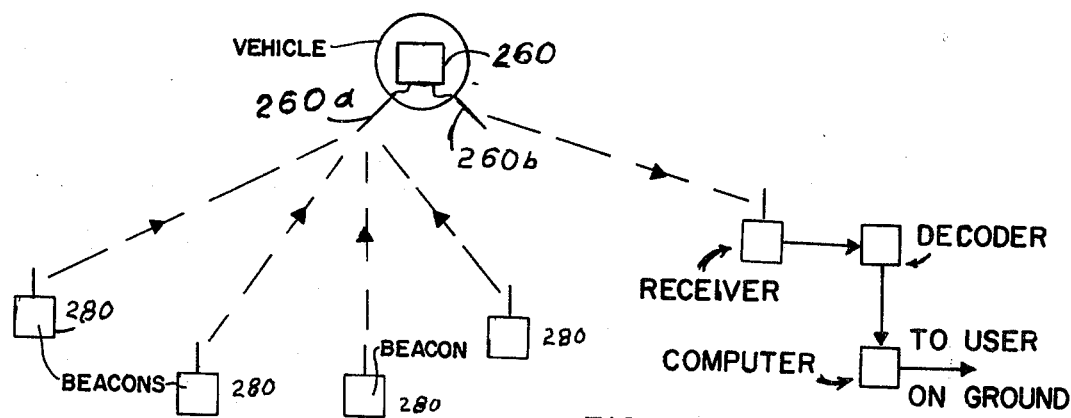
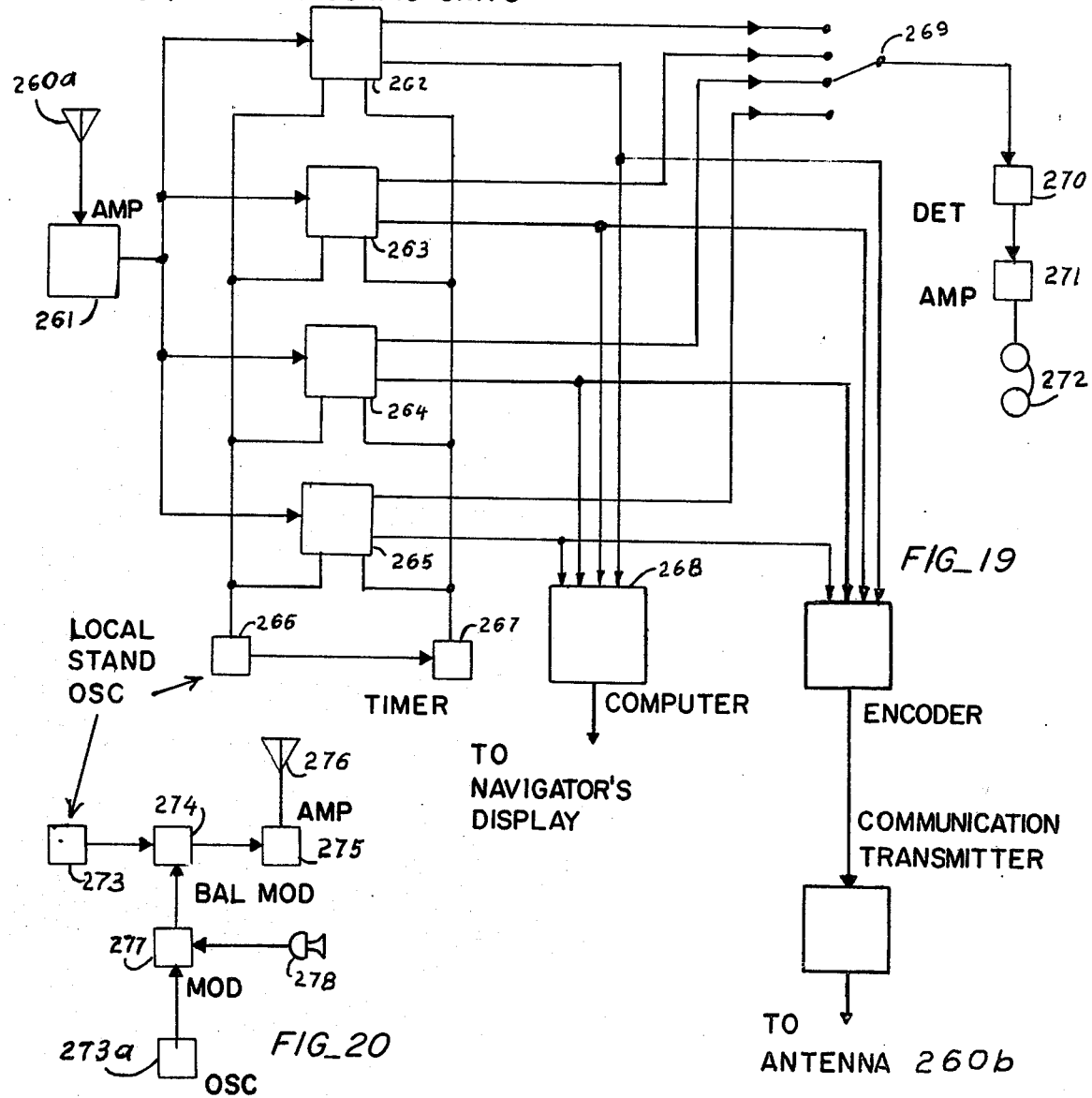

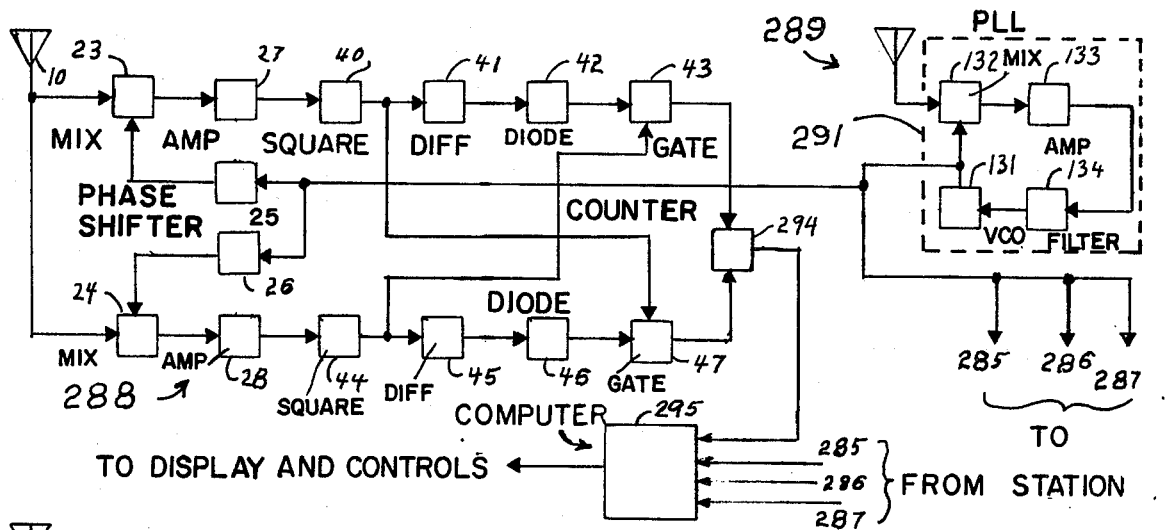
FIG_23
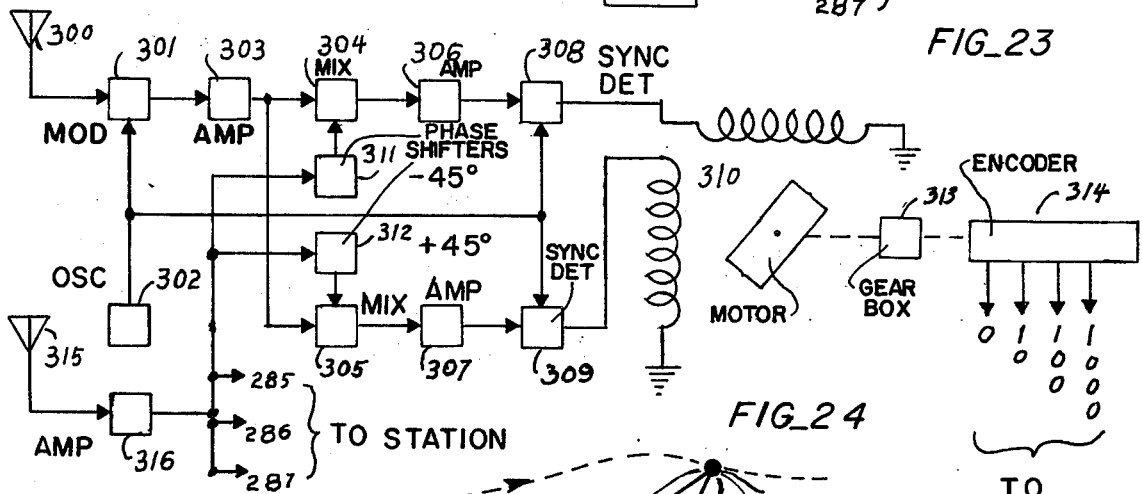
FIG_24
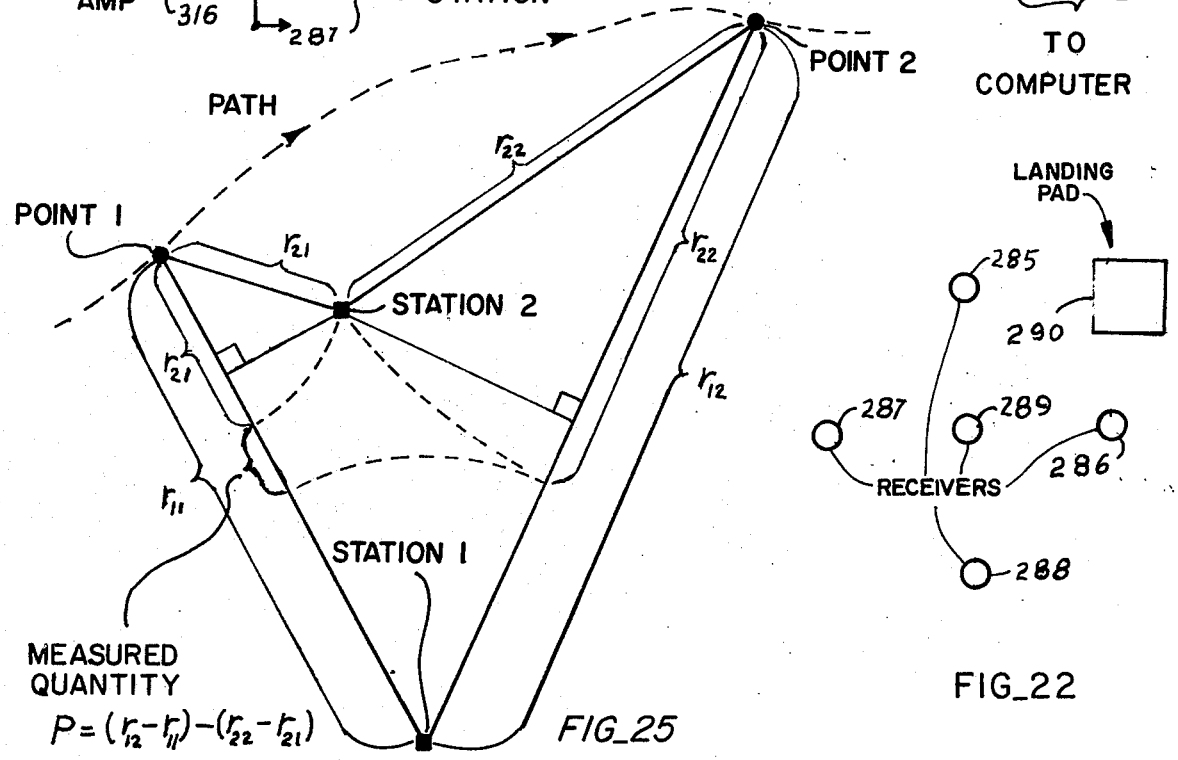
FIG_22
FIG_25
Measured quantity $P = (r_{12} - r_{11}) - (r_{22} - r_{21})$

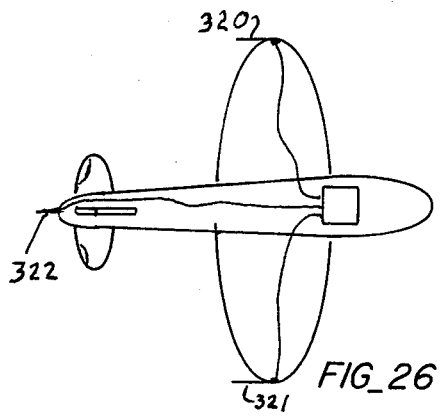
FIG_26
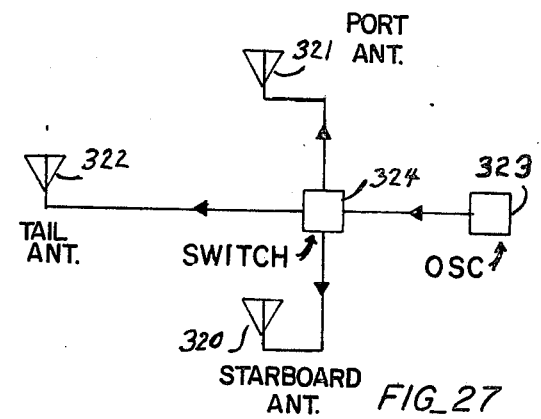
FIG_27
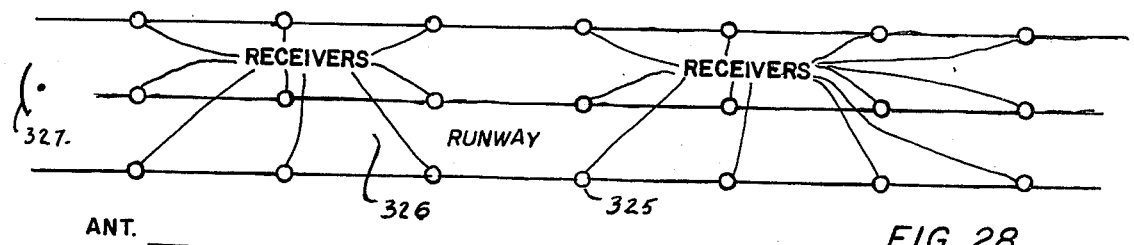
FIG_28
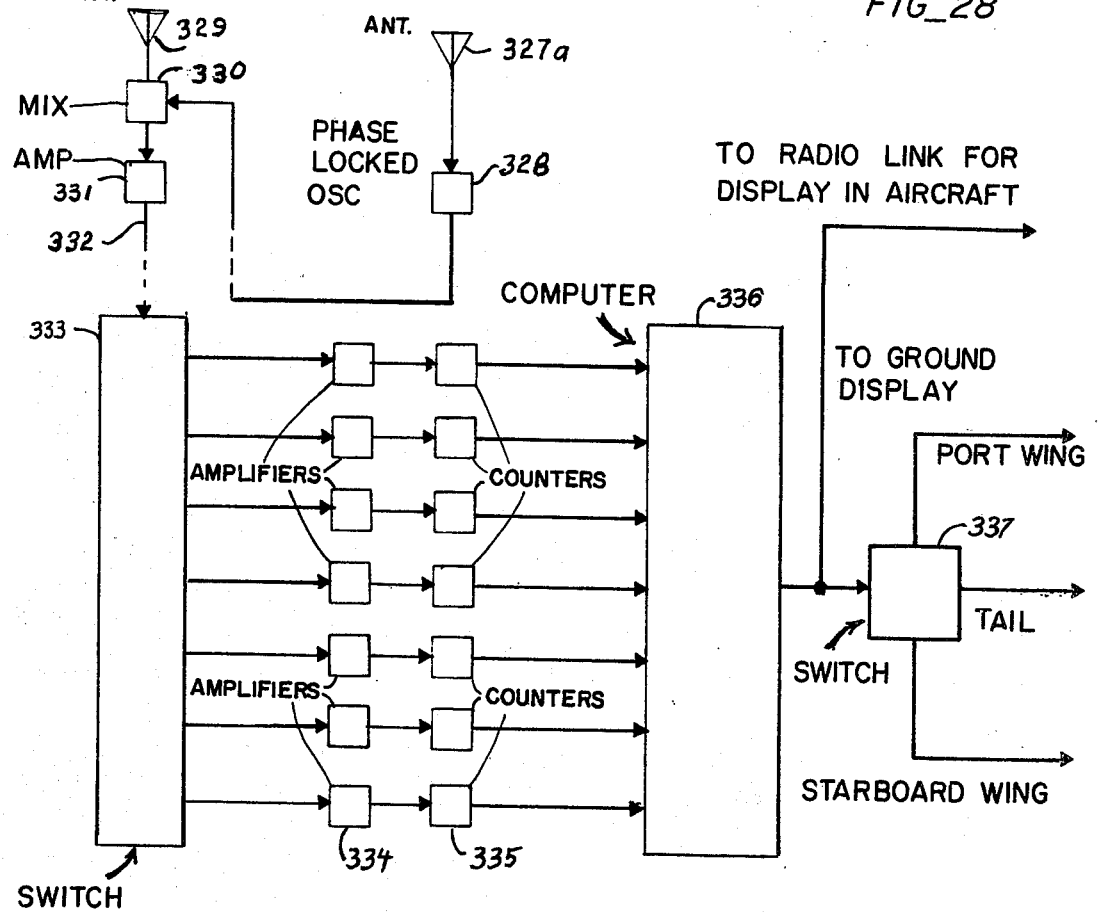
FIG_29

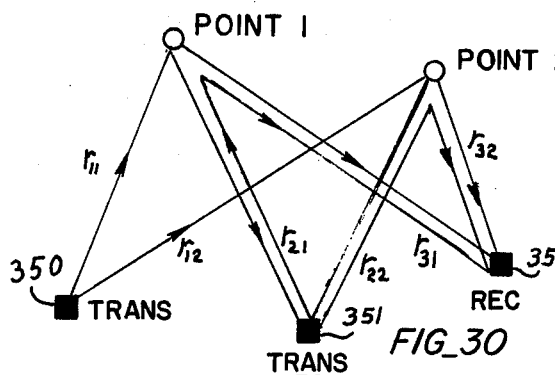
FIG_30
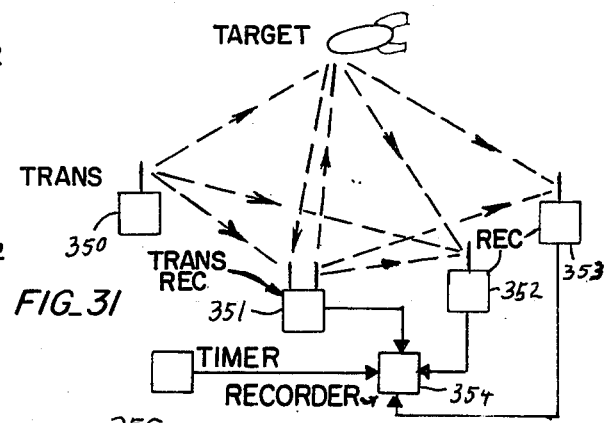
FIG_31
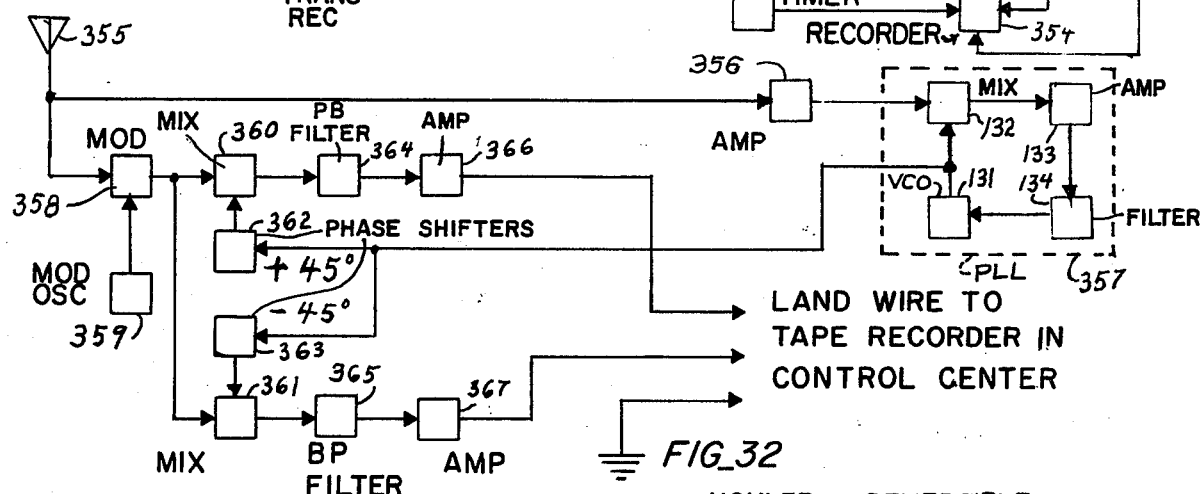
FIG_32
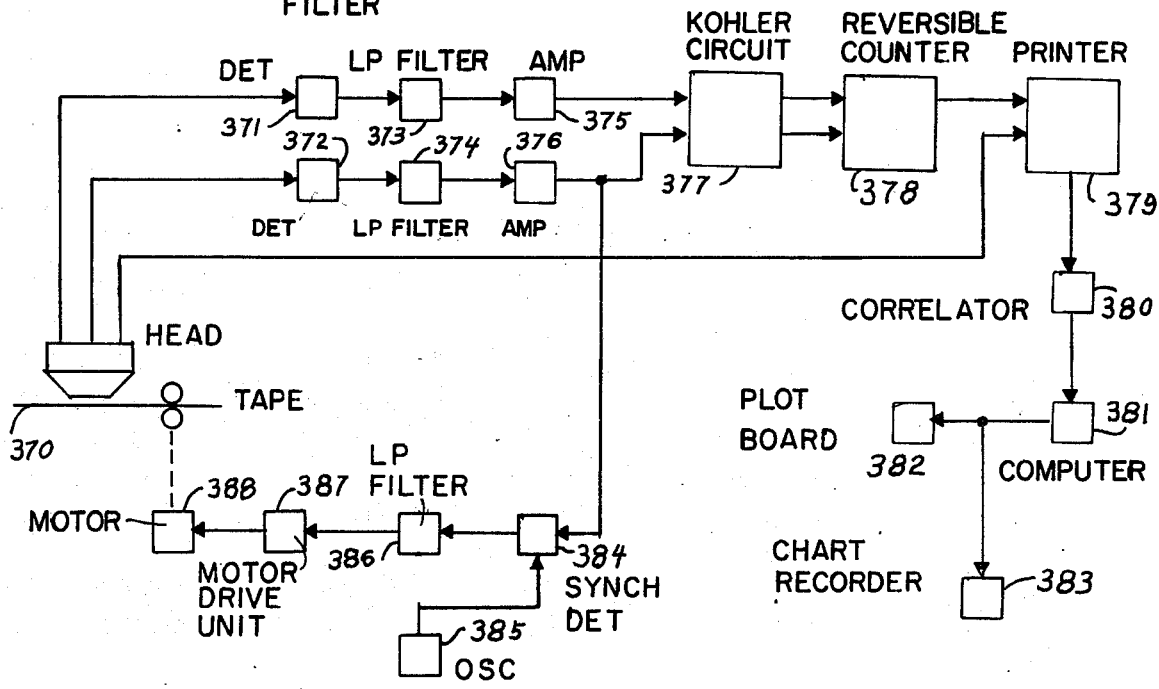
FIG_33

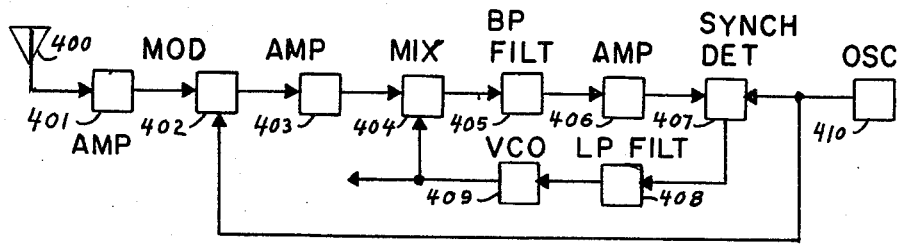
FIG_34
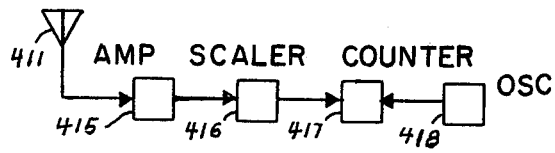
FIG_35
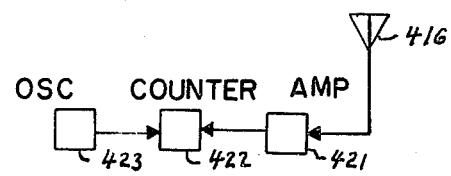
FIG_36
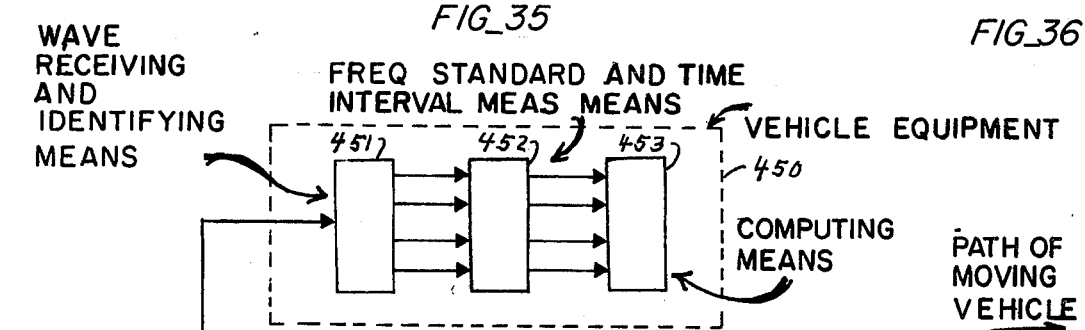
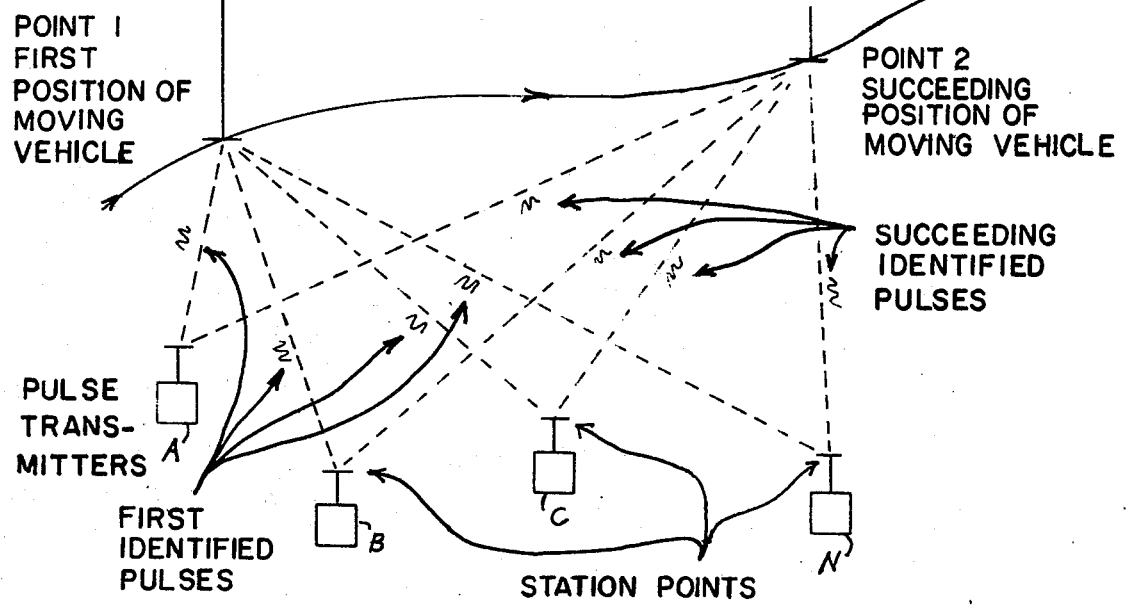
TIME DIFFERENCE BETWEEN ARRIVAL OF FIRST PULSE AND ARRIVAL OF SUCCEEDING PULSE FROM SAME TRANSMITTER ARE MEASURED AT RECEIVER — SUCH MEASUREMENTS ARE PERFORMED AT APPROXIMATELY THE SAME TIME USING ALL TRANSMITTERS
FIG_42

$$\left[ \left(\frac{x-a_i}{r_i}\right) \left(\frac{y-b_i}{r_i}\right) \left(\frac{z-c_i}{r_i}\right) \left(\frac{x-a_i}{r_i}\frac{\dot{x}}{\dot{r}_i} - \frac{y-b_i}{r_i}\frac{\dot{y}}{\dot{r}_i} - \frac{z-c_i}{r_i}\frac{\dot{z}}{\dot{r}_i}\right) \right]_{i=1,\ldots,6} \begin{bmatrix} dx \\ dy \\ dz \\ d\dot{x} \\ d\dot{y} \\ d\dot{z} \end{bmatrix} = \begin{bmatrix} \frac{r_1}{\dot{r}_1}dr_1 \\ \frac{r_2}{\dot{r}_2}dr_2 \\ \frac{r_3}{\dot{r}_3}dr_3 \\ \frac{r_4}{\dot{r}_4}dr_4 \\ \frac{r_5}{\dot{r}_5}dr_5 \\ \frac{r_6}{\dot{r}_6}dr_6 \end{bmatrix}$$

*FIG. 37*  ERROR EQUATION $$\begin{bmatrix} dm_1 & dm_2 & dm_3 & dm_4 & dm_5 & dm_6 \end{bmatrix} =$$

$$\begin{bmatrix} dx_1 & dy_1 & dz_1 & dx_2 & dy_2 & dz_2 \end{bmatrix}$$

$$\begin{bmatrix} \frac{x_1-a_1}{r_{11}} & \frac{y_1-b_1}{r_{11}} & \frac{z_1-c_1}{r_{11}} & \frac{x_2-a_1}{r_{12}} & \frac{y_2-b_1}{r_{12}} & \frac{z_2-c_1}{r_{12}} \\ \frac{x_1-a_2}{r_{21}} & \frac{y_1-b_2}{r_{21}} & \frac{z_1-c_2}{r_{21}} & \frac{x_2-a_2}{r_{22}} & \frac{y_2-b_2}{r_{22}} & \frac{z_2-c_2}{r_{22}} \\ \frac{x_1-a_3}{r_{31}} & \frac{y_1-b_3}{r_{31}} & \frac{z_1-c_3}{r_{31}} & \frac{x_2-a_3}{r_{32}} & \frac{y_2-b_3}{r_{32}} & \frac{z_2-c_3}{r_{32}} \\ \frac{x_1-a_4}{r_{41}} & \frac{y_1-b_4}{r_{41}} & \frac{z_1-c_4}{r_{41}} & \frac{x_2-a_4}{r_{42}} & \frac{y_2-b_4}{r_{42}} & \frac{z_2-c_4}{r_{42}} \\ \frac{x_1-a_5}{r_{51}} & \frac{y_1-b_5}{r_{51}} & \frac{z_1-c_5}{r_{51}} & \frac{x_2-a_5}{r_{52}} & \frac{y_2-b_5}{r_{52}} & \frac{z_2-c_5}{r_{52}} \\ \frac{x_1-a_6}{r_{61}} & \frac{y_1-b_6}{r_{61}} & \frac{z_1-c_6}{r_{61}} & \frac{x_2-a_6}{r_{62}} & \frac{y_2-b_6}{r_{62}} & \frac{z_2-c_6}{r_{62}} \end{bmatrix}$$

FIG_38  ERROR EQUATION $$\begin{bmatrix} dp_2 & dp_3 & dp_4 & dp_5 & dp_6 & dp_7 \end{bmatrix} =$$

$$\begin{bmatrix} dx_1 & dy_1 & dz_1 & dx_2 & dy_2 & dz_2 \end{bmatrix}$$

$$\begin{bmatrix}
\left(\frac{x_1-a_1}{r_{11}} + \frac{x_1-a_2}{r_{21}}\right) & \left(\frac{y_1-b_1}{r_{11}} + \frac{y_1-b_2}{r_{21}}\right) & \left(\frac{z_1-c_1}{r_{11}} + \frac{z_1-c_2}{r_{21}}\right) & -\left(\frac{x_2-a_1}{r_{12}} + \frac{x_2-a_2}{r_{22}}\right) & -\left(\frac{y_2-b_1}{r_{12}} + \frac{y_2-b_2}{r_{22}}\right) & -\left(\frac{z_2-c_1}{r_{12}} + \frac{z_2-c_2}{r_{22}}\right) \\
\left(\frac{x_1-a_1}{r_{11}} + \frac{x_1-a_3}{r_{31}}\right) & \left(\frac{y_1-b_1}{r_{11}} + \frac{y_1-b_3}{r_{31}}\right) & \left(\frac{z_1-c_1}{r_{11}} + \frac{z_1-c_3}{r_{31}}\right) & -\left(\frac{x_2-a_1}{r_{12}} + \frac{x_2-a_3}{r_{32}}\right) & -\left(\frac{y_2-b_1}{r_{12}} + \frac{y_2-b_3}{r_{32}}\right) & -\left(\frac{z_2-c_1}{r_{12}} + \frac{z_2-c_3}{r_{32}}\right) \\
\left(\frac{x_1-a_1}{r_{11}} + \frac{x_1-a_4}{r_{41}}\right) & \left(\frac{y_1-b_1}{r_{11}} + \frac{y_1-b_4}{r_{41}}\right) & \left(\frac{z_1-c_1}{r_{11}} + \frac{z_1-c_4}{r_{41}}\right) & -\left(\frac{x_2-a_1}{r_{12}} + \frac{x_2-a_4}{r_{42}}\right) & -\left(\frac{y_2-b_1}{r_{12}} + \frac{y_2-b_4}{r_{42}}\right) & -\left(\frac{z_2-c_1}{r_{12}} + \frac{z_2-c_4}{r_{42}}\right) \\
\left(\frac{x_1-a_1}{r_{11}} + \frac{x_1-a_5}{r_{51}}\right) & \left(\frac{y_1-b_1}{r_{11}} + \frac{y_1-b_5}{r_{51}}\right) & \left(\frac{z_1-c_1}{r_{11}} + \frac{z_1-c_5}{r_{51}}\right) & -\left(\frac{x_2-a_1}{r_{12}} + \frac{x_2-a_5}{r_{52}}\right) & -\left(\frac{y_2-b_1}{r_{12}} + \frac{y_2-b_5}{r_{52}}\right) & -\left(\frac{z_2-c_1}{r_{12}} + \frac{z_2-c_5}{r_{52}}\right) \\
\left(\frac{x_1-a_1}{r_{11}} + \frac{x_1-a_6}{r_{61}}\right) & \left(\frac{y_1-b_1}{r_{11}} + \frac{y_1-b_6}{r_{61}}\right) & \left(\frac{z_1-c_1}{r_{11}} + \frac{z_1-c_6}{r_{61}}\right) & -\left(\frac{x_2-a_1}{r_{12}} + \frac{x_2-a_6}{r_{62}}\right) & -\left(\frac{y_2-b_1}{r_{12}} + \frac{y_2-b_6}{r_{62}}\right) & -\left(\frac{z_2-c_1}{r_{12}} + \frac{z_2-c_6}{r_{62}}\right) \\
\left(\frac{x_1-a_1}{r_{11}} + \frac{x_1-a_7}{r_{71}}\right) & \left(\frac{y_1-b_1}{r_{11}} + \frac{y_1-b_7}{r_{71}}\right) & \left(\frac{z_1-c_1}{r_{11}} + \frac{z_1-c_7}{r_{71}}\right) & -\left(\frac{x_2-a_1}{r_{12}} + \frac{x_2-a_7}{r_{72}}\right) & -\left(\frac{y_2-b_1}{r_{12}} + \frac{y_2-b_7}{r_{72}}\right) & -\left(\frac{z_2-c_1}{r_{12}} + \frac{z_2-c_7}{r_{72}}\right)
\end{bmatrix}$$

FIG_39  ERROR EQUATION $$\begin{pmatrix} dm_{11} & dm_{21} & dm_{31} & dm_{12} & dm_{22} & dm_{32} & dm_{13} & dm_{23} & dm_{33} & dm_{14} & dm_{24} & dm_{34} \end{pmatrix}$$

$$=$$

$$\begin{pmatrix} dx_1 & dy_1 & dz_1 & dx_2 & dy_2 & dz_2 & dx_3 & dy_3 & dz_3 & dx_4 & dy_4 & dz_4 \end{pmatrix}$$

$$\begin{pmatrix}
-\frac{x_1-a_1}{r_{11}} & -\frac{y_1-b_1}{r_{11}} & -\frac{z_1-c_1}{r_{11}} & \cdot & \cdot & \cdot & \cdot & \cdot & \cdot & \cdot & \cdot & \cdot \\
-\frac{x_1-a_2}{r_{21}} & -\frac{y_1-b_2}{r_{21}} & -\frac{z_1-c_2}{r_{21}} & \cdot & \cdot & \cdot & \cdot & \cdot & \cdot & \cdot & \cdot & \cdot \\
-\frac{x_1-a_3}{r_{31}} & -\frac{y_1-b_3}{r_{31}} & -\frac{z_1-c_3}{r_{31}} & \cdot & \cdot & \cdot & \cdot & \cdot & \cdot & \cdot & \cdot & \cdot \\
-\frac{x_1-a_4}{r_{41}} & -\frac{y_1-b_4}{r_{41}} & -\frac{z_1-c_4}{r_{41}} & \cdot & \cdot & \cdot & \cdot & \cdot & \cdot & \cdot & \cdot & \cdot \\
-\frac{x_2-a_1}{r_{12}} & -\frac{y_2-b_1}{r_{12}} & -\frac{z_2-c_1}{r_{12}} & -\frac{x_2-a_1}{r_{12}} & -\frac{y_2-b_1}{r_{12}} & -\frac{z_2-c_1}{r_{12}} & \cdot & \cdot & \cdot & \cdot & \cdot & \cdot \\
-\frac{x_2-a_2}{r_{22}} & -\frac{y_2-b_2}{r_{22}} & -\frac{z_2-c_2}{r_{22}} & -\frac{x_2-a_2}{r_{22}} & -\frac{y_2-b_2}{r_{22}} & -\frac{z_2-c_2}{r_{22}} & \cdot & \cdot & \cdot & \cdot & \cdot & \cdot \\
-\frac{x_2-a_3}{r_{32}} & -\frac{y_2-b_3}{r_{32}} & -\frac{z_2-c_3}{r_{32}} & -\frac{x_2-a_3}{r_{32}} & -\frac{y_2-b_3}{r_{32}} & -\frac{z_2-c_3}{r_{32}} & \cdot & \cdot & \cdot & \cdot & \cdot & \cdot \\
-\frac{x_2-a_4}{r_{42}} & -\frac{y_2-b_4}{r_{42}} & -\frac{z_2-c_4}{r_{42}} & -\frac{x_2-a_4}{r_{42}} & -\frac{y_2-b_4}{r_{42}} & -\frac{z_2-c_4}{r_{42}} & \cdot & \cdot & \cdot & \cdot & \cdot & \cdot \\
\cdot & \cdot & \cdot & \cdot & -\frac{x_3-a_1}{r_{13}} & -\frac{y_3-b_1}{r_{13}} & -\frac{z_3-c_1}{r_{13}} & \cdot & \cdot & \cdot & \cdot & \cdot \\
\cdot & \cdot & \cdot & \cdot & -\frac{x_3-a_2}{r_{23}} & -\frac{y_3-b_2}{r_{23}} & -\frac{z_3-c_2}{r_{23}} & \cdot & \cdot & \cdot & \cdot & \cdot \\
\cdot & \cdot & \cdot & \cdot & -\frac{x_3-a_3}{r_{33}} & -\frac{y_3-b_3}{r_{33}} & -\frac{z_3-c_3}{r_{33}} & \cdot & \cdot & \cdot & \cdot & \cdot \\
\cdot & \cdot & \cdot & \cdot & -\frac{x_3-a_4}{r_{43}} & -\frac{y_3-b_4}{r_{43}} & -\frac{z_3-c_4}{r_{43}} & \cdot & \cdot & \cdot & \cdot & \cdot \\
\cdot & \cdot & \cdot & \cdot & \cdot & \cdot & \cdot & \cdot & \cdot & -\frac{x_4-a_1}{r_{14}} & -\frac{y_4-b_1}{r_{14}} & -\frac{z_4-c_1}{r_{14}} \\
\cdot & \cdot & \cdot & \cdot & \cdot & \cdot & \cdot & \cdot & \cdot & -\frac{x_4-a_2}{r_{24}} & -\frac{y_4-b_2}{r_{24}} & -\frac{z_4-c_2}{r_{24}} \\
\cdot & \cdot & \cdot & \cdot & \cdot & \cdot & \cdot & \cdot & \cdot & -\frac{x_4-a_3}{r_{34}} & -\frac{y_4-b_3}{r_{34}} & -\frac{z_4-c_3}{r_{34}} \\
\cdot & \cdot & \cdot & \cdot & \cdot & \cdot & \cdot & \cdot & \cdot & -\frac{x_4-a_4}{r_{44}} & -\frac{y_4-b_4}{r_{44}} & -\frac{z_4-c_4}{r_{44}}
\end{pmatrix}$$

FIG. 40 ERROR EQUATION $$\begin{bmatrix} dm_1 \\ dm_2 \\ dm_3 \\ dm_4 \\ dm_5 \\ dm_6 \\ dm_7 \end{bmatrix} = \begin{bmatrix} \frac{x_1-a_1}{r_{11}} & \frac{y_1-b_1}{r_{11}} & \frac{z_1-c_1}{r_{11}} & \frac{x_2-a_1}{r_{12}} & \frac{y_2-b_1}{r_{12}} & \frac{z_2-c_1}{r_{12}} & 1 \\ \frac{x_1-a_2}{r_{21}} & \frac{y_1-b_2}{r_{21}} & \frac{z_1-c_2}{r_{21}} & \frac{x_2-a_2}{r_{22}} & \frac{y_2-b_2}{r_{22}} & \frac{z_1-c_2}{r_{22}} & 1 \\ \frac{x_1-a_3}{r_{31}} & \frac{y_1-b_3}{r_{31}} & \frac{z_1-c_3}{r_{31}} & \frac{x_2-a_3}{r_{32}} & \frac{y_2-b_3}{r_{32}} & \frac{z_1-c_3}{r_{32}} & 1 \\ \frac{x_1-a_4}{r_{41}} & \frac{y_1-b_4}{r_{41}} & \frac{z_1-c_4}{r_{41}} & \frac{x_2-a_4}{r_{42}} & \frac{y_2-b_4}{r_{42}} & \frac{z_3-c_4}{r_{42}} & 1 \\ \frac{x_1-a_5}{r_{51}} & \frac{y_1-b_5}{r_{51}} & \frac{z_1-c_5}{r_{51}} & \frac{x_2-a_5}{r_{52}} & \frac{y_2-b_5}{r_{52}} & \frac{z_2-c_5}{r_{52}} & 1 \\ \frac{x_1-a_6}{r_{61}} & \frac{y_1-b_6}{r_{61}} & \frac{z_1-c_6}{r_{61}} & \frac{x_2-a_6}{r_{62}} & \frac{y_2-b_6}{r_{62}} & \frac{z_2-c_6}{r_{62}} & 1 \\ \frac{x_1-a_7}{r_{71}} & \frac{y_1-b_7}{r_{71}} & \frac{z-c_7}{r_{71}} & \frac{x_2-a_7}{r_{72}} & \frac{y-b_7}{r_{72}} & \frac{z-c_7}{r_{72}} & 1 \end{bmatrix} \begin{bmatrix} dx_1 \\ dy_1 \\ dz_1 \\ dx_2 \\ dy_2 \\ dz_2 \\ dB \end{bmatrix}$$

FIG_41 ERROR EQUATION

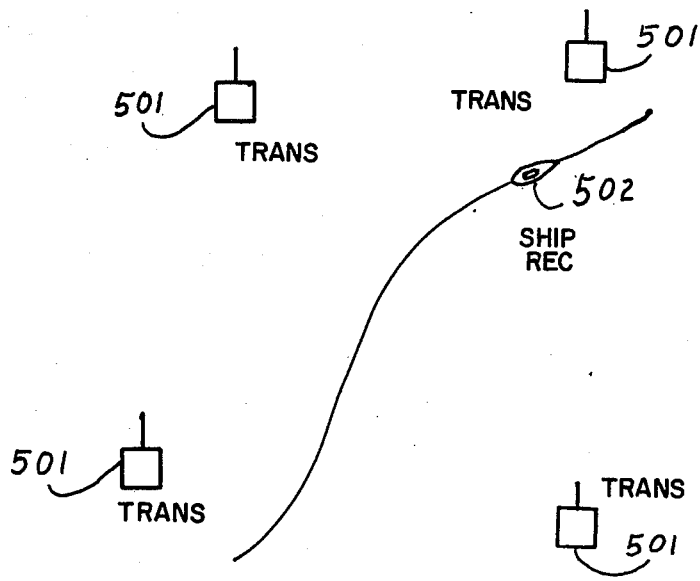
FOUR-STATION PLANAR
NAVIGATION SYSTEM
FIG_43

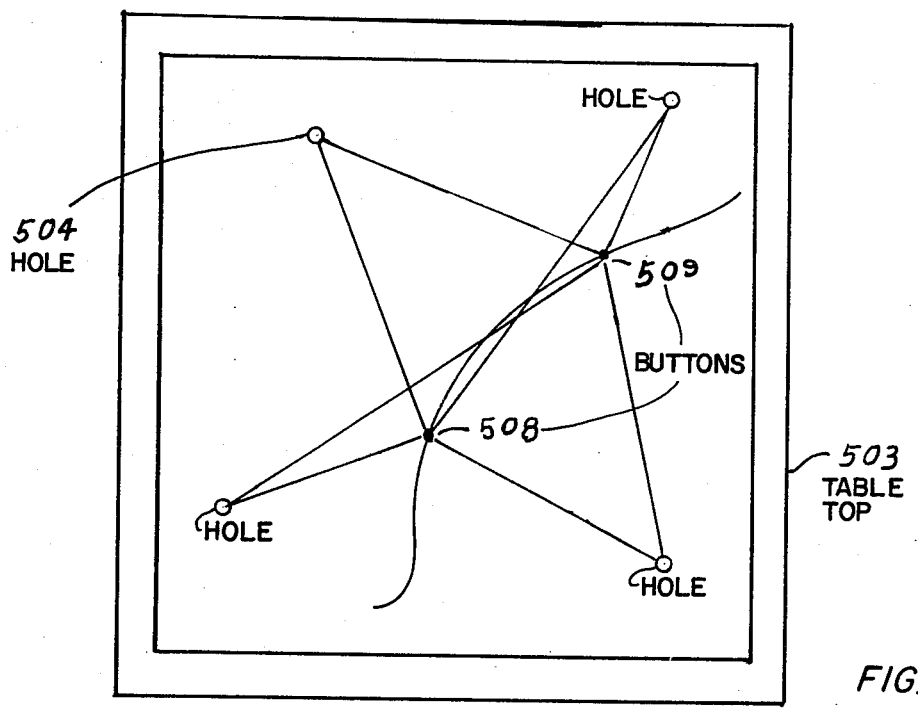
FIG_44
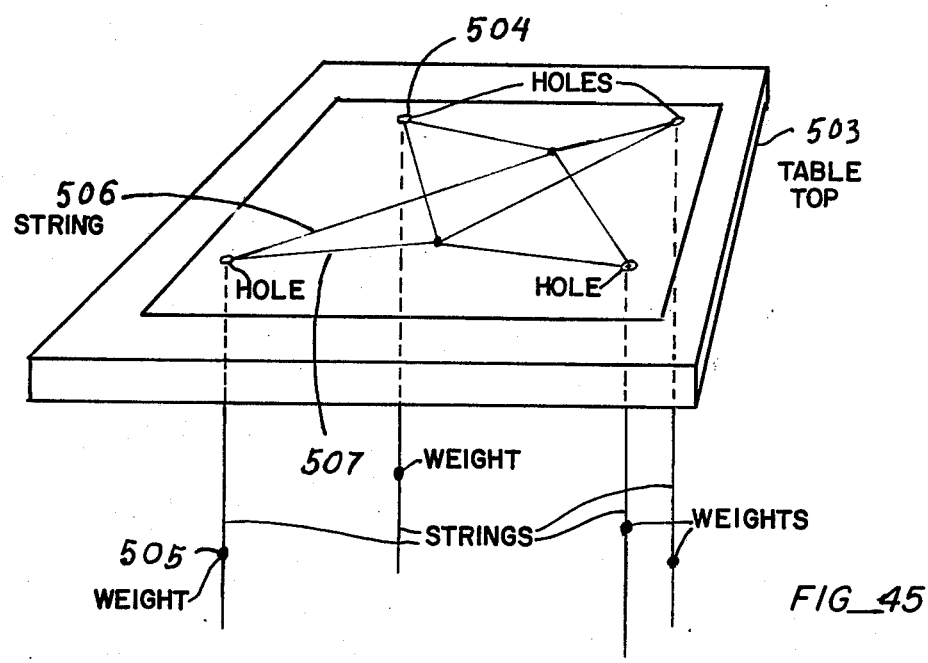
FIG_45

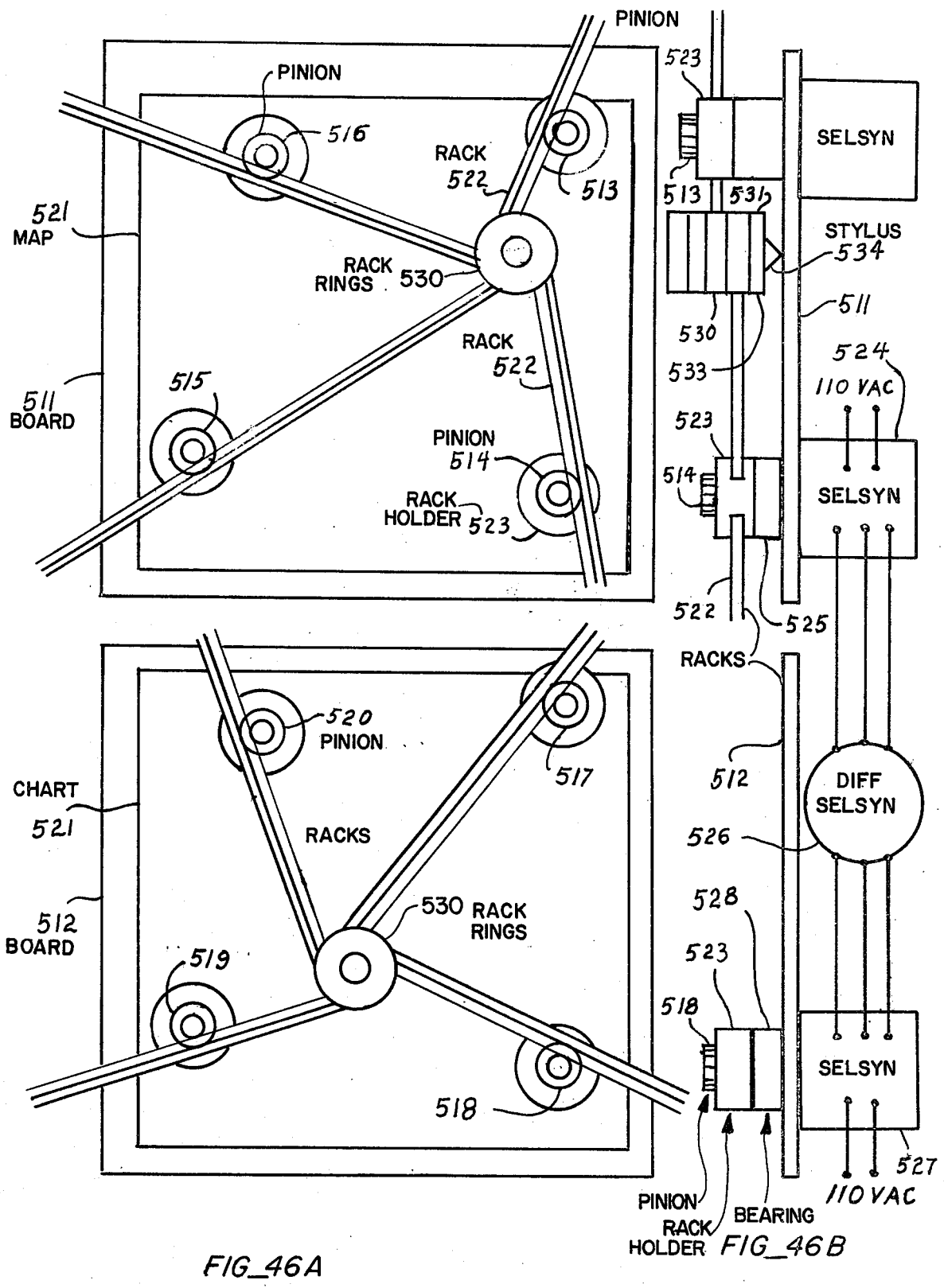
FIG_46A  FIG_46B

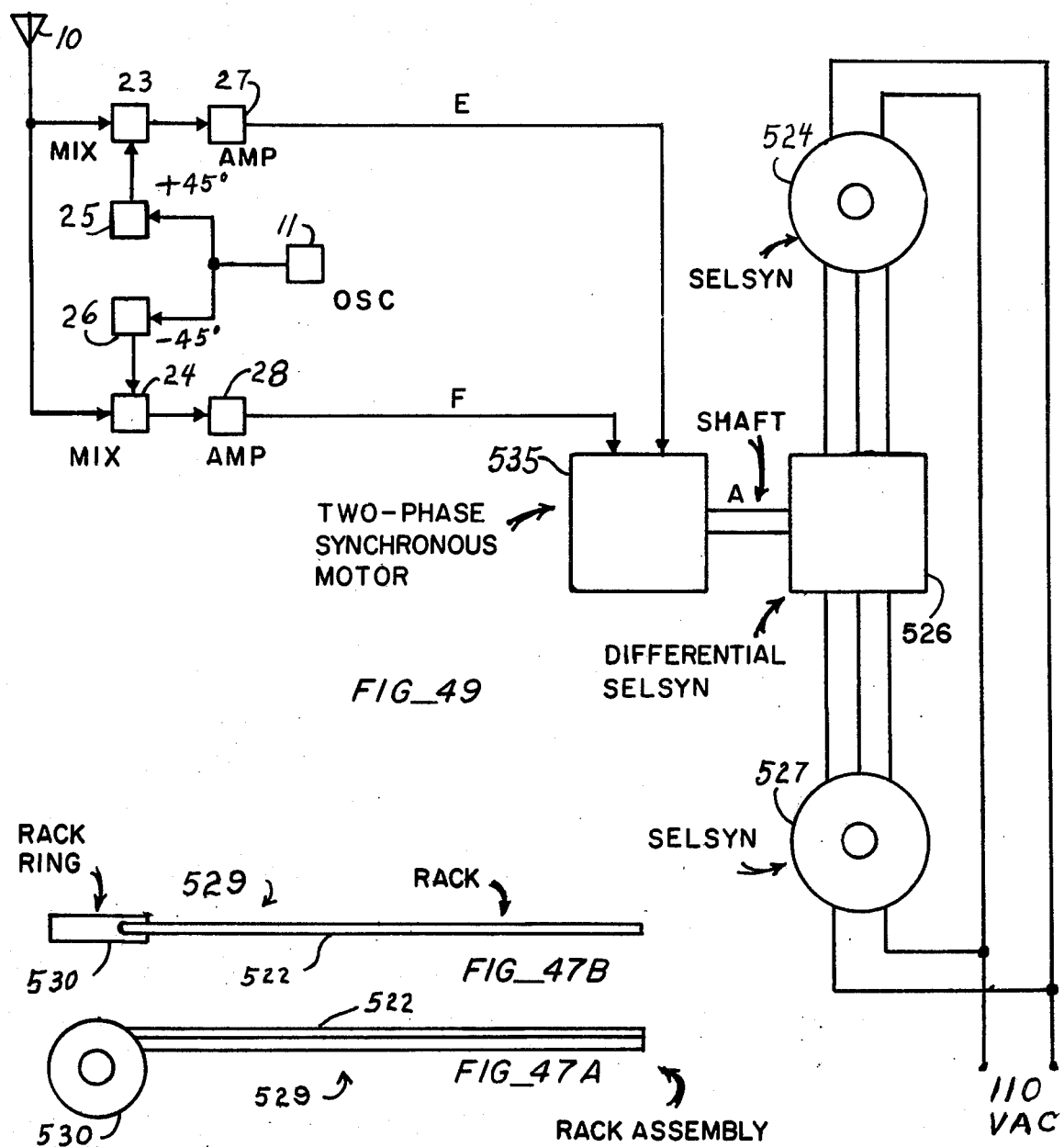
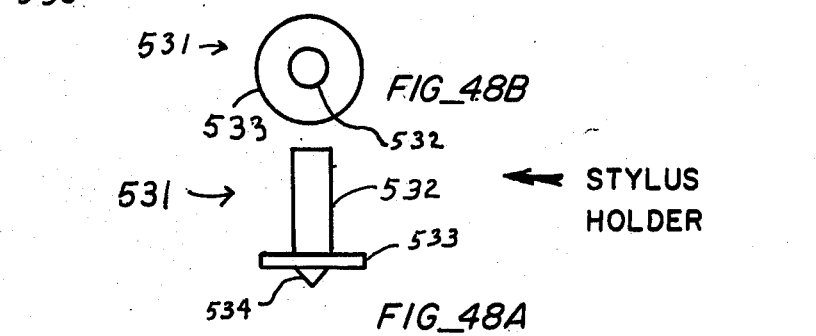
FIG_49
FIG_47B
FIG_47A
RACK ASSEMBLY
FIG_48B
FIG_48A
STYLUS HOLDER

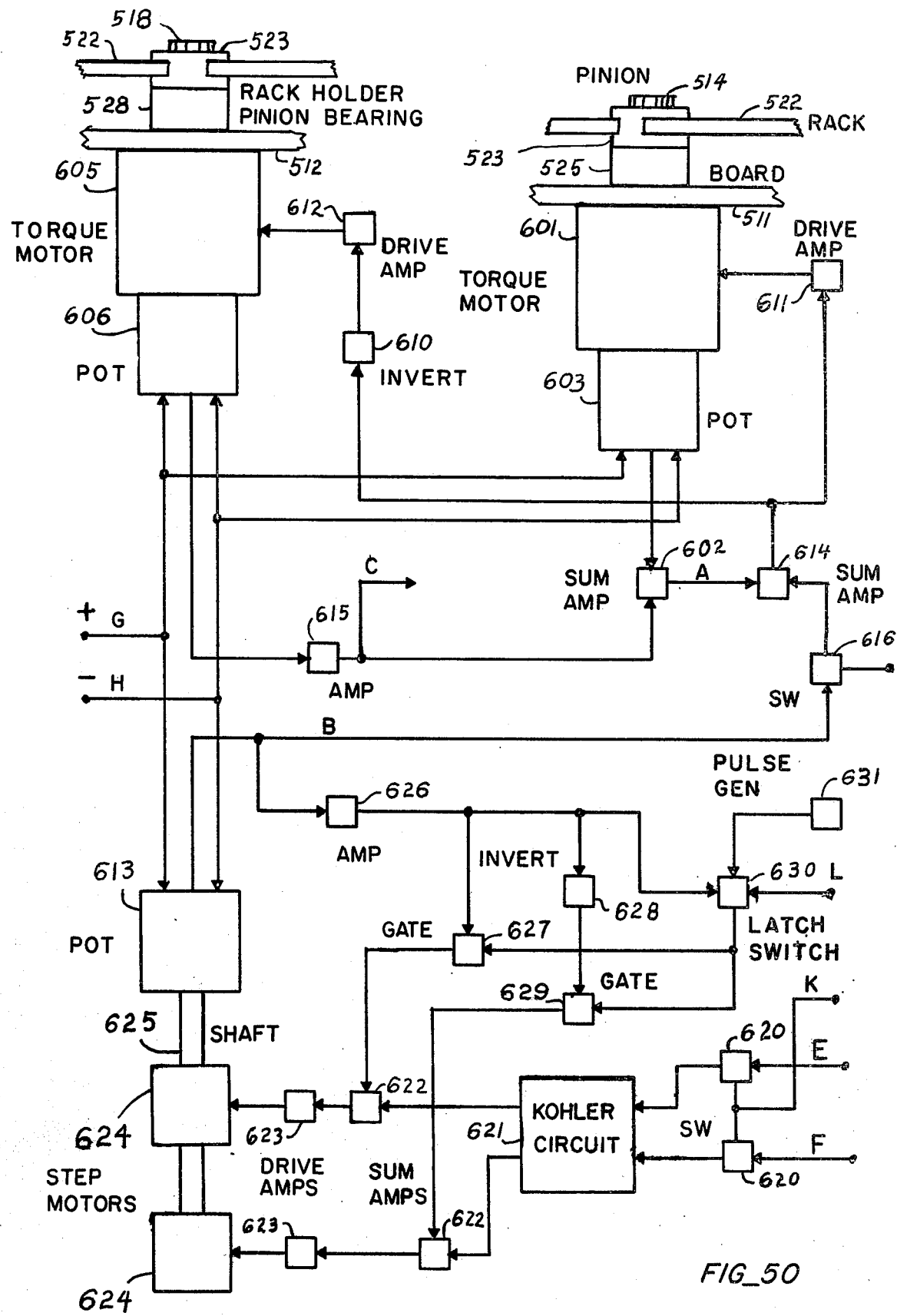
FIG_50

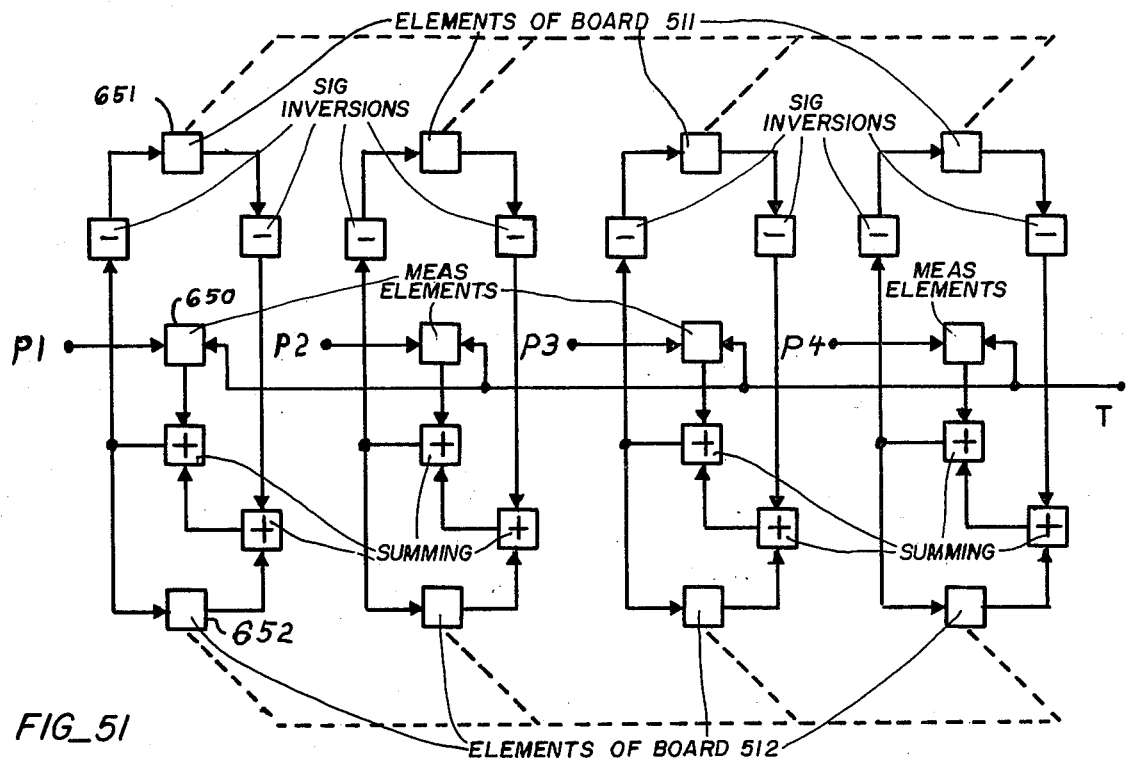
FIG_51
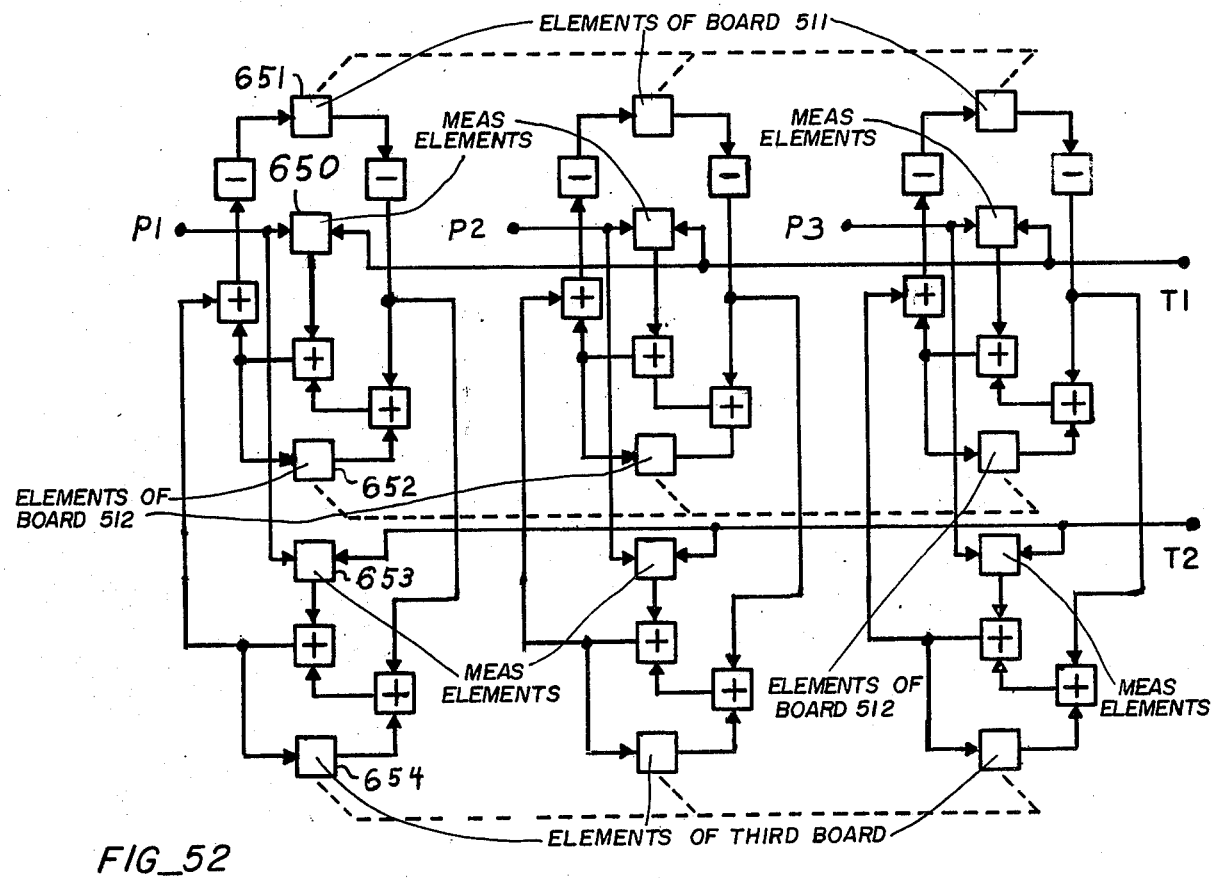
FIG_52

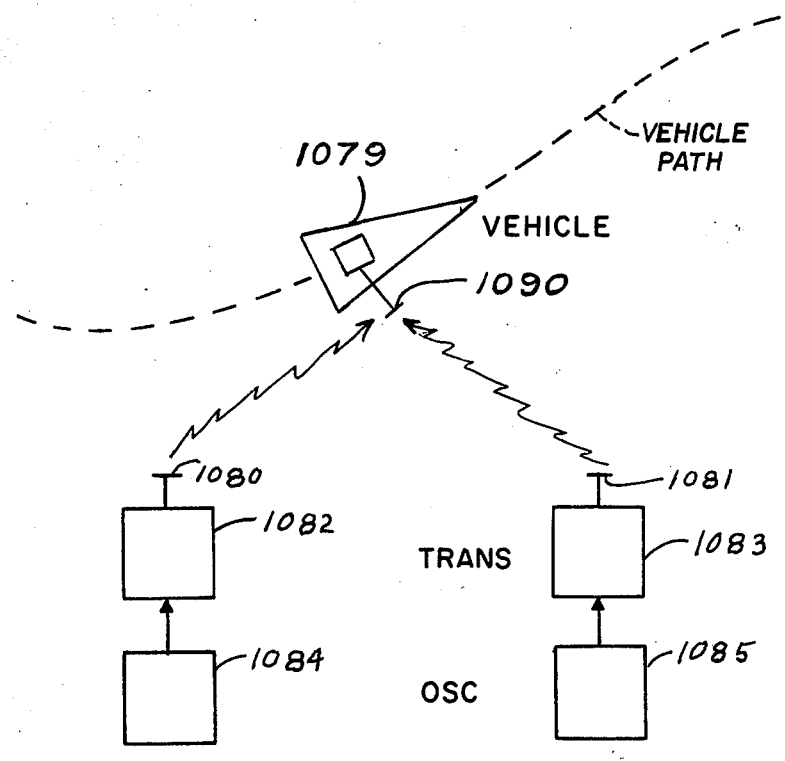
FIG_53
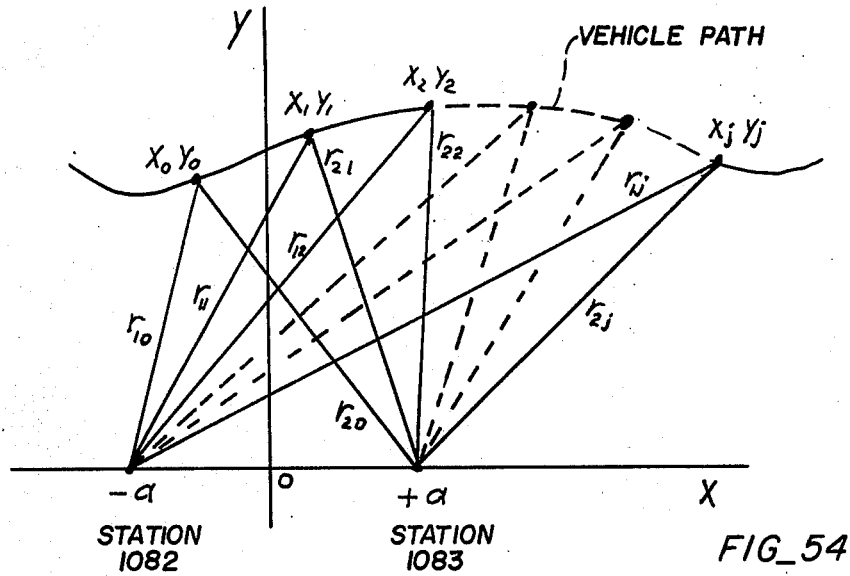
FIG_54

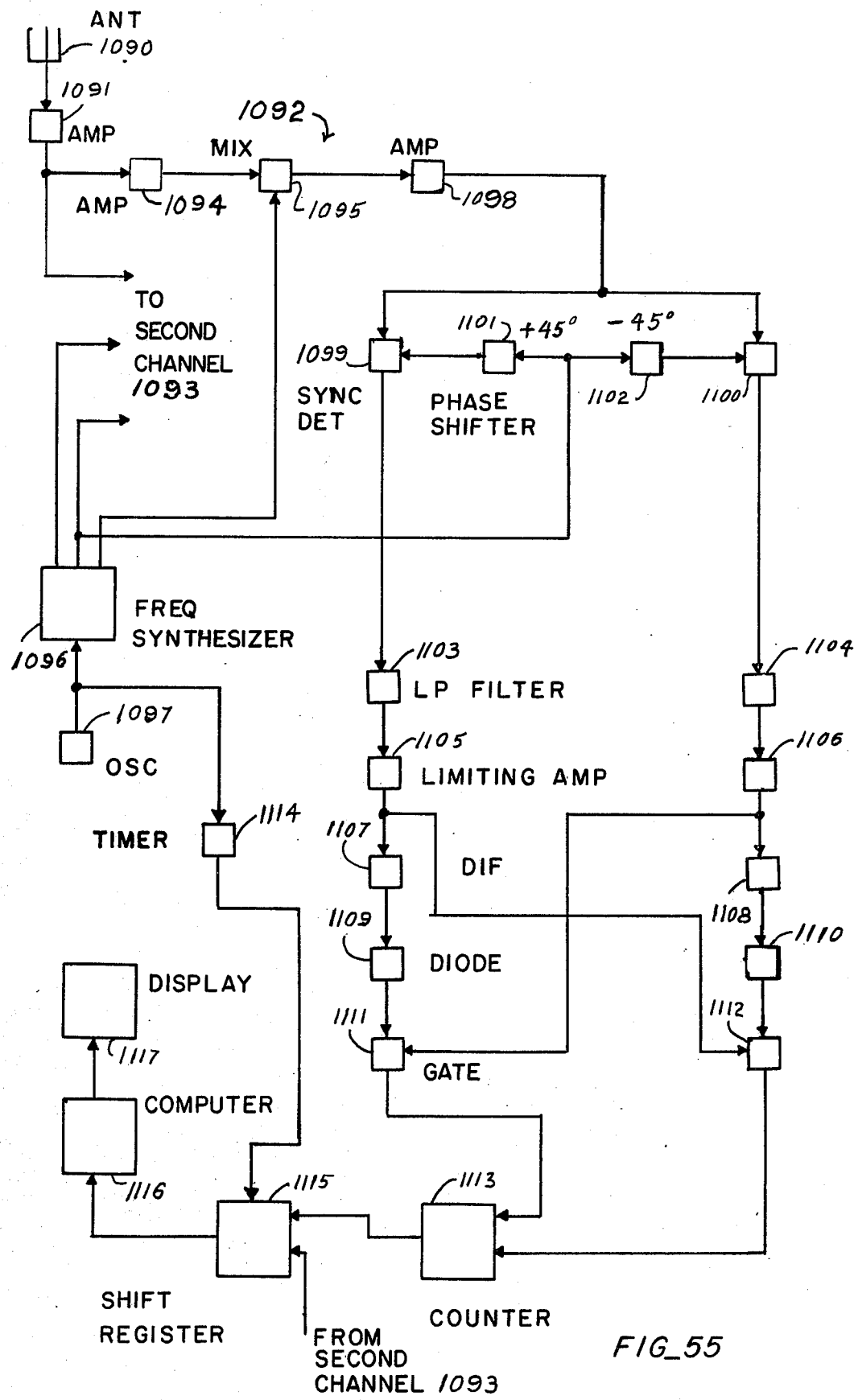
FIG_55

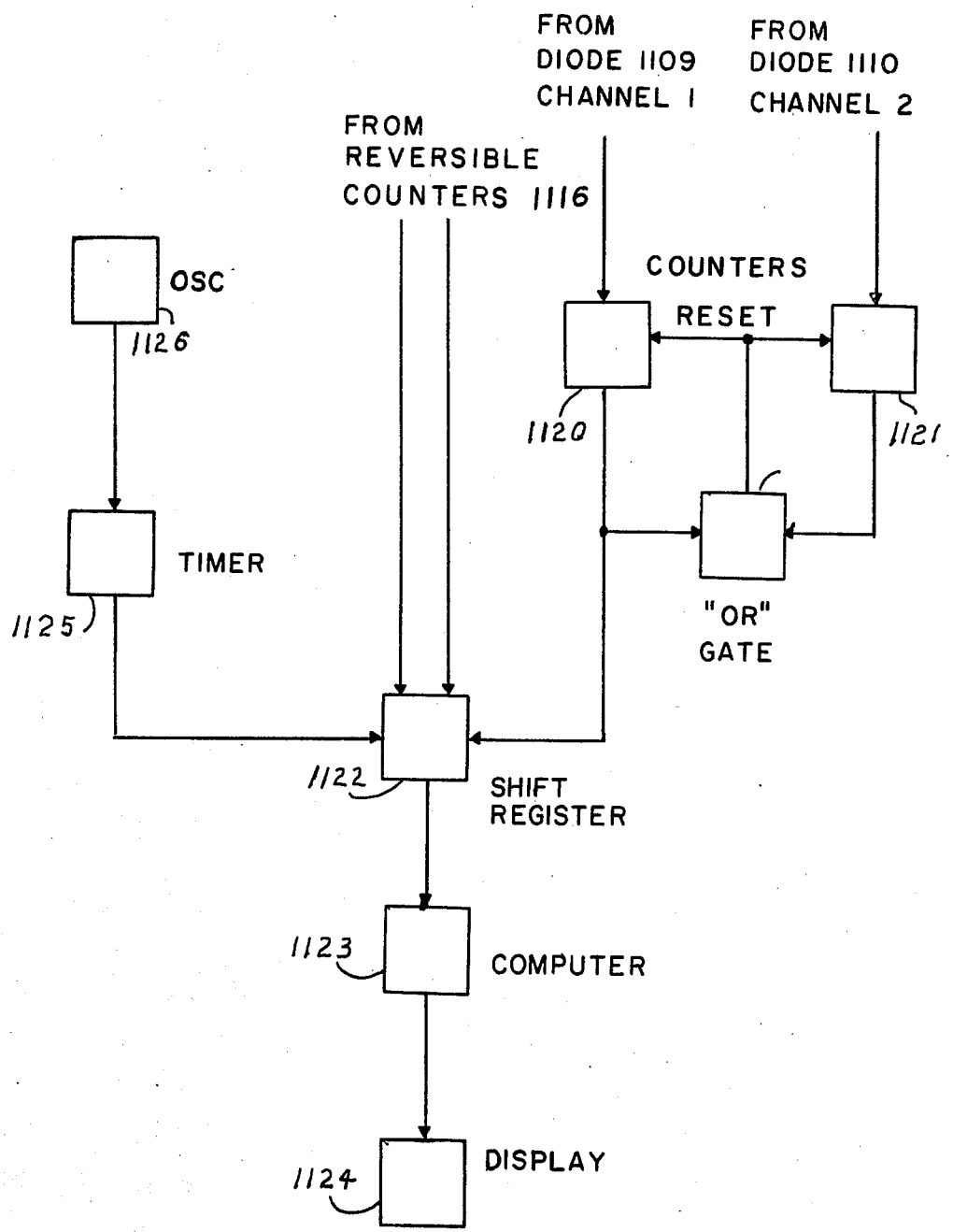
FIG_56

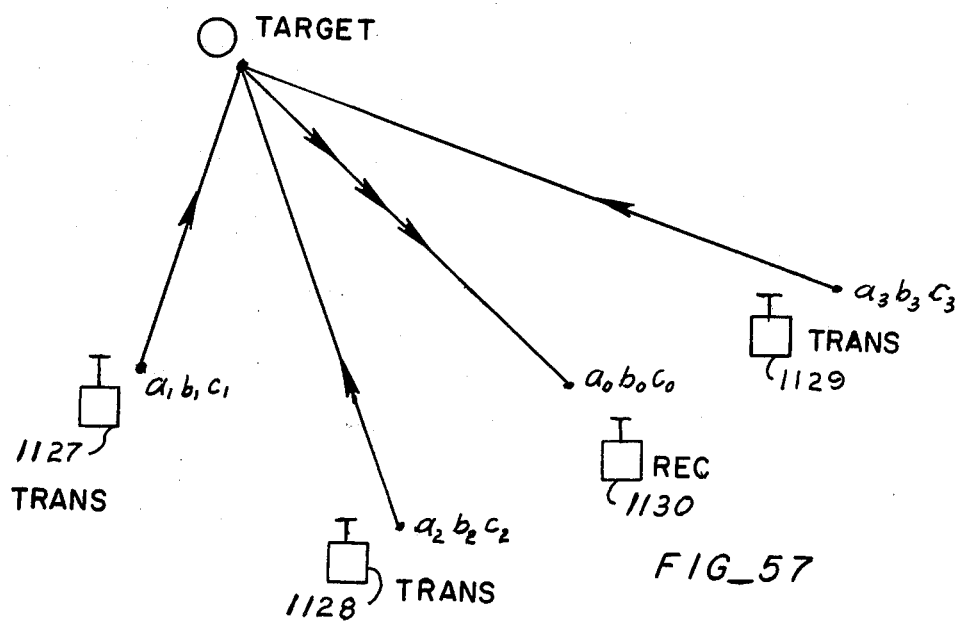
FIG_57

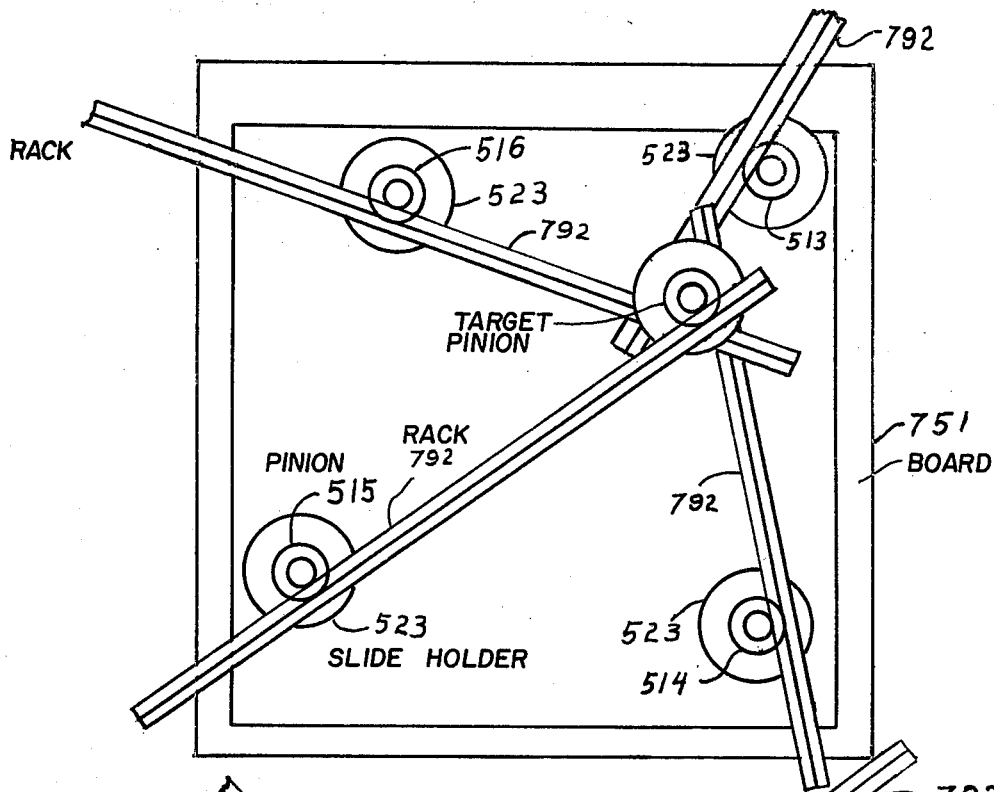
FIG_62
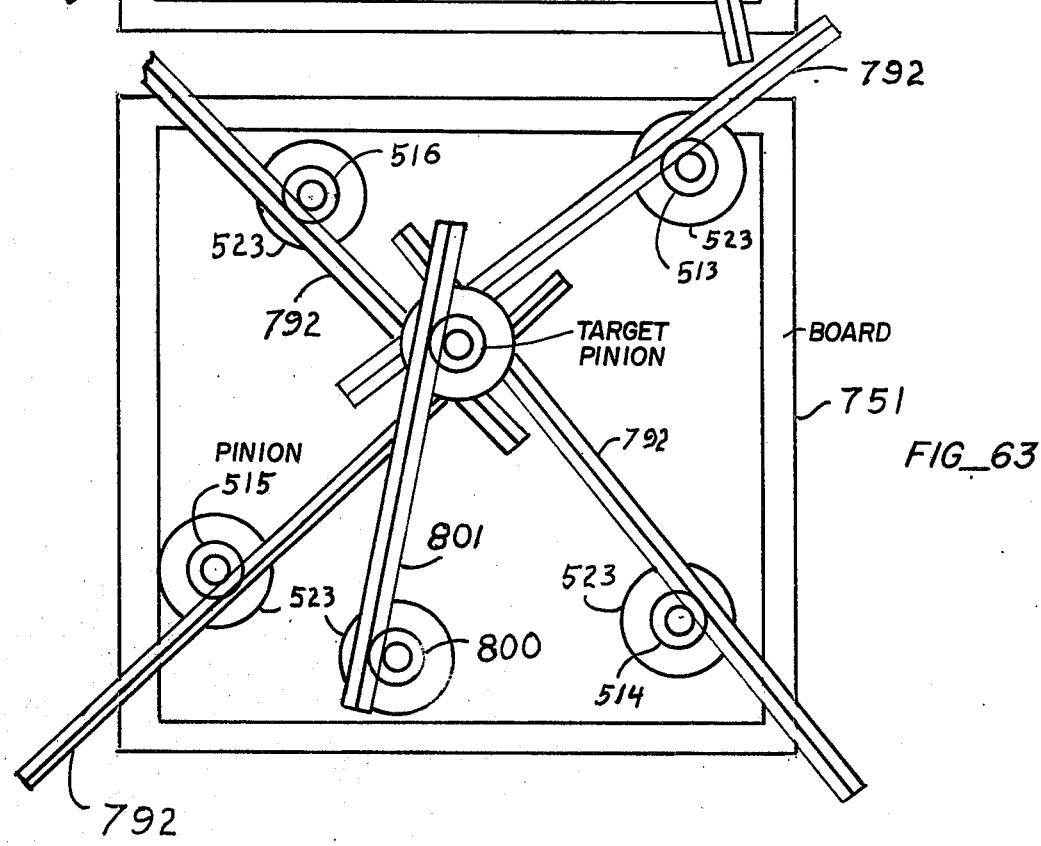
FIG_63

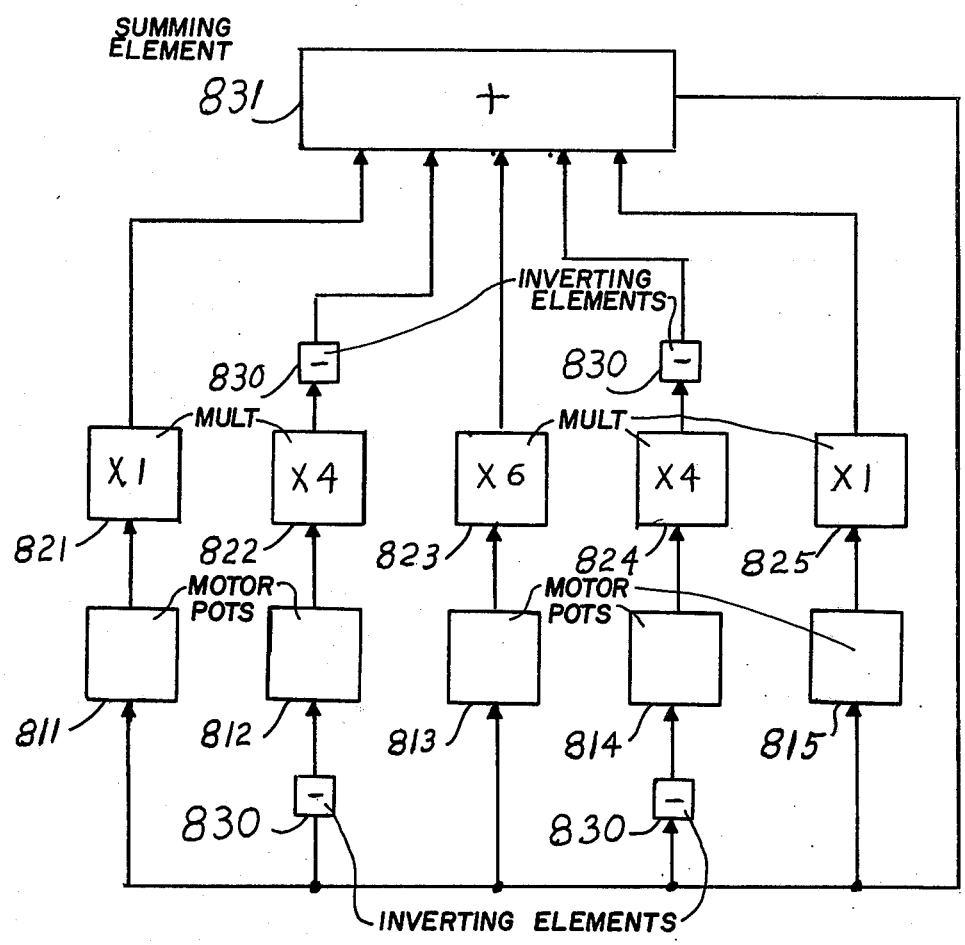
FIG_64

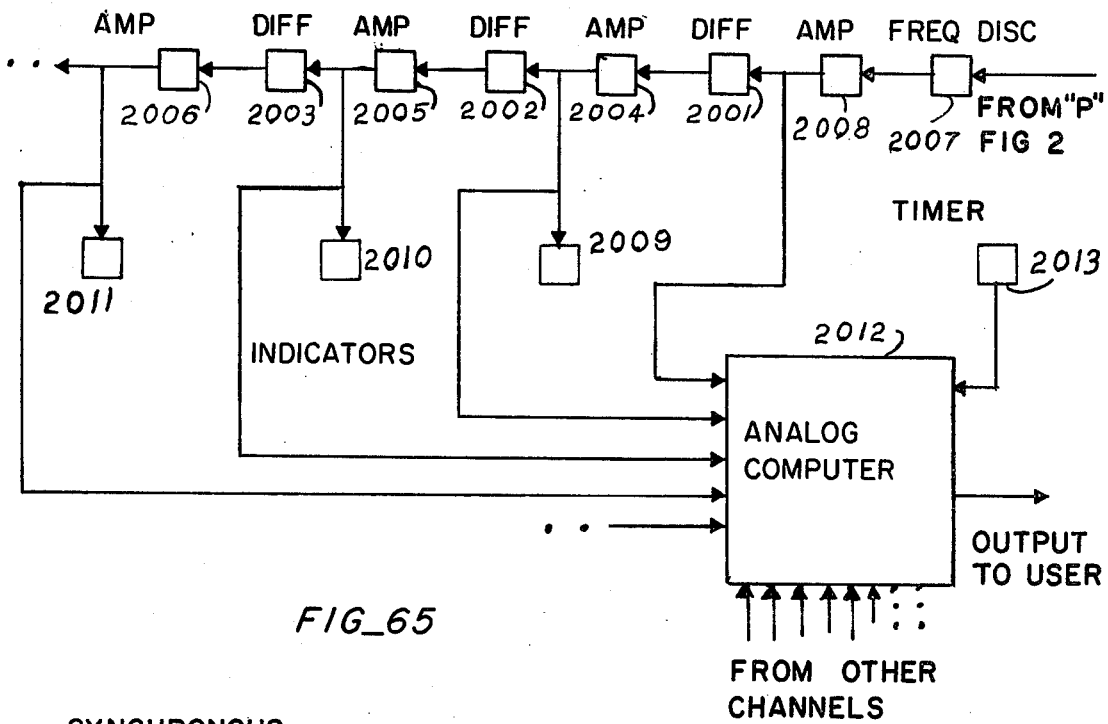
FIG_65
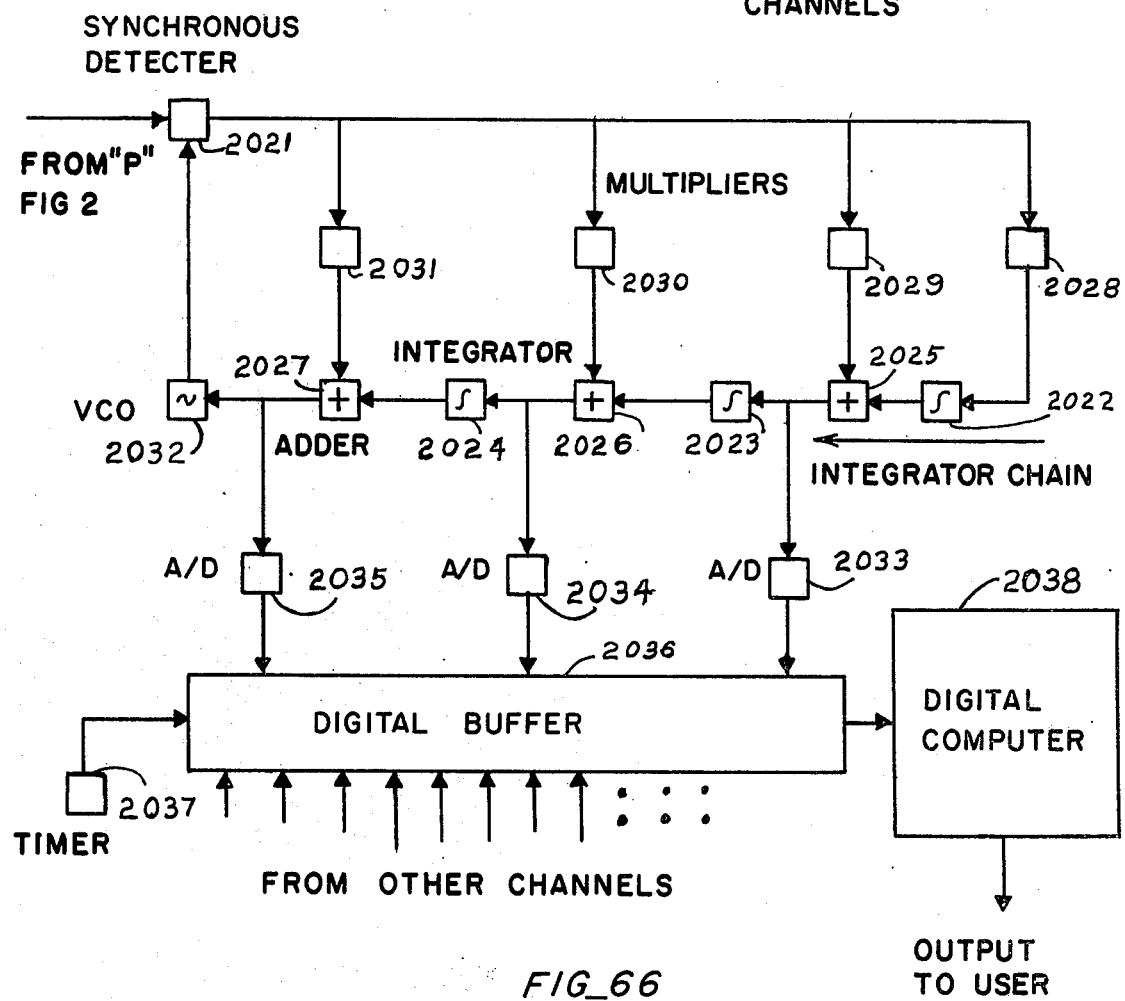
FIG_66

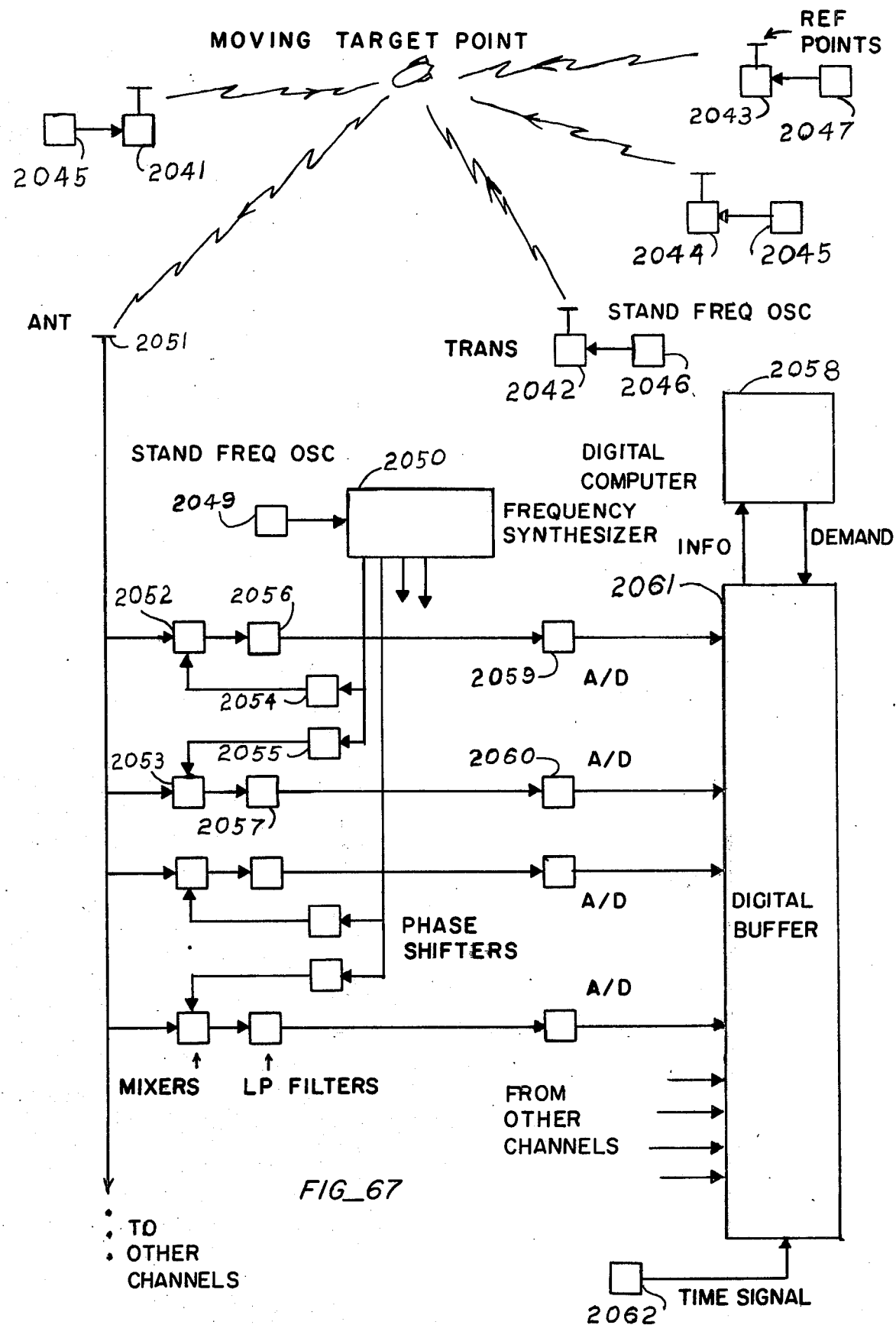
FIG_67

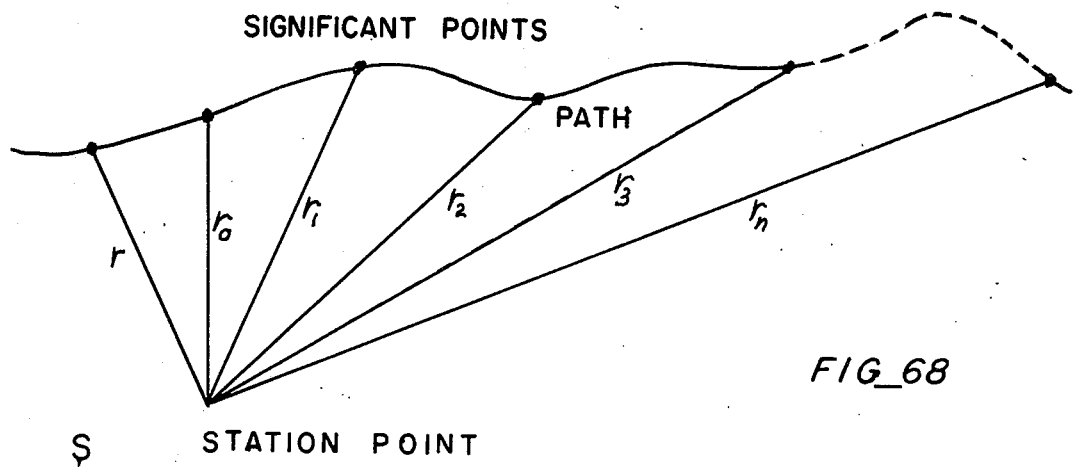
FIG_68
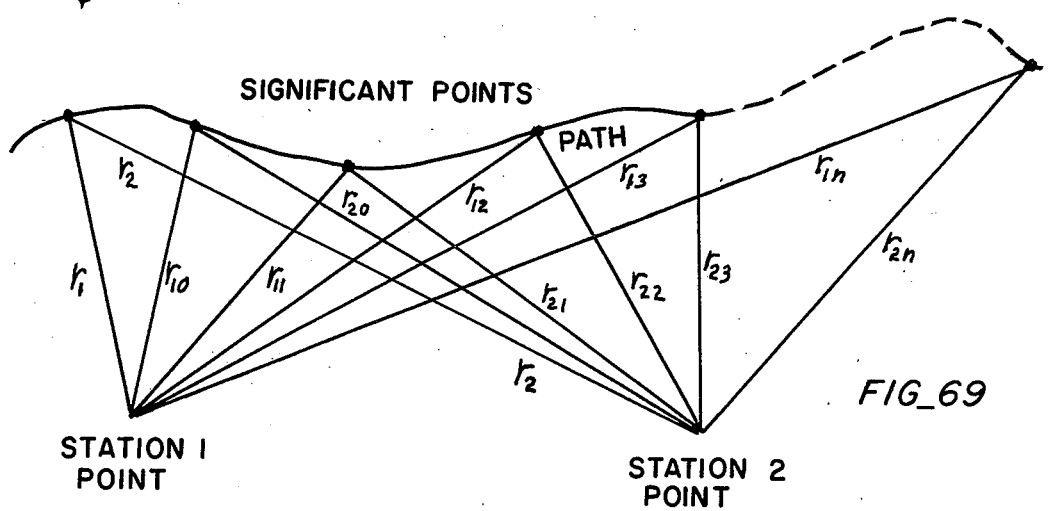
FIG_69
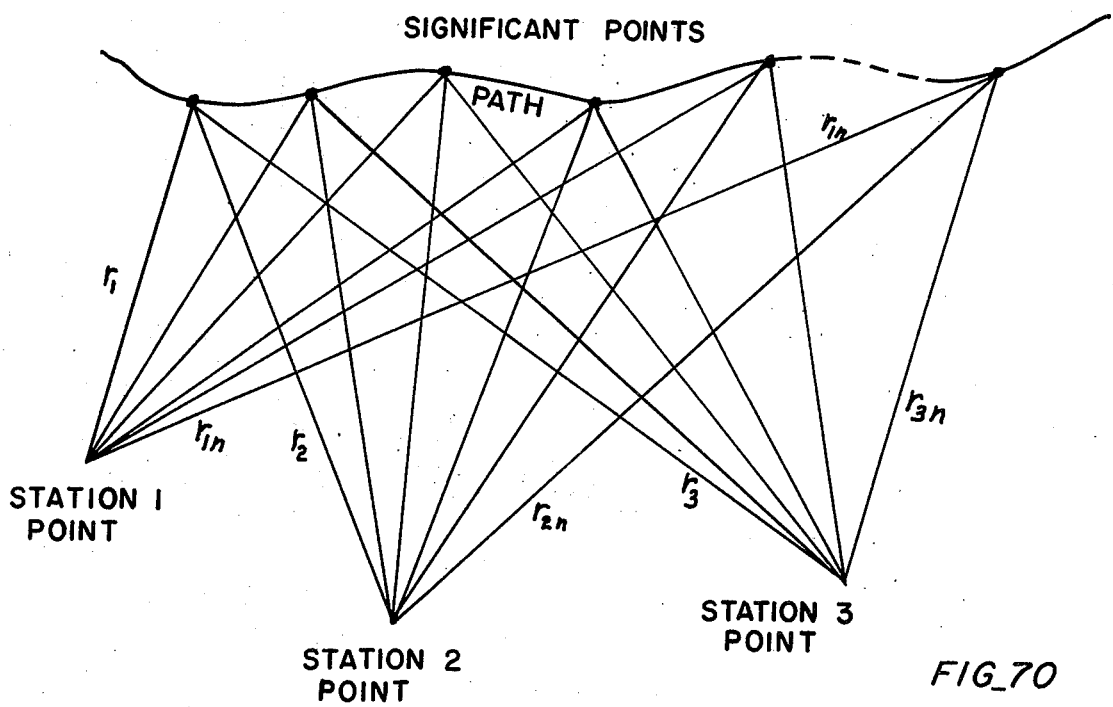
FIG_70

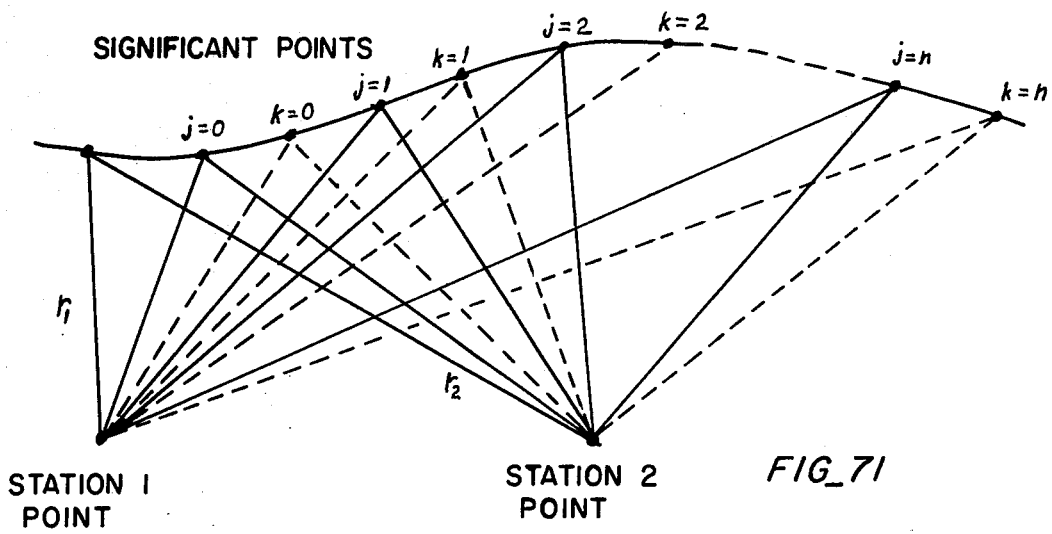
FIG_71

METHOD AND APPARATUS FOR AUTOMATICALLY DETECTING AND TRACKING MOVING OBJECTS AND SIMILAR APPLICATIONS

CROSS REFERENCES TO RELATED APPLICATIONS

This is a continuation-in-part of copending patent applications Ser. No. 86,770, filed Feb. 2, 1961, now U.S. Pat. No. 3,706,096 issued Dec. 12, 1972, Ser. No. 817,765, filed Apr. 21, 1969, now U.S. Pat. No. 3,691,560 issued Sept. 12, 1972, and Ser. No. 74,180 filed Sept. 21, 1970, now U.S. Pat. No. 3,795,911 issued Mar. 5, 1974, this application being also a continuation-in-part of application Ser. No. 278,191, filed May 6, 1963, now abandoned, and of application Ser. No. 288,429, filed Sept. 12, 1972, now U.S. Pat. No. 3,866,229, issued Feb. 11, 1975. Related applications of the applicant include patent application Ser. No. 335,454, filed Dec. 5, 1963, now U.S. Pat. No. 3,242,467 issued Mar. 22, 1966 entitled Detection and Tracking of Multiple Targets; Ser. No. 289,609, filed June 21, 1963, now U.S. Pat. No. 3,286,263, issued Nov. 15, 1966 entitled Polystation Detector For Multiple Targets; Ser. No. 312,598, filed Sept. 30, 1963, now U.S. Pat. No. 3,270,340, issued Aug. 30, 1966 entitled Method of Echo Grouping; and Ser. No. 420,623, filed Dec. 23, 1964, now U.S. Pat. No. 3,445,847, issued May 20, 1969 entitled Method and Apparatus for Geometrical Determinations. The above-identified copending patent application Ser. No. 74,180 is specifically incorporated herein by reference.

SUMMARY OF THE INVENTION

The physical basis of the instant invention is a particular part of a more general domain of physical phenomena which I discovered, particular parts of which I have used as the bases of several other inventions. Some of these other inventions are described in the specifications of the referenced patent applications. In absurdedly few words this domain of physical phenomena, at least as it is relative here, can be characterized somewhat as follows in terms of geometry:

A configuration of a sufficient number of points is entirely determined by a sufficient number of its static or temporal variations of suitable kind and of suitable combination.

The instant specification is only concerned with variations of the physical quantities with respect to time. (See U.S. Pat. Nos. 3,286,263 and 3,445,847 for particular systems not concerned with variation with respect to time.) In the general domain the variation of a configuration of points comprises the variation of an indeterminate number of possible geometric parameters, which geometric parameters in sufficient combination define the configuration. One kind of parameters whose variations can be sensed in my invention are angular. (See U.S. Pat. No. 3,445,847 for systems of this type based on angular variations.) In the instant specification I am only concerned with geometric parameters, that are lineal in character. Lineal geometric parameters, or simply lineal parameters here, is defined for the purpose of this disclosure as being limited to any of the following geometric elements: the distance, or range, between two points; the sum of two such distances; the difference between two such distances; any other combination of such distances.

An embodiment of my instant invention is a system employed in air traffic control and collision avoidance applications. In this embodiment of my invention each aircraft comprised by the system carries communications equipment capable of maintaining wave communications, in at least one direction, with a plurality of other aircraft comprised by the system. The variations (with respect to time) of lineal parameters defined by the points of position of the aircraft are sensed by the equipments carried aboard the aircraft. The communications network established by the airborne communications apparatus is such that it provides to a single aircraft signals whose information content includes the variations of the lineal parameters relative to all of the aircraft of the system. This information content is reduced from the signals, and the position-motion state of each aircraft of the system is determined on board the single aircraft. Each aircraft has its own signal reduction and computation equipment on board. Alternatively the information computed on board at least one aircraft is communicated to other aircraft.

In the above described embodiment of my invention it is seen that there are no fixed stations required nor any stations whose positions or motions are known a priori. In other embodiments of my invention use is made of ground stations whose positions are known. The additional information provided in the system reduces the number of points required in the geometric configuration of the system.

I have made a variety of ancillary improvements in the art concomittant with my invention, and some of these improvements are described in this specification.

My invention is particularly useful in tracking, navigating and the like under conditions of unknown acceleration, jerk, etc. The condition of straight line-constant speed motion (constant velocity) is almost never approximated in practical application to such a degree as to permit use of this assumption in systems employing only doppler type measurements. It can be shown that the error resultant of such assumption does not approach zero in practical systems as the measurement interval is reduced. Instead the error resultant of such assumptions frequently tends toward an irreducible minimum greater than that error which can be tolerated. My invention makes possible the accomodation of unknown accelerations of it matters not what order and of any practical magnitude.

In the practice of my invention it is not necessary to employ any equations of motion or other assumptions relative to the position-motion state. It is possible, in certain modes of my invention, to achieve certain advantages through the employment of practical assumptions relative to the position-motion state. Among these advantages, available under particular restricted circumstances, is the improvement of accuracy through the introduction of redundancy. Another advantage that similarly may be achieved in this way is the reduction in the number of stations required. Furthermore the introduction of such assumptions or equations of motion is useful in particular modes of my invention in predicting and interpolating dimensions of the position-motion state.

OBJECT

It is an object of my invention to determine automatically dimensions of the position-motion state of moving objects and/or fixed objects by sensing variation of geometric parameters, providing such determination in a manner that has improved availability, accuracy, sensitivity, reliability, cost-performance index, and/or greater convenience over the methods of the prior art, and to achieve this in a manner that provides improved resistance to countermeasures and/or other interference.

It is a further object of my invention to determine automatically the trajectory or path of a moving object.

BRIEF DESCRIPTION OF DRAWINGS

Referring to the drawings briefly:

FIG. 1 is a schematic diagram showing a single legged reflective system;

FIG. 2 is a schematic drawing of a radial velocity measuring station;

FIG. 3 is a schematic drawing of a radial displacement measuring station;

FIG. 4 is a schematic drawing of a measuring station provided with a reversible counter;

FIG. 4A is a fragmentary drawing showing a cathode ray tube used in the arrangement shown in FIG. 4;

FIG. 4B is a schematic drawing of a pulse forming network adapted to be used in connection with the circuit shown in FIG. 4 and in some of the other circuits;

FIG. 5 is a diagram of the space track station distribution;

FIG. 6 is a schematic drawing of a space track station;

FIG. 7 is a diagram of a submarine detection system;

FIG. 8 is a schematic drawing of a submarine detection station;

FIG. 9 is a diagram of a pulsed light tracking system;

FIG. 10 is a schematic drawing of a pulsed light tracking station;

FIG. 11 is a drawing of an arrangement for getting one legged data to be used in accordance with this invention;

FIG. 12 is a drawing of a four station tracking system;

FIG. 13 is a schematic diagram of a transponder circuit;

FIG. 14 is a schematic diagram of a tracking station;

FIG. 19 is a schematic diagram of the circuit of the airborne navigation receiver;

FIG. 20 is a schematic diagram of the circuit used in the ground beacon transmitter of the navigation system;

FIG. 21 is a diagram of the navigation system arranged in accordance with this invention;

FIG. 22 is a diagram of the station distribution for the vertical landing aid arranged in accordance with this invention;

FIG. 23 is a schematic drawing of the circuit used in the ground station of the vertical landing aid;

FIG. 24 is a schematic drawing of an alternative circuit used in the vertical landing aid for recording phase change;

FIG. 25 is a diagram used to facilitate explanation of the two station measurement in the vertical landing aid;

FIG. 26 is a diagram showing the antenna arrangement on an aircraft as used in the ground controlled landing sensor system;

FIG. 27 is a schematic diagram of connections used in the aircraft transmitter;

FIG. 28 is a diagram showing the ground station distribution;

FIG. 29 is a schematic diagram of connections of the individual runway station 325;

FIG. 30 is a diagram used to facilitate explanation of an arrangement for obtaining single legged data from double legged data;

FIG. 31 is a diagram showing the arrangement of stations used in the mortar locator system;

FIG. 32 is a schematic diagram of connections used in the remote mortar locator station;

FIG. 33 is a schematic diagram of connections used in the control center of the mortar locator;

FIG. 34 is a schematic diagram of connections of an improved phaselocked oscillator;

FIG. 35 is a schematic diagram of connections adapted to be used in a cycle timing station;

FIG. 36 is a schematic diagram of connections adapted to be used in a cycle counter station;

FIG. 37 is a matrix error equation: six-station; single reading; single legged; velocity measurement; general station distribution;

FIG. 38 is a matrix error equation: six-station; single reading; single legged; displacement measurement; general station distribution;

FIG. 39 is a matrix error equation: seven-station; single reading; double legged; displacement measurement; general station distribution; 6-1 station ratio;

FIG. 40 is a matrix error equation: 4 station; three reading; single legged; displacement measurement; general station distribution;

FIG. 41 is a matrix error equation: seven-station; single reading; single legged; displacement measurement; general station distribution; vehicle standard oscillator frequency unknown;

FIG. 42 shows a navigation system using pulsed transmitters as beacons;

FIG. 43 shows a four-station planar navigation system;

FIG. 44 shows plan view of table top analog model;

FIG. 45 shows perspective view of table top analog model;

FIG. 46A shows top view rack and pinion type analog computer;

FIG. 46B shows side view of rack and pinion type analog model;

FIG. 47A shows the rack assembly, side view;

FIG. 47B shows the rack assembly, top view;

FIG. 48A shows the stylus holder, side view;

FIG. 48B shows the stylus holder, top view;

FIG. 49 shows the connections between the doppler detection element and the analog computer thus showing how the data is fed into the computer or indicator;

FIG. 50 shows servo system for driving pinions of rack and pinion type analog computer or display;

FIG. 51 shows connections of programming of rack and pinion type analog device for a four station, single reading, planar navigation system;

FIG. 52 shows the connections or programming of a rack and pinion type of analog device for a three station, multiple reading navigation system;

FIG. 53 shows a two-station navigation system;

FIG. 54 indicates the geometrical relationships of the two-station navigation system;

FIG. 55 indicates the doppler measurement computation and display elements of the airborne equipment of a two-station navigation system;

FIG. 56 shows a modification of the two-station navigation system in which the readings are taken automatically for equal increments of the faster varying range;

FIG. 57 shows a two-legged system for tracking reflecting targets and comprising three illuminating transmitting stations and a single receiving station;

FIG. 62 shows four-station, single legged programming of the rack and pinion type of analog computer;

FIG. 63 shows five-station double legged programming of the rack and pinion type of analog computer;

FIG. 64 shows the cartesian driving elements programmed for a four reading system configuration;

FIG. 65 is a schematic diagram of apparatus for determining time derivatives of ranges;

FIG. 66 is a schematic diagram showing another form of apparatus for determining time derivatives of ranges;

FIG. 67 is a schematic diagram of a receiving system and associated digitally-operated apparatus for digital processing of data;

FIG. 68 is a diagram used to facilitate explanation of a process for determining range from a single station;

FIG. 69 is a diagram used to facilitate explanation of a process for determining range from two stations;

FIG. 70 is a diagram used to facilitate explanation of a process for determining range from three stations;

FIG. 71 is a diagram used to facilitate explanation of a modified process for determining range from two stations.

APPLICANT'S INVENTION WITH REFERENCE TO THE DRAWINGS

Figure 15:
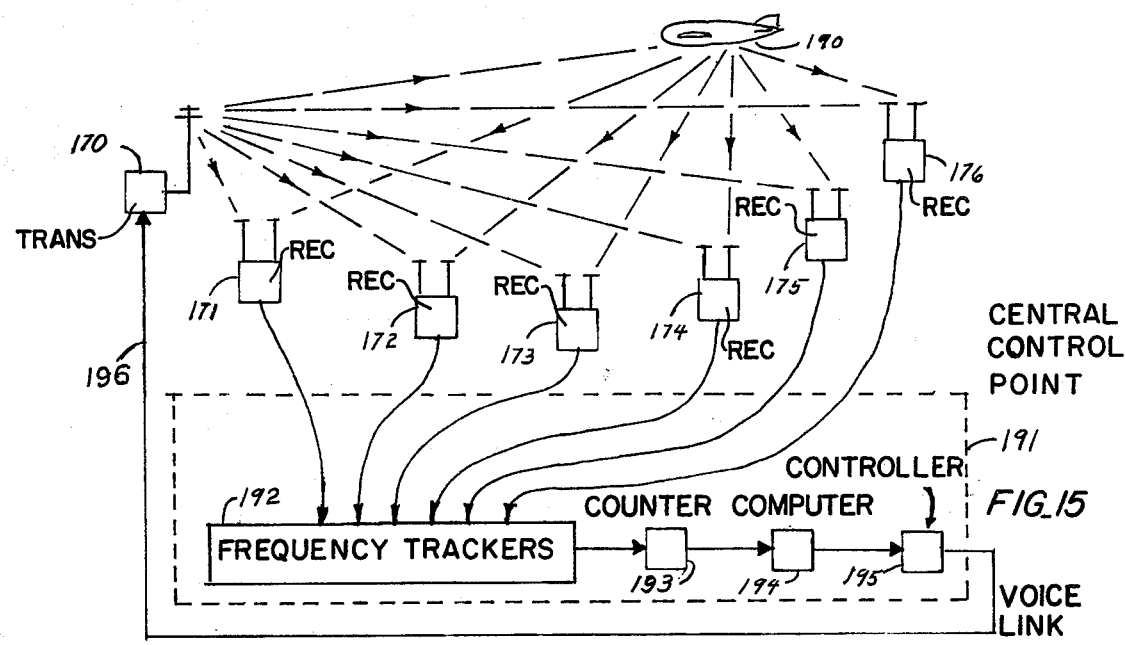
FIG. 15 is a diagram of the air traffic control system.

The instant specification describes a variety of systems employing the generic invention disclosed herein, and a brief description of several systems now will be provided. FIG. 1 shows a system of six doppler stations designated 1 through 6 for performing six simultaneous partial measurements of the motion of a vehicle. Each station measures either the finite displacement of the vehicle in the direction of the station or the time rate of such displacement. Six simultaneous measurements, one from each station, forms a set of data which, with the knowledge of the station positions, fully, exactly, and uniquely defines and determines the position of the moving vehicle. This measured data is actually a set of specialized coordinates specifying two positions of the vehicle. The word "coordinate" is defined by *Webster's New Collegiate Dictionary* as "Any of a number of magnitudes that determine position". A computer is also shown in FIG. 1. It is the purpose of the computer to convert the measurement data completely specifying the two positions of the vehicle into a usable system of coordinates also specifying either or both of the positions of the vehicle. In this particular instance the measured quantities are transformed to the cartesian coordinates by the computer. The methods of performing this computation are an important part of the Applicant's invention and are described in detail and with particularity in the instant specification.

Other configurations of systems are also described in the specification employing other numbers of stations. In some of these configurations the transmitter is in the vehicle and the receivers are in the ground stations. In other systems the vehicle carries a receiver and navigates relative to ground beacons. Some systems employ transponders in the vehicle and some, as shown in FIG. 1, employ the vehicle as a reflector. Furthermore, in reflector or transponder systems, some systems employ transmitters and receivers located at the same fixed stations as shown in FIG. 1 while other systems show the transmitters and receivers located at different ground stations. Some of the systems disclosed employ unmodulated continuous waves and some of the systems employ pulsed waves. In some systems coherent waves are employed while in at least one system shown in FIG. 9 and 10 noncoherent waves are employed. One skilled in the art will at once recognize without further explanation that means are common in the art for measuring the changes of the length of a wave propagation path which is caused to vary by the relative motion of the wave emitter, the wave receiver, or some reflection point. Details of various electronic apparatus for performing the individual measurements are shown in FIGS. 2, 3, 4, 4B, 8, 10, 13, 14, 16, 17, 18, 19, 20, 23, 24, 29, 32, 33, 34, 35, 36, 42, 49, 55, and 56.

FIG. 11 shows the relationships involved in the measurement of the difference of certain geometric parameters. The particular difference measurements illustrated are those of lineal distances. In this particular instance the difference values are determined by measurement of the change in the shape of a geometrical configuration resultant from the movement of a vehicle from Point 1 to Point 2. The configuration whose shape changes is the configuration formed by points representing the vehicle 111, the transmitting and receiving station 110, and the receiving station 112. Two types of measurement are indicated. In the first type waves are transmitted from the station 110 and reflected back to that same station by the vehicle. As the vehilce moves from Point 1 to Point 2 the change in the total propagation distance is measured at the station 110. Thus the change in range from the station 110 to the vehicle 111 is measured as the vehicle moves from Point 1 to Point 2. In the second measurement waves are transmitted from the station 110 to the vehicle 111 and reflected by the vehicle to the receiving station 112. The receiving station 112 measures the change in the propagation path from station 110 to vehicle 111 thence to station 112 which change of propagation path length occurs as the vehicle moves from Point 1 to Point 2.

The stations shown in FIG. 11 may employ unmodulated continuous waves to perform the measurements or they may employ tone modulated or pulse modulated waves. Station 110 may transmit a first pulse when the vehicle is at Point 1 and a second pulse a known time interval later when the vehicle is at Point 2. The difference in time between the arrivals of the two pulses reflected from the vehicle is then measured at station 110. The difference in the lengths of the propagation path associated with Point 1 and the length of the propagation path associated with Point 2 may be derived by subtracting from the measured time difference of the arrivals of the two pulses at station 110 the known time difference between the transmissions of the two pulses from station 110. To get the difference of the propagation path lengths $r_{11}$ and $r_{12}$, one merely multiplies the difference of these two time intervals by the velocity of propagation. Similarly at the station 112 the time difference between the arrivals of the two pulses is measured and the difference between the path length comprising $r_{11}$ and $r_{21}$ and the path comprising $r_{12}$ and $r_{22}$ is derived. It is unnecessary that the time interval between the transmission of a pulse by station 110 and the reception of that pulse by station 112 be measured or known. From this last fact is derived one of the very substantial advantages of the instant invention over elliptical methods. Elliptical methods require very accurate knowledge or measurement of such time intervals.

In an alternative system the station 110 may transmit unmodulated continuous waves. In this method the echo signals returning to station 110 may be beat with a signal of the frequency of the transmitted signal and the number of beats counted during a given time interval during which the vehicle travels between Point 1 and Point 2. The beat count may be multiplied by the wave length to obtain the change in the propagation path length. Station 112 operates in a similar manner, except that it need not transmit any signal since it operates from the signal transmitted by station 110 and reflected by the vehicle 111. The signal used to beat with the echo signal can be derived by direct reception of the signal radiated by the station 110 or it may be derived from a local oscillator whose frequency can be maintained sufficiently close to the frequency of the signal transmitted by station 110. The measurement performed by station 110 operating by itself is called a one-legged measurement. The measurement performed by station 112 operating on the signal originally transmitted by station 110 is called a two-legged measurement.

Another type of two-legged measurement is illustrated in FIG. 25. In this type of measurement the parameter whose difference is measured is itself the difference of two geometric elements. These geometric elements are the ranges from the moving vehicle to each of two stations. As the vehicle moves from Point 1 to Point 2 the change in this parameter is measured. One way of performing this measurement is to provide the vehicle with a continuous wave transmitter. Signals from the transmitter in the vehicle are received at Station 1 and at Station 2. The relative change in phase between these two received signals is measured by the apparatus shown in FIG. 24. This relative change of phase multiplied by the wave length is the measured difference between a geometric parameter associated with Point 1 and the corresponding parameter associated with Point 2. The difference is the measured change occurring as the vehicle moves from Point 1 to Point 2.

In an alternate system the vehicle could transmit a pulse at an initial point and another pulse at a known time interval later at a succeeding point, these points being Point 1 and Point 2. The difference in the arrival times of these two pulses at Station 1 is measured. The difference of the arrival times of the pulses at Station 2 is also measured. When these two readings are subtracted and the result multiplied by the velocity of propagation one obtains the same geometrical measurement as is performed employing continuous waves. In the system shown in FIG. 22 five receiving points are employed and determination of the position of the moving vehicle in three-dimensional space is achieved without the knowledge of the frequency of transmission. Similarly if pulses are employed one need not know "a priori" the time between transmission of the pulses. It is shown in the specification that this time interval or frequency quantity may be determined by incorporating it as an unknown quantity which is determined simultaneously with the position data by performing the proper number of measurements.

Not all combinations of measurements of finite or infinitesimal differences of configuration parameters determine fully, exactly and uniquely the locations of the points comprising the configurations. It is necessary that there be a sufficient number of nonredundant measurements. This number of independent measurements must at least equal the total number of the degrees of freedom of the several points whose positions are simultaneously determined. If there are otherwise unknown time parameters incorporated in the operation of the system these elements contribute to the number of degrees of freedom, and additional measurements must be employed. It is unnecessary that all of the measurements be performed in the same time interval. Consecutive or overlapping measurements may also be employed. Using such consecutive or overlapping measurements it is possible to employ fewer stations since each station can be employed in taking more than one measurement in forming a group of measurements defining the locations of a plurality of points whose locations are otherwise unknown. It is essential in employing more points of unknown location that not more degrees of freedom are introduced into the determination than measurements.

The Applicant's invention may be employed to determine sizes and shapes of configurations of points all of whose positions relative to each other are entirely unknown. As the number of known elements of the subject configuration is increased relative to the number of unknown elements the number of different measurements necessary to define the configuration by the method of the instant invention becomes smaller.

USES AND ADVANTAGES

The geometrical principles underlying the operation of the disclosed systems and first discovered by the Applicant, are real, tangible and definite. Similarly the practical advantages provided by the utilization of these principles in the systems are real, tangible and definite. The invention makes possible the exact and specific determination of the position of a moving object by doppler sensing alone, without any measurement of ranges from any station to the moving object or measurement of angles or measurement of precise time differences between stations such as the Loran system or the Ordir systems require.

In the discussion of apparatus for performing measurements suitable for the purpose of the invention the specification is directed to those systems that are dependent upon time variations of geometric elements. The specific methods described in detail in the specification will be seen to be but particular examples of the invention. Other apparatus may be employed for determining similar geometric quantities relative to the otherwise unknown locations of stationary objects. The fundamental geometrical principles established by the Applicant for specifically determining the point locations in terms of a plurality of measurements as described above apply as well to stationary objects as to moving objects.

DEFINITIONS

Measurement

Much of a substantial region of embodiment of the instant invention is dependent upon the element of directly measuring the change of the instantaneous magnitude of at least one physical quantity. Such measurement of change is identical in its fundamental nature to the measurement of the distance travelled in an automobile by reading the odometer on the dashboard at a first epoch and at a second epoch. The difference of these two readings is commonly derived by subtraction. For the accuracy required in such a measurement the process of subtraction can be accomplished by a person of reasonable mental powers without the manipulation of a tool of any sort. The difference of the two readings so derived represents the distance travelled by the automobile between the two epochs. Neither of the two readings necessarily represents the total distance travelled by the automobile prior to that particular reading. It is obviously not necessary to measure or otherwise establish the total distance travelled by the automobile prior to either epoch in order to use the odometer to measure the distance travelled by the automobile in the time interval between the two epochs. Thus one does not measure the distance travelled prior to the first epoch and the distance travelled prior to the second epoch and then subtract the one from the other. Actually one measures nothing by reading the odometer at the first epoch. One merely performs a part of the total measurement process at this epoch by establishing the "zero" or reference value upon which the measurement is based. The measurement process is continuing between the first epoch and the second epoch. The measurement requires a finite length of time to perform, and the length of time is the time between the first epoch and the second epoch (discounting the time required for performing ancillary functions such as adjusting the equipment and securing it and recording the data).

Furthermore no information of value is obtained by the second reading without having the information derived from the first reading. Thus one can shown that neither reading in itself constitutes a measurement since no significant information is imparted by a single reading without reference to some zero or other reference reading. The performance of two such readings at separate epochs however does provide a complete element of information having definite, understandable physical significance. To reduce this information to a single digital value instead of two digital values, each value the result of a separate reading, the indicated subtraction is performed and the resultant number is commonly called the result of the completed measurement.

The concept that a measurement of the distance travelled by the automobile may be measured by performing successive readings is fairly well established. A measurement is performed, and a useful result of the measurement is provided by the process. The odometer is an essential tool, an essential artifact, without which the measurement cannot be performed. In all modifications and practical applications of the instant invention in which similar apparatus or method is used this function is performed entirely automatically without human intervention and any mental process or mental step does not exist and indeed is difficult to conceive. Furthermore it is emphasized that the measurement may adequately be expressed in terms of two numbers: the reading at the first epoch and the reading at the second epoch properly labeled. The expression of the measurement value as a single number by subtracting one of the numbers either mentally or by machinery as is contemplated in this patent in no way influences the measurement itself and is a function really performed subsequent to the actual measurement if desired. A measurement has been performed whether or not the result of the measurement has been expressed as two digital numbers, neither number having physical significance by itself, or as a single number possessing the entire physical significance of the two numbers presented together. Clearly the essence of the measuring step does not lie in the ancillary subtraction.

It is most obvious that it is not necessary to perform two readings of the odometer in order to perform the measurement. One can set the odometer to zero at the first epoch and complete the measurement at the second epoch by merely reading the odometer. Thus there is no process of subtraction required to reduce the digital representation of the measurement value to a single digital number, and therefore this function performed automatically in my invention can be circumvented. Anyone skilled in the art would know that odometers may be readily set to zero, as desired. For example, some automobile odometers are provided with a trip indicator whereby the odometer may be set to zero at the start of the trip and whereby the length of the trip is directly indicated at the end of the trip.

There is no practical significance in the discussion of whether the initial value shown by the odometer is zero or some reference value. In either case the magnitude of the measurement is clearly indicated by the odometer either as one number or as by two successive numbers. It is also most obviously apparent that to determine this difference or change in distance only a single measurement has been performed. There are not two measurements of which the difference is determined. It is of course perfectly possible to determine the difference of distances by measuring two distances and performing the subtraction of one measured value from the other measured value to obtain the determined difference of distances. Such a measurement and subtraction process could also be performed where that difference of distance that is so derived is a change of distance. A measurement from a benchmark to a given object is measured as by a tape or radio means. The object is then moved and the distance from the bench mark to the moved object is again measured. The change in distance has been determined by a process of two measurements and a subtraction. Even here common parlance might permit of the statement that the difference of distance is measured, and this is not antithetical to the common use of the word in the technical community. However the applicant has avoided this use of the word measure to indicate the performance of two measurements the difference of which is derived or to indicate any other linear combination of two measurements.

The question of standards arises relative to the use of the word "measurement". Nothing in the use of the word measurement in this specification is intended beyond the common use of the word in the technical community. One "measures" the frequency of a signal. There are a number of ways by which this operation of frequency measurement is accomplished. One method is simply to tune a calibrated resonant circuit to the signal whose frequency is to be determined. Thus one probably measures directly only the angular degree of rotation of a dial or the traverse of a linear indicator.

The frequency itself must be derived by implicit computation relating the direct measurement of mechanical displacement to the standard with which it is to be compared. One may count the difference beat cycles between two signals, one the standard and the other the signal whose frequency is to be determined. To derive the frequency one must determine the time over which this count was performed and perform explicity or implicitly the division required to determine the average number of cycles per second of the unknown frequency. It is rare indeed that one has a direct comparison of a standard of the same dimension and of the same qualitative character as the quantity that one desires to measure. One generally measures time by directly measuring the angular displacement of the hands on a watch face. Implicit measurement or indirect measurement is more the rule than is direct measurement, and the extent to which one regards a measurement as direct is more often than not a matter of divergent opinions. In a similar manner at the other extreme, the determination of quantities through processes that are quite involved, (and to the uninitiated, obscure) are still said to be measured (particularly by the expert) if the relationship between the measured quantity and the standard or standards are sufficiently firm and dependable.

Frequently a measurement is in reality a nonlinear combination of two other measurements. Area is rarely measured directly by taking a standard and calibrated area, of say cloth, and laying it down a number of times over the surface whose area is to be determined. Even this procedure would involve counting, a mathematical process, if the standard were to be used on an area greater than the standard area. Rather one generally measures two dimensions of the surface and by simple computation determines the area.

Webster's *New World Dictionary* defines a planimeter as an "instrument for measuring the area of a regular or irregular plane figure by tracing the perimeter of the figure." Where is the standard? Actually the device is a fairly complicated computing element. It is sensitive to both the rotation of a wheel in contact with the surface of the area being measured and the direction in which the instrument is moved. The instrument does not even measure the length of the perimeter which it traces. Yet this instrument is universally said to measure area. In this specification the applicant neither implies nor requires a definition of the term measure any more explicit than this common usage.

A measurement is frequently if not always dependent upon more than a single standard. Even the standard of length is defined in terms of temperature and other conditions all of which constitute standards against which a measurement is performed. Furthermore, frequently these multiple standards are not qualitatively the same as that which is being measured nor the same relative to each other, i.e. "at standard temperature and pressure."

The measurement of the difference of two like quantities is an easy and simple concept and widely practiced in everyday living. The applicant does not use the term in any other way than it is used in such common practice. The difference must of course be in terms of the same units, (feet, seconds, grams) as the two quantities whose difference is to be determined. This difference may be between two quantities that are not coexistent in time in which case one may refer to the change in a quantity. Here again the subject is extremely simple and no further meaning is attached to this word by the applicant than this very common usage.

The words algerithm, program, programming as used in this specification refer to the arrangement of parts and functions in automatic computing type machinery, or indicating type machinery, employed in the processes of determining geometrical parameters, the variations thereof or the determining of dimensions of position-motion state.

The words "measurement group" refer to the totality of all of the measurements required for the complete determination of a position or dimension of the position-motion state.

The word "variation" in this application is employed to mean incremental changes or to mean rates of change, either of which variations occur with respect to time.

The words "a priori" are used to designate known information other than that of the dimensions or measurement of the system that may be employed to provide complete or partial bounding or determination or resolution of ambiguities. Such information may concern the characteristics of motion of a moving object.

The word "bound" is employed in this application to indicate the partial determination of position or motion, the restriction thereof, or the determination of one or more coordinates of position or motion.

A "significant point" or a "significant epoch" is the point or epoch at, or corresponding to, the initiation or termination of a measurement of incremental change and represents the location in space or time of physical items such as reflecting objects or apparatus of the system.

The word "epoch" is used synonymously with the words "point in time". It is the interval of time in which a sequence of the method of the process is initiated or terminated for example. The duration of an epoch is presumed to be so limited that there are no significant changes in the geometrical properties of the system. This usage is resorted to to limit the use of the word "point" to mean a location in space at which equipment, reflecting objects, or the like has been located, is located, or will be located, or which is traversed by such equipment or other objects.

In connection with doppler measurement two common definitions of the "Doppler Effect" may be enlightening:

"The change in the apparent time interval between two events that arises from the motion of an observer, together with the finite velocity of transmission of information about the events." T. P. Gill, *Doppler Radar*, 1965

"The apparent change of frequency of sound waves or light waves, varying with the relative velocity of the source and the observer." Webster's *New World Dictionary*, 1951

Quite obviously neither definition is comprehensive of common usage.

It should be made clear that common in the art are two somewhat different descriptions of doppler measurements: One may be described as a rate or instantaneous measurement, the other may be described as a displacement or incremental measurement. Both types of measurement are recited in the instant specification since the principle of my invention is independent of whichever type of doppler measurement is specified, The "changes" and "rates of change" referred to in this specification are changes and rates of change occuring with respect to time, unless otherwise stated.

Digital Processes in Measurement and Sensing

The use of digital processes in the performance of the measurement or sensing elements of my invention in no manner changes the basic principles of that invention. Digital processes may be employed in any of the measurement or sensing elements of the various forms and modes of my invention, regardless of the particular type of wave form (c.w., pulse, tone, noise, a.m., f.m., etc.), regardless of the particular geometric parameters whose variations are sensed or measured, regardless of the particular definition of the doppler phenomenon most applicable to the particular type of apparatus (analog or digital) employed to convert the information most directly sensed or measured into more directly useable dimensions or coordinates of the position-motion state of the moving object, regardless of the type or mode of presentation of the useable information.

When the process of data conversion is digital and a part of the measurement process is digital there may occur discussion about where the measurement process ends and where the computing process begins. Such discussion appeals more to those specializing in semantics than it appeals to those specializing in pragmatic science. Just as the act of subtraction can be a part of the measurement process, as previously discussed, regardless of whether that subtraction is performed by analog or digital means, so the measurement process remains the same regardless of whatever particular data processing methods are employed therein.

In a system which makes maximum use of digital processes an analog-to-digital converter is employed to convert the signal at the first point in the system where its amplitude and frequency are such as to permit conversion. Theoretically, under unusual circumstances, this could be at the output of the antenna of a low frequency radio system. It is possible to argue that the only actual measurement in such a digital system is that of instantaneous amplitude. This argument is supported by the idea that such amplitude measurement is more readily associated with a standard than say a phase change measurement expressed in terms of feet. To describe this most completely digital modification of my invention in terms of the instantaneous wave amplitude measurement would require a dissertation of considerable length and would constitute a course in the subject matter. In essence any of the analog elements of procedure and/or apparatus has an equivalent digital element. In essence any complete analog process and/or apparatus has an equivalent digital process and/or apparatus. Analog system wiring diagrams can serve as information processing diagrams, to one skilled in the art, for constructing the equivalent digital systems. Since the analog art is believed to be more readily understood than is the digital art this specification is written largely in terms of such analog art.

All of the digital processes, under particular circumstances, can be performed employing a properly arranged general purpose digital computer once analog-to-digital conversion is achieved. Furthermore general purpose analog computers are also available for performing the necessary system functions. The construction of special purpose apparatuses of both catagories is also obvious once the teachings of this specification are understood.

At the time of filing of the application Ser. No. 86,770, afore referenced and which is the earliest specification of which this specification is a continuation-in-part, all of the digital processes and techniques for performing all of the various functions to which these processes and techniques are applicable, and which are discussed above, were in existence and well known.

Nothing in the meaning of the words measurement, sensing, etc. precludes the use of digital apparatus in the indicated process.

Measurement Sequence and Significant Epochs

When a position determination is made on the basis of derivatives there is often only one set of space coordinates involved and only one epoch. An epoch is here defined as an interval of time that is so short that it is without significance in the geometrical, mechanical and mathematical considerations in the method under consideration. When position is determined on the basis of the measurements of a number of contiguous or overlapping measurements of the change of a geometrical quantity there is a plurality of successive space positions involved and a corresponding plurality of particular epochs associated with these measurements. A sequence of measurements of change of a geometrical quantity, called in this application a "measurement sequence" is continuous from its start to its finish. The infinitessimal instants of time at which a measurement is started and finished are called epochs of initiation and termination of the measurement, and these are significant epochs of the measurement sequence. The corresponding points or positions in space where the moving object happens to be when a measurement is started and finished are points or positions of initiation and termination of the measurement; and these are significant points or positions of the measurement sequence. The interval of time between the two epochs of a measurement is the measurement interval.

The term measurement sequence refers to the acquiring by direct measurement of the complete set of data necessary for a complete determination of some geometric quantity that is not directly measured.

The measurement sequence for a given single geometric quantity is the performance of several measurements of the change of that quantity with respect to time, and which measurements are continuous in some manner with respect to each other. The measurements may be performed contiguously in that as one measurement is terminated the next is initiated within the same epoch. Alternatively all of the measurements may be started simultaneously at the same "epoch of initiation" and terminated successively at a plurality of succeeding separate epochs. Other orders of taking the data may also be employed. The latter described procedure is preferred in this application. This procedure places a minimum requirement on the electronic counting and "readout" equipment employed in many of the embodiments of my invention and the form of the resulting data is easy to process. In taking this data the measuring equipment, which may be a counter or a timer is turned on at the epoch of initiation or alternatively it may simply be "read" at this epoch or point. At successive epochs the values are read, read out, or "taken" without interrupting the process of the continuous timing or counting process that constitutes the measurements corresponding to succeeding readings. When the "measurement sequence" includes the measurement of the changes of several simultaneous geometric quantities relative to a single moving object, the several separate series of measurements are performed simultaneously employing the same significant epochs, or simply epochs, and the same significant points or significant positions.

Algebraic Sum

Various embodiments of my invention differ from each other simply by whether a plus or a minus sign appears in certain binomials in the measurement equations. All the basic principles of the invention remain the same for that group of systems where this sign is positive for all such terms, for that group of systems where this sign is negative for all such binomials, and for that group of systems where combinations of binomials containing either sign are employed. All of these groups include: (1) reflective systems in which waves are emitted by a transmitter or transmitters of the system, reflected or transponded by the target object and intercepted by a receiver or receivers of the system, (2) one way systems in which waves are emitted from a transmitter or transmitters and received and detected at a moving vehicle and (3) one way systems in which waves are transmitted from a moving vehicle and intercepted by one or more receivers of the system.

A typical measurement equation illustrating this relationship is:

$$M_{ikj} = (r_{ij} \pm r_{kj}) - (r_{io} \pm r_{ko})$$

Where
 $M_{ikj}$ is the measured quantity
 $r$ indicates the absolute value of straight line distance
 subscript $o$ indicates the position of the moving object at the initiation of the measurement sequence
 subscript $j$ indicates the position of the moving object at the termination of the $j$th measurement
 subscript $k$ indicates the $k$th station or reference point of the system
 subscript $i$ indicates the $i$th station or reference point of the system The term "algebraic sum" is employed to mean that either sign may be taken in either of the terms without regard to the sign taken in any other term as required to express the relationships existing in the measurement technique.

The variety of techniques for performing the measurements of changes of sums or differences of distances is manifold and well known in the art. It is unnecessary to remind one skilled in the art that mixers may be employed for taking the sums of the frequencies of two signals as well as the differences. To confine this application to reasonable length detailed descriptions of embodiments of my invention in which summation of two signals is achieved in a mixer or by other means are not included; and such systems are only further embodiments of my invention as are systems employing various combinations of measured sums and differences, that is, combinations of plus or minus signs in the various binomials.

The Position Motion State

"Position-Motion State" is described in the referenced U.S. Pat. No. 3,445,847. See Column 4.

While the position-motion state may be fully defined in terms of non-orthogonal dimensions as in a system of hyperbolic coordinates it is generally more useful to apply dimensions of the position-motion state in terms of a set of orthogonal dimensions. Spherical coordinates, cylindrical coordinates, and cartesian coordinates are samples of orthogonal coordinate systems the dimensions of which in terms of position, velocity, acceleration, jerk, and accelerations of higher order can be employed to fully define the position-motion state.

In some modifications of my invention the positions of a series of significant points along the path of the moving object defines the dimensions of the position-motion state of the moving object. In some of these modifications it is desired to convert these dimensions defining the position motion state to the dimensions of position, velocity, acceleration, jerk, etc. This conversion is directly performable in automatic computation apparatus employing algorithm derived from the geometric time series.

$$x(t) = a_0 + a_1 t + a_2 t^2 + a_3 t^3 \quad \text{or}$$

$$x_j = a_0 + a_1 j + a_2 j^2 + a_3 j^3$$

By employing the proper number of such equations and performing the simultaneous solution process one obtains the coefficients $a$ from which are directly derived the velocity, acceleration, jerk, etc.
 $a_1$ is the speed along the $x$ axis
 $2a_2$ is the acceleration along the $x$ axis
 $6a_3$ is the jerk along the $x$ axis
 and so forth.

Similar procedures exist for use in other coordinate systems.

MULTIPLE RATE FINDERS

A practical embodiment of my invention, shown in FIG. 1, is a simple system designed to track a single aircraft or space vehicle without relying on equipment placed aboard the vehicle.

Each of the stations 1–6 is identical to the others and consists of a transmitter to illuminate the target and a receiver tuned so as to receive signals reflected to it from the target. The receiver of a particular station is tuned to receive signal frequencies that are near but not equal to the frequency of the corresponding transmitter. Each of these stations is adjusted to its own operating signal frequency so as to prevent the reception of signals transmitted by one station of the group by the receiver of another station of the group. Each station then makes a completely independent measurement of radial velocity with reference to the missile or target simultaneously with the other five stations of the system. The measured radial velocity is then transmitted by each station to a central point where the position and velocity of the vehicle at the time of the measurements is calculated by computer 7.

In FIG. 2 there is shown a diagram of connections for one of the six stations shown in FIG. 1 and each of the stations 1 to 6, inclusive, is connected as shown in FIG. 2. It is seen that the transmitter and the receiver share some elements of their respective systems namely, the antenna 10 and the local standard oscillator 11, which may be a piezoelectric crystal controlled oscillator or any other type of frequency stabilized oscillator. The use of a common oscillator 11 for both transmitter and receiver effectively eliminates the effects of small frequency drifts which might occur in the oscillator frequency and thereby improves the practical precision with which the fundamental measurement is made. The transmitter and the receiver are coupled to the single antenna 10 by a directional coupler 12 which is well known in the art, so that the receiver is protected from the power of the transmitter.

A diode mixer 14 is connected to the received signal output of the directional coupler 12. The diode mixer 14 also receives a signal from the frequency translator 18 which is connected to the oscillator 11 and translates the frequency of the signal supplied to the mixer 14 by the oscillator 11 as will be described further under the operation of this circuit. The output of the mixer 14 is fed to the rejection filter 15 which is tuned to reject signals of undesired frequencies such as the signal produced by the mixing of the transmitter signal and the mixing signal. Other signals of constant frequency may also be eliminated by this filter. The output of the filter 15 is amplified by the amplifier 16 and the amplified output is fed to the frequency meter 17.

The radial velocity of the target from the station is a component of the target's velocity in the direction of the station and is related to the doppler frequency shift in the following manner:

$$V = \frac{(f_o - f_e)}{(f_o + f_e)} C$$

Where:
$V$ is the radial velocity away from the station
$f_o$ is the frequency of the radiated signal
$f_e$ is the frequency of the reflected signal
$C$ is the velocity of light
$\pm |f_o - f_e|$ is the frequency shift owing to the motion of the reflector in the direction of the station. The upper sign applies if the target is approaching the station. The lower sign applies if the target is receding from the station.

For each station may be written the well known equation relating the slant range from the target to the station and the cartesian coordinates of the target. Each of these equations may be differentiated with respect to time to attain a new and independent equation for each differentiation. Thus twelve equations are available whose simultaneous solution yields twelve unknowns. The equations are:

$$r_i^2 = (x - a_i)^2 + (y - b_i)^2 + (z - c_i)^2$$

$$r_i \dot{r}_i = (x - a_i) \dot{x} + (y - b_i) \dot{y} + (z - c_i) \dot{z}$$

Where:
$a_i, b_i, c_i$ are the cartesian coordinates of the $i^{th}$ station and are known and constant. The twelve unknowns are the slant ranges $r_1, r_2, r_3, r_4, r_5,$ and $r_6$, the three cartesian coordinates of the target, $x, y,$ and $z$, and the time derivatives of the coordinates $\dot{x}, \dot{y},$ and $\dot{z}$. The time derivatives of the slant ranges are measured and therefore known, $\dot{r}_1, \dot{r}_2, \dot{r}_3, \dot{r}_4, \dot{r}_5, \dot{r}_6$. There are thus twelve independent equations that are solved simultaneously to determine not only the position of the vehicle but also its velocity.

Simultaneity of measurement is achieved in some embodiments of my invention by transmitting a timing signal from time signal generator 7A in FIG. 1. A readout 17A, FIG. 2, connected to element 17 is actuated by the timing signal simultaneously at all stations. In other embodiments timing means 11A driven by element 11 controls the operation of the readout 17A. Timer 11A can be set by prearrangement using broadcast time signals, transport of clocks, using the timing signal in FIG. 1, or by similar means. The frequency of element 11 can be adjusted similarly, but the measurement stability is guaranteed by the stability of the oscillator 11 itself at the station site.

MULTIPLE DISPLACEMENT FINDERS

In an embodiment of my invention the measurement performed at each station is that of displacement of the target in the direction of the station. A finite increment of distance radial to the measuring station is measured. This displacement, positive or negative, occurs in a finite length of time and is a measurement of range difference, or change of range, of the target from a single station. The configuration of the system is shown in FIG. 1. The equipment arrangement is shown in FIG. 3. The radial displacement measuring station includes parts that are identical to those used in the radial velocity measuring station shown in FIG. 22 with the exception that the frequency meter 17 has been replaced by a cycle counter 20 and a timer 21. (It would be possible to employ a device for the integration of the radial velocity, but a preferred embodiment directly responsive to the change of phase is shown here.) The timer 21 determines the interval over which the cycle counter 20 counts the cycles of the signal by turning the counter on at the beginning of the predetermined interval and turning the counter off at the end of the interval. The timer 21 determines not only the duration of the count but the time of its initiation also. The timer 21 employs the standard oscillator 11 as the timing standard.

The timer 21 of each station is coordinated with the timers of the other stations by prearrangement. This procedure is possible and effective because timing between stations is not critical for targets of reasonable speed in my invention. This fact distinguishes in part this modification of my invention from hyperbolic systems such as Loran and elliptic systems such as Ordir. In these other systems timing is much more critical.

If desired initiation of the measurement may be achieved by using a timing signal supplied by element 7A as shown in FIG. 1. The timing signal actuates timer 21. Stability of the measurement is guaranteed by Element 11 at each station.

For each station of the system there may be written the well known equation relating the slant range from the station to the target and the cartesian coordinates of the target $$(x_1 - a_i)^2 + (y_1 - b_i)^2 + (z_1 - c_i)^2 = r_{i1}^2$$

$$(x_2 - a_i)^2 + (y_2 - b_i)^2 + (z_2 - c_i)^2 = r_{i2}^2$$

Where:
$i = 1, 2, 3, 4, 5, 6$
$x_1, y_1, z_1$ are the cartesian coordinates of the location of the target at the time the measurement is initiated.
$x_2, y_2, z_2$ are the cartesian coordinates of the location of the target at the time the measurement is terminated.
$a_i, b_i, c_i$ are the cartesian coordinates of the $i$ th station.
$r_{i1}$ is the slant range from the $i$ th station to the target at the initiation of the measurement.
$r_{i2}$ is the slant range from the $i$ th station to the target at the termination of the measurement.

There is also the simultaneous equations resulting from the measurements as follows:

$$r_{i2} - r_{i1} = m_i$$

Where: $m_i$ is the range increment measured at the $i$ th station.

There is one set of each of these three equations for each station resulting in a total of eighteen equations. There are eighteen unknowns, the three cartesian coordinates of the initial point, the three cartesian coordinates of the final point, the six ranges from the stations to the initial point, and the six ranges from the stations to the final point. The simultaneous solution of these equations provides the values of the unknowns.

MULTIPLE DISPLACEMENT FINDERS WITH REVERSIBLE COUNTERS

In this embodiment of my invention the measurement performed at each station is that of radial displacement toward or away from the measuring station. The configuration of the system is shown in FIG. 1. A schematic diagram of connections is shown in FIG. 4.

The local standard oscillator 11, determines the frequency of the radiated wave. The output of the local standard oscillator is amplified by the transmitter power amplifier 13, and is fed through the directional coupler 12 to the antenna 10 from which it is radiated. The signal is then reflected, with its frequency changed, by the moving target, reentering the antenna 10 and entering the receiver mixers 23 and 24 through the directional coupler 12. Since in this embodiment the mixing frequency is the same as the transmitted frequency it is necessary to employ two channels in the receiver in order to provide the system with a sense of direction.

The signal returning from the target and shifted in frequency by the doppler effect is fed into the diode mixers 23 and 24 along with two mixing signals of the radiation frequency which are 90° out of phase with each other. These mixing signals are derived from the local standard oscillator 11 through phase shifting circuits 25 and 26. The outputs of the mixers 23 and 24 are amplified by low-pass amplifiers 27 and 28, which contain limiters so as to provide output signals of nearly constant amplitude. The outputs of the amplifiers 27 and 28 are fed into gates 29 and 30, respectively which are controlled from the timer 21 which is connected to the standard oscillator 11 to provide the timing signal. These gates under control of the timer 21 control the duration of the cycle count. The output of the gates 29 and 30 is a two-phase signal on three wires including the ground 31. The direction of rotation of this two-phase signal indicates whether the target is approaching or receding from the station. Each revolution of the signal is indicative of a change in the distance to the target of one-half wavelength of the transmitted wave. The change in range is then measured by noting the amount of rotation of this two-phase signal from the amplifiers. This operation may be performed electronically by supplying these signals to the magnetic deflection coils 35 and 36 of a cathode ray tube 37 as shown in FIG. 4A, so the beam of the cathode ray tube is rotated either clockwise or counter clockwise. However a very satisfactory electromechanical device similar in all respects to a two-phase synchronous motor employing two windings 33 and 34 in space quadrature may be used in which the signal from one amplifier 27 is applied to the winding 33 and the signal from the other amplifier 28 is applied to the other winding 34. The rotor 32 of the motor consists of a small permanent magnet and the rotation of this magnet indicates the sense and the magnitude of displacement of the target from the station.

A circuit such as shown in FIG. 4B may be used for converting the outputs of the amplifiers 27 and 28 into command signals to be fed into reversible electronic means of conventional construction. The circuit for this counter means includes two branches, the upper branch is connected to the amplifier 27 and comprises apparatus 40 for converting the output of the amplifier into a square wave which is fed to the differentiating circuit 41. The pulses derived from the differentiating circuit are fed to diode circuit 42 which cuts off the negative pulses, and the positive pulses are fed through the AND gate 43 to the electronic counter. The lower branch is connected to the amplifier 28 and includes a square wave circuit 44, a differentiating circuit 45, a negative cutoff circuit 46 and an AND gate 47. One input of gate 43 is connected to the output of the square wave circuit 44 and likewise one input of the gate 47 is connected to the output of the square wave circuit 40. Thus positive pulses appear at the output of gate 43 for displacement in one direction and positive pulses appear at the gate 47 for displacement in the opposite direction. These pulses are fed to a suitable reversible counter.

SPACE TRACK SYSTEM

A practical embodiment of my invention is a system to detect the presence of a strange or hostile space vehicle and to determine its course and position by electromagnetic means. This system covers a circular area on the ground about 1500 miles in diameter and is designed to operate to altitudes of 2000 miles or more. The system contains four transmitters 50 with broad beamed antennas. As shown by the squares in FIG. 5, three of the transmitters are located around a circle, and the fourth is located at the center. A diameter of 1000 miles or more is contemplated.

The four transmitters 50 emit continuous unmodulated waves, each station operating on a different frequency. The transmitters operate collectively and separately with various groups of receivers 51 and 52 to form a variety of subsystems for the detection of targets of various characteristics and locations.

The receiving systems comprising groupings of the receiving stations 51 and 52 are grouped according to whether the particular subsystem is intended to work at high altitudes, medium altitudes, or low altitudes. Each of the receivers 51 and 52 is connected as illustrated schematically in FIG. 6. The main difference in the design of the stations 51 and 52 of the individual groups is in the gain of the antennas employed. The high altitude system employs three receiving stations 52 located around the perimeter of the circle of the transmitters, uniformly spaced between the transmitters 50 as shown in FIG. 5. Each of the receiving stations 52 consists of about two hundred separate receiver and antenna combinations of the type illustrated in FIG. 6 adapted to operate on a frequency of 300 megacycles, for example. Each antenna has a gain of about 30db and a beam width of 3° to the 80 percent power point. The total of 200 such receivers permits continuous monitoring of the space above the circle of the composite system out to three thousand miles when employed with proper transmitters.

The signal receiving antenna is provided with a fixed parabolic reflector 53, and the pickup element 55 of the receiver is mounted at the focus to minimize power loss. A mixing signal is also supplied to the pickup 55 from the translator 54 which translates the frequency of the standard oscillator 63. The signal output from the receiver is transmitted at an I.F. frequency to the main control apparatus 56 of the station which determines whether or not the signal has sufficient intensity. When the signal is determined to have sufficient intensity above the noise so that it may be tracked it is assigned by the switch board 57, such as used in automatic telephone exchanges, to one of many tracking filters 58 which are maintained on standby. The output of the tracking filter is fed to the counter 59 which is provided for each tracking filter. The counter 59 is controlled by timer 62 that times the counting interval of the counter 59. The output of the counter is then fed to the encoder 60 where it is encoded for transmission by land wire or radio to the central computer station 61.

The Low sensitivity receiving stations 51 are distributed throughout the pattern of the other stations as shown in FIG. 5. The receivers provided with high gain antennas may also be provided with low gain systems if desired. Coverage is thus maintained down to very low altitudes.

A discussion of mathematical processes directly suitable for inclusion in the Space Track apparatus is provided in my copending application for letters patent Ser. No. 86,770 elsewhere referenced in this specification. For methods of grouping the echos of the several transmitters corresponding to a single target among a plurality of targets I refer to my U.S. Pat. No. 3,270,340 for operation of the system with a single receiver. Other methods of grouping are discussed elsewhere in this specification. Any of these methods may be used in the method and system I have disclosed in this section of this specification.

SUBMARINE DETECTION AND TRACKING

A practical embodiment of my invention is a system to detect the presence of a submarine by means of sonic waves. The system configuration is much the same as that of the space track system and comprises four receiving stations 71 each equipped with a transducer 70 for converting acoustic energy into electrical signals as shown in FIG. 7. The system also includes three transmitting stations 73 each equipped with a transducer 74 for transmitting acoustic signals. All of these stations are connected to the central station 72 containing the computer and data reduction apparatus. The receiving stations consist of electro acoustical transducers connected to amplification equipment. The transducers 70 and 74 may be affixed to the ocean bottom or anchored at certain depths.

Referring to FIG. 8, the doppler signals from receiver transducers 70 ae amplified by the amplifier 75 and then fed to the mixers 76 and 77 which are also supplied with electrical oscillations from the phase shifters 80 and 81 respectively. The output of the generator 83 is supplied to the amplifier 82, which energizes the transmitting transducer 74, and to the phase shifters 80 and 81. Phase shifter 80 advances the phase by 45° and phase shifter 81 retards it by 45° so that the signals supplied to the mixers 76 and 77 are 90° out of phase with each other. The outputs of the mixers are supplied to amplifiers 78 and 79. The outputs of these amplifiers are fed to a reversible counter as described in connection with FIG. 4, FIG. 4A, and FIG. 4B.

The mathematical process performed by the computer is described in my referenced patent application Ser. No. 86,770. Processes for echo grouping are set forth in my U.S. Pat. No. 3,270,340 for systems operating with multiple reflecting targets.

TRACKING SYSTEM EMPLOYING LIGHT PULSES

A practical embodiment of my invention is a system for the determination of the position and motion of a moving missile or vehicle which is emitting pulses of light at known intervals. The light so emitted is detected by photoelectric means. The layout of the system is shown in FIG. 9 in which the strobe type light 91 is mounted on the missile 98 and transmits short bursts of light energy at known time intervals. The light energy is received at separate ground receiving stations 92, 93, 94, 95, 96, and 97 which are arranged so that they can all view the missile 98 at the same time. These ground stations are provided with light responsive cells 92A, 93A, 94A, 95A, 96A and 97A respectively, for converting light signals to electrical signals. The outputs of all of the receiving devices 92–97 are connected to the computer 99. At each station the interval between successive pulses is measured. The difference in the time interval between the transmission of two pulses and the time interval between the reception of the two pulses is a direct measure of the velocity of the vehicle in the direction of the measuring station. This relationship may be expressed as follows:

$$r_2 - r_1 = C(T_m - T_o)$$

Where:
$(r_2 - r_1)$ is the change in range from the station occurring during the time interval between the two transmitted pulses.
$C$ is the velocity of light.
$T_o$ is the time interval between transmission of pulses.
$T_m$ is time interval between reception of pulses.

Each of the receiving stations is provided with instruments for measuring the time interval between the reception of the two pulses, and these instruments are connected as illustrated schematically in FIG. 10. The cell 101 emits an electric pulse each time there is a light pulse incident upon it. This electric pulse is amplified by pulse amplifier 102. The pulse signal from the pulse amplifier 102 is supplied to readout device 103 which is used to control the readout of counter 104. The local standard oscillator 105 provides a local time base for the station and the output of this oscillator is fed continuously into counter 104 which is in continuous operation. The count registered on the counter is read out by the readout 103 upon command given by the pulse of light received by the photocell 101. The counter 104 comprises a series of flip-flops, and no reset thereof is required as any given measurement is obtained by subtracting a previous reading from the last reading. A number of readout devices are available on the market which record the reading on the counter at the instant a readout signal is received. Thus the intervals between a single point and several consecutive points may be determined by subtracting from each of the successive readings after the first the value of the first reading. The intervals are of course time intervals, designated $T_m$ in the expression above.

There is no precise synchronization required between the stations. The only precise time standard is the independent frequency standard at each station. Only the time difference between epochs at each station is measured. These epochs are significant epochs and are the points in time during which the very narrow light pulses arrive at the photo cell and are detected thereby. It is assumed that the time between pulses is large compared to the time required for light to travel the distance of the range increment ($r_2 - r_1$). The error involved in this assumption is in the ratio of the velocity of the vehicle to the velocity of light. The duration of the pulse is assumed to be small compared to the range increment.

The measurements of the separate stations are transmitted by land line or radio to the central station 99 where computations are made in accordance with procedures described elsewhere in this specification. Both single-reading and multiple reading methods may be employed.

This pulse wave method may also be applied to underwater sound operation.

FOUR STATION TRACKER

In this system for determination of the track of a vehicle there need be no accurate frequency standard aboard the vehicle.

FIG. 11 is a diagram indicating the manner in which it is possible to derive single legged data from one element of single legged data combined with double legged data. In this diagram station 110 includes both a transmitter and a receiver which is capable of receiving the echo signal of the transmitter reflected from the moving object 111. Thus $r_{12} - r_{11} = m_1$ is measured at station 110, $(r_{12} + r_{22}) - (r_{11} + r_{21}) = m_{12}$ is measured at station 112 and $r_{22} - r_{21} = m_2$ is obtained by computation.

FIG. 12 shows a diagram of the system in which continuous waves of constant frequency are radiated in all directions from the transmitter of the transmitter-receiver station 113. These waves are intercepted at the vehicle 114 by receiving antenna 115. The signal is tracked in frequency, suppressed carrier amplitude modulated, and amplified by equipment 116 which is aboard the vehicle 114. Special efforts are made to attenuate the carrier, which is at exactly the frequency of the received waves. The two sidebands are radiated over transmitting antenna 117. The modulated signal minus the carrier is transmitted in all directions from the satellite and is received and measured by identical receiving stations 118, 119 and 120 and by transmitter-receiver station 113. The data collected by the receiving stations 118, 119 and 120 and the transmitter-receiver station 113 are transferred by normal communications means to computer 121.

Each station is equipped with a standard oscillator. The equipment in the vehicle is shown in FIG. 13 and includes a receiving antenna 115 that is connected to the band-pass filter 135 and to the amplifier 136. The output of the amplifier is connected to the mixer of the phase locked oscillator 130 which tracks the incoming signal from the ground transmitter 113. The phase-locked oscillator 130 includes the voltage controlled oscillator 131, mixer 132, d.c. amplifier 133 and low-pass filter 134. The output of the phase locked oscillator 130 is amplitude modulated by the balanced modulator 137 to provide a continuous set of sidebands. The modulation signal may contain the identification of the vehicle, timing marker and communications if desired. The signal is amplified by amplifier 137a and fed to filter 138. Balanced modulation and filter 138 are employed to suppress the carrier before the signal is fed into transmitting antenna 117.

The ground receiving and measuring equipment is the same in all four stations. A block diagram of the receiving equipment in one of the ground stations is shown in FIG. 14. The signal from the vehicle 114 is received on omnidirectional antenna 140 at each of the ground receiving stations 113, 118, 119 and 120, and it is amplified in band-pass radio frequency amplifier 141 from whence it enters the two diode mixers 142 and 143. The signals are mixed in these mixers with locally generated signals which are derived from phase shifters 144 and 145 in such a manner that they are ninety degrees out of phase with each other. Consequently the outputs of the two mixers 142 and 143 are 90° out of phase with each other. The frequency of the output signal of the mixers (a two-phase signal) is the frequency of the amplitude modulation imposed upon the carrier at the vehicle. This frequency is generally in the region below 100 kilocycles. In the event that it is merely desired to identify the vehicle, and no communications are required, the modulation in the vehicle may consist of a simple sinewave of fixed frequency. The frequency of this modulation may be used to identify the vehicle. The sidebands thus serve two purposes; they aid in the tracking operation and they identify the vehicle.

After amplification in amplifiers 146 and 147 the signals are filtered by filters 148 and 149 to narrow the spectrum and to include only desired signals. If no other communications than identification are required these filters may be of a very narrow band-pass type. The two signals are then fed into synchronous detector 150 in the output of which is generated a "direct current" signal which upon being filtered by the filter 151 to remove the high frequency signals coming from the detector, is used to control the frequency of the voltage controlled oscillator 152, whose frequency is thus maintained at exactly the value the carrier would have had had it been transmitted from the vehicle 114. There is of course a slight frequency shift of the sidebands owing to the doppler effect, and the filters 148 and 149 must be capable of passing the entire probable doppler spectrum of the modulation signal.

The modulation signal is available at the output of one of the filters 148 and 149 depending upon the polarity of the connections into the voltage controlled oscillator 152. In the presence of noise the modulation signal may be obtained from both channels through the adder 153, thereby improving the quality of the signal derived, and the output of this adder is the communications output. The action of the narrow band-pass filters 148 and 149 is to render the system largely immune to any tracking signal which does not modulate with the desired frequency. Communications signals could be obtained ahead of the filters 148 and 149 if desired thus permitting selection of the identification signal from the rest of the modulation that may be placed on the carrier for other purposes.

The output of the voltage controlled oscillator 152 is then used for comparison with the local signal to generate the actual doppler signal which is measured. The output of the phase locked circuit just described is fed into two synchronous detectors 154 and 155 which are 90° out of phase with each other.

The frequency of the output signals from these detectors is the difference between the frequency of the local standard oscillator 156 and the center frequency of the two sideband signals received from the vehicle 114. The signal can vary from direct current to very high audio depending upon the wavelength of the signal radiated from the ground transmitter 113A which is located in station 113 and the amount of the doppler frequency shift.

The fundamental components of the two square waves generated by the squarer circuits 159 and 160 are 90° out of phase with each other. If the frequency of the signal from the voltage conrolled oscillator 152 is higher than the frequency of the local standard oscillator 156, the phase of the signal from squarer 159 will be 90° ahead of the signal from squarer 160. This condition exists because phase shifter 157 advances the signal while phase shifter 158 retards it. Each phase shifter operates through 45° to produce a 90° phase difference between the two channels. When the frequency of the voltage controlled oscillator 152 is lower than the frequency of the local standard oscillator 156 the phase of the signal from squarer 160 will be 90° ahead of the signal from the squarer 159. The outputs of the two squarers are differentiated in differentiaters 161 and 162, forming positive and negative spike pulses at the leading and trailing edges respectively of the square waves. The negative spikes are removed by diode negative limiters 163 and 164. The output of each squarer is also used to gate the spike signal from the differentiator of the opposite channel. In this manner one obtains a spike from the output of gate 165 in the upper channel when the relative phase of the two signals from the squarers is positive and from the gate 166 in the other channel when the relative phase is negative. When one channel is emitting pulses there is of course no output from the other channel. In the above manner pulses are obtained from one channel when the center frequency from the vehicle is higher than that of the local standard oscillator 156 and pulses from the other channel when the signal is lower than the local standard. A pulse occurs in one channel or the other for each beat between the incoming signal and the local standard, thereby indicating a lengthening or shortening in the distance traveled from the ground transmitter 113a to the vehicle 114 and back to the receiver 141 by one wavelength for each pulse, one channel recording the shortening of the path and the other recording lengthening of the path. The outputs of the two channels may each be connected to a separate counter, the count on one counter being subtracted from that on the other counter and the appropriate sign applied to result to indicate the net change in path. In this system reversible counter 167, of which there are several on the market, is employed. There are two inputs to this type of counter and signals into one channel add to the total count and signals from the other channel subtract from the total count. The counter is turned on and off by Timer 169 which employs local standard oscillator 156 as a time standard.

Station 113 only is equipped with a transmitter. This transmitter 113a is shown by dotted lines in the FIG. 14 and employs the local standard oscillator 156 as a frequency standard. The receiving circuits employed in receiving stations 118, 119 and 120 are the same as the receiving circuit shown in FIG. 14 and do not include the transmitter 113a. Each is provided with a counter such as the counter 167 and the outputs of all of these counters are connected to a central computer station 121.

AIR TRAFFIC CONTROL SYSTEM

Figure 17:
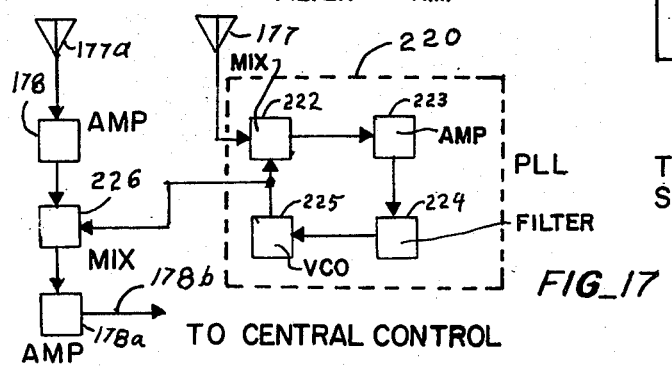
FIG. 17 is a schematic diagram of the circuit used in the air traffic control system.

An important embodiment of my invention is a system for the control of air traffic. In FIG. 15 is shown a transmitter 170 for radiating a c.w. constant frequency signal. The signal from this transmitter is received by the aircraft 190 and is translated to another frequency that is somewhat removed from the frequency of the ground transmitter as that signal is received by the aircraft. A signal of this translated frequency is transmitted by the aircraft in all directions toward the ground. The signal from the aircraft is identified by a modulation frequency assigned to the aircraft. The signal from the aircraft is received by all six stations 171–176 continuously. The circuits of the six receiving stations, shown in FIG. 17, are identical. Each receiving station has two antennas 177 and 177a, antenna 177 being directed and tuned to pick up the signal from the ground transmitter 170 and antenna 177a having a wide angle to cover the space region over which air traffic control is to be maintained. The signal from the transmitter tracked by phase locked oscillator 220 is mixed at mixer 226 with the signal from the aircraft to obtain the i.f. signal of the receiving station. This i.f. signal is amplified by a conventional amplifier 178a and transmitted without detection to the central control point 191 over line 178b. The signals from the receivers 171–176 received at the central control point 191 are introduced to a set of frequency trackers 191. Each of these sets of trackers consists of six trackers tuned ot one channel frequency, one set for each aircraft.

The output of the frequency tracker is fed into the counter 193 which counts the number of wavelengths of the signal of the ground transmitter by which the total propagation distance increases or decreases as the aircraft moves along its course. This incremental distance data is introduced into the computer 194 which determines the positions and courses of the various aircraft. This position-course information is employed by the controller 195, which is connected to the transmitter 170 by the voice link 196, to direct aircraft traffic.

Figure 16:
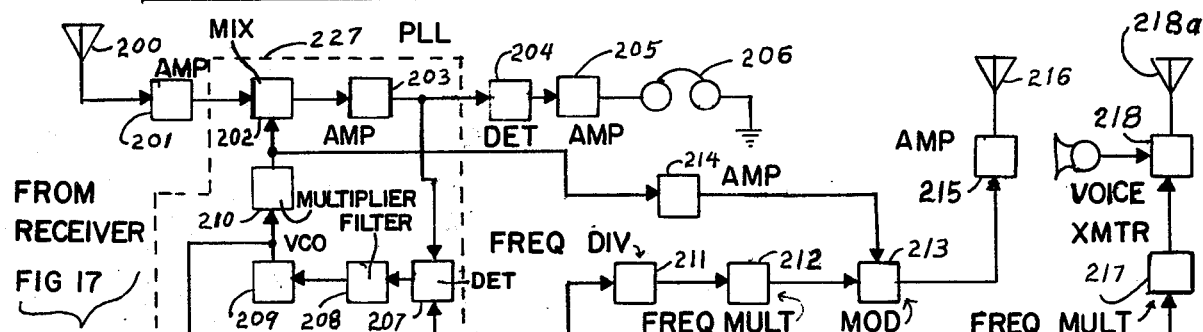
FIG. 16 is a schematic diagram of the circuit used in airborne equipment such as used in the system shown in FIG. 15.

The equipment carried by the aircraft 190 is shown in FIG. 16. The signal from the ground transmitter 170 modified by the doppler effect is received by receiving antenna 200, amplified by r.f. amplifier 201, and fed into phase locked oscillator 227, which includes mixer 202 where the signal is reduced to the i.f. frequency. The i.f. signal is amplified in amplifier 203. Voice modulation on the signal is detected by second detector 204, amplified by audio amplifier 205, and fed into headset 206. The i.f. signal is fed into balanced detector 207 the output of which is used through low-pass filter 208 to control the frequency of the voltage conntrolled oscillator 209. Oscillator 209 oscillates at the i.f. frequency, and a signal from it is fed to balanced detector 207 along with a signal from i.f. amplifier 203. The output of oscillator 209 is also fed to mixer 202 after being multiplied in frequency in the multiplier 210 by an integer sufficient to result in the proper i.f. frequency.

The output of oscillator 209 is also fed into frequency divider 211 which reduces the frequency to 1000 hertz. The output frequency of divider 211 is multiplied by frequency multiplier element 212 which determines the channel upon which the aircraft will operate. The output of the selector 212 is then employed to modulate, and thereby identify, the signal to be transmitted by the aircraft 190. Balanced modulation is employed in balanced modulator 213 for this purpose. The carrier is obtained from the output of the multiplier 210 and is the mixing signal used in the receiver. The signal is amplified in driver amplifier 214 before being modulated. Only the two sidebands are amplified in class B amplifier 215 and radiated over antenna 216. The output of the oscillator 209 is multiplied in multiplier 217 to the desired value and transmitted over voice transmitter 218 and antenna 218a.

Figure 18:
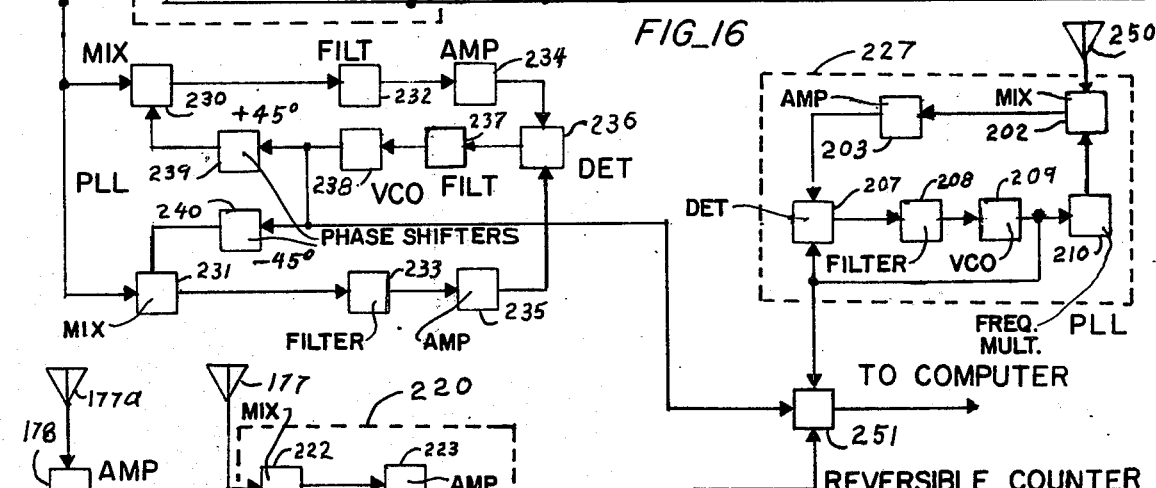
FIG. 18 is a schematic diagram of the circuit used in the control center equipment of the air traffic control system.

The signals received at the central point from the receiving stations are tracked by a set of trackers. As shown in FIG. 18, the signal from a particular station at the aforementioned i.f. frequency is fed into mixer 230 and mixer 231 where it is combined with mixing signals of the same frequency as the input signal and ninety degrees out of phase with each other. The outputs of the two mixers are fed into identical band-pass filters 232 and 233 which are tuned to the channel subcarrier. This is the frequency employed in the aircraft 190 to modulate the carrier originally derived from the main transmitter signal by translation by the amount of the i.f. The bandwidth of the filters is determined by the amount of the expected doppler variations. The output of the filters is amplified by amplifier 234 and amplifier 235. The outputs of the two amplifiers are mixed in balanced detector 236, the output of which is used through low-pass filter 237 to control the frequency of voltage controlled oscillator 238. The output of the oscillator is shifted ahead and behind by 45° in phase shifters 239 and 240 so that the two signals, which are fed to mixers 230 and 231, are 90° out of phase with each other. The signal from transmitter 170 directly is received on antenna 250 and is tracked by a phase locked circuit 227 similar to that in the aircraft comprising mixer 202, amplifier 203, balanced detector 207, filter 208, voltage controlled oscillator 209, and frequency multiplier 210. The output of the oscillator 209 of this phase locked circuit and the output of oscillator 238 are fed to element 251. Element 251, comprising a reversible counter and associated circuits as described elsewhere in this specification, provides as electrical data the number of wavelengths of variation of the propagation path, transmitter 170 to aircraft 190 to ground receiver 171–176, which occur in time interval determined by the time signal. This data is fed to the computer 194 for determination of the course and position of the aircraft.

A phase locked oscillator circuit 220 is employed at each ground station to track the signal from the transmitter 170. Element 220 comprises: mixer 222, amplifier 223, filter 224, and voltage controlled oscillator 225. Operation of such phase locked loops is well known. Further discussion of the sideband tracker loop employed in the central station 191 is found in J. P. Costas, "Synchronous Communications," *Proc. IRE* Dec., 1956 pp. 1713–1718. This article explains the tracking process of this circuit and how voice communications are provided.

The synchronization of the separate channels at the central control point 191 is accomplished by a timing signal from a single local time signal source at the point 191. The source, common to all channels guarantees the simultaneity of the operation of the several channels at the control point 191 and the equality of the durations of their separate measurements. A radio link is relied upon to convey the reference frequency of the transmitter 170 to the separate receiving stations 171–176. Admittedly this feature relies on the stability of the wave propagation path from transmitter to receiver. However, the cost of separate standard frequency oscillators is avoided.

As seen in this description this Air Traffic Control System employs two-legged geometry. The configuration of points associated with this system comprises seven station points and one aircraft point. The station points comprise six receiver points and one transmitter point. The geometrical configuration, the geometry of the system, varies as the aircraft point proceeds along its course. The dimensions or parameters of the configuration are not contained in the information set into the system a priori, other than the cartesian coordinates of each of the stations; nor is any such other dimension sensed by the system. Variations of the configuration are sensed by the apparatus of the system. In this particular case the only parameters whose variations are sensed by the system are range sums. The apparatus senses the variation of an electrical signal quantity (phase in this case) whose variation is linearly dependent upon the variation of each of two ranges associated with each measuring element, or determining element, of the system, the range from the ground transmitter to the aircraft and the range from the ground receiver to the aircraft.

In brief, the sensing apparatus senses the variation of an electrical signal quantity, which variation of an electrical signal quantity is lineraly dependent upon the variation of a geometrical parameter. Connected to a plurality of such sensing apparatus is computing or indicating apparatus for determining and indicating at least one dimension of the position-motion state of at least one aircraft point, which aircraft point is a part of the geometrical configuration, the geometry, of the system.

NAVIGATION SYSTEM

Another practical embodiment of my invention is a system and a method of navigating by taking doppler displacement measurements with receiving and measuring equipment 260, FIGS. 19 and 21 in the vehicle, the transmitting equipment being located on the ground. Such a system is just the reverse of the other systems, however the mathematics does not change. Whatever number of stations and readings one wishes to choose of the many combinations available, the calculation is the same as for that same system employed for ground determination of the position of the vehicle. One may use pulsed, modulated, or continuous waves for this application.

Any of the single legged systems may be the basis for a navigational system. For the purpose of this example a four station system is chosen. Four transmitters 280 are located on the ground as shown in FIG. 21. (Actually some or all of the transmitters could be located in satellites or other moving vehicles whose positions were precisely known.) The receiving equipment is located in the vehicle. The transmitters radiate a suppressed carrier-double sideband signal of high frequency stability and phase stability. No attempt is made to hold any particular phase angle between stations. All of the transmitter stations employ the same nominal center frequency. Each station is amplitude modulated by a simple sinewave and its carrier is suppressed. Each station has a particular modulation frequency assigned to it so that it may be identified. The modulation serves also as an aid in tracking the frequency of the signal by the equipment in the vehicle. The means of tracking such a signal and re-establishing at the receiver the carrier removed at the transmitter have been discussed elsewhere in this application.

Four such synchronous receivers are employed and each tuned to the same center frequency but each being tuned to a separate audio identification signal corresponding with the particular transmitting station with which it is to operate. Each receiver reestablishes the center frequency in the process of detecting the modulation envelope. This signal is of the same frequency and phase as the carrier would have been at the receiver antenna had it not been suppressed at the transmitter. FIG. 14 shows one of the four tracking and measuring equipments. The communications output may be employed for identifying the particular transmitter and also for receiving voice communications from the transmitter. In the event that voice communication is employed the identifying tone is the subcarrier and the voice communication must be obtained by detection of this signal. The transmitter shown in FIG. 14 is not employed There is only one local standard oscillator and only one timer in the airborne equipment, all four tracking units operating from one set of these two devices. The outputs of the four tracking and counting units are the measurement signal from the reversible counters. This information is in parallel form and is transferred, all digits at once, by a plurality of wires to a digital computer in the aircraft. The computer employs an iterative solution with four readings and determines the position of the aircraft with respect to the four stations. Furthermore with this solution it is possible to adjust the local standard oscillator to the frequency of the ground system or to merely note the difference existing between the two. This solution is based upon the assumption that the oscillator in the vehicle is stable in frequency during the course of the measurement. The oscillator frequency need not be exactly known. Of course the locations of the four transmitters must be exactly known to the computer in the aircraft.

Referring to FIG. 19 there is shown a schematic diagram of the airborne receiving, measuring and computing equipment, such as the equipment 260 shown in FIG. 21. The signals from all four transmitters 280 ae received by the vehicle on a single antenna 260a and amplified in a common amplifier 261. The signal is then fed into tracking and measuring units 262, 263, 264, and 265 which receive frequency standard and time signals from local standard oscillator 266 and timer 267. The measurement data is fed as stated into computer 268. An alternate computer may be located on the ground as shown in FIG. 21, and a suitable radio link provided between it and the vehicle as shown in FIGS. 19 and 21. The communications outputs of each receiving unit is fed to a point on switch 269 so that the modulation on any of the subcarriers may be selected and heard over the headphones 272 after being detected by detector 270 and amplified by amplifier 271.

In FIG. 20 is shown the very simple transmitter used in the four stations 280. At each station there is a highly stable and accurate local standard oscillator 273, whose signal is modulated by balanced modulator 274 which suppresses the carrier and leaves only the two sidebands. If there is no voice communication the modulation is a simple sinewave provided by oscillator 273a and the radiated signal consists of just two frequencies. The modulated signal is amplified by Class B amplifier 275 and radiated by antenna 276. If voice is to be transmitted over the transmitter the modulation signal is itself modulated by modulator 277 with signals derived from microphone 278. The voice link makes it possible for the pilot to receive verbal identification of the station, weather reports, traffic reports and other broadcasts as is now done in the omnirange system.

This system is readily adapted to tracking a friendly satellite with minimum power levels used in the vehicle. In such application the computer may be retained on the ground. The measurement data would be transmitted to the ground by teletype or telemetry circuits established between the remote vehicle and the system complex. In this manner large power levels could be achieved from which to make the measurements since the transmitters on the ground may be made very powerful. The information sent back from the vehicle would be in digital form and could be sent with great redundancy with far less power than it would take to send the equivalent data in analog form. The main advantage of this method of tracking lies in the power that may be employed in the transmitter In the vehicle the amount of power and energy available for tracking purposes is severely limited because the available space is taken up by the mass of the necessary equipment and fuel necessary for the length of time the vehicle is to be aloft. The amount of primary power required by a receiver of a given sensitivity is limited. Therefore in order to improve the signal to noise ratio in the measuring system the only procedure available is to increase the transmitter power. The increased power is much more available on the ground than in the vehicle. The antenna problem remains the same whether the transmitter or the receiver is in the vehicle.

The complete solution for the errors of this system involves sixteen simultaneous equations when one retains the unknown though constant frequency. When the frequency is eliminated from the equations and is still unknown the set is reduced to fifteen equations. Should the local standard oscillator 266 in the vehicle be of sufficient accuracy and stability only three readings would be required. The error equation in this case would involve a 12 by 12 matrix rather than a 16 × 16 matrix as is the case when the frequency is unknown. Furthermore if the frequency is known and the ground stations can be located in a plane one may resort to rather simple algebraic equations. Use of five ground stations instead of four increases the various options as to system configuration. The stations need not lie in a plane to achieve algebraic solutions if four readings are taken though the algebra is somewhat more extensive than in the system of four stations in a plane. On the other hand if an iterative solution is employed only two readings need be taken when five stations are employed on the ground and the frequency of the local standard oscillator in the vehicle may be determined. The associated error matrix is then 10 by 10. With five stations one has also the option of taking three readings and, with an iterative solution, determining not only frequency of the local standard oscillator but also the variation of the average frequency between each of the three measurements. It is readily apparent that there are a number of various configurations and computing procedures that are available. These will not all be listed here as it is clear that one familiar with the art can employ the techniques and methods of computation set forth here to evolve many systems of varied design.

SENSOR SYSTEM FOR AIDING THE GUIDANCE OF VERTICAL LANDINGS

Another embodiment of my invention relates to a system for the direction and control of landings by heliocopters, rockets, and other vehicles capable of vertical takeoffs and landings.

This particular embodiment of my invention may be described as a system for automatically determining the dimensions of the position-motion state of a moving object, the landing vehicle. No dimension of the position-motion state of the vehicle is known. The system is capable of operating by itself without radar or other ancillary device or method of obtaining any true initial position or true starting point along the path of the moving object. Neither is there any dependence in this embodiment of my invention upon any inertial subsystem within the vehicle. As in other modifications of my invention there is a plurality of wave stations well separated from each other in space. There are plural signal sensing means operating cooperatively with the wave stations. Each of the signal sensing means generates automatically at least one signal quantity linearly related to the variation of each of two unknown distances (ranges), the variation being the variation of the unknown distance separating the vehicle from one of the wave stations. There is also computing means responsive to the sensing means which automatically produces a set of signal quantities. This set of signal quantities represents sets of simultaneous values of the ranges. Signal quantities representing dimensions of the position motion state of the vehicle are developed simultaneously by the computer in the same process.

The configuration of the system chosen for this application is one in which a continuous oscillator is mounted aboard the vehicle. There are five receiving equipments 285–289 located on the ground near the landing pad 290, as shown in FIG. 22.

Only four of the stations of the system provide measurement data. The fifth station 289 serves as a phase reference. The four measuring stations 285–288 each record the total change in phase relative to station 289.

In FIG. 23 is shown a system for taking these measurements. In this system the phase change is measured in units of one cycle of the transmitted frequency. The equipment of these stations 285–288 is similar to that shown in FIGS. 4 and 4B and the operation of the circuit of FIG. 23 is described in connection with these figures. In general this equipment will measure the number of cycles of phase change that occur between the signal it receives over its antenna and the signal is derives from its own frequency standard. In this five station system the frequency standard as employed in some of the other embodiments is replaced by a fifth station 189 geometrically separated from the others. This fifth station comprises the phase locked oscillator 291 shown in FIG. 23 which is similar to the oscillator loops shown in FIGS. 13, 17 and 18. This oscillator furnishes a signal to the phase shifters 23 and 26 of station 288 and also to similar phase shifters of stations 285, 286 and 287. The output of the reversible counter 294 of station 288 is fed to the computer 295. Likewise the outputs of the counters of stations 285, 286 and 287 are also fed to computer 295. If the signal strength from the vehicle is strong enough the phase locked oscillator 291 may be replaced by a simple amplifier.

FIG. 24 shows an alternate circuit for the system which is capable of recording phase change regardless of how low the rate of change of phase becomes. This circuit also has the capability of measuring phase change in fractions of a cycle. The capability of measuring parts of a cycle is important when increased accuracy is desired. Also in this system it is assumed that sufficient signal strength is available from antenna of station 289 that it need only be amplified in an amplifier, whose phase characteristic is sufficiently stable, for use as the reference signal.

The continuous wave signal is received on antenna 300 and modulated by modulator 301 employing the output of low frequency oscillator 302 as the modulating frequency. The modulating frequency should be higher by a factor of three or four than the frequency of the maximum expected doppler shift. The modulated signal is then fed into mixers 304 and 305 which employ mixing signals which are derived from the reference station 289 amplifier 316 and which are separated in phase by 90° by means of a phase shifters 311 and 312. The outputs of the mixers 304 and 305 which now contain the modulating frequency are fed into amplifiers 306 and 307 which have a band pass characteristic centered around the modulating frequency. The signal outputs of the amplifiers are at modulating frequency and varying in amplitude and sign according to the phase relationship between the signals received on antenna 300 and antenna 315. The signal outputs of the amplifiers 306 and 307 are synchronously detected in synchronous detectors 308 and 309. The outputs of the synchronous detectors are then used to excite the winding of a two phase motor 310 whose rotor is magnetically polarized. the motor 310 is coupled through gear box 313 to shaft encoder 314. Depending upon the particular encoder employed gear box 313 may not be necessary. Shaft encoders are common in the art and commercially available in a variety of forms. The output of the encoder 314 is compatible with the input to the computer. The encoder provides a decimal or binary signal to the computer telling it the total angle through which the shaft of the motor has turned including whole turns and fractions of a turn.

The reference signal is obtained from station 289, which has no measuring function. This station consists solely of antenna 315 and radio frequency amplifier 316.

This system is capable of measuring changes of only a part of a cycle. The degree of fineness with which this measurement can be made is dependant upon the phase transfer characteristic of the various amplifiers and the connecting leads. Phase stability is an important characteristic in all of the amplifiers when the most exact measurements are to be made. Amplifiers 306 and 307 are a matched pair with identical phase characteristics. There are other systems possible for measuring the change occurring in the relative phase between two antennas. These systems would be equally applicable.

It should be borne in mind that it is a change in phase occurring in a given interval that is measured not the absolute value of the phase. Furhermore this measurement should not be confused with measurements of planar angles or space angles or the changes thereof. In the event that the distance from the target to the station complex is much greater than the distance between stations this measurement approximates a measurement of rate of change of a trignometric function of an angle. However this approximation is not made in this system. One can see the nature of the measurement by reference to FIG. 25. As the vehicle moves from point 1 to point 2 there is a change in the difference between the ranges to station 1 and station 2. One may say equivalently that there is a difference between the change of range occurring from one station and the change of range occurring from the other station. This measured quantity is shown in the diagram.

It is necessary to take at least three consecutive readings in this system. Writing the expresssion relating variation of the various ranges to the variation of measured quantity as before $$dr_{12} - {}_{11} - dr_{s2} + dr = dp_{15}$$

and the four differential equations of the form $$(x_j - a_i)dx_j + (y_j - b_i)dy_i + (Z_j - C_i)dz_j = r_{ij}dr_{ij} \text{ of coefficients determine}$$

where $i$ denotes the station and $j$ denoes the position point occupied by the vehicle at the start or termination of a measurement. From these equations one may write the error equation for three readings. This equation involves a twelve by twelve matrix of coefficients and each coefficient is the difference between two fractions. For this reason the matrix is not reproduced here. However it is a completely practical expression and easily handled on a computer. This relationship may then be employed to determine the position of the vehicle by an iterative computation as described elsewhere in this application.

The similarity between the type of measurement performed here and the double-legged measurement in which the vehicle acts as a reflector only is to be noted. The mathematical problem is almost identical. An error equation can be written that is similar to that in FIG. 40 but in which each term is the difference of two fractions. This single legged system employing an extra station and measuring the difference between the changes of range may be employed using any of the simpler systems as a base. Furthermore the entire system may be reversed in its operation. Five transmitters may be placed on the ground and the receiving system placed aboard the moving vehicle for the purposes of either navigating in general or for performing a landing upon a landing pad adjacent to the system. It should also be noed that the system is independent of normal drift or excursions of the frequency of the oscillator in the vehicle. If one were to employ the reversed system and desired the highest possible accuracy for a given frequency it would be necessary to employ means for maintaining the phase between the ground transmitters as nearly constant as possible. The only requirement is for constancy over the measurement interval. No particular absolube values need be maintained or known.

GROUND CONTROLLED LANDING SENSOR SYSTEM

The success of a blind landing system hinges on being able to determine very closely the position, attitude and motion of the aircraft. The polystation doppler system is capable of the accuracy required for such a system.

Attitude of the aircraft is determined by the comparison of the positions of transmitting antennas on the extremities of the aircraft rather than direct measurement of the angles. These measurements may be made with extreme precision close to the ground, and this is precisely the region in which the system is to operate.

Attitude control of the aircraft at the higher altitudes during the approach to the landing would be controlled from within the aircraft employing the gyros in the aircraft.

All transmitting equipment for the doppler ground controlled landing sensor system is in the aircraft. All receiving equipment is located on the ground. Special computing techniques and system configurations which are a part of my invention permit the use of ordinary piezoelectric crystal control for stabilization of the frequency of the oscillator in the airborne equipment. The frequency of the ground local oscillator is adjusted by automatic means to provide adequate counting signals. Very high frequencies are employed to reduce the size of the antennae employed on the aircraft and to increase the accuracy of the system. Three small transmitting antennae, 320, 321 and 322, are placed aboard the aircraft, one on each wing tip and one on the tail, as shown in FIG. 26. The airborne equipment shown schematically in FIG. 27 consists of a crystal controlled oscillator 323 whose output is switched sequentially by radio frequency switch 324 from the port antenna 320 to the starboard antenna 321, and to the tail antenna 322. The sequence is then repeated. The rate of switching is slow enough to permit an adequate length in the measuring interval, yet fast enough to allow adequate following of the motion of the aircraft. The switch timing is not critical and is accomplished by ordinary mechanical means. At each switchover the carrier is reduced to zero to provide a signal or a pulse for the initiation of a new count. One measurement of displacement is accomplished by the ground equipment for each transition of the switch 324. The switch actually acts as the timer of the system and sets the duration of each count measurement. The switching would of course be more rapid for highspeed aircraft than for low speed aircraft.

The signals from the aircraft are received on a plurality of receiving equipments 325 located along the runway 326, as shown in FIG. 28. Each receiving equipment on the runway is mounted below the surface of the runway and employs a flush type antenna.

FIG. 28 shows the distribution of the stations 325 in three rows along the runway, one row on each longitudinal edge and one row down the middle. Station 327 is located at the end of the runway and has a high gain antenna pointing down the runway. This station consists simply of a phase locked oscillator 328, shown in FIG. 29, which provides the mixing signal for the other stations at the identical frequency of the signal received by its antenna 327a. If the signal strength is sufficient then the phase locked oscillator 328 may be replaced by a simple radio frequency amplifier, otherwise this oscillator may be connected as previously described. Station 327 has no measurement function. Each of the runway stations 325 measure the difference between the change of range to the antenna thereof and the change in range to the antenna of station 327 at the end of the runway.

FIG. 29 also shows a schematic diagram of connections of the individual runway station 325. Each of these stations includes an antenna 329, mixer 330, and the low frequency amplifier 331. The single output from each receiving equipment is transmitted to the sequence switch 333 of the control center over the line 332. Each receiver along the runway has its own line to the sequence switch of of the control center. By means of this sequence switch 333 a group of six receiving units is selected to form, with station 327, a system of seven active units, six of which are just behind the aircraft. As the aircraft proceeds down the runway the receiver units forming the group are changed so that group forming the active system is effectively maintained just behind the aircraft. Timing of the measurements is no direct problem in this system since all receivers are turned on and off together. The duration of the count is of no importance in the calculations of the position of the aircraft relative to a particular system of stations at the time when the measurement is started and when the measurement is terminated. All of the receiving equipments employ the same mixing signal which is transmitted to all receiver units from the phase locked oscillator 328. This oscillator is locked on a signal from a high gain antenna 327a located at the end of the runway and directed along the runway and in the direction in which the aircraft lands so that it receives a signal from the oscillator 323 on the aircraft. Thus the mixing signal supplied from oscillator 328 to mixer 330 is just lower than the lowest possible frequency in the spectrum covered by the doppler shifted signals from the aircraft. One should be reminded that, although in this system one can control the frequency in this manner, one is not burdened with maintaining any particular phase adjustment between the receivers. This freedom from phasing problems is one of the significant aspects of my invention.

At the control center the output signals from the selected group of stations are amplified by amplifiers 334 and the cycles thereof are counted. Each time there is a pause in the received signal, as is caused by the switching in the aircraft, the counters 335 are read out to the computer 336 and recycled. The computer operates to solve in turn for the position of each of the aircraft extremities that carries an antenna. The position calculations are sorted by a sequence switch 337 which has the same sequence as the antenna sequence switch 324 in the aircraft. The switch advances one position each time a new computation is obtained from the computer 336. The position coordinates immediately indicate the desired position of the switch as any but the true position would require the aircraft to be moving down the strip backwards or sidewards. The data thus derived may be employed to position a model of the aircraft in the air above a model runway so that it could be guided down to a landing by an operator watching the model.

Alternatively, a display may be arranged which simulates for the ground pilot the cockpit of the aircraft. Such simulators are already in a high state of development for use as trainers. Also a system providing a television camera that is moved along a model of the runway including all nearby buildings and other hazards may be used. The television camera is directed from the position information derived from the computer 336. The television signal may be relayed to the aircraft so that the crew could actually watch the landing in process. The picture tube may be placed before the pilot so that he can perform the landing with this aid.

Various modifications are possible in this system, and the goal of course is to provide, under conditions of zero visibility, the same traffic capability that exists in perfectly clear weather. The system shown provides equipment useful in accomplishing the final approach and actual touchdown after the aircraft is over the approach area of the runway. Less precise equipment would be required to direct the aircraft during other phases of the approach. Depending upon local conditions, this part of the approach may be controlled by the air traffic control system described herein. Also the number of receivers 325 on the runway may be reduced substantially by resorting to one of the multiple reading configurations described elsewhere in this application.

The seven station single reading system described herein permits independence of minor variation in the frequency of the vehicle oscillator and normal piezoelectric means are adequate for its stabilization without the necessity of thermal control thereof or other special precautions. There is no problem of sense determination in this application because the direction of the aircraft is known and the receiver 327 at the end of the runway is subject to the greatest doppler shift. Since this receiver provides the mixing signals for all the other receivers, the beat from each receiver can have only one sense meaning.

The signals from the antennas on various extremities of the aircraft may be frequency-multiplexed rather than time-multiplexed as shown. This method would make possible longer observation but requires additional equipment. The method of solution of this system is very much the same as that for the seven station double-legged single reading system. Iterative computation is used and the error equation is identical with the exception that each coefficient is formed of the difference of two fractions instead of the sum. FIG. 39 shows the double-legged error equation. Station No. 1 in that equation may represent a receiver, the rest of the stations being transmitters or the reverse may be true. In the present system the No. 1 station in the equation corresponds to the Station No. 1 which is located at the end of the runway.

MORTAR LOCATOR

It has long been a problem in infantry warfare to determine the position of hostile cannon, mortars, and other missile launching devices so that counter fire might be directed against such sites. The arts of modern war have not eliminated this requirement. The great progress in the miniaturization of computing elements has made the computer a battlefield tool. Since the purpose in this application is not to shoot down the shell but to detect the position of the launcher, one can gather data over a very substantial portion of the trajectory of the shell and take much more time for completing the calculation of the track accomplished from the data obtained. The system may also be used to adjust friendly fire. Whereas other mortar detection equipment has in the past depended upon the use of radar tracking devices employing large parabolic reflectors, my invention makes possible the use of whip antennas or other such antennas of low gain which are much less conspicuous. The requirements of this system do not include the simultaneous tracking of a number of missiles. However it is required that the system be able to track a single target even though there may be several targets in the air simultaneously. This system is relatively simple and therefore requires somewhat more effort in use than a more elaborate and consequently heavier system. To simplify the equations which must be solved and to keep the number of stations to an absolute minimum the system configuration consists of four stations in a plane as shown in FIG. 31. Small deviations from the planar condition such as are expected under battlefield conditions effect the accuracy of the system but do not disable it. The calculations involve only the solution of three simultaneous linear equations and the separate solution of a quadratic equation in one variable. A system employing five stations may be employed which does not require that the stations be located in a plane. Alternatively a system employing three stations could be devised if it were possible to position the stations along a line and to get along with two dimensional information regarding the path of the vehicle. The battlefield equipment may be arranged to work in a number if different modes dependent upon particular conditions existing on the battlefield at a given time. A further use for this type of system is the location of a submarine which fires a rocket missile such as the Polaris. In this instance there may be the additional problem of getting sufficient data to shoot down the missile. However there is also a prime requirement for locating the submarine before it can discharge the rest of its rockets. The system to be described here may be placed aboard four small naval craft whose position relative to each other is known and adjusted through radar readings. The coplanarity requirement is more easily met with ocean vessels since it is only necessary that they maintain their positions so that they are on a common circle. Again errors in exact location in the plane is not disabling to the system. Furthermore, for naval use the ship could carry a computer that is more sophisticated and able to handle a three dimensional station distribution by use of an iterative solution.

In both the land and the naval systems it is desirable to avoid the necessity of communications between stations in the performance of the tracking operation. It would be desirable to employ a single receiving station and have all the rest of the stations be transmitters. However two advantages are gained by employing two receiving stations; namely, (1) the number of stations required for this reflective type system is reduced by one, whereas without the use of the second receiver five stations would be required in the system, and (2) the second receiver makes possible the resolution of ambiguity under conditions when two or more targets enter the field of the system simultaneously. The communications between the two receiving stations need not be carried on during the actual tracking of the missile. Rather the complete recorded data for the entire track may be communicated to the station or vessel carrying the computer after the tracking operation is completed if desired. The data itself is in digital form and need not be voluminous in most applications. A dozen or so readings containing perhaps a dozen or so digits each would be enough to provide a great deal of information relative to the track and initial point of the track. This figure would also include the necessary timing information. In the land based system shown here data is transferred by analogue means.

To make possible a closed solution in the simplest form, the double legged information originally collected by the receiving stations is converted into single legged data. This data is then employed in a very simple computation to determine the positions occupied by the vehicle at each counting point. Two methods of computation employing single legged data are available. In one method four readings must be taken for a complete solution and a set of four linear equations in four unknowns results. In other method only three measurements need be made but one must solve a quadratic equation. The relative accuracies of the two methods and the relative ease of carrying out the computation process determines which method is employed in a particular application.

As mentioned elsewhere in this application there is a reduction of sensitivity in a c.w. system in which a station must detect the echo from its own transmission. Since the echo signal is only removed from the transmitted carrier by the amount of the doppler shift the unavoidable residual noise near the carrier tends to mask the fainter echos. This interference of the receiver by the transmitter at the same station is greatly reduced if the receiver and transmitter operate at different frequencies.

In order to reduce double legged data to single legged data in any system comprised of four or more stations it is only necessary that one of the stations has the capability of transmitting and receiving, and it is not necessary that that station be capable of receiving the echos of its own signal. When one element of single legged data can be determined in some manner this element of information may be employed to convert all other double legged data into single legged data. In this system the required initial element of one legged data is derived from the data derived from three of the four stations of the system, one of these stations being the only station in the system which transmits and receives, another of the stations being a receiving station, and another being a transmitter station. The fourth station in the system is a receiving station and while double legged data is taken from it simultaneously with the other stations this double legged data is not employed to obtain the initial single element of single legged data. The double legged data from the fourth station is combined with the initial single legged data derived from the double legged data from the other three stations to provide the complete set of single legged data desired for a closed algebraic solution. FIG. 30 shows the relationship between the three stations used to derive single legged data. Only station 351 both transmits and receives. Station 350 transmits only and station 352 receives only. Station 352 and station 353 receive and measure data from both station 350 and station 351. Station 351 receives only from station 350 and does not record the echo of its own signal. Station 350 and station 351 transmit on different frequencies. Therefore station 351 transmits and receives on different frequencies. Stations 352 and 353 receive on two frequencies and are thereby able to distinguish between echos received from the two transmitters.

The computational procedure for deriving the desired single legged data from the observed double legged data is very simple and is as follows Let $$(r_{12} + r_{22}) - (r_{11} + r_{21}) = p_{12}$$

$$(r_{22} + r_{32}) - (r_{21} + r_{31}) = p_{23}$$

$$(r_{12} + r_{32}) - (r_{11} + r_{31}) = p_{13}$$

Where:

The $r$'s are the ranges indicated in FIG. 30, the first subscript indicating the number of the station and the second subscript indicating the number of the point representing the position of the vehicle at the beginning or ending of the measurement.

The $p$'s are the measured quantities, the first subscript representing the transmitter associated with the measurement and the second subscript representing the station where the signal was received. The following relationships are derived from the above equations:

$$r_{12} - r_{11} = \tfrac{1}{2}(P_{12} - p_{23} + P_{13})$$

This is the single legged data of change in range desired for the closed solution and is denoted by $m$ or $M$ elsewhere in this application. Similarly the following equations are obtained $$r_{32} - r_{31} = \tfrac{1}{2}(p_{13} - p_{12} + p_{23})$$

$$r_{12} - r_{21} = \tfrac{1}{2}(p_{13} - p_{12} - p_{23})$$

Thus the change in range from each of the three stations is determined. The change in range from the fourth station is determined by subtracting the range data from one of the transmitters from the double legged data obtained by the fourth station using that same transmitter. Either transmitter would serve this purpose. Since the fourth station is capable of receiving from both transmitters redundant data becomes available for other purposes including resolution of ambiguity.

FIG. 31 shows the complete system. The frequency of each transmitter is controlled by its own crystal oscillator and this frequency is different from that of the other transmitter. In this application there is no problem of maintaining the frequencies to great accuracies since the receivers are synchronized to the transmitters by receiving directly the radiation from the transmitters. This mode of operation is possible in this case because of the relatively small distances involved. Both station 353 and station 352 have two receiving units, one for each transmitter. The transmitters are extremely simple being merely crystal controlled continuous wave generators coupled to their respective antennas. The echo signals received at each receiver unit are detected and modulated in such a manner that the signals may be conveniently amplified and transmitted to the control center 354 where they are recorded on magnetic tape simultaneously with the signals from the other receiver units. Timing signals are easily applied to the tape along with the signals from the receiving units. Other ancillary data may be included also. Tape recorders with multiple tracks adequate for this purpose are common on the market. The timing signals are not required for the determination of the path of the vehicle. However they would be required when one wishes to determine the velocities as well.

The purpose of the tape recording is to allow a more thorough examination of the signals and to permit the determination of the projectile path with less equipment. Only one counter would be required to break down the data on the tape as may be replayed as many times as necessary each time counting a different signal until all the signals from all the receiving units have been measured. Another purpose in the recording is to relieve crews of the necessity of continuous watch. Automatic equipment not shown may be employed to start the tape recorder when a signal is received so that a complete record is attained of a sudden firing after a period of quiet. The data reduction process will be described subsequently.

FIG. 32 shows the receiving unit of which station 351 has one, tuned to the frequency of the transmitter at station 350, and of which station 352 and station 353 each has two, one tuned to each transmitter. The operation of the receiving unit is very simple. Signals are received on antenna 355 directly from the transmitter to which it is tuned and from the target as reflections, the signal from the transmitter being substantially larger in amplitude than the echo signal. The signal from the antenna is fed into isolation amplifier 356 whose main function is to prevent signals from phase-locked oscillator 357 from going back into the antenna circuit. From the isolation amplifier 356 the signal goes to phaselocked oscillator 357. This oscillator closely tracks the signal received from the transmitter because that signal is much larger than the echo signals. In some situations it might be possible to operate the system without the phase locked oscillator 357, employing in its stead the amplified signal directly from the transmitter or perhaps even without amplification. However the system shown is more applicable to the wide variety of signal strengths and background noise found under field conditions.

The signal from the antenna 355 is then amplitude modulated by modulator 358 with a sinusoidal wave derived from modulation oscillator 359. This modulation frequency is somewhat higher than the maximum frequency shift expected due to the doppler effect. The purpose of the modulation is to provide a carrier signal for amplification and transmission subsequent to detection in mixer 360 and mixer 361. Mixers 360 and 361 are fed mixer signals from phase locked oscillator 357 through phase shifters 362 and 363 so that the mixing signals applied to the mixers are ninety degrees out of phase with each other. Bandpass filters 364 and 365 have their pass band centered on the modulation frequency and have a bandwidth sufficient to contain the frequencies present because of the doppler shift. The signals from the filters are then amplified in amplifiers 366 and 367 which have output impedances suitable for matching the transmission lines to the control center. The signal is amplified and recorded on magnetic tape at the control center as stated before.

The process and apparatus for analysing the signals on the tape will be described in connection with FIG. 33. It is not necessary that electrical connections be made between all of the units. Data may be transferred between the printer and computer in the form of punched tape for instance, or on cards.

Each of the receiving units has a separate pair of tracks on the tape 370. The signals on each track of a given pair are 90° out of phase with each other. The pair of tracks from one receiving unit may of course contain the recorded echo signals of two or more targets. The pair of signals for any particular target will, after detection by detectors 371 and 372, be 90° out of phase with each other and the relative phase position between the two will be determined by whether the two legged distance from transmitter to target to receiver is increasing or decreasing. After amplification in amplifiers 375 and 376 the signals are fed into the pulse forming network 377 shown in FIG. 33. The pulses from this circuit drive the reversible counter 378 which in turn drives printer 379. The timing signal from the tape is also fed into the printer so that a complete set of printed data of count versus time is obtained. This data is fed into the correlator 380 from whence it proceeds to computer 381 and thence to plot board 382 and chart recorder 383. Since there may be echos from more than one target on the pair of tape tracks being examined means are provided for tracking one pair of signals by regulating the speed of the tape drive so as to produce a nearly constant frequency at the output of amplifier 376. A signal from this point is fed into synchronous detector 384 which also receives a signal of constant frequency from oscillator 385 which determines the operating frequency of the channel. When the signal from amplifier 376 is exactly 90° out of phase with the signal from oscillator 385 there is no d.c. output from the synchronous detector 384. When the signal from amplifier 376 departs from this 90° relationship there is a d.c. signal from the synchronous detector 384 which is employed to control the speed of the drive on the tape transport. The signal from the synchronous detector 384 is fed through low pass filter 386 which has suitable characteristics for use in the servo loop of which it is a part. From the filter 386 the signal controls the motor drive unit 387 which in turn controls the tape drive motor 388. Band pass filters 373 and 374 are placed between detectors 371 and 372 and amplifiers 375 and 376 to reduce the amplitudes of all signals of frequency other than the frequency being tracked. The center frequency of these filters is of course that of the oscillator 385.

In the above manner already described one obtains a system which is the geometrical equivalent of a system in which the change in range from the target to each station is measured directly.

When four stations are located in a plane one can write the following equations $$\alpha_1 r_1^2 + \alpha_2 r_2^2 + \alpha_3 r_3^2 + \alpha_4 r_4^2 = k$$

$$\alpha_1 m_{11} r_1 + \alpha_2 m_{21} r_2 + \alpha_3 m_{31} r_3 + \alpha_4 m_{41} r_4 = -\tfrac{1}{2}(\alpha_1 m_{11}^2 + \alpha_2 m_{21}^2 + \alpha_3 m_{31}^2 + \alpha_4 m_{41}^2) \text{ a completely}$$

$$\alpha_1 m_{12} r_1 + \alpha_2 m_{22} r_2 + \alpha_3 m_{32} r_3 + \alpha_4 m_{42} r_4 = -\tfrac{1}{2}(\alpha_1 m_{12}^2 + \alpha_2 m_{22}^2 + \alpha_3 m_{32}^2 + \alpha_4 m_{42}^2)$$

$$\alpha_1 m_{13} r_1 + \alpha_2 m_{23} r_2 + \alpha_3 m_{33} r_3 + \alpha_4 m_{43} r_4 = -\tfrac{1}{2}(\alpha_1 m_{13}^2 + \alpha_2 m_{23}^2 + \alpha_3 m_{33}^2 + \alpha_4 m_{43}^2)$$

Where the $\alpha$'s and the K are constants depending upon the location of the station within the plane and the M's are the single legged measurements as described elsewhere in this specification. These equations are sufficient to determine the ranges to each of the four stations, whose position is known. The computation process is facilitated by solving the three linear equations for three of the ranges keeping the fourth as a constant. These three may then be substituted in the fourth degree equation to obtain a single quadratio equation in one unknown. After finding the four ranges conversion to cartesian coordinates is routine and will not be described here. If iterative processes are to be employed the associated error formula is shown in FIG. 40 for the four station - three reading configuration. If a completely linear solution is desired a fourth equation, $$\alpha_1 m_{14} r_1 + \alpha_2 m_{24} r_2 + \alpha_3 m_{34} r_3 + \alpha_4 m_{44} r_4 = -\tfrac{1}{2}(\alpha_1 m_{14}^2 + \alpha_2 m_{24}^2 + \alpha_3 m_{34}^2 + \alpha_4 m_{44}^2)$$

may be derived as above.

Alternative Circuits

The phase locked oscillator, several improved variations of which are shown in the various modifications of my invention, is a well known circuit component. This type of circuit is also variously known as a "phase locked loop" and as a "tracking filter". Simplified phase locked oscillators are shown in FIGS. 13, 17, 18, 22, and 32 as devices 130, 220, 230, 291, and 357, respectively, and the circuit shown in FIG. 34 may be used in place of these devices. It is the function of this circuit to generate a continuous wave signal that is of the same frequency and phase as the incoming signal that it is tracking but with greater power and reduced noise. In the circuits referred to above the d.c. and low frequency control voltage is obtained from the mixer and filtered and amplified in a low pass amplification circuit. The circuit shown in FIG. 34 is an improved phase locked oscillator in which the problems of d.c. amplification and of stabilizing the d.c. output characteristic of the mixer are circumvented. This circuit may be operated directly from the antenna or it may be employed in circuits where the signal has undergone considerable translation or other processing. This circuit is an excellent substitute for the circuits numbered above. The circuit shown in FIG. 34 operates in the following manner. The signal is received on antenna 400 and amplified in amplifier 401 in the conventional manner. Amplifier 401 must have a sufficiently broad bandwidth to cover the entire frequency spectrum of operation of the phaselocked oscillator, since the tuning of this amplifier is not variable and does not track the frequency of the input signal. The signal is then modulated with a simple sinewave modulation signal adding a pair of sideband signals to the original unmodulated signal. This modulated signal is then amplified in amplifier 403 whose bandwidth, like that of amplifier 401, is sufficiently broad to accommodate the entire frequency excursion of the incoming unmodulated signal. In addition the bandwidth of amplifier 403 must be wide enough to accommodate the modulation as the total signal spectrum moves as a result of the doppler effect, equipment instabilities, or other causes of frequency shift. Amplifier 403 is tuned to the same center frequency as that of amplifier 401. Also like amplifier 401, amplifier 403 is fixed tuned; the tuning does not follow the frequency shift of the signal being tracked. The modulated signal then enters mixer 404 where it is mixed with a signal from voltage controlled oscillator 409 to produce a signal of the modulation frequency. All other signals from the mixer are suppressed by filter 405. Filter 405 is a bandpass filter whose bandwidth is just wide enough to pass the modulation frequency and may be sharply tuned. The signal from the filter 405 is amplified by conventional means in amplifier 406 and fed into synchronous detector 407. The output from detector 407 contains d.c. and low frequency components that are employed to control the frequency of voltage controlled oscillator 409. Filter 408 is a low pass filter and removes all high frequency components such as carrier frequency signals from the control signal. The exact design of filter 408 determines the response characteristics of the over all phaselocked oscillator. When the signal output of the voltage controlled oscillator is of the same frequency as the center frequency of the signal input to mixer 404 and 90° out of phase with that signal there is no detectable signal of modulation frequency at the output of the mixer 404. When the input signal or the oscillator signal shifts in phase so that a component of the modulated signal input to mixer 404 is in phase with the mixing signal from voltage controlled oscillator 409 there appears at the output of the mixer 404 a signal of modulation frequency whose polarity is determined by the direction of the phase shift. This signal of modulation frequency is either directly in phase with the modulation signal applied to modulator 402 from oscillator 410 or directly out of phase with that signal. This signal then is approximately proportional to and of the same sign as the phase displacement from the standard 90° relationship between the two inputs to mixer 404. The synchronous detector provides a d.c. output of one polarity when the error signal fed to it from amplifier 406 is in phase with the synchronizing signal fed to it from oscillator 410 and a signal of the opposite polarity when the two input signals are of opposite phase. The d.c. control voltage from synchronous detector is essentially proportional to the amplitude of the signal output from amplifier 406 since the signal from oscillator 410 is normally at a greater signal level than the output of the amplifier 406. The filtered output of synchronous detector 407 is connected of such polarity to the control circuit of voltage controlled oscillator that original phase error is reduced or eliminated. The oscillator 410 operates at a convenient low frequency and requires no particular stabilization other than that its frequency should remain in the pass band of filter 405.

For the purposes of the systems described in this application the fact that there is ninety degrees between the phases of the input signal and the signal from the voltage controlled oscillator, which is the output signal of the circuit, is of no consequence. In other applications a ninety degree phase shifter could be placed at the output of the voltage controlled oscillator 409 so that the signal from it would be nominally in phase with the signal input to the circuit.

The output of this circuit may be fed to a frequency meter or a counter which when a proper frequency or time standard is employed would provide a complete doppler receiving station.

FIG. 35 shows a doppler receiving station of a rather elemental variety in which all of the essentials are present. In this system the time required for a predetermined number of cycles of the transmitted wave to arrive at the receiving antenna is determined. From this data the change in range that has occurred during the measured interval is found by use of the following relationship.

$$r_2 - r_1 = C\left(T - \frac{Q}{f}\right)$$

where:
$r_1$ is the range at the beginning of the measurement.
$r_2$ is the range at the end of the measurement.
$Q$ is the number of cycles arriving at the receiving station during the measurement.
$C$ is the velocity of propagation.
$T$ is the time elapsed during the measurement.
$f$ is the frequency of oscillations emitted from the vehicle being tracked.

This expression may alternatively be written $$r_2 - r_1 = \lambda(Q_t - Q_r)$$

Where:
$Q_t$ is the number of waves transmitted during the measuring interval.
$Q_r$ is the number of waves received during the measuring interval.
$\lambda$ is the wavelength corresponding to the frequency of the transmitter.

It is of course readily apparent that these equations are approximations valid only for vehicles that are travelling at velocities slow compared to that of the wave propagation. The corrections that must be applied for extremely high velocities are not presented here. In FIG. 35 the signal is received by antenna 411, amplified in a conventional amplifier 415 and fed into a scaler 416 where the frequency is divided by flip-flops or multivibrators to a convenient value. Signals from this scaler are then employed to turn counter 417 which counts the number of cycles of oscillation of a signal from oscillator 418. Several such stations may be used to form a system as described elsewhere in this application. If several such identical receiving stations are employed in a system to measure the signal from a moving continuous wave transmitter it will be seen that as each receiver counts the same number of cycles of the transmitted wave the time required for each receiver to make the count is different and one may be inclined to doubt the validity of the geometric model that is employed in the system. However the error described is only that owing to the change in the position of the transmitter during this extremely slight time difference. For vehicles moving at practical velocities and at practical ranges this approximation is of no consequence.

FIG. 36 shows another elemental doppler receiving and measuring station employing the technique of measuring the number of cycles that occur during a predetermined time interval. The time interval of the measurement is set by the period of the oscillator 423. In practice this oscillator would probably operate at a higher frequency than that required for the timing signal and would be reduced to that frequency by a scaler. However in principle the time duration of the count by counter 422 is set by the period of oscillator 423. The counter receives the arriving signal through antenna 416 amplifier 421. amplifier421.

Several such stations may be employed to track a moving transmitter as described elsewhere in this application. The applicable equation relating count and displacement is shown in the explanation of FIG. 35. Receiving circuits of the types shown in FIG. 35 and FIG. 36 may be employed in many of the systems described in this application. They may be employed in conjunction with the phase locked oscillator described in FIG. 34. They may be employed in both the tracking and navigation systems and in signal legged and double legged systems, and in systems where the frequency of the moving transmitter is not precisely known.

NAVIGATION SYSTEM EMPLOYING PULSES

FIG. 42 shows a method of navigation employing the detection, aboard a navigating vehicle, of pulses transmitted from each of a plurality of transmitters. As explained elsewhere in this specification pulsed waves may be employed in such a navigation system as well as sine waves or modulated waves.

The Navigation System Employing Pulses shown in FIG. 42 combines certain features of the Navigation System, FIGS. 14, 19, 20, and 21, and certain features of the Tracking System Employing Light Pulses, FIGS. 9 and 10. Similar to both these other embodiments of the Applicant's invention, this Navigation System Employing Pulses employs a plurality of simultaneous measurements using a plurality of referenced points each of which points is the location of a wave aperture; and, of course, there is a wave aperture on the moving vehicle.

The Navigation System Employing Pulses is similar to the Navigation System and dissimilar to the Tracking System Employing Light Pulses in that waves are transmitted, for the purpose of performing the required measurements, from the ground stations to the vehicle. The Navigation System Employing Pulses is similar to the Tracking System Employing Light Pulses and dissimilar to the Navigation System in that pulses are employed to make the required measurements.

Each position determination is achieved by the simultaneous performance of a plurality of measurements. One measurement alone is not sufficient for the determination of the position of the moving vehicle just as such a single measurement is not adequate for position determination in either the Navigation System or the Tracking System Employing Light Pulses referenced above. It is of course necessary to understand in detail the nature of the single measurement in order to understand how a plurality of such measurements is employed to determine the position of the moving vehicle.

Each measurement is performed by determining the time interval between the arrivals at the moving vehicle of a first wave pulse and a successive wave pulse. Both of these pulses are transmitted by the same station. This measured quantity is linearly related to the variation (change) of the distance between the single transmitting station and the vehicle, which variation occurs between the epoch of the reception of the first pulse and the epoch of the reception of the second pulse. This variation of the distance (change of range) is a direct consequence of the variation (change) of the position of the moving vehicle occurring between the first epoch and the second epoch. It is thus seen that the quantity actually measured, the time interval between the arrivals of the two pulses, is dependent upon the motion of the moving vehicle, i.e., the variation, (or more particularly the change) of the position of the moving vehicle occurring between the two epochs. One actually measures a quantity, the time interval, that is linearly related to the variation of the distance; and thus this quantity actually measured is dependent upon the variation of the position of the moving vehicle.

The linear relationship between the variation (change) of the distance (range) and the measured quantity (time interval) is shown elsewhere in this specification. The manner in which the time interval between the arrivals at the vehicle of the first pulse and the successive pulse is measured is shown in FIG. 10 of this specification. This equipment is aboard the vehicle of course, rather than on the ground as in the case of the Tracking System Employing Light Pulses.

The process of performing a plurality of such measurements and the several options that are available in the configuration of stations and the number of measurements to be performed by each is explained in the specification relative to the Navigation System. It is readily seen that the distances (ranges) whose variations are measured as described above form the edges of a solid geometrical configuration of points. These points are of course the reference points which are the positions of the stations and the point which is the position of the vehicle. As the vehicle moves the geometrical configuration of points varies (changes), the distances (ranges) vary accordingly, and the time intervals described are linearly related to the variation of the ranges and are thus dependent upon the variation of the geometrical configuration. There is thus a relationship between the time intervals described and the positions of the moving vehicle at the epochs of the initiation and termination of the measurement. A plurality of such relationships defines these positions.

One may alternatively describe the operation of this modification of the invention in terms of a plurality of static geometric configurations of points. A first configuration of points exists which is a configuration comprising the locations of the stations (the reference points) and the vehicle at the epoch of the initiation of the measurement. A successive configuration of points exists comprising the locations of the stations (the reference points) and the location of the vehicle at the epoch of the termination of the measurement. There may be two or more of such configurations depending upon the number of stations employed. In this explanation of this modification of the invention there must of course be at least two configurations of points. The differences of corresponding parameters (the distances of ranges) of the successive configurations of points is dependent upon the differences in the shapes of the configurations. Each configuration corresponds to one of the above mentioned epochs at which the vehicle traverses that point of the configuration that is not one of the reference points, and each configuration has only one point that is not a reference point.

It should be clear that it is the variation of the configuration (or the difference between successive configurations) that produces the measurable phenomena, and permits thereby the determination of the configuration (configurations, in the above alternative explanation).

The transmitters must transmit their respective pulses sufficiently close together in time that the vehicle does not move sufficiently between the transmission of the first pulse corresponding to a given epoch and the transmission of the last pulse corresponding to that same epoch that the geometric model upon which the determination of position is based is destroyed. Such interstation synchronization is easily achieved either by timing means at each station or communication means between the stations. The critical item relative to the timing of the pulses is not the timing between the stations but rather is the timing between the successive emissions at each single station. This intrastation timing is easily accomplished by frequency reference means at each station.

FIG. 42 shows a plurality of pulse transmitters A, B, C . . . N which serve as beacons for the navigation of the vehicle. The vehicle equipment 450 is carried aboard the vehicle. The vehicle equipment 450 comprises receiving and signal identifying means 451. From these means signals corresponding to the signals of the several transmitters are fed into frequency standard and measuring means 452. In means 452 the time intervals between successive pulses from each transmitter are measured. The measured quantities from apparatus 452 are fed into computing means 453 for position determination. Means 453 convert the measured quantities into the cartesian coordinates of the first and successive positions of the moving vehicle corresponding to the epochs of initiation and termination of the measurements.

APPROXIMATE METHODS

Any method for obtaining an approximation of the true values of the dimensions of the position-motion state for the purposes of initiation of an iterative or recursive function in a digital machine is in itself a method of performing the computational elements of an embodiment of my invention. A number of such methods for obtaining approximate dimensions are discussed in my copending application Ser. No. 86,770. It is merely a matter of accuracy whether or not the particular method is adequate for the purposes to be served by the particular modification of my invention. Some of the methods of automatically obtaining approximate dimensions are as follows.

1. Automatic reference to stored tables of sets of dimensions arranged in the computer memory opposite corresponding sets of values of the measured quantities. Such automatic "look up" procedures and mechanisms are well known in the digital art.

2. Random selection of possible sets of dimensions. The set of possible dimensions is chosen as from a set of random numbers or other automatic process for deriving random numbers. The selected set of dimensions is applied as the initial values in the recursive process. If the process converges the desired values are achieved. If the process does not converge after a preselected number of iterations another selection is made.

3. Methods employing analog computation. Such methods are described elsewhere in this specification. The inventor built and used both 2-space and 3-space model-type analog computers or indicators using the weight and chain mechanism prior to filing of the copending application Ser. No. 86,770 of which this application is a continuation-in-part. FIG. 44 shows a plan view of a 2-space computing or indicating system. FIG. 45 shows a perspective view of the same system. The system shown employs four stations with single-legged measurements. Further description of this type of apparatus and similar analog apparatus are provided elsewhere in this specification.

4. Automatic closed computation procedures that provide the required dimensions of the position-motion state using algorithms based on explicit solutions. In some embodiments of my invention these algorithms are based on the simultaneous solution of sets of linear equations. In some embodiments of my invention motion equations are employed as described elsewhere in this specification to achieve an approximate solution in closed form. In some modifications a plurality of ranges is determined, the range from an individual station being determined only by variational measurements taken relative to that station.

5. The use of previous data taken along the track of the moving object. This procedure is a natural consequence of the tracking process. Previous determinations of dimensions of the position-motion state in either orthogonal or non-orthogonal dimensions, provided by previous operation of the system, are excellent data from which to initiate a succeeding iterative process using new measurement data.

6. Data supplied by mechanisms external to the system proper. Such data may be acquired by radar or other tracking mechanism and may comprise estimated orbital or other motion information.

7. Automatic scanning of the dimensions of selected domains of the position-motion state provides another method of obtaining initial values from which to commence an iterative or recursive process of automatic computation. In some embodiments of my invention the scanning process is performed on a matrix of dimensions of the position-motion state stored in the memory of a computer, or the scan may be automatically synthesized as it proceeds by a subroutine which computes each trial set from the values of the preceeding set. Such automatic computer routines are well known in the digital art. As each new set of trial values is derived the corresponding measurement values are computed and compared automatically with the actual measurement values. When the difference between the set of computed measurement values and the set of actual measurement values is smaller than a preselected value a control is activated which automatically applies the corresponding trial dimension of the position-motion state to the input of the iterative process. The scan may be in a systematic fashion as with a rastor or can be accomplished in a random fashion.

The above represent but a portion of the options for deriving approximate values from which to initiate a recursive process. Various combinations of the above methods are also employed in the various embodiments of my invention. In the selection processes it is not necessary in all embodiments of my invention to scan all of the dimensions of the position-motion state. For instance in one embodiment of my invention the position dimension corresponding to the position point of the moving object at the instant of acquiral of the signals is scanned while succeeding positions or other dimensions of the position-motion state are computed from each of the scanned position dimension sets using the actual measured variation data. From this data a set of corresponding measurement data is computed. The computed measurement data is then compared automatically with the actual measured data. When the difference between the two sets occurs below a preselected value the corresponding dimensions are used in starting the iteration process.

A particularly simple example of the use of previous tracking data occurs in an embodiment of my invention using a single set of simultaneous displacement (incremental type) measurements to determine the dimensions of the corresponding two position points (described in the section entitled MULTIPLE DISPLACEMENT FINDERS). The position of the moving object at the time that tracking is initiated is retained. The second, or termination, point is advanced as each new set of measurements (each new reading) is taken. The previous termination reading and the initial point data are employed as an approximation set in getting a new position approximation using the recursive process to determine both the initial point and the advancing point. The newly determined initial point data may then be employed directly in a new approximation set for a new performance of the recursive proceudre. Alternatively the newly determined starting point data may be combined with the old starting point data according to statistical rules to obtain an improved approximation of the starting point. The approximation for the advancing point may simply be the old computed value for that point, or it may be an improvement derived using the new measured variation data.

PLANAR NAVIGATION SYSTEM

Four-station Configuration

This navigation system is designed for two-dimensional operation, the beacon stations and the navigating vehicle all lying in the same plane. Thus it is appropriate only for restricted areas of the Earth's surface. However the principles of my invention are illustrated as well by this two-dimensional system as by the somewhat more complex three-dimensional system. In FIG. 43 is shown the geographical plan of the system. There are four transmitters 501 radiating continuous wave unmodulated signals. Each station radiates at a different frequency. On board the navigating ship 502 there are four receivers, each tuned to one of the transmitters. These receiving channels may share a common front end if the frequencies of the several transmitters are close enough to each other. Computing and indicating means connected to these receiving channels determine the position of the ship.

In FIG. 44 and FIG. 45 are shown a plan view and a perspective view of a mechanical model, or analog, of the geometrical aspects of this modification of my invention. The analog comprises a table top 503 upon which lies a map of the Earth's surface over which it is intended to navigate. At each point on the map at which there is located a beacon there is a small hole 504 just large enough to pass two strings. A weight 505 is supported beneath each hole by two strings 506 and 507, generally of unequal length passing up through the hole. There are two small buttons 508 and 509 lying on the surface of the table, each button representing a position of the navigating vehicle. One string from each hole, beacon location, is attached to each button. It is found that for any selected pair of positions on the chart there will be a set of string inequalities which causes all of the strings to be taut. Conversely when a set of four string differences exist that corresponds to a position pair both of the positions may be determined correctly by adjusting the string differences on the model and positioning the buttons so that all of the strings are taut. It is recommended that one attempting to understand my invention construct such a model.

A practical automatic means of navigating employs an apparatus closely resembling this string and weight computer.

Each of the four receiving channels on board the ship has electrical-mechanical means for rotating a shaft, the rotational speed of which shaft is in direct proportion to the rate of change of the distance of the ship from the beacon to which the channel is tuned. At some unknown point on the map the navigation system is put in operation. As long as the ship remains at this position there is no useful information to be gotten from the equipment other than the fact that the ship is not moving. However as soon as the ship has moved a significant distance from this point zero where the equipment was placed in operation the apparatus indicates both the present position and the point zero. The indicating apparatus is actuated by the rotations of the four shafts, each of which shafts is actuated by one of the receiving channels.

The method of operation of the indicating device is closely related to that of the table model just described. Selsyns, racks, and pinions replace the strings, weights, buttons and holes. To avoid interference between the sets of elements of the apparatus, each set indicating the position of one of the two navigation points, two separate "boards" are employed in this modification of my invention. Each board has a map or chart or grid identical to that of the other board. The boards are not mechanically connected but are electrically connected. Mechanical connection through differential gears and flexible cabling could be substituted for the electrical connection chosen here.

Referring to FIGS. 46A and 46B, there are two boards, 511 and 512. Board 511 is equipped with pinions 513, 514, 515, and 516. Board 512 is equipped with pinions 517, 518, 519 and 520. The pinions of the two boards correspond in the order given. Each board is equipped with a map 521 identical to that of the other board. Each pinion is located at the same point on the map as its corresponding pinion on the other board. Corresponding pinions on the two boards are linked by selsyns. Pinions 514 and 518 located at the lower right of the two boards are a pair of pinions so connected. Pinion 514 engages rack 522. The rotors of the selsyns are excited through the 110 volt power line. The stator of selsyn 524 is connected by three wires to the rotor of differential selsyn 526. The stator of the differential selsyn 526 is connected by three wires to the stator of selsyn 527 which is mounted on board 512. Selsyn 527 is mounted at the same point on board 512 as is mounted slesyn 524 on board 511. Pinion 518 is mounted at the same height as pinion 514. The rack holders 523 are identical. Each rack is a part of rack assembly 529 shown in FIG. 47A and 47B, the side and top view respectively. Rack assembly 529 consists of two parts, rack 522 and rack ring 530. The rack holder support bearing 528 has the same height as the rack holder support bearing 525 for convenience of assembly and operation. All of the rack assemblies 529 of both boards are identical.

Stylus holder 531 supports the rack rings 530 of all four of the rack assemblies 529. There is one stylus holder 531 for each board, and they are identical and shown in FIG. 48A and FIG. 48B, the side and top views respectively. The stylus holder 531 has a shaft 532 and a platform 533 for supporting the rack rings 530. The rack rings 530 fit around the shaft 532 and rest on the platform 533. The weight of the assembly is supported by the stylus 534 which is conveniently of the ball point variety. With this type of stylus the weight is easily supported and adequate pressure of the stylus on the map surface is assured.

The differential selsyn 526 is not mounted on either board but is mounted along with the other three differential selsyns on a separate control panel.

FIG. 49 shows the connection between the differential selsyn 526 and the driving receiver channel. Also shown are the connections of the differential selsyn 526 with its associated selsyns 524 and 527. The shaft of the differential selsyn 526 is joined to the shaft of two phase synchronous motor 535 whose rotor is a permanent magnet. Synchronous motor 535 is a part of a receiver channel shown in FIG. 4.

The operation of the receiver channel is fully described relative to FIG. 4 and is clearly shown in that figure. The only difference between the receiving circuit of FIG. 49 and the circuit of FIG. 4 is that FIG. 4 includes a transmitter power amplifier 13, directional coupler 12, timer 21 and gates 29 and 30, none of which elements is required in the circuit of FIG. 49. The standard frequency oscillator 11 is tuned to the frequency of the beacon to which it is assigned. This tuning may be accomplished by assignment using the ultra stable atomic standard oscillators available at the time of the filing of the patent application Ser. No. 86,700 of which the instant application is a continuation in part. If less stable oscillators are employed fine tuning may be accomplished while the ship is stationary. Transponders may be employed instead of independent beacons if it is desired to achieve greater independence of the ship's standard frequency oscillator.

The navigation system is put in operation by placing both styluses at the same point on their respective maps and turning on the excitation of the rotors of the selsyns. The ship may be stationary or in motion when the apparatus is turned on. The ship may be at any point in the field of operation of the system, and the styluses need not be placed at that point. One of the boards indicates the position where the system was placed in operation. The other board indicates continuously the position of the ship. The styluses of boards remain quiescent until the ship has moved a minimum distance. As the ship continues to move the stylus of each board moves to its proper position. Continued motion produces an improvement in the accuracy with which the two positions are indicated. Soon the stylus of the board indicating the initial point becomes essentially stationary as the stylus of the other board continues to indiate the present position of the ship.

The advantages of this system over the conventional navigation systems include the simplicity of the beacons, the absence of any requirement for timing between the beacons as is required in the Loran and other hyperbolic systems. No receiver is required at any of the beacon sites as it is required in the Loran. The simplicity of the receiving system and the accuracy attainable are further advantages.

In this method of navigation, which is a particular modification of my invention, a plurality of sensing elements, the receiving channels on board the moving vehicle, are employed to detect nonorthogonal components of the motion only if the ship relative to each of a plurality of reference points. These reference points are the sites of the beacons. No knowledge of any previous position or initial position of the ship is required, nor is any characteristic of the path of the ship required. Only the detected motion relative to each of the beacons is employed to determine and indicate the position of the vehicle.

This apparatus for navigation comprises the following elements, a plurality of beacon elements located at known points, the sites of the beacons, a plurality of sensing means on board the moving vehicle each sensing means sensitive only to motion relative to one of the plurality of beacons, indicating means responsive to the plurality of sensing means for indicating at least one dimension of the position-motion state of the moving vehicle.

It is a very obvious characteristic of this modification of my invention that it may also be employed as a position finding system in which a beacon is placed on the ship and the several beacon stations employed on the shore are replaced by receiving equipment. Land or underwater cable is used to connect all of the receiving equipments to a common point, a common site, where the indicating apparatus is located. The two-phase signal from the receiving sensing element can be transmitted over the communication line.

Servo amplifiers and followup devices can be employed to improve the basic operation of this system employing selsyn devices. Another method of introducing servos is to employ potentiometers as pinion-rack position sensing elements and torque motors as driving elements.

Station Pinion Servo

A servo method for linking the corresponding pinions of the two boards 511 and 512, automatically inserting the measurement data into the board system, and determining the measurement values that exist in the state of the board system is shown in FIG. 50. Torque motor 601 is mounted on board 511. Mounted on the shaft of torque motor 601 is pinion 514 for driving the rack 522. Mounted on the reverse end of the torque motor 601 and driven from its shaft is helical potentiometer 603. Similarly there is mounted on board 512 the corresponding combination of elements: torque motor 605, potentiometer 606, and pinion 518. The pinions for driving the racks are surrounded by rackholders 523 and pinion bearings 525. Driver amplifiers 611 and 612 drive torque motors 601 and 605 respectively. Potentiometers 603 and 606 as well as potentiometer 613 are all excited from a constant voltage source provided at posts G and H. Inverter amplifier 610 is inserted in the control input of the driver amplifier 612. Inverter amplifier 610 and driver amplifier 611 are driven from sum amplifier 614. The ouput of potentiometer 606 is inverted in inverter amplifier 615. The outputs of potentiometer 603 and inverter amplifier 615 are summed in sum amplifier 602. The output of sum amplifier 602 at point A indicates the difference between the ranges from the corresponding station point represented by 514 and 518 and the two stylus points. The output of the sum amplifier 602 and the signal appearing at point B are combined in sum amplifier 614. Switch 616 removes the input signal from the servo combination making that input zero for setting the racks at equal lengths in initially adjusting the system. This switch is also employed in other modes of operation. If more than two boards are employed, board 512 becomes the common board and the signal at point C goes to the corresponding circuits related to the other boards.

The combination of elements above is wired so that the difference of the displacements of the potentiometer contactor slides (indicated by the center terminals) is maintained by the torque motors to be proportional to the applied input signal at point B. When the system is quiescent at the neutral or balance point the difference in the outputs of the two potentiometers 603 and 606 is equal to the input at B.

The interface between the radio frequency sensing elements of the system and the indicator servo system for each channel is shown by the remaining elements of FIG. 50. The input to this section of the system is provided as a two-phase a.c. signal appearing at points E and F and are derived from the corresponding points E and F in the circuit shown in FIG. 49. Switches 620 provide a means of initiating and terminating the measurement and are actuated by signal from post K. The signal input at post K is provided by the system timing device such as timer 21 in FIG. 4. The inputs from points E and F are fed to Kohler type circuit 621. (The Kohler type circuit is shown essentially in FIG. 4B). The outputs of the Kohler type circuit 621 are used to drive the step motors 624 through driver amplifiers 623 and sum amplifiers 622. The shafts of the two step motors are provided with a common shaft 625 also shared by potentiometer 613. These elements are so connected that the phase rotation of the a.c. signal input in one direction at points E and F cause rotation of the shaft 625 in one direction. Reversal of the phase sequence of the signal at points E and F causes reversal of the rotation of the shaft 625. One step motor drives the shaft in one direction and the other step motor drives the shaft in the other direction.

The sum amplifiers 622 provide a means of resetting the step motors to the zero point on the potentiometer 613. The output of the potentiometer 613 provides the input to the servo and is also employed in the reset operation. The output of the potentiometer 613 is amplified in amplifier 626 and thence fed to gate 627, to gate 629 through inverter amplifier 628, and to latch switch 630. The latch switch switches on a pulse signal train from pulse generator 631. The latch switch is turned on upon actuation by signal from Post L and is turned off when the absolute value of the output of the potentiometer 613 is zero. Positive values of the signal from potentiometer 613 open gate 627 and close gate 629. Operation of the gates is reversed for negative values of the signal from potentiometer 613. The potentometer 613 is thus driven to zero upon actuation of the reset control and returned to operation when the potentiometer output signal is reset to zero.

FIG. 51 shows the mechanical and electrical arrangement of the indicator elements and the doppler sensing elements. There are four identical channels synchronized by a common timing signal. These separate channels have no interaction other than that owing to the mechanical coupling provided by the racks 522. This rack coupling is indicated by the dotted lines. The lines at the top of the figure indicate this mechanical coupling provided by the mechanisms associated with board 511, and the dotted lines at the bottom of the figure indicate the mechanical coupling provided by the apparatus of board 512. Explanation is provided relative to only one of the four identical channels. Element 650 represents the doppler responsive element and the elements required to process the signal for introduction into the indicator system. The output of element 650 appears at point A in FIG. 49 and in FIG. 50. Element 651 comprises the elements associated with the board 511. Element 652 comprises the elements associated with board 512. Signal inversions are indicated by the boxed negative symbols. Signal additions are indicated by the boxed plus symbols. In order that the senses of the mechanical elements and their associated driving and sensing elements be preserved signals both to and from element 651 are inverted. Since the sense relationship between the output of element 650 and the remainder of the circuit is arbitrary no inversion is shown at this point.

Element 650 receives the doppler signal at post p1. This signal is of course different for each of the four channels. The element 650 receives a timing signal at post T, and this timing signal is common to all four channels.

Three-Station Configuration

FIG. 52 shows how the planar system can be modified to employ but three stations. As explained elsewhere in this specification a plurality of overlapping or contiguous doppler measurements is required for this type of operation. In this particular three-station planar modification of my invention three boards are employed. There are three target points, each involving two dimensions of position. There are two measurements of the doppler phenomenon performed in either an overlapping or a contiguous manner. Thus the geometry of the system is defined — six unknown dimensions of the position-motion state and six measurements with which to determine the six unknowns. As in the case of the four station planar system the channel corresponding to each station or beacon has no interaction with the other channels other than that provided by the racks of the separate boards. Operation of the three channels is synchronized by timing signals introduced at posts T1 and T2. In this particular modification it is chosed arbitrarily to have the doppler measurements overlap. Both measurements start at the same time so that the second measurement comprises the displacement measured in the first measurement. There are two measurement elements 650 and 653 in each channel. Element 650 operates relative to the first board and the second board. Element 653 operates relative to the first board and the third board 654. The first board displays the first position point. The second board displays the second position point. The third board displays the third position point.

This particular three-station planar modification of my invention is not designed to be capable of continuous indication of position as provided by the four station method described above. Since there is only one measurement in the four-station system the positions of the initial point and the final point can be continuously indicated by the very simple apparatus shown and described relative to the four station configuration of the planar navigation system. In the three-station method described here doppler measurements are performed first and position determined subsequently by the board apparatus. Typically equal time intervals between the terminations of the overlapping measurements is employed. Upon completion of the final measurement switches 616 can be closed to cause the indicator system comprising the three boards to indicate the positions of the three points.

In the single channel the doppler signal is inserted at post P. Actually this insertion will require more than a single connection and as elsewhere in the diagram the lines indicate information flow rather than the corresponding practical wiring. The same doppler signal is fed to both the measuring element 650 and the measuring element 653. Element 650 makes the first measurement. Element 653 makes the second measurement.

The dotted lines at the top of the figure indicate the racks of the first board, corresponding to the point where both measurements are started. The dotted lines in the center of the figure represent the racks of the second board, corresponding to the point where the first measurement is terminated. The dotted lines at the bottom of the figure represent the racks of the third board, corresponding to the point where the second measurement is terminated.

REFERENCES ON MEASUREMENTS

H. W. Kohler in U.S. Pat. No. 2,911,641 issued Nov. 3, 1959, shows a one-legged system for measuring radial displacement from the station of a moving reflective target. This arrangement could serve as a part of the measuring instrumentation for some embodiments of my invention. Attention is called in particular to the circuitry for converting the two phase signal, which is capable of indicating magnitude and sense of displacement, to a digital indication of magnitude retaining the sense indication. Kohler does not show a method of control of the duration of the measurement.

H. P. Kalmus in Proc. of the IRE Vol. 43, No. 6 June 1955, pp. 698–700 shows a method of obtaining the two phase signal indicating the sense and magnitude of change of distance. This technique could be applied in some of the embodiments of my invention.

AUTOMATIC COMPUTATION PROCEDURES

Algorithms

Algorithms for the automatic computing elements of different sample modifications of my invention are shown in my copending applications Ser. No. 86,770 and Ser. No. 74,180 as well as in this document. In each of these described sample modifications of my invention the ranges from each of the stations to the moving object is determined as a part of the automatic computation process even though in some instances the output data does not include such range data in indicating dimensions of the position-motion state. My analog mechanisms, which first clearly demonstrated the conclusive and unique determination of the position-motion state by doppler measurements and which preceeded achievement of digital processes for performing the computational functions of my invention, also included coincident determinations of the ranges. Though I have invented automatic procedures which do not depend upon range determination, such determination is employed to advantage in some modifications of my invention for determining the dimensions of the position-motion state of a moving object in orthogonal coordinates. The simultaneous determination (achieved without direct range measurement) of a plurality of simultaneous ranges is an integral part of some modifications of my invention. Both analog and digital devices and processes are described herein dependent upon such coincidental range determination. In some modifications of my invention other system parameters such as oscillator frequency similarly are determined coincidently in the process of determining dimensions of the position-motion state.

Iteration Processes

My copending application Ser. No. 86,770 contains discussion on the application to my invention of the well known iteration process of solving simultaneous equations. It is seen that in these automatic processes the determination of the ranges is coincident with the determination of the dimensions of the position-motion state.

Error Equations

As is well known in the art of mathematics, the matrix error equation can be employed in multidimensional processes for the determination of the "geometric dilation of precision" of multidimensional error ratio as well as in iterative solutions. Discussion of these error matrices and their formation for application to my invention are provided in my patent application Ser. No. 86,770. Samples of these matrices appropriate for use in some of the sample modifications of my invention described in this specification are provided herein. The particular modifications of my invention do not necessarily require these matrices, and they are submitted only as being typical for application relative to certain of those modifications of my invention where computational processes are based on nonlinear equations.

An error equation for a system employing radial velocity data is shown in FIG. 37. Since only range velocity (simple doppler shift in this instance) measurements are made in this system, six stations are required. This error equation for the system is described in this specification under the title MULTIPLE RATE FINDERS. Similar error equations may be written for systems employing fewer stations and higher time derivatives. Such equations may also be written to include provision for unknown constant vehicle frequency standards and for variable unknown frequency standards in the vehicle, as well as other applications such as mapping.

FIG. 38 shows an error equation for the six station-single reading - single legged displacement measurement systems such as the system described in this specification under the title MULTIPLE DISPLACEMENT FINDERS.

FIG. 39 shows an error equation for a seven station - two legged - single reading - displacement measuring system. This equation is appropriate for a system employing either six transmitters and one receiver or six receivers and one transmitter. Station number one is the singular station in this equation. This equation applies to the system described under the heading AIR TRAFFIC CONTROL SYSTEM in this specification.

FIG. 40 shows an error equation for a four station - single legged - three reading system such as the system described under the heading FOUR STATION TRACKER in this specification.

FIG. 41 shows an error equation for a seven station - single reading - single legged system permitting determination of error in a vehicle standard frequency source as well as the determination of the vehicle position coordinates.

The word "reading" in the paragraphs above is intended to indicate a set of measurement values each of whose measurement are essentially simultaneous with the other measurements of the set and which extend over the same time intervals as the other measurements of the set. As in the case of the error equation shown in FIG. 40 a complete set of sufficient conditions to establish position may call for more than one reading as the word reading is here used.

Closed Solutions

Closed solutions exist for use as the basis for algorithms suitable for application to the computing elements of certain modifications of my invention requiring automatic numerical computation and are discussed in my patent application Ser. No. 86,770 under the title CLOSED ALGEBRAIC SOLUTIONS. Discussion of both linear closed solutions and nonlinear closed solutions are comprised by this section of the referenced patent application. Closed solutions exist for both rate type systems and incremental (displacement) type systems as referenced above and as discussed elsewhere in this specification.

Position Determination Without Motion Constraints

It has been shown that given a sufficient number of operating sites it is possible to determine uniquely the position of a moving object at the initiation and at the termination of any substantial movement by observing or measuring only changes of distances. It is not necessary to measure or to know a priori any distance related to the moving object. In the analysis associated with those techniques the equations expressed exactly the relationship between the coordinates of the various positions occupied by the moving object at the initiation and termination of the several measurements, the measurement values, and other parameters of the system. The recommended methods of solving the equations in some instances were approximate, but the equations themselves are expressions of exact relationships relative to the geometrical model of the actual physical system. One geometric model in this technique is a static structure of straight lines drawn between the various station points of the system and two or more unrelated points in space occupied or previously occupied by the moving vehicle. The vehicle positions can be any points in space. No relationship is assumed or established between these points in the geometric model other than that relationship established through the measurement of distance changes. Equations relating the measured values of distance changes to position coordinates of the moving objects and the coordinates of the system stations are called measurement equations in this application. These measurement equations are all that is required to describe the geometric model employed in the methods previously described.

The only assumptions made concerning the motion of the vehicle in establishing the geometric model in the previous methods were that the moving object could not be in more than one place at a time and that the moving object did not visit the same position twice in any measurement sequence employed for a position determination. Discontinuity of the path of the moving object in either time or space is acceptable everywhere except at the positions of the object at which readings are made of the measured quantities. The values of the readings of the measured quantities are directly related to the coordinates of the positions of the moving object at the times and places when the readings are made, and the times and places where measurements are initiated with absolutely no relationship to the path traversed by the object in getting from one place of reading to another or in the manner of traversing that path.

Motion Constraints

In the improved methods of position determination presented in this section the constraint of continuity of the path of the moving object in space is imposed. The constraint of continuity of motion with time is also sometimes imposed in the methods described in this section. With only the additional constraint of continuity in the analytical treatment of the problem there is no greater physical constraint assumed on the actual motion of the target object than before this constraint is added. Practical mechanics of the motion of any object in space as we know it precludes the moving object being in two places at the same time and assures us of the continuity of the path. It is not necessary to express this fact in the mathematical procedures for determining position from measured doppler data, as has been shown in the previous section. Expressing this constraint analytically and including it in the mathematical procedures of position determination in no way restricts the generality of the resulting methods insofar as these methods are applied to physically realizeable moving objects. Analytical recognition and use of this unavoidable physical fact of life makes possible the improved methods that form one of the categories of this disclosure.

The assumption or discovery of the a priori knowledge of further constraints on the motion or path of the moving object makes possible still other improved methods which form another category of this disclosure. These further constraints substantially restrict the motion that can be accommodated by the mathematical procedures that are set up according to the particular constraint. Simplification of data taking and handling and computation procedures are some of the advantages of methods employing these somewhat specialized constraints. One such constraint is that the object moves in a straight line. Another constraint may be an elliptical or parabolic path. Whereas the more general constraints may be used in a rather routine fashion, use of specialized constraints makes advisable precautions to ascertain that the motion of the moving object is indeed within the assumed constraints expressed analytically, at least to a satisfactory degree of approximation.

Equations descriptive of the motion are added sometimes to the measurement equations to provide improved methods of position and motion determination. These additional equations are called "motion equations". The motion equations relate to coordinates or the ranges of the reading positions to each other and represent relationships that are independent of the measurement relationships.

Measurement Equations

The following applies to systems wherein the fundamental measurement is of a finite change of distance rather than the measurement of an infinitesimal change of distance or rate of change of distance.

The measurement eqations, so called because the values of the measured changes of distance appear therein, may be written as follows:

$$M_{kij} = (r_{ij} \pm r_{kj}) - (r_{io} \pm r_{ko}) + \sum_n e_n$$

The $r$'s are functions of the unknown coordinates of the moving object and the coordinates of the stations of the system and represent the distance between the position of the moving object and the system station indicated by the subscripts. The $e$'s are the unknown errors in measurement owing to misalignment of local standard frequencies of the pair of stations involved in the particular measurement. The $M$'s are the values of the measurements performed at the times and stations indicated by the subscripts. The subscript $j$ denotes the point in space occupied by the moving object at the time the measurement is completed and also the instant or epoch of time at which the measurement is completed. The same quantities are indicated for the initiation of a measurement by this subscript being zero. Conventionally all changes of distance are referred to the position occupied by the moving object at the initiation of the measurement sequence, the readings of which are to be used to establish a set of simultaneous equations. The $i$ and $k$ subscripts indicate the two stations involved in the measurement. The choice of plus or minus signs depends upon the manner of making the measurement, and the choice must be the same for both binomials. If the measurement system consists simply of a transmitter station and a receiver station and a reflecting target, the positive sign is employed as the measurement is one of the change of the sum of the range to the transmitter and the range to the receiver from the moving object. The negative sign is employed when the $r$'s refer to two stations of the same kind, either transmitters or receivers. In this instance a third station, of the opposite kind, is employed in making the measurement but the range to it does not appear in the measurement equations. Its operation has no effect on the mathematical operations.

The two stations relative to which the measurement equation is written is called a "station pair" in this application. Measurement equations for systems involving transmission either to or from the moving object but not in both directions are obtained by suppressing the appropriate $r$'s in the equation. Measurement equations for systems in which transmission and reception is performed at the same stations are simply:

$$M_{ij} = r_{ij} - r_{io}$$

There are no error terms since the received signal is compared with the local standard controlling the transmitted signal.

In these measurement equations the $r$'s may be expressed in terms of the cartesian coordinates of the moving target and the cartesian coordinates of the stations cooperating in making the measurement. The coordinates of the station as well as the coordinates of the moving object may vary from measurement point to measurement point. When measurements can be taken simultaneously by an adequate combination of stations a complete set of equations for the determination of the positions of the moving object can be derived using only the measurement equations. It is also possible to determine the coordinates of the cooperating stations using only these measurement equations.

Motion Equations

No matter how many readings are taken by any system whose number of station measurement combinations, or station pairs, equals the number of coordinates axes of the space or area in which the target is moving there are never enough relationships or equations developed solely by the measurements to permit the determination of the positions of the target corresponding to the various measurements. For example, a system employing three station pairs is capable of making three simultaneous measurements on a given target. If the target is moving in three dimensional space each new reading by the system provides three new elements of data and three more unknowns. Each new three equations resulting from a reading is accompanied by three new unknown coordinates of the new position of the moving object. When the position occupied by the moving object at the initiation of the measurement is included there are always three more unknowns than there are measurements taken and consequently the number of measurement equations is always three less than the number required for a complete set permitting a simultaneous solution. To obtain a complete set of equations it is necessary to introduce additional relationships of some kind. Such additional equations may be obtained through the use of one or more additional station pairs. Other methods involve the generation of equations based on the known physical mechanics of the path or motion of the object. These "motion equations" may represent the path of the moving object, the type of path of the object, or some constraint or limitation on the motion or path of the moving object. Equations relating the displacements along the coordinate axes would constitute motion equations, and the coefficients may be known or it may be that they be determined as part of the problem. The equation of a plane to which the motion is confined would be a motion equation. Equations relating successive displacements along a coordinate axis would also constitute motion equations.

Interrupted Tracking Sequence

The possibility that there may be a signal interruption or that one or more readings may be missed is generally present in practical displacement type doppler systems. If continuous waves are employed for the purposes of making the primary measurements the signal level may fall below that required for accurate phase tracking or for maintaining "phase lock". If pulses are employed there is the possibility that a sudden burst of noise will mask the signal just at the time of the arrival of the pulse at the receiving element of the system. An intermittent or unexpected temporary failure of the transmitter to issue an expected pulse could also cause an interruption of the measurement sequence or the deletion of one or more of the readings of the sequence. Failure of a readout mechanism might be a cause for dropping a reading in a continuous wave system.

There are two major cases of interruption of the measurement sequence. In one type of interruption there is simply the skipping of one or more readings. The fundamental timing is not interrupted, skipping of pulse or readout failure would be of this type. The second and perhaps more serious type of failure is such that the measurement sequence or a part of it is effectively terminated and must be reinitiated after the interruption. Loss of phase lock in a continuous wave system or breakdown of a station's frequency standard would be samples of such interruption. In this class of interruption any measurement started before the interruption does not extend through the interruption. In the less serious type of interruption measurements started before the interruption carry on through the interruption but measurements scheduled to be completed during the interval of the interruption are missed.

Any equation linking points on the path of the object before the interruption to points on the path after the interruption serves to link that part of the measurement sequence completed before the interruption to that part of the sequence completed subsequent to the interruption. Equations that result from measurements which extend through the interruption serve this purpose; intervals are initiated prior to the interruption and terminated subsequently to the interruption. Motion equations of the various types described in this application are generally of use for this purpose. In some instances, it is desirable to modify the motion equations used in a particular method to eliminate terms that are associated with points occurring in the interruption interval or to add points and measurements so that sufficient data is present to obtain a position determination.

Method Dependent on General Motion Relationships

The only assumptions that are valid for all motions of an object are that the path is continuous, through the space traversed by the object while the measurements are being taken and that the object cannot be in more than one place at a time. These two assumptions are quite practical and include all conceivable domains and modes of operation. Theoretically, it can also be assumed with equal certitude and generality that the path or position of the vehicle is continuous with time. During the course of the measurement sequence the moving object is at some position along its path at all times. However, in order to employ time as a parameter in position determination, it is sometimes necessary or at least desirable to place some further restriction on the motion of the object relative to time. These restrictions, so general in character that they are not treated in this application as special constraints, are that the motion is always in one direction along the path and that the motion is continuous. The moving object does not reverse itself and retrace its former path. Sometimes the restriction that the object does not stop during the measurement sequence is imposed. In practice it is possible to accommodate operation of the moving object in which the object comes to rest for a period of time by stopping the clock during the period that the object is at rest. Since the system is sensitive to any change of position, the operation of stopping the clock is simple, particularly with a continuous wave system.

To the above assumptions, arbitrarily and for convenience, is added the assumption that the object does not occupy the same position twice during a measurement sequence. The validity of this assumption is also easily checked from the measurements, particularly with continuous wave systems. Should it be desired to operate with motion that includes stopping, retracing and crossovers, more elaborate methods may be employed including step by step processes.

One purpose of my invention is the determination of the position of the moving object during the measurement sequence. It is not essential as an operational procedure nor is it always an essential objective to determine or generate equations or numbers indicating the position of the moving object at other points either preceding or succeeding the measurement sequence. The motion equations indicated in this section of this application and concerning systems operating without special constraints on the motion are not chosen to fit any particular set of physical circumstances affecting the path of the moving object. The applicability of these equations and techniques is independent of the validity or nature of other equations that can be used to describe the motion. These general motion equations may or may not be usable for prediction. They may be used for deriving position data usable by other methods for position prediction and orbit determination.

The methods described in this application are but a limited example of the many possible methods that may be employed to determine the position of a moving object by measuring changes of distances. The general method may be altered in the number of readings taken, the number of stations employed, the mathematical expressions or equations used to describe the system and the motion of the object, and the methematical procedures employed to gain a solution of these equations.

The method of determining the position of the moving object is initiated by expressing the continuous path or motion of the object in terms of one or more infinite series. Simple geometrical series in terms of some parameter such as time may be employed. Fourier series may also be employed or series of other harmonic functions. Equations consisting of only a finito number of terms of these series are derived by dropping the terms of degree or order higher than a certain limit. The determination of this limit on the number of terms employed will be described. The resultant one or more polynomials form the motion equations and are employed with the measurement equations to form a finite solvable set of simultaneous equations. The number of unknown elements involved in the derived motion equations in great measure determines the number of readings or measurements required of the system for a complete determination of position. Should the number of readings or measurements be otherwise limited the number of terms of the series that may be employed would be correspondingly limited.

The accuracy of this type of system is not simply the accuracy of the measurements of changes of distances but is a somewhat complicated function of the measurements, the geometrical relationship between the stations and the moving object, and the accuracy with which the motion equations describe the characteristics of the path of the moving body. There is at least one finite source of error associated with each of these elements of the method. Furthermore these elements are not necessarily independent of each other in their effects on the accuracy of the system. The greatest uncertainty in determining the accuracy of the method is in determining the adequacy of the motion equations employed in the set of simultaneous equations to be solved. Since no special constraints are assumed on the motion of the object in this category there is a degree of uncertainty regarding the adequacy of any equation containing a limited number of terms to fully describe the path or even the relationship between separate points along the path. Fortunately there are methods of statistically checking the adequacy of the derived motion equations. For any particular set of motion equations and measurement error it is a simple matter to determine the system infinitesimal error by writing and inverting the error matrix, then multiplying by the measurement error vector.

Method Using Time as the Series Argument

Time is an easily measured and recorded parameter. Measurements of elapsed time may be performed and recorded simultaneously with the measurements of changes of distance. Time has another convenient characteristic in being single valued, for any value of time there can be only one set of coordinates of the moving object. Time as a parameter is also of value in having easily recognized physical significance. A simple geometric series in time forms an excellent motion equation for many purposes. Each of the orthogonal coordinates is expressed as a geometrical series of time. The power of the highest term in the series employed is determined by any or all of several factors: the required accuracy, the accuracy of the measurements, the geometry of the system, the capacity of the computer, and the number of readings taken. These factors can be interdependent. Any knowledge as to the forces acting on the moving object would constitute a special constraint and will be discussed under a separate heading. It is then necessary to determine by other means the degree of the motion equation to be employed in the simultaneous set. It is quite possible that only the infinite series could theoretically express the motion of the object perfectly. However, a practical value of the degree of the motion equations is a value which permits position determination with satisfactory confidence and accuracy. Furthermore, it is useless to attempt to utilize a set of motion equations of degree higher than that warranted by the accuracy of the measurements.

The coefficients of the time series are not generally known and they are determined as part of the solution simultaneously with the determination of the coordinates of the various points along the path significant in the method.

Measured Values as Argument in the Motion Equation

The values of the measured changes in ranges, or changes of the sums or differences of ranges constituting the fundamental measurement of the systems may be employed as the argument in a series forming a motion equation. Furthermore some function of one or more of these values may be employed a the argument. An advantage of using the measured values as the argument lies in independence of the time factor. The mathematical operation is then completely independent of the variations in the speed with which the moving object proceeds along its path. When using time as the argument of the series, there is the problem of accommodating periods when there is no motion of the object. It is possible to write time series of higher degree to accommodate these periods, but the computing process may be lengthened and the required capacity of the computer increased. In the same manner as when time is employed as the argument the system readings may be taken at integral values of the argument though this restriction is not theoretically necessary. A possible function of the measured quantities that may be employed as the argument is the square root of the sum of the squares of the measured quantities of the various stations. In general, it is a good practice to relate in some systematic manner the incidence of the system readings to the argument.

A motion equation using the measured quantities as the argument may be written for each coordinate axis of the system and for each of the measured quantities. Thus a three station system with change of range as the measured quantity can develop nine series equations in three dimensional operation. These equations may be employed as substitutes for measurement equations in the sets of simultaneous equations to be solved or may be employed to obtain redundancy for improved accuracy or for resolution of target ambiguity. In general, it is only necessary to employ the values of a single measurement mechanism in conjunction with the measurement equations to obtain a complete and solvable set of equations.

The Coordinate Equations

The term "Coordinate Equations" is given in this application to equations that are derived in terms of a single space coordinate from any of the power series parametric equations in that particular coordinate. These equations are motion equations in that they relate the various positions of a moving object to each other. Use of these equations results in a simpler set of equations to be solved simultaneously. In some instances the coefficients of the coordinate equations may be precomputed without reference to measurements and therefore their values are a part of the fixed computer program, rather than items to be determined as a part of the computation procedure. The equations are homogenous in the first degree. Use of these equations in some cases eliminates the necessity for determining the values of the coefficients in the parametric power series; and, in fact, the power series need not be employed at all in some instances.

There is a separate power series for each coordinate axis. The same argument may be employed for all three, as when time is used as the argument. If desired, different arguments may be employed for the series equation corresponding to each coordinate axis. The degree of the highest term is generally one less than the number of system readings taken. For each increment of the argument there is a corresponding set of measurements constituting a system reading. The values of the increments of the arguments are known; and from the series equations for a given coordinate axis evaluated for each point associated with each of the readings and the starting point or other reference point one obtains, by eliminating the coefficients of the series, a single equation representing the relationship between the values of that particular coordinate at the various points of measurement.

The following is an example of the derivation of the coordinate equation of the X coordinate axis of a three reading system. Time $t$ from the initiation of the measurement sequence is employed as the argument. The value of the X coordinate is expressed for three points along the path of the object in terms of the time $t$ at which it is at each of the points:

$$X_1 = X_0 + \alpha_1 t_1 + \alpha_2 t_1^2$$

$$X_2 = X_0 + \alpha_1 t_2 + \alpha_2 t_2^2$$

$$X_3 = X_0 + \alpha_1 t_3 + \alpha_3 t_3^2$$

For uniform increments of time one may obtain from these the following:

$$t_1 = 1 \quad t_2 = 2 \quad t_3 = 3$$

$$X_0 - 3 X_1 + 3 X_2 - X_3 = 0$$

These equations may be obtained for each coordinate axis of the system. They are called coordinate equations because only a single coordinate axis supplies the variables of one equation. These linear equations provide the information needed to make a complete and solvable set of equations when used with the associated measurement equations.

Motion equations in Terms of Two or Three Coordinates

Equations in this category are derived directly from the assumption of continuity of the path of the moving object and the assumption that the object cannot be in two places at the same time. A third assumption will be added for the purposes of simplifying the explanation of the process. The equations are simple power series of one coordinate in terms of another coordinate. For motion in three dimensions equations of the following form may be written using the infinite series:

$$X = X_0 + a_1 z + a_2 z^2 + a_3 z^3 + a_4 z^4 +$$

$$Y = Y_0 + b_1 z + b_2 z^2 + b_3 z^3 + b_4 z^4 +$$

The number of terms employed in the assumed motion equation may be determined in the same manner as outlined for previous motion or path equations written in terms of some other parameter.

In using the equations as shown the assumption that the object moves in one directon only along the axis of the independent variable coordinate during the measurement interval is made. Any total path can be broken into smaller segments for which this assumption would be valid.

A set of these equations may be written for each position of the moving object corresponding to a system reading and corresponding to the initiation of a sequence of measurements. As before the degree of the highest term in the series may be one less than the number of readings taken by the system in a given sequence. One may eliminate the coefficients of the coordinate terms by simultaneous solution of this number of equations deriving from the solution a single equation in terms of the two coordinates involving the other unknowns. This technique would be the equivalent of that described above for the derivation of coordinate equations. However, since the coordinates are unknown this operation would have to be handled algebraically, and it would probably be easier to employ the power series equations directly in forming the set of equations to be solved simultaneously with the measurement equations.

Other Power Series

Power series for each of the coordinates of the moving object may be written in terms of a wide variety of functions of these coordinates. Typical of such functions are:

$$l = \sqrt{X^2 + Y^2 + Z^2}$$

$$l = \sqrt{(X_j - X_o)^2 + (Y_j - Y_o)^2 + (Z_j - Z_o)^2}$$

Either of these equations may be used with the power series:

$$X = X_0 + a_1 l + a_2 l^2 + a_3 l^3 +$$

$$Y = Y_0 + b_1 l + b_2 l^2 + b_3 l^3 +$$

$$Z = Z_0 + C_1 l + C_2 l^2 + C_3 l^3 +$$

The argument must not reverse itself in the measurement sequence. The equation defining the argument, the series equation, and the measurement equation appropriate to the particular system form a set of simultaneous equations which are solved simultaneously for the required unknowns. These functions constituting the argument in these series are easily interpreted physically. Other functions of the coordinates not so easily interpreted or perhaps without understandable physical significance may be employed as the argument of the power series. The distance from any other point may also be employed as the argument of the power series. Three equations might be obtained from these equations, and each derived equation would be in terms of all three coordinates. However, as above, this operation would have to be accomplished algebraically and that procedure in most cases would be awkward. Direct use of the equations as they stand appears easier.

Use of Additional Measurements to Obtain Additional Equations.

The logical extrapolation of the methods presented so far is to employ a number of readings in a given measurement sequence that is greater than the degree of the series employed by two or more. Alternatively, given a number of consecutive readings, one may employ in the mathematical procedures motion equations whose degree is less than the number of readings taken by two or more. As far as the solution itself is concerned, such a procedure does provide additional equations with a consequent increase in redundancy or reduction of the number of measurement stations. The redundancy may be employed in statistical methods of improving data. The number of stations in the system can be reduced to the number required to define the coordinate axes. One transmitting station and two receiving stations, or two transmitting stations and one receiving station may be employed in three dimensions. In two dimensions one transmitter and one receiver is adequate. In both of these systems an ambiguity of two exists which must be resolved by other conditions of the tracking situation.

In one-legged systems, where transmission is in one direction only, to or from, the moving vehicle, the additional equations made available by this technique may be employed to eliminate the effects of misalignment of vehicle and station local standard oscillators.

In the discussion in this section there has been no departure from the conditions previously stated as to the motion of the object. Even though the degree of the motion equation employed is considerably less than the number of readings taken, the only assumptions are as before. The path of the object is continuous, the object cannot be in more than one place at a time, and in some instances that the path is single valued relative to certain coordinates or parameters. Useful position data may be obtained with any number of stations by making measurements of change of ranges, changes of differences of ranges between the moving object and two known points, or change of the sums of two such quantities. In succeeding sections systems will be discussed in which more explicit assumptions are made as to the motion of the object.

Special Constraints.

Special knowledge that concerns the path of the object or timing of progress along the path can be of use in simplifying computation and measurement and in increasing the accuracy of a given system. This knowledge must concern some constraint or inhibition on the motion of th object. These special constraints can be strictly geometrical or they may include time as a parameter. A wide variety of constraints is possible. Some constraints are relative to established points or groups of points in the coordinate system. Others have no relationship to such point. Special knowledge may appear to be quite vague, yet be of use in the establishment of a method of position determination. As example, definite information that the motion of the object along each axis of the cartesian coordinate system can be expressed in a finite number of terms of a power series of time is of value even if the exact degree of the equations is unknown. If the degree of the equations is known, this knowledge constitutes an even greater constraint and is even more useful.

One modification of my invention is a three-station one-legged doppler system operating in three dimensional space. Wave propagation may be in either direction or in both directions.

The apparatus required for sensing the variation of geometrical parameters in this system is the same as that employed in the six station system using displacement finders described in the earlier pages of this disclosure. See FIGS. 3 and 4 and the discussion relative thereto.

For each of the three stations of the system and relative to each of the positions occupied by the target at the time that the measurements are started and at the successive times when readings are taken the following equation can be written:

$$(X_j - a_i)^2 + (Y_j - b_i)^2 + (Z_j - C_i)^2 = r_{ij}^2$$

Where:
- $i = 1, 2, 3$ designates the station
- $j = 0, 1,...$ designates target position
- $x_o y_o z_o$ are the cartesian coordinates of the position of the target at the beginning of the measurement sequence
- $x_j y_j z_j$ are the cartesian coordinates of the position of the target at the time of the $j$th reading.
- $a_i b_i c_i$ are the cartesian coordinates of the $i$th station.
- $r_{ij}$ is the slant range from the $i$th station to the position of the target at the time of the $j$th reading.
- $r_{io}$ is the slant range from the $i$th station to the position occupied by the target at the initiation of the measurement sequence.
- $M_{ij} = r_{ij} - r_{io}$ is the range increment between the range from the $i$th station to the position occupied by the target at the beginning of the measurement sequence and the position occupied by the target at the time of the $j$th reading.

By taking a sufficient number of readings of range increments over any interval of the path of the target it is possible to determine the positions occupied by the target at the times of the readings to an accuracy that is limited only by the accuracy of the primary measurement of the range increments. it is to be emphasized that the three stations make their measurements simultaneously. Error in the timing between stations is reflected in error in the determination of the positions of the target. In general the effect of an error of timing of a given magnitude between stations increases as the velocity of the target is increased. For the purpose of this initial explanation it will be assumed that the timing between stations is perfect.

No matter how many readings of range increments are taken it is impossible to determine the values of the unknown target positions along the target path using these equations alone as is possible when four stations are avaiable. Other relationships may be employed to provide the additional equation required to make up a complete set of solvable equations. These additional equations may come from several sources of information concerning the path of the target and the accuracy ot the methods of performing the measurements. If it is known that the object behaves in some predictable manner so that a set of equations having a finite number of significant terms and unknown constants can be written to describe the path or some characteristic of the path these equations may be added to those derived directly from the measurements of the range increments to produce solvable sets of independent simultaneous equations. A sample of such path equations is the ellipse travelled by an earth satellite. It is sometimes more important to determine the constant parameters of such an equation than to determine the constant parameters of such an equation than to determine the actual instantaneous coordinates of the target. This technique becomes complicated when it is necessary to include the effects of air resistance, distortion of the gravitational field owing to the Earth's shape, the tides and the moon, and the effects of radiation pressure. The simple ellipse is then no longer applicable. These techniques are heavily dependent upon ability to determine the characteristics of the forces involved and to express these relationships in sufficient mathematical detail. It is not necessary to possess this specialized information to merely determine the present position of the target at the times of the measurements. It is possible to write more general equations not dependent upon specialized knowledge of the motion of the target, which when combined with the equations derived directly from the measurements of the range increments will provide solvable sets of independent equations. The accuracy of this method is limited only by the amount of the data taken and the accuracy of the measurements.

In this general technique, a finite number of readings N is taken by each of the three stations over an interval of the motion of the target. There are thus associated with this set of readings the same number N plus one positions of the target. The initial position of the target occurring at the time the series of measurements is commenced accounts for the number of target positions associated with the measurement set being one greater than the number of readings taken. The errors in the measurements of the range increments are assumed to be random and that the average error is known. It is assumed that the path of the target is continuous, but that no further information concerning it is available nor is any starting point or other position along the path known. The readings are taken sufficiently often that the increment of the change of range between two successive measurements at any station is never greater than the average error expected in the measurements. Data may be taken at closer intervals if desired. The frequency of the measurements is thus dependent upon the velocity vector of the target. Because of the random nature of the errors in the measurement of the change of range and because no other information is provided concerning the path of the target it is necessary to assume that a true curve passing through all of the positions occupied by the target at the epochs of the various readings could not be of degree less than the number of readings taken. This number is finite even though the actual motion of the target might be only expressible by equations of still higher degree or by infinite series. The error in the individual measurements limit the accuracy with which the equations of this curve or the coordinates of the points along it may be determined even if the coordinates of the starting point or some other reference point along this curve were known with perfect accuracy.

The error involved in representing the path of the target by an equation whose degree is one less than the number of readings taken is no greater than the uncertainty of representing the path by an equation whose degree is equal to the number of measurements when the increments in the measurements is equal to the expected error of the measurement. Thus we have access to equations that are not dependent upon assumptions as to the nature of the path of the target. If the equations representing the path of the target are of degree greater than the number of readings taken in the manner defined the ability of the system to indicate the motion as defined by the higher terms of the equation is lost because of the expected accuracy of the system. In other words the system using a given measurement accuracy in determining the range increments has only a finite resolving capability thereby limiting the fineness with which the variations of the path may be determined. Taking readings closer togethr than as described may result in some marginal improvement.

Over the region of measurement the path of the target can generally be described by three equations showing the cartesian coordinates as functions of time.

$$x = x_o + \sum_{n=1}^{n=N-1} \alpha_n t^n$$

$$y = y_o + \sum_{n=1}^{n=N-1} \beta_n t^n$$

$$z = z_o + \sum_{n=1}^{n=N-1} \gamma_n t^n$$

Where:
$x_o, y_o, z_o$ are the coordinates of the position of the target at the time of the initiation of the measurement sequence.

$x,y,z$, are the cartesian coordinates of the point at time $t$ after initiation of the measurement sequence.

$N$ is the number of readings taken in the sequence $\alpha_n$, $\beta_n$, $\gamma_n$ are unknown constants which appear as unknowns in the equations.

$n$ is an integer

The total number of unknowns introduced by these equations is three times the number of readings minus three, $3(N-1)$, The total number of equations thus made available is equal to three times the number of system readings, $3N$. The following equations may be written $$M_{it} = \sqrt{\left(\sum_{n=1}^{n=N-1} \alpha_n t^n + x_o - a_i\right)^2 + \left(\sum_{n=1}^{n=N-1} \beta_n t^n + y_o - b_i\right)^2 + \left(\sum_{n=1}^{n=N-1} \gamma_n t^n + z_o - c_i\right)^2}$$
$$- \sqrt{(x_o - a_i)^2 + (y_o - b_i)^2 + (z_o - c_i)^2}$$

Where $M_{it}$ is the measurement taken by the $i$th station at time $t$. When N readings are taken by the system there results a set of 3N equations in 3N unknowns which may be solved for the unknowns. The equations of the path of the target including the starting point are thereby determined. These equations are not based on any physical laws of motion other than the continuity of the path of the target. Extrapolation using the derived equations to times before and after the measurement sequence is hazardous. Such extrapolation is often desirable as in position prediction for intercept. Such prediction should be based on at least some knowledge of the forces governing the motion of the target. Examination of the equations of motion derived by the method described above may lead to the knowledge required for intelligent extrapolation. However, it must be remembered that the equations were derived to describe the path of the target within the interval of the measurement sequence, and particularly the positions occupied by the target at the epochs of the readings. Even interpolation between the points of readings should be based on understanding of the physical relationships of the motion of the target. Examination of the equations may also indicate the existence of unsuspected forces affecting the motion of the target which might not have become apparent had assumptions been made at the outset as to the nature of the motion of the target.

The assumptions that may be made relative to the motion of the target are manifold. If knowledge of the physics affecting the path of the target is such as to permit the assumption of equations of lower degree than that indicated by the above method the computing procedure might be simplified by reduction of the number of unknowns and consequently, the reduction of the number of equations and unknowns required. Elimination through special knowledge of any of the terms in the equations results in similar simplification. Relationships need not necessarily be expressed as a function of time. Confinement of the motion of the target to an unspecified plane provides a means of employing fewer readings than necessary in the general method.

Range Determination Processes, Bilateration, Trilatration

There are many algorithms suitable as a basis of the computation procedure element of each of the modifications of my invention. The particular algorithm chosen is determined, at least in part, by the kind of automatic computing apparatus that it is desired to employ. The use of the cartesian coordinates of the unknown variable in equation sets comprising the measured doppler values is discussed elsewhere in this specification. Other algorithms employ the ranges as the unknown variables in sets of simultaneous equations; and some of these procedures are discussed in my copending patent application Ser. No. 86,770 and elsewhere in this specification. Processes for determining the range of the moving object from a single station using only doppler data acquired relative to that single station are revealed in my copending patent applications Ser. Nos. 74,180 and 817,765.

When the ranges from each of two or three stations are determined by computation, bilateration or trilateration computation process can be employed to determine cartesian or other orthogonal coordinates of the moving object. Similarly other dimensions of the orthogonal set of dimensions of the position-motion state are determined using measured values of the variations of the ranges. My invention is not to be confused with the simple trilateration method of position-motion determination, wherein the ranges are determined directly by measurement of delay times and the like. Once the ranges and variations thereof are found, conversion to one of the orthogonal coordinate systems such as spherical coordinates or cartesian coordinates or cylindrical coordinates is easy and well known; and if, in a modification of my invention the computational processes of bilateration or trilateration are employed to convert range and range variation data to dimensions in an orthogonal coordinate system, such a bilateration or trilateration process constitutes but a single element of the computational part of that particular modification of my invention. There are many other elements, both computational and noncomputational. No modification of my invention uses either of the well known complete processes known as bilateration and trilateration position determination since no ranges are measured nor are any ranges known a priori in any modification of my invention.

The computational process of bilateration (or trilateration) is not a process of position determination. In order for the bilateration or trilateration process to be applied the actual position of the target point must already be known or determined. The three (or two) ranges are known before the trilateration or bilateration computational process actually can start. The ranges are known a priori. It is loose language to state that the process of converting nonorthogonal dimensions (such as ranges) to orthogonal dimensions (such as cartesian coordinates) is a process of position determination; position has already been determined when one has found the ranges however inconvenient such range dimensions may be in a given application. The set of ranges from the station points of known position to the target point to be defined is a set of dimensions in a nonorthogonal coordinate system defining that target point.

Common usage of "trilateration" and "bilateration" is so loose that it may convey any of the following meanings, and perhaps others.

1. The defining of the otherwise unknown position of a point by the specification of the values of the required number of ranges.

2. The converting of the dimensions of the position of a point known in any other coordinate system (orthogonal or nonorthogonal) to the coordinate system (necessarily nonorthogonal) characterized by the specification of the required number of ranges.

3. Determining the values of the ranges to a point position by some method such as range measurement, which method itself does not involve any process of coordinate conversion to determine the values of the ranges. This trilateration is more than one of computation since physical sensing of the distances between actual objects is essential. Coordinate conversion from the values of the ranges to an orthogonal system of coordinates is not contemplated in this definition.

4. Directly sensing the ranges and converting the values of these ranges to the corresponding dimensions in an orthogonal coordinate system. This definition comprises both the physical sensing of distances and the computational process of coordinate conversion.

The variety of the above definitions of trilateration and bilateration makes it evident that conventionally these terms are very loosely interpreted among those practicing the art of position finding (finding the dimensions of the position-motion state). Even the concept of coordinate conversion may be subject to some discussion. Coordinate conversion implies a computational process involving the geometrical relationships among the coordinates to be converted. Conversion may be between orthogonal coordinate systems, between orthogonal and nonorthogonal coordinate systems, between nonorthogonal coordinate systems. In each case however at least one coordinate of the coordinate system to which conversion is to be made is dependent upon more than one coordinate of the coordinate system from which conversion is to be achieved. Simple translation of coordinates or even rotation thereof is not contemplated here as being comprised by coordinate conversion.

The underlying principle that the doppler dimensions alone, in suitable kind and number, determine position is the discovery of the applicant. Since these dimensions uniquely define position, these dimensions may be said to be the dimensions of a nonorthogonal system of doppler coordinates in which the dimensions of the position-motion state may be expressed. As an ancillary elective element of his invention the applicant has also devised diverse computation processes for obtaining the ranges from the doppler data. As another ancillary elective element of his invention the applicant has discovered a method of determining the range of an accelerating object from a single station by sensing the variations of that range only. This range variational data is directly obtainable through use of doppler sensitive apparatus.

The use of three stations, combined with the determining of the three simultaneous ranges independently by means other than direct measurement of the three ranges (as by measuring the three propagation times) might be said to constitute a total process that could be included within the definition of the word trilateration. Such a definition is an extension of the conventional definition upon confrontation of the new doppler method constituting a modification of my invention. The applicant has not chosen to stretch the definition of trilateration to this extent. The applicant prefers to retain the conventional definition of trilateration that implies the defining of the target position by the intersection of three spherical surfaces, each surface being defined by a single range quantity. Range determination by the doppler method of the applicant requires a plurality of doppler measurements for each such determination. The applicant's basic invention cannot be explained in terms of the intersection of lines or surfaces each of which lines or surfaces being independently defined by a separate physical measurement. Thus the applicant states without reservation that no modification of his invention constitutes a trilateration or bilateration process. When in this specification trilateration or bilateration is employed as an element in certain modifications of the applicant's invention the meaning of these terms is strictly that of an analog or digital computation process element. Trilateration belongs to the general field of multistatic position determining devices generally deriving their description from the conic sections of geometry: spherical (trilateration), hyperbolic (loran type), elliptical (ordir type, dovap type). My invention does not correspond to any of these catagories since, in each of these catagories, separate locii, curves or surfaces, or families of curves or surfaces are developed, each by a separate single measurement. In my invention no such locus, curve or surface, can be developed by any quantity linearly related to any of the variational lineal measurements, or to any combination of variational lineal measurements employed. Since only lineal variational measurements are employed in my invention this characteristic sharply distinguishes my invention from the prior art of multistatic systems and is associated with its practical advantages.

The determination of ranges is common to many, not all, of the embodiments of my invention. Only embodiments wherein such range determination is a part of the process of determining dimensions of the position-motion state have been included in this specification. Only in certain particular embodiments of my invention does the process determine the ranges separately for each station thereafter employing trilateration process as a mere computatin element for converting the range coordinates defining position to orthogonal coordinates defining position. In the process of separate range determination relative to each station a plurality of successive variational lineal measurements are performed, upon all of which measurements the determination of range is dependent. No direct measurement of range is performed nor is any quantity linearly related to one or more ranges directly measured. It is impossible to determine range using only a single value of a single quantity linearly related to the variation of range, and no such process is shown in this specification.

Doppler Range Determination

When range increments are measured between a moving point and a fixed point, or between two moving points and when it is possible to assume that the path is well behaved (continuous, no reversals), one may write the equation $$\sum_{j=0}^{j=n} \alpha_j r_j^2 = 0$$

where the terms $\alpha$ are coefficients determined by the timing of the measurements. In particular, these terms α are the binomial coefficients when the time intervals between the terminations of the measurements are equal, the convention of referring all measurements of a series of measurement to the same starting point being employed here. From this equation, one finds the range to the starting point to be $$r_0 = -\frac{\sum_{j=1}^{j=n} \alpha_j M_j^2}{2 \sum_{j=1}^{j=n} \alpha_j M_j}$$

where
$j$ is the number of the measurement
$M_j$ is the value of the $j$th measurement of change of range
$n$ is the number of measurements in the range measurement sequence Alternatively, one may write $$r = -\frac{\sum_{j=0}^{j=n} \alpha_j M_j^2}{2 \sum_{j=0}^{j=n} \alpha_j M_j}$$

where: $r$ is any range to which all the measurements of range change are referred but which reference range is not included in the series of range squares indicated above.

In the strict sense these equations are approximations since it is essentially certain that the true path followed by the moving target object will be such that the range variation will have more than a limited number of range accelerations and since there is always one more significant point than can be accommodated perfectly by degree of the time series employed to derive the equations. There will always be a residual. In general these residuals will be of approximately equal value for two stations when using the same set of significant points for the two stations. The closer the stations are to each other the smaller is the residual between the difference of the residuals of the two stations. By equating these residuals of the two stations one can write the following equation as a basis for an algorithm for use in one modification of my invention:

$$r_1 \sum_{j=0}^{j=n} \alpha_j M_{1j} - r_2 \sum_{j=0}^{j=n} \alpha_j M_{2j} = \tfrac{1}{2} \left[ \sum_{j=0}^{j=n} \alpha_j M_{2j}^2 - \sum_{j=0}^{j=n} \alpha_j M_{1j}^2 \right]$$

This equation is in terms of the reference ranges $r_1$ and $r_2$ relative to the first and second stations respectively. This equation has two unknowns $r_1$ and $r_2$. To determine the values of $r_1$ and $r_2$ it is necessary to establish another relationship between the two ranges. Such another relationship can be provided by using the same equation with the same $\alpha$ coefficients but with different doppler data for the M values.

$M_{1j} = r_{1j} - r_1$ represents doppler data for first station.
$M_{2j} = r_{2j} - r_2$ represents doppler data for second station.
where $j$ represents the significant point along the target point path. $M_{1k} = r_{1k} - r_1$ and $M_{2k} = r_{2k} - r_2$ represents other doppler data for the same path but for other significant points $k$ along that path. The $k$ points may be interleaved with the $j$ points. The second set of doppler data, that employed in the second equation, is taken relative to the same reference ranges $r_1$ and $r_2$.

FIG. 68 shows the geometry associated with the use of the doppler range formula to determine the range from a single station. The moving target object or navigating vehicle need not be travelling a straight line path at constant speed. Instead the moving object may be subject to acceleration of any combination of the first and higher orders. The more measurements that are taken in the series of measurements, the greater the number of significant points along the path of the moving object, the higher is the order of acceleration that can be accommodated. The binomial coefficients are derived simply by forming a suitable matrix from equations of the type $$r_i^2 = \sum_{j=0}^{j=n} \beta_j t^j$$

and substituting successive integral values of $t$ in successive equations. Simultaneous solution of these equations for the $\beta$'s and substitution of these $\beta$ values in one more equation written for an additional integral value of $t$ provides the binomial coefficients for the coefficients $\alpha$ in the range squares equation above.

A modification of my invention employs two doppler stations. An element of this modification of my invention is the process of range determination shown above. This process is applied to each of the two stations separately and simultaneously, using the same significant points along the path of the moving object. Another element of this two station modification of my invention is the bilateration computation process using the two simultaneous ranges to determine at least one dimension of the set of orthogonal dimensions used to define the position-motion state of the moving object. The configuration of this two station system is shown in FIG. 69. A similar three station system employing my doppler method of range determination as one element and trilateration computation process as another element is another modification of my invention. The configuration is shown in FIG. 70.

The alternative two station modification of my invention is shown in FIG. 71. The solid ranges are related to the first equation. The dashed range lines are related to the second equation. The ranges $r_1$ and $r_2$ are related to the same significant point on the path of the moving object. This significant point is not a member of either of the groups of significant points designated by $j$ or $k$. Other choices of forming the two groups of significant points for selection of the doppler data exist essentially without limit. Also other patterns exist essentially without limit for the selection of the $\alpha$ coefficients, and this selection need not be the same for the two equations.

Similar sets of simultaneous equations can be shown for use as the basis of a three station system.

Bilateration and Triangulation computation processes for converting the derived range dimensions to another system of coordinates, orthogonal or nonorthogonal (hyperbolic coordinates for instance), can be selected regardless of which of the two methods for determining the ranges as shown above is selected.

Another method of determining the ranges discussed in my copending application Ser. No. 86,770 and elsewhere in this specification is derived by exploiting the geometrical conditions resulting in the following equations $$\sum_{i=1}^{i=N} \beta_i r_i^2 = K; \sum_{i=1}^{i=N} \beta_i M_{ij} = -\frac{1}{2} \sum_{i=1}^{i=N} \beta_i M_{ij}^2$$

The $\beta$'s and the K are determined in this case by the configuration of ground stations employed and are not related to the timing of the measurements as the $\alpha$'s were in the discussion immediately preceeding. The letter $i$ designates a station point; the letter $j$ designates a significant point on the path of the moving object. By performing the necessary number of simultaneous doppler measurement sets one can derive as many of the linear type equations as desired and can elect whether or not to employ the nonlinear equation in forming the basis of the algorithm to be employed in the automatic computation element of this modification of my invention. The designer of the particular modification of my invention can also choose to employ bilateration and-/or trilateration computational processes to convert the range dimensions so derived to the dimensions of another coordinate system as described above.

Rate type systems and two-legged systems are other modifications of my invention characterized by the determination of the ranges from doppler data and the conversion of the range dimensions to another coordinate system such as the cartesian coordinate system. In some modifications of my invention elliptic rather than range (spherical) dimensions are first obtained from two-legged doppler data. The elliptic data forms a suitable set of coordinates for the purpose at hand in some modifications of my invention, as when a chart is prepared employing elliptic coordinates. In other modifications of my invention hyperbolic dimensions are first obtained using two-legged doppler difference data and these dimensions are also directly useable in some applications as with a properly prepared map. As in the systems which derive spherical (or range) dimensions the elliptic and hyperbolic dimensions are changed in some modifications of my invention to the dimensions of another coordinate system.

TWO STATION NAVIGATION SYSTEM

In FIG. 53 there is shown an embodiment of my invention in which the position of the receiver located in the moving object 1079 is determined in only two dimensions relative to a pair of fixed transmitters 1082-1083 which are a known distance apart thereby providing a means of navigation of the vehicle carrying the receiver. The system as shown is intended to operate at or near the surface of the earth. Under any circumstances the system may always be considered to operate in a plane since a plane is always determined by three points. The only three points basic to this system are the locations of the station 1082, station 1083 and the vehicle 1079 being navigated. These stations consist simply of a standard frequency oscillators 1084 and 1085, respectively, and simple continuous wave transmitters 1082 and 1083, respectively connected to suitable antennas 1080 and 1081, respectively.

There need be no modulation whatever employed by these transmitters. However, use of either transmitter for communications purposes simultaneously with use thereof for navigation purposes is perfectly possible. The transmitter carrying the communication signal must of course be modulated with that signal. Such apparatus is not a part of the navigation system and is not shown in the diagram.

Transmitter identificaton can be provided either through modulation of the transmitted wave or through the frequency assignment of the individual transmitter. In the system described here the transmitters are identified by the frequency of their unmodulated waves.

FIG. 54 shows a typical vehicle path and the relationship between the path, the positions of the stations 1082 and 1083, which are designated $-a$ and $+a$, and the coordinate system. The coordinate system was chosen to simplify the mathematical expressions used to describe the geometrical relationships involved.

FIG. 55 shows the equipment carried in the aircraft or vehicle 1079 by means of which the crew of the aircraft is able to determine the position of the vehicle. The aircraft carries both the equipment for making the necessary measurements and the equipment for computing and displaying the vehicle positional data. In the system described here the data is fed automatically and directly into the computer without the necessity of human intervention or manipulation.

The signals from both transmitters enter the receiving system aboard the aircraft through a single antenna 1090 and are amplified in the broadly tuned input RF amplifier 1091. The output of the amplifier 1091 is fed into each of two similar channels 1092 and 1093. One of these channels is tuned to the frequency of one of the transmitters for example, transmitter 1082; and the other channel is tuned to the frequency of the other transmitter, for example transmitter 1083. At the input of each channel the signal is amplified in a narrow band TRF amplifier 1094 and passes into a conventional mixer 1095. The mixing signal is derived from frequency synthesizer 1096 which is stabilized by standard frequency oscillator 1097.

The frequency of the mixing signal is removed from that of the signal of the transmitter by a value known as the IF frequency. The LF signal output from the mixer 1095 is amplified in IF amplifier 1098 and fed into two synchronous detectors 1099 and 1100. The synchronizing signal for operation of these detectors is provided by the frequency synthesizer 1096. This signal is at the IF frequency and is fed into the phase shifters 1101 and 1102. One of the phase shifters advances the phase by 45° and the other retards the phase of the signal by 45°. Thus the two synchronizing signals used to synchronize the synchronous detectors 1099 & 1100 are 90° out of phase with each other. The outputs of the synchronous detectors are passed through low pass filters 1103 and 1104 to limiting amplifiers 1105 and 1106 respectively. These limiting amplifiers may be of the variety commonly known as Schmidt flip-flops. The signals from the limiting amplifiers 1105 and 1106 are essentially square waves. The leading and trailing edges of each wave are very steep and the top of the wave is quite flat. The waves are differentiated by differentiators 1107 and 1108 and the negative peaks cutoff by diodes 1109 and 1110 respectively. The outputs of the limiting amplifiers 1105 and 1106 are employed to operate gates 1111 and 1112 respectively, each gate being controlled by a signal from the opposite subchannel so that the pulses from one gate indicate movement of the receiver toward the transmitter and the pulses from the other sub-channel indicate movement away from the transmitter. Each pulse indicates a movement of one wavelength. These pulses are fed into a reversible counter 1113 which is typical of many on the market. The counter is controlled by signals from the timer 1114. Included in the counter system is the circuitry for composing the entire data "word" including the timing information. The output from counter 1113 is fed into the computer memory. Also fed into this same memory is the count word from the second channel. No time component is required in the signal from the other channel as there is already such a signal on the word from the first channel and the readout of the two channels is simultaneous. The computing memory contains the necessary shift registers 1115 to provide isolation between the counters and the computer logic 1116. The timing signal for the operation of these devices is also obtained from the timer 1114. The count measurements are fed from the memory 1115 to the computer 1116 where the position of the aircraft is calculated and the results of the calculation are then shown on the display 1117.

The calculation that must be performed by the computer 1116 is the simultaneous solution of a set of equations. The set of equations is composed of equations of two types. One type of equation shall be called the measurement equations and the other type shall be called, for lack of a better name, coordinate equations. The measurement equations are the familiar differences of ranges expressed in terms of the cartesian coordinates of the stations and the target. The measured quantities appear only in these equations. The coordinate equations are quite general, descriptive of any continuous motion whatever over the region of measurement. There is one measurement equation for each measurement performed by the system. Since this is a two station system and a "reading" consists of the simultaneous measurement of the change of range to two stations there are thus two measurements and corresponding two equations for each reading taken. The number of coordinate equations is equal to the number of coordinate axes of the system. Since this is a two dimensional system, there are only two such equations in the equation set to be solved. There is one coordinate equation for each coordinate axis. The measurement equation is the same for each point and is independent of the number of points. The coordinate equation is dependent upon the number of readings taken. The coordinate of each point is represented in the equation relating to a particular coordinate axis. The coefficients of the coordinate equation remain fixed for a given number of readings.

The complete set of simultaneous equations for the system operating with five readings is shown below:

$$\sqrt{(x_1+a)^2 + y_1^2} - \sqrt{(x_0+a)^2 + y_0^2} = M_{11}$$

$$\sqrt{(x_1-a)^2 + y_1^2} - \sqrt{(x_0-a)^2 + y_0^2} = M_{21}$$

$$\sqrt{(x_2+a)^2 + y_2^2} - \sqrt{(x_0+a)^2 + y_0^2} = M_{12}$$

$$\sqrt{(x_2-a)^2 + y_2^2} - \sqrt{(x_0-a)^2 + y_0^2} = M_{22}$$

$$\sqrt{(x_3+a)^2 + y_3^2} - \sqrt{(x_0+a)^2 + y_0^2} = M_{13}$$

$$\sqrt{(x_3-a)^2 + y_3^2} - \sqrt{(X_0-a)^2 + y_0^2} = M_{23}$$

$$\sqrt{(x_4+a)^2 + y_4^2} - \sqrt{(x_0+a)^2 + y_0^2} = M_{14}$$

$$\sqrt{(x_4-a)^2 + y_4^2} - \sqrt{(x_0-a)^2 + y_0^2} = M_{24}$$

$$\sqrt{(x_5+a)^2 + y_5^2} - \sqrt{(x_0+a)^2 + y_0^2} = M_{15}$$

$$\sqrt{(x_5-a)^2 + y_5^2} - \sqrt{(x_0-a)^2 + y_0^2} = M_{25}$$

$$x_0 - 5x_1 + 10x_2 - 10x_3 + 5x_4 - x_5 = 0$$

$$y_0 - 5y_1 + 10y_2 - 10y_3 + 5y_4 - y_5 = 0$$

The first ten equations are the measurement equations. The last two equations are the coordinate equations. The measurement equations are nonlinear therefore iterative techniques are required in the computer.

In the system as described so far the readings are taken at equal time intervals. The system may be modified to employ equal increments of the range to either of the stations or equal increments of some function of these range increments. In FIG. 56 is shown a modification of the two station navigation system in which the readings are taken automatically for equal increments of the faster varying range. The system is identical to that shown in FIG. 55 except that the shift signal for the shift register is derived from a pair of counters 1120 and 1121. Each of these counters is driven by a pulse derived from the counting circuits at the output of either of the diodes in each channel. The counters are preset so that the reset signal is actuated each time the count reaches a fixed value. The output signal of either counter resets both counters and also actuates the shift register 1122. In this manner the time element is removed from the actual determination of position. A timing signal from the timer 1125 is shown entering the shift register 1122 to be included in the "word" being transmitted to the computer 1123. This signal is introduced so that the display 1124 will ultimately show the various positions associated with the proper time. Furthermore, it is possible to compensate for errors in the frequencies of the standard frequency oscillators by observation of the time at which each reading is taken.

The two station method may be employed to find the range and angle to the moving vehicle through ordinary triangulation. If the system is used only for two dimensional motion on a plane that includes the stations there will be an ambiguity of two in the determination of the position and course of the vehicle. This ambiguity is resolved through the use of other data available to the navigator such as readings taken on other systems, or rough data available through dead reckoning. If one other station is available to the system readings on this station may be employed to resolve the aforementioned ambiguity or to determine the position of the vehicle in three dimensions. To accomplish these operations the station must of course not be on the line joining the two original stations. It is not necessary to make the count on the three stations simultaneously. One of the stations may be used as a sort of pivot station. A series of readings is taken using the pivot station and one of the other stations, and this series of readings followed at once by a series of readings using the other station and the pivot station. The two series of readings are solved separately but the measurements are so taken that the last range to the pivot station in the first series is the first range to the pivot station in the second series. The effectiveness of this mode of operation is dependent upon rapid tuning of the "front end" to the second station at the termination of the first series of readings. If an additional channel is installed tuned to the added station and taking data simultaneously with the other two channels the system can operate in three diemsnional mode of operation in both making the measurements and in performing the computation. Another modification of the method is to employ a pivot station as before but employ the data taken with one station to find a two dimensional solution and then employ the data taken with the other station and the pivot station to make a two dimensional calculation. Combining the results of the two calculations gives the position in three dimensions at each of the reading points and the initial point.

TWO-LEGGED SYSTEM

In order to track targets at extreme range, it is possible to improve the sensitivity of a continuous wave system that is operating from energy reflected from the target by arranging the system so that the transmitting and receiving equipment are at substantially separated points geographically. This modification of my invention involves little additional theoretical consideration. The measurement equations in this modification contain two additional terms but no more unknowns than those of the simpler systems in which the energy travels along only one path, either going and coming along the same line connecting target and station, or merely travelling in one direction along such a line. The following is the form of the measurement equation for such a system:

$$\sqrt{(x_j-a_i)^2 + (y_j-b_i)^2 + (z_j-c_i)^2} - \sqrt{(x_o-a_i)^2 + (y_o-b_i)^2 + (z_o-c_i)^2} + \sqrt{(x_j-a_o)^2 + (y_j-b_o)^2 + (z_j-c_o)^2} - \sqrt{(x_o-a_o)^2 + (y_o-b_o)^2 + (z_o-c_o)^2} = M_{ij}$$

where $x_j\ y_j\ z_j$ are the coordinates of the position of the target at the instant of the $j$th reading, $x_o\ y_o\ z_o$ are the coordinates of the position of the target at the beginning of the measurement sequence. $a_i\ b_i\ c_i$ are the coordinates of the transmitting station. $a_o\ b_o\ c_o$ are the coordinates of the receiving station. $M_{ij}$ is the measurement performed relative to the $i$th transmitter.

In FIG. 57 there is shown a two-legged system consisting of three transmitters 1127, 1128, 1129 at fixed and known positions on the ground. The reflected radiations from all of the transmitters are received, detected, and measured at a single receiving station 1130. The electrical system is exactly the same as that employed in the navigational system previously described except that there are now three transmitters instead of two, and three channels in the receiving equipment instead of two.

AUTOMATIC COMPUTATION

In essentially every practical application of the instant invention the mathematical processes are sufficiently complicated that it is necessary to employ automatic computation or automatic indicating means. The instant invention comprises such methods of automatic computation and comprises such means of automatic computation. It is emphasized that no mental processes are involved in any part of the instant invention and no part of the instant specification or claims is to be interpreted or construed as describing or reciting such mental processes or mental steps or mental elements. The instant invention is based upon a fundamental fact of physics, mechanics, geometry, and mathematics first discovered and disclosed by the applicant. However it is unnecessary to repeat the applicant's mental processes exercised in the process of the basic discovery in the practice and use of the applicant's invented apparatus and non-mental processes.

A variety of methods and means may be employed in the instant invention for performing automatically all the functions necessary for generating the desired output information, displaying it, and/or putting it in form for further use. In common parlance these various apparatuses may roughly be divided into two groups, analog and digital. In each group there are general purpose machines and special purpose machines. In general the special purpose machine is constructed to form, in combination with other computing and/or noncomputing apparatus, a system of apparatus to carry out a specific function or a limited number of functions. the cooperative apparatus may involve measurements or may involve a measurement function. In any case the computing apparatus, analog or digital, is connected to the other apparatus through shafts, wires, magnetic tape, pneumatic tubes, punched cards or other such means to convey signals to the computer. The output of the computer may be provided by any such means or printing means or other indicating means. In general the special purpose machine either analog or digital must be constructed especially for the purpose of the system into which it is to be employed. The building blocks of which it is constructed vary. In a simple case a few modest, more or less permanent, changes in a general purpose machine convert it to special purpose computer. In other cases a special purpose computer, either analog or digital, must be constructed essentially from resistors, capacitors, transistors, etc., the entire design being so specialized that it must be accomplished as an entirely original design. Some special purpose machines are so designed that they can be called upon to serve a plurality of alternate functions. Furthermore the special purpose machine can comprise a number of rather involved subelements which can perform one or more rather complicated functions as required. The general purpose machine is essentially a special purpose machine that is so constructed that it can perform an essentially unlimited choice of functions when proper signals are fed into it. The more complex the signals that are fed into such a machine the greater is the variety of the functions that it can perform. The larger, the more complex the machine, the more complex are the signals that can effectively be fed into it. No matter how complicated such a machine can be there is no possibility that it can perform any mental operation or mental function whatsoever. All mental processes can only be accomplished in the animal mind. It is emphasized that this specification contains no recitation or description of any element of any machine, device, or method of performing any mental function nor any function dependent upon such mental process. In practical application of the invention either analog machine or digital machine computation or indication is employed.

My method is sometimes practiced by arranging the internal circuitry of an apparatus already in existence by means of changing the state of being of certain elements within the system and thus altering the machine so that it is suitable for performing automatically and without human control the entire computation procedure of my invention. My invented method includes such a programmed machine but of course does not include any mental step that may have gone into the invention of such a machine nor into any mental steps that may have gone into planning, conceiving, inventing or arranging the program of the computer. Nor does my invention include the display of such planning on paper. The electro mechanical means of arranging the general purpose computer to the specific purpose of my invention includes in various modes magnetic tapes, magnetic drums and punched cards. In such instances the computing part of my invention begins after the cards or tape are inserted into the digital computer and the machine is turned "on". Therefore it is readily seen that there is no mental step described as a part of my invented apparatus or invented method. The measurement data may also be fed directly into the computer automatically through shift registers as shown in FIG. 55 and as shown in FIG. 56. Also, direct connection to the computer through the counter or readout device is shown in FIGS. 15, 18, 19, 22, 24, etc.

One such computing machine is the IBM 704, another is the IBM 7090. Both of these machines were in existence well in advance of the filing of the patent application Ser. No. 86,770 and the patent application Ser. No. 278,191.

No matter what mechanism is employed to introduce the measurement data into the computing means, tapes, cards, etc. or direct electrical connection as shown in FIG. 55 and FIG. 56, etc. some physical representation of the measured magnitudes is generated and automatically introduced into the computer. Similarly physical representations are employed to introduce other required data (station coordinates) and the computer outputs a physical representation (lists, charts, etc.) of the output position-motion information.

An advantage of the general programmable digital computer in connection with the instant invention is that it enables one to conveniently carry out the electro-mechanical programming elements of my invention automatically and without human intervention, much less mental activity, once the "on" switch is thrown to the on position.

In the manner of operation of the mode of my invention making use of the general purpose computer there has been prepared a deck of cards or a magnetic tape which by holes punched in the card or magnetic deformations in the tape contain the information that is to be fed into the computing machine. This version of my invention is initiated by pushing the on button. At the moment the on button is pushed my process begins and proceeds entirely without human intervention or mental processes of any sort. The cards or the magnetic tape pass through sensing elements which develop signals which are fed to the storage and logic elements of the computer which proceeds to complete my invented process.

The entire light of this specification is directed toward nonmental processes and no interpretation or extension of the words or discussion herein should convey the slightest idea that my invention includes any mental process or other mystique whatsoever. The light of this specification is entirely concerned with practical automatic processes.

ANALOG COMPUTER FOR PLANAR METHODS

The geometric principle which I have discovered and which underlies the invention, makes possible a large number of modifications of my invention in the fields of navigation, position finding, surveying, etc. Automatic computation is essential to many of these modifications, and each of these modifications may employ any of a wide variety of analog computers as well as a wide variety of digital computers. Similarly any particular one of these computers can generally be employed in a wide variety of modifications of my invention with only slight if any change.

As a sample only, a two-dimensional analog computer is presented herein to indicate the flexibility of my invention and to assist in providing an understanding of the basic principle of my invention.

Because of its flexibility this analog computer can indicate position in the same manner as does the position indicator described in the section entitled *Four Station Planar Navigation System* and shown in FIGS. 43–50. This analog computer, with minor change of certain elements can accept either analog or digital data of any of a variety of measurements that can be fed into it. The computer can also provide output data in either analog or digital form. When position is indicated as data rather than as a direct pointing or marking on a map the output data is presented in cartesian coordinates. It is a matter of semantic choice whether or not to label as a "computer" the indication apparatus described in this previous section. The inventor knows of precedence for such labelling, but the inventor knows of no precedence prejudicing such labelling of similarly functioning analog apparatus.

For simplicity of illustration a two-dimensional computer was chosen for this illustration. Similar principles of design may be applied to a three-dimensional computer.

This analog computer employs racks and pinions, slide bars, carriages, servo elements, etc. to perform the actual geometrical computation. The device comprises a number of "boards" similar to those described previously in this document. The number of these boards depends upon the geometrical characteristics of the system or method in which it is employed.

Analog Programming

This analog computer can be "programmed," in the same manner that a general purpose digital computer can be programmed, to be functional in any of a wide variety of planar systems using my invention. Systems and methods may be one-legged or two-legged. The computer can also be programmed for a method using a set of simultaneous single measurements in a system that uses multiple consecutive or overlapping simultaneous measurements, as previously described relative to the planar doppler navigation system. The computer can also be arranged or programmed to operate in those types of systems that are dependent upon a continuity of motion as described elsewhere in this document.

Whereas the programming of an electrical general purpose digital computer is accomplished by changing electrical, magnetic, or mechanical (relays) states the computer here described is programmed by the selection of the kinds and numbers of elements. As with the general purpose digital machine the input and output formats can be selected to suit the method or system in which it is employed.

In certain of the elements of the analog computer there are subelements which are employed in some programs and not in others. In such instances that particular element or subelement is disabled when it is not in use. Of course such unused elements would not be included in a machine which is not intended ever to be used in a particular method that requires their use.

This particular analog computer is designed to operate with measurements that can be expressed in terms of differences of lengths (expressed in the machine as differences in distances along the lengths of separate racks). The computer can be employed with a doppler sensing equipment, and it can be employed also in methods that have no doppler element such as described in my U.S. Pat. No. 3,286,263. The computer is easily coupled to various sensors through appropriate servo elements for completely automatic operation of the entire system.

The Board Assembly

There are at least two identical principle assemblies in the computer. These assemblies are called boards. These boards are coupled electrically, and this modification of my invention depends upon the interaction between, or among, the separate boards. Since there is no mechanical connection between the boards they may be mounted horizontally at table height for easy viewing. Each board has mounted on its surface a chart or map if it is desired for the computer to indicate the position by direct pointing or marking on the map. The map or chart is not required if the only output of the system is to be numerical. A simple chart of orthogonal grid coordinates can also be employed in one method of numerical readout. Other methods of numerical readout are available and will be immediately apparent to one skilled in the art. All points in the actual geographical system are represented on the board by the points (locations) at which are located pinions. The pinions are all on axes perpendicular to the surface of the board. Each pinion is mounted on the shaft of a torque motor whose shaft is also perpendicular to the surface of the board. All but one of the torque motors and their pinions are mounted so as to be stationary with respect to the board. One of the torque motors, along with its pinion, is mounted on a carriage that is supported by a slide rod system in such a manner that it can traverse the active surface of the board. Each of the board mounted pinions engages a rack which is also engaged by the carriage mounted pinion.

Figure 58:
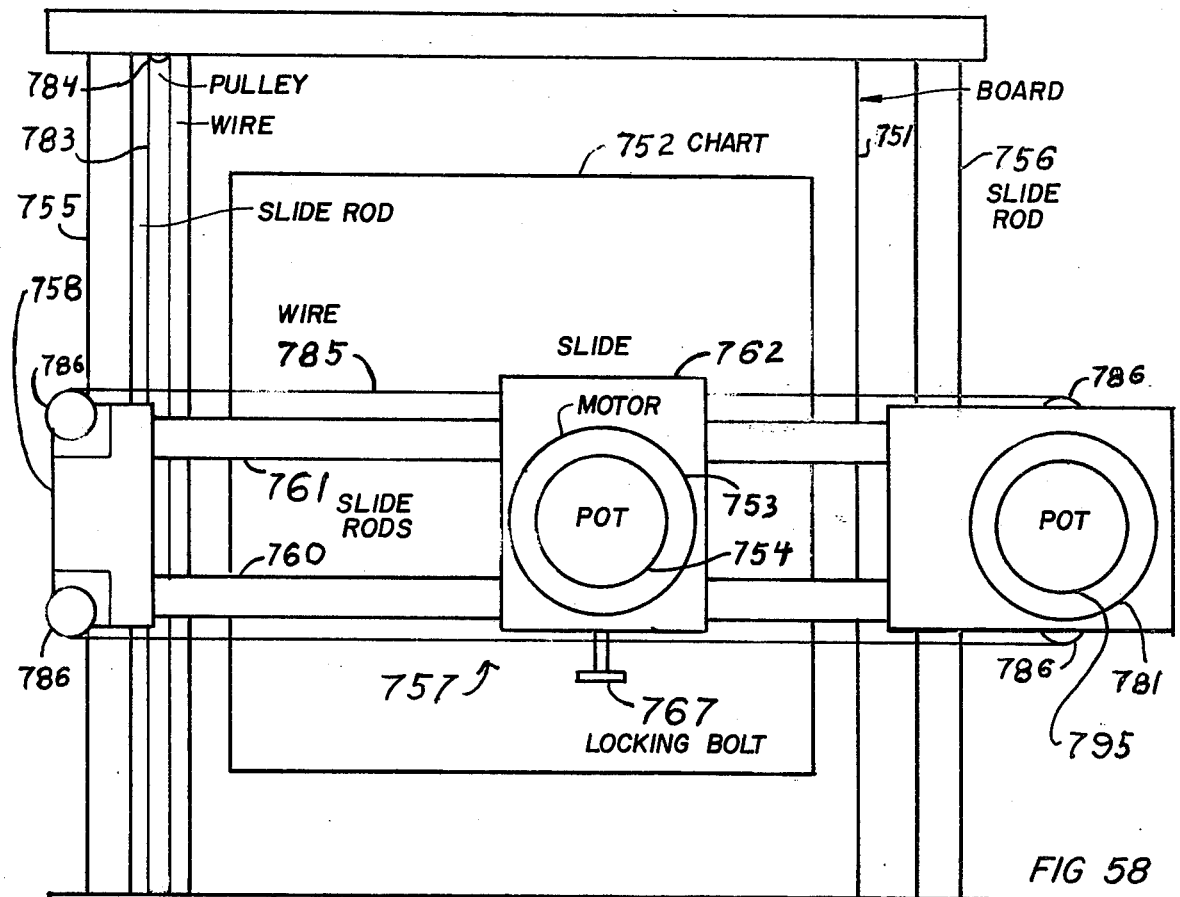
FIG. 58 shows the plan view of rack and pinion type analog computer employing cartesian apparatus.
Figure 59:
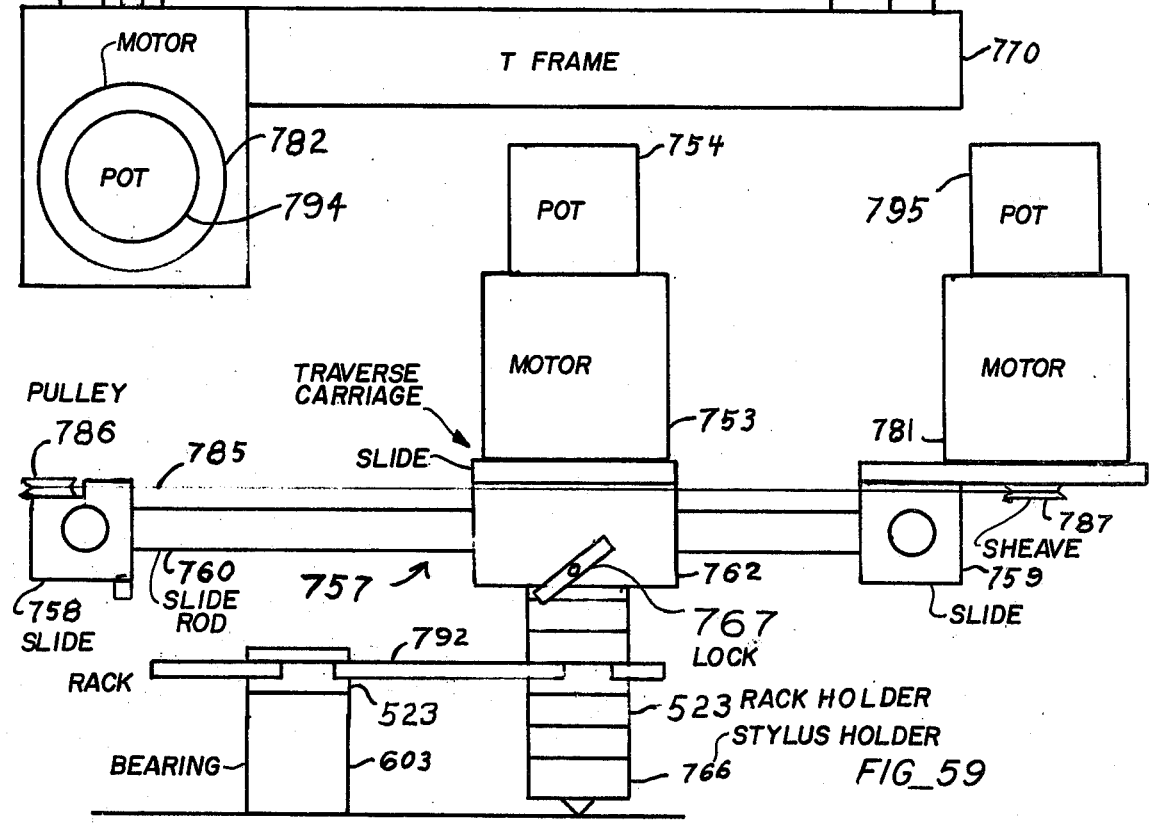
FIG. 59 shows side view of stylus carriage and associated equipment.

FIG. 58 is a plan view of board 751 showing the chart 752 and the slide rod system. Also shown are the tops of servo torque motors 781, 782 and 753 and the tops of potentiometers 754, 794 and 795. Mounted on the board 751 are two fixed slide rods 755 and 756, one along each of opposite edges of the board. The fixed slide rods are parallel to each other and parallel to the surface of the board, and they are of equal height above the board. It is the function of these fixed slide rods 755 and 756 to hold traversing carriage 757 so that it can slide back and forth over the board 751. The traversing carriage is seen in FIG. 58 and FIG. 59. The traversing carriage assembly 757 has two slides 758 and 759 one riding on each of the two fixed slide rods 755 and 756 respectively. Joining these two slides 758 and 759 are a pair of moving slide rods 760 and 761 which in conjunction with the two slides 758 and 759 form a rigid structure, the traversing carriage 757. It is the function of the traversing carriage 757 to hold the target pinion carriage 762, which is mounted on the slide rods 760 and 761 in such a manner that it is free to move along these rods from one side of the board 751 to the other in a direction at right angles with the direction of the traverse of the traversing carriage. The pinion carriage assembly is seen in FIG. 58, FIG. 59 FIG. 60 and FIG. 61. The pinion carriage 762 holds torque motor 753 in a vertical position between the slide rods 760 and 761. The shaft of the torque motor 753 holds the target pinion below the slide rods 760 and 761 in such a manner that it can engage all of the several racks employed in the use of the board.

The target pinion, not visible, is held vertically by the shaft of torque motor 753 and is sufficiently long that it may engage simultaneously all of the racks employed in a particular board geometry. In the geometry shown this pinion is long enough to accomodate five racks. This length permits the use of four racks operating in one direction and one rack operating in the reverse direction permitting the simulation of two-legged systems such as those that would result with a reflective type of system. Rack holders 523 hold the racks so that they engage the pinion and are free to pass back and forth through the rack holder according to the rotation of the pinion independently of the angle of the rack with respect to the board. In FIG. 59 a single rack 792 is shown engaging both a station pinion and the target pinion. The pinions themselves are not seen as they are completely surrounded by their rack holders 523. The rack holders 523 for the target pinion are held in place on the pinion by stylus holder 766. The stylus does not support the weight of the target pinion assembly as this assembly is supported by the slide rods 760 and 761. Stylus holder 766 is mounted on the shaft of the torque motor 753 and serves to support the rack holders 523 so that they can rotate freely.

In some systems or methods or programs it is necessary that the target pinion be free to rotate driven only by the summation of the rack forces. In other geometries or programs the target pinion must not rotate. A locking brake is provided by locking bolt 767. In other geometries or programs the rotation of the pinion is in part determined by torque motor 753.

Figure 60:
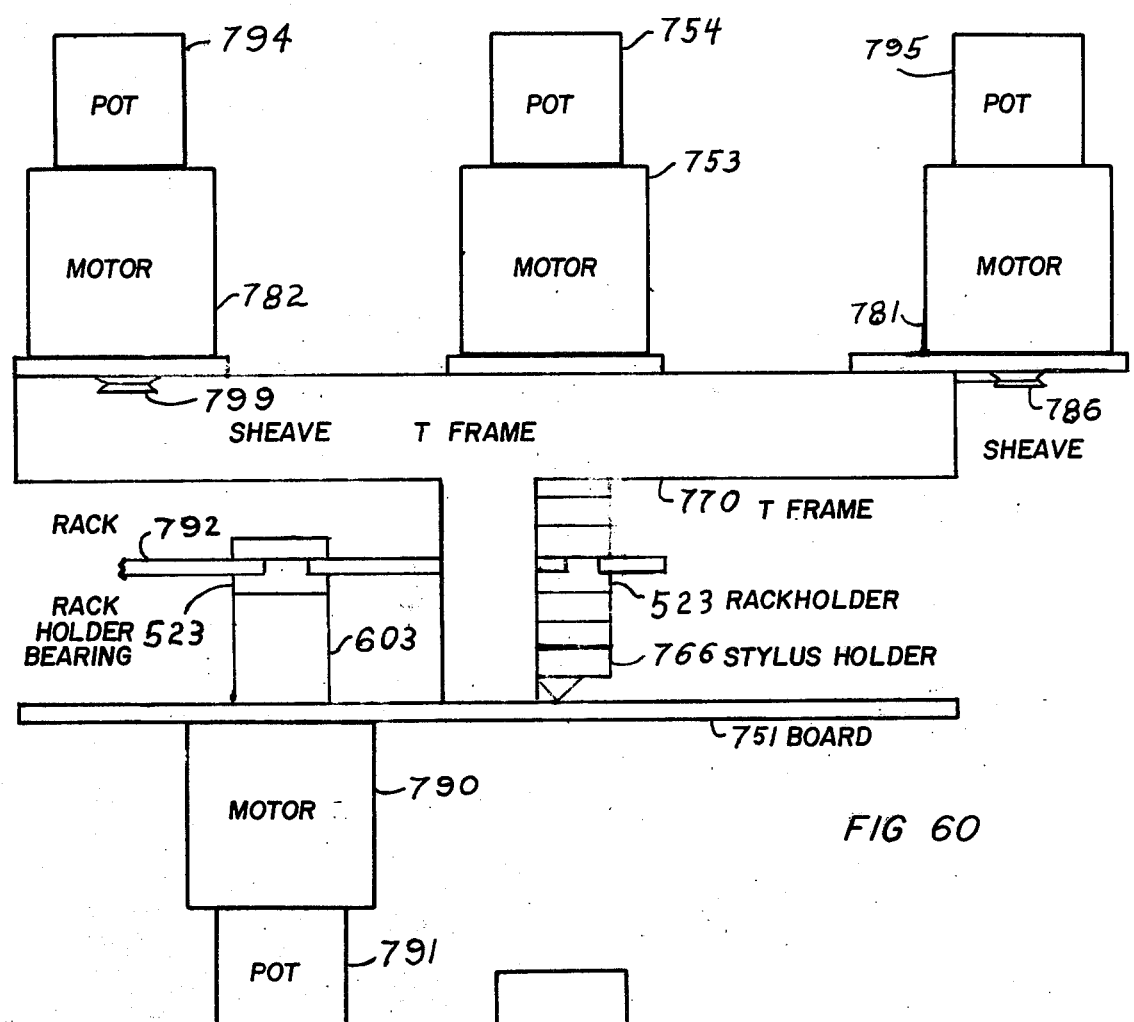
FIG. 60 shows supporting elements for rack and pinion type analog computer.

In the particular apparatus shown wires and sheaves are employed, instead of racks and pinions which would be equally satisfactory, for coupling the cartesian servo motors 781 and 782 to their respective carriages. Dial wire 783 and pulley 784 are shown in FIG. 58 for coupling torque motor 782 to the traversing carriage. The sheave 799 on the shaft of servo motor 782 is seen in FIG. 60. Wire 785 and pulleys 786 and sheave 787 are shown for coupling the torque motor 781 to the pinion carriage.

FIG. 60 shows an end view of the board assembly shown in FIGS. 58 and 59. The stationary slide rods 755 and 756 are supported by the T-frame 770 which also supports torque motor 782 and its associated elements. Also shown in FIG. 60 is the relationship among the station servo element (comprising motor 790 and potentiometer 791) the rack 792, the station pinion, and the target pinion. Of course the pinions are not seen as they are hidden by the rackholders 523 and the support bearing 603.

Figure 61:
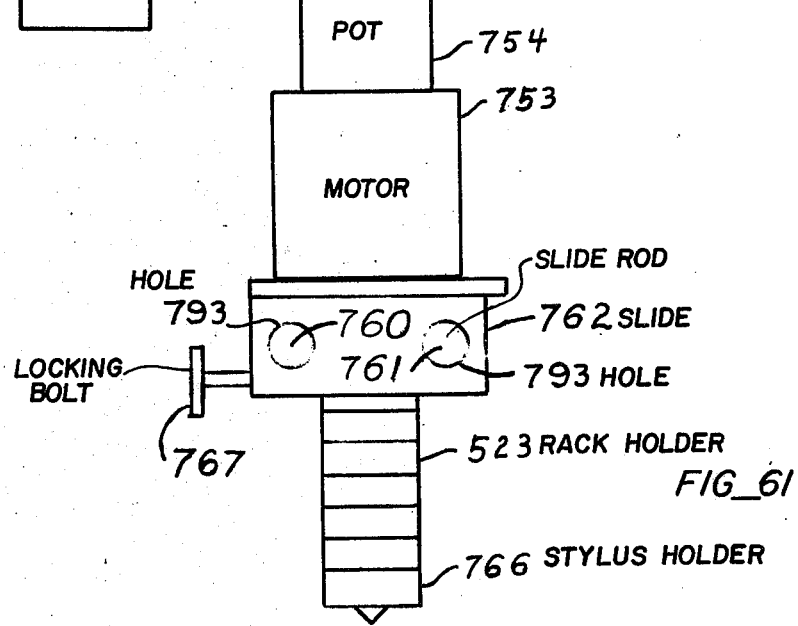
FIG. 61 shows the stylus carriage and the element it supports.

FIG. 61 shows the target pinion carriage assembly including the torque motor 753, the potentiometer 754, the target pinion carriage 762. The target pinion is hidden by the rack holders 523. The target pinion carriage rides on slide rods 760 and 761 which pass through the holes 793.

One-Legged Programming

FIG. 62 shows one of the boards of the planar analog computer programmed for a four station planar doppler system. In this program the target pinion is locked by braking bolt 767 shown in FIG. 58, FIG. 59 and FIG. 61. The stations pinions 513, 514, 515 and 516 are shown in their rack holders 523. The racks 792 are shown, each rack engaging one station pinion and the target pinion. This program requires only one other board and this other board is identically arranged. Not shown are the carriage assemblies and slide bar assemblies.

Two-Legged Programming

FIG. 63 shows the board 751 programmed for a two-legged system. There are five station pinions including the four pinions as shown for the one-legged system in FIG. 62. In addition there is a single pinion 800 which is held fixed on a fixed shaft so that there is no rotation of the pinion. No servo element is required for pinion 800. Pinion 800 and its associated rack holder are otherwise exactly the same as the other station pinions and rackholders. However the rack 801 is set on the opposite side of the pinion from the position that the other racks occupy with respect to their associated pinions. Similarly the rack 801 is on the opposite side of the target pinion from that of the other racks. The brake 767 on the target pinion is released so that this pinion is free to rotate. The target pinion servo element is disengaged in this programming and is without effect.

The geometrical arrangement of this program is identical to that of a doppler system of four receiving stations and one transmitting station. It is also identical to that of a system comprising four transmitting stations and one receiving station. These two types of systems have identical geometrical properties thereby permitting the use of the same program for either system.

The reason for use of a fixed pinion for the singular station rather than a shaft with a ring fixed to the rack as in the rack assembly shown in FIG. 47A and FIG. 47B is that the latter arrangement introduces some error that is dependent upon the position of the target. Use of the fixed pinion avoids this error. The error owing to the use of the rack assembly was tolerated for overall simplicity in the Four-Station Planar Navigation System where it was employed at the stylus holder.

In this particular program there is no need for the servos on the traverse mechanism and they are disengaged.

Programming with Traverse Servos

When there is a relationship between the cartesian coordinates of different target points (there is only one target point per board) the traverse servos are included in the programming of the computer. Generally systems which are required to accommodate the relationships between the separate target points also employ fewer stations. Thus when the traverse (cartesian) servos are employed in the analog computer there are generally (but not necessarily) fewer station servos used per board. Another characteristic of this type of programming is that the number of boards employed is always greater than two.

FIG. 64 shows that part of the program involving the cartesian relationships when five boards are employed. The blocks 811, 812, 813, 814 and 815 represent the motor-potentiometer combinations 782 and 794 for each of the five boards respectively. The circuit programming shown in FIG. 64 is for one cartesian axis only. There must be a similar programming for the other axis involving motor-potentiometer combinations 781 and 795. Introduced into the control lead of each motor is a multiplier 821, 822, 823, 824, and 825 respectively. In this particular program the multiplier values are 1, 4, 6, 4, 1 respectively.

The polarities of connections are indicated by the inverting elements 830. Generally in such apparatus this function of reversal of polarity is accomplished in the manner of connection of the separate elements. This function of reversal of polarity may also be accomplished by the introduction into the circuit of an inverting amplifier.

Indication of the summing of the signals on separate circuits is shown by element 831. This function is sometimes accomplished by a resistor network or other impedance network, or it may be accomplished in a summing amplifier. In any event the accomplishment of this function is trivial and many means for its accomplishment are well known in the art.

A typical use of this type of programming element occurs when the computer is employed with a multistatic doppler system in which the relationship between the separate target points exists relative to known or assumed characteristics concerning the trajectory or motion of the target.

Generally separate cartesian programming is employed for each of the two orthogonal coordinate axes. However other programming can be introduced to accommodate the motion relationships.

Using five boards, only two stations are required in a minimum system possessing adequate standard frequency oscillators or the equivalent.

Programming With The Target Point Servo

The facility offered for programming the computer by the target point servo is appropriate in certain systems where there is a relationship between some elements of the state of apparatus at the target point that is independent of the position or motion of the target point. Such a relationship is that resultant from the variation of the frequency of a standard frequency oscillator on board a navigating vehicle.

The connections shown in FIG. 64 may be employed for such programming of a time dependent function in a five board system employing three stations.

Range Indication

The analog computer elements of my invention shown in this specification share with equivalent digital elements in other embodiments of my invention the characteristic that, although the ranges are determined within the computer element and the functioning of the computer depends on such determination, the ranges are not indicated by output signals. In some systems employing my invention the ranges are output information. It is a simple matter in either analog or digital computing elements of my invention to provide such range output indication by means obvious to one skilled in the art. Range indication was omitted in this specification to simplify discussion and drawing. in some embodiments of my invention the range information is desired for establishing corrections for the effects of bending of the wave propagation paths by the atmosphere.

ANALOG COMPUTER REFERENCES

J. E. Hawkins and R. W. Baltosser have disclosed an analog hyperbolic computer stating that their "invention relates to position computing and plotting apparatus and more particularly to improvements in signal receiving and position computing apparatus for use in radio position finding systems of the hyperbolic or continuous wave type employing phase comparison in pairs of position indication signals radiated from at least three spaced transmitting points to provide indication or measures from which the position of a mobile receiving point relative to known positions of the transmitting points are mechanically and automatically computed so as to provide a continuous indication on a chart or the like." The invention is described in U.S. Pat. No. 2,587,467, J. E. Hawkins et al., issued Feb. 26, 1952.

This patent shows computing elements comprising racks and pinions to provide an analog configuration of points similar to analog computing elements shown in this specification. However the "geometry" of the system of Hawkins et al. is entirely different from that of any of the systems described in this specification; and, therefore, the analog computer shown in Hawkins et al.

is conspicuously different from that shown in the instant specification. The apparatus disclosed in the patent of Hawkins et al. discloses an analog device whose actual physical appearance resembles in shape exactly the geometrical characteristics of the configuration of the station points and vehicle points of the actual hyperbolic system. Other analog systems employ analog elements for trigonometric functions, the functions of multiplying, integrating, etc. This second type of analog system bears no mechanical resemblance to the configuraton of the actual system of stations and vehicles. U.S. Patents showing such elements are:

No. 2,922,578 G. M. Davidson, issued Jan. 26, 1960
No. 2,917,237 G. M. Davidson, issued Dec. 15, 1959
No. 2,841,329 J. Statsinger, issued Dec. 12, 1951
No. 2,841,677 J. Statsinger, issued July 1, 1958

Modifications of my invention comprise both types of analog computers.

SYSTEMS USING THE HIGHER TIME DERIVATIVES

The variations of geometric parameters includes not only incremental variations and first time derivatives but also the higher time derivatives of lineal geometric parametrs such as ranges. Some of such systems and processes of my invention based upon determining the higher time derivatives comprise some dependence upon motion relationships. Other systems and processes of my invention operate entirely independently of any motion relationships.

FIG. 2 and the text of this document elsewhere relative thereto show apparatus for the determination of the first derivatives of ranges. In another system the higher derivatives are derived from the signal at the input to the frequency meter 17, at post P in FIG. 2. FIG. 65 shows apparatus for determination of the higher derivatives of ranges. The apparatus comprises a series of differentiaters 2001, 2002, and 2003 separated by amplifiers 2004, 2005, and 2006. The chain is driven by frequency discriminater 2007 through amplifier 2008. Discriminater 2007 is itself driven by a signal from the post P shown in FIG. 2. Indicators 2009, 2010, and 2011 are driven from the outputs of the amplifiers 2004, 2005, and 2006, as is the analog computer 2012. A timing signal is also fed to the computer 2012 from timer 2013. This timing signal is not a part of the measurement process, or determining process, but merely serves in the coordination of the position determining process. From the data fed into it from the integraters corresponding to the several stations of the system, the computer 2012 determines for its output at least one dimension of the position-motion state of the moving target object.

FIG. 66 shows an alternative apparatus for obtaining the required time derivative information relative to a lineal geometric parameter, the range, and feeding this information into a computer to obtain at the output of the computer at least one dimension of the position-motion state of the moving target object. Synchronous detector 2021 is driven by a signal from the Post P in apparatus such as that shown in FIG. 2. A chain of integraters 2022, 2023, and 2024 separated by adders 2025, 2026, and 2027 is driven by the output of synchronous detector 2021 through multiplier elements 2028, 2029, 2030, and 2031. The output of adder 2027 drives voltage controlled oscillator 2032 whose output in turn drives the input of synchronous detector 2021. The outputs of the adders 2025, 2026, and 2027 representing respectively the third, second, and first derivatives of the frequency with respect to time are converted to digital information by analog-to-digital converters 2033, 2034, and 2035 and thence fed to digital buffer 2036 where it is combined with identification signals from timer 2037. The output of the buffer comprising the identified digital time derivative data is fed to the digital computer 2038. The computer 2038 computes automatically at least one dimension of the position-motion state which appears at the output. Computers such as the IBM 7090 and IBM 704 may be employed for this use.

Either of the above two systems may be extended to operate with time derivatives of any practical order.

Each of the above two systems determines the values of quantities linearly related to variations of geometric parameters. These variations in these cases are the time derivatives of the distances from the station points to the target point. Thus variation of the geometry of the system, the geometrical configuration formed by the station points and the target point, is sensed by the apparatus which uses the data so determined in either analog or digital apparatus to determine at least one dimension of the position-motion state of the point representing the moving target object. In these particular systems a dimension of the position-motion state can be the range from a station point, one of the cartesian coordinates of position, or one of the time derivatives of one of these.

Mathematics of Processes Involving the Higher Time Derivatives

Differentiating with respect to time the expression for the radial velocity in terms of frequency, one derives the following expressions for successive derivatives of the radial velocity:

$$\dot{V} = \frac{dV}{dt} = -\frac{f_0 \dot{f_r} C}{(f_o + f_r)^2}$$

$$\ddot{V} = \frac{d^2V}{dt^2} = -\frac{4\dot{f_r} - 2\ddot{f_r}(f_o + f_r)^2}{(f_o + f_r)^2} f_0 C$$

Simpler approximations result when the velocity of the vehicle is small compared to the velocity of propagation of the waves:

$$\ddot{r} = \dot{V} = -\frac{C}{2f_o} \dot{f_r}$$

$$\dddot{r} = \ddot{V} = -\frac{C}{2f_o} \ddot{f_r}$$

$$\ddddot{r} = \dddot{V} = -\frac{C}{2F_o} \dddot{f_r}$$

Using the determinations of radial velocity and the time derivatives of radial velocity, all measured simultaneously relative to all of the stations one is able to calculate the position of the vehicle at the time of the measurements. All of the corresponding time derivatives of the position of the target point may also be computed.

In terms of the cartesian coordinates, employing designations as shown elsewhere in this document, the following relationships may be employed in automatic computing equipment to determine position and the derivatives thereof:

$$r = (x - a)^2 + (y - b)^2 + (z - c)^2$$

$$r\dot{r} = (x - a)\dot{x} + (y - b)\dot{y} + (z - c)\dot{z}$$

$$r\ddot{r} + \dot{r}^2 = (x - a)\ddot{x} + (y - b)\ddot{y} + (z - c)\ddot{z}$$

$$3\dot{r}\ddot{r} + r\dddot{r} = 3\dot{x}\ddot{x} + 3\dot{y}\ddot{y} + 3\dot{z}\ddot{z} + (x - a)\dddot{x} + (y - b)\dddot{y} + (z - c)\dddot{z}$$

$$4\dot{r}\dddot{r} + 3\ddot{r}^2 + r\ddddot{r} = 4\dot{x}\dddot{x} + 4\dot{y}\dddot{y} + 4\dot{z}\dddot{z} + 3\ddot{x}^2 + 3\ddot{y}^2 + 3\ddot{z}^2 + (x - a)\ddddot{x} + (y - b)\ddddot{y} + (z - c)\ddddot{z}$$

As many of these equations as are necessary for each station may be obtained, and a set of these relationships exists for each of the stations of the system. The unknowns of these equations are the cartesian coordinates of the target point position and the derivatives of these coordinates with respect to time. It is desired to determine at least one of these unknowns, and such as determination may be made when the number of independent equations available for the automatic computation procedure equals or exceeds the total number of unknowns.

In three dimensional space a minimum of four stations are employed in some versions of my invention to determine at least one dimension of the position-motion state of the moving target point without employing motion relationships. For four stations the determination of the derivatives up to the third is required of the ranges of each of the four stations. There are then four sets of three equations each, and there are twelve unknowns after the ranges have been eliminated.

If four stations are located in a plane it is possible to obtain any number of independent equations corresponding to any chosen target point merely by differentiating repeatedly with respect to time the expression relating the squares of the four simultaneous ranges to each other:

$$\sum_{i=1}^{i=n} \alpha_i r_i^2 = K$$

$$\sum_{i=1}^{i=n} \alpha_i r_i \dot{r}_i = 0$$

$$\sum_{i=1}^{i=n} \alpha_i (\dot{r}_i^2 + r_i \ddot{r}_i) = 0$$

$$\sum_{i=1}^{i=n} \alpha_i (3\dot{r}_i \ddot{r}_i + r_i \dddot{r}_i) = 0$$

$$\sum_{i=1}^{i=n} \alpha_i (4\dot{r}_i \dddot{r}_i + 3\ddot{r}_i^2 + r_i \ddddot{r}_i) = 0$$

Where:

$n$ is the number of stations $r_i$ is the range from the i th station to the target point The $\alpha_i$'s and the $K$ are constants determined by the geometrical distribution of the station points.

Simultaneous solution of four of these equations yields the unknown ranges. If five stations are employed the stations need not be located in a plane, and five of the equations must be employed. Further discussion of the use of this relationship between the squares of the ranges, apparently first discovered by the applicant, is to be found in the applicant's patent application Ser. No. 86,770 referenced elsewhere in this document.

In the practice of my invention electrical signal quantities such as phase, frequency, time delay, and the variations thereof are generally converted in the computer to geometrical quantities such as ranges, the algebraic sums thereof and the variations of these. There is great flexibility as to where and how the conversion of such dimensions takes place within the total data processing functions within the computer. The constants required for these conversions are inserted into the computer as are such other required ancillary data such as the coordinates of the station points using well known means and methods. These are the frequent practices of my invention whether the particular system is of the rate type or of the incremental (displacement) type or some hybrid thereof. Other methods of introducing this ancillary data may be employed as well in the practice of my invention.

Although the discussions of rate type modifications of my invention have been centered around the one-legged type of system with wave transmission both to and from the target point, it is evident by analagy to other types of systems disclosed herein that other geometries such as those involving two-legged lineal parameters and other wave transmission such as only to, or such as only from, the target point are also comprised by my invention.

DIGITAL PROCESSES

The manner in which digital processes can be used in my invention are so varied and so flexible that it is not possible to be at all comprehensive here in showing them.

It was old, at the time of the filing of the patent application Ser. No. 86,770 of which this patent application is a continuation in part, to employ, as parts of a complete system comprising nondigital elements, digital data processing and digital computers coupled to sensing apparatus such as radio receivers, accelerometers, temperature guages, displacement guages, rotation velocity guages, speedometers, used singly, in plurality, or in combination. Such systems had been evolved for navigation, tracking, and industrial processes of all sorts. The methods of coupling the digital machine to the sensing apparatus were old and well established. Some sensing elements such as the pulse integrating gyro and the doppler frequency counter were remarkably adapted to digital operation by their inherent properties. Other sensing elements provided data outputs requiring the use of separate analog-to-digital converters in coupling the analog sensor element to the digital data processing element. These analog-to-digital converting elements were highly developed in the art at that time.

My invention is well adapted to employment of digital data processing and the digital computer either using sensing elements inherently digital in character such as the cycle counter or using other sensing elements with the analog-to-digital converter.

Functional elements of my invention that are particularly suitable for the application of digital techniques are signal tracking, spectrum analysis, signal selection, filtering, correlation, counting, integrating, differentiating as well as all of the more common mathematical functions. (See my U.S. Pat. No. 3,242,487 for discussion of this subject.)

FIG. 67 shows a receiving system and its associated digital apparatus. This apparatus is intended to be employed in those types of systems employing multiple spaced transmitting means and a single receiving equipment located at a single point along with the data reduction apparatus. The system may be a navigation system, in which case the receiving and computing apparatus is located aboard the navigating vehicle. The apparatus may as well be employed in a reflective type of system or a system employing a coherent transponder, in which case the receiving apparatus is located at a point, either vehicular or stationary, remote from the target object or vehicle that is being tracked (at least one dimension of whose position-motion state is to be determined).

In this particular system waves are transmitted from the wave emitters 2041, 2042, 2043 and 2044 which are stabilized by standard frequency oscillators 2045, 2046, 2047 and 2048 respectively. Each standard frequency oscillator is adjusted to a separate frequency sufficiently remote from that of the others that the anticipated doppler spectrums do not overlap. This system employs a two-legged geometry operating with a reflective target. The transmitters and the receiving station are so separated that the direct signal from the transmitters is not available at the receiving site, and an independent standard frequency oscillator 2049 is used at the receiver. Oscillator 2049 drives a frequency synthesizer 2050 which provides a set of signals, each signal being equal to that of one of the transmitters. The signals of all of the transmitters reflected from the moving object enter the receiving apparatus through the wave aperture 2051 (antenna in the case of radio waves). Separate two-phase detecting circuits are employed, one corresponding to each transmitter, and each receiving a separate synchronizing signal from the frequency synthesizer 2050. Other than that they are fed separate synchronizing signals of different frequencies and provide separate outputs, the separate homodyne circuits are identical; and all receive the same spectrum of signals from aperture 2051.

Each homodyne circuit comprises a pair of input mixers 2052 and 2053, which is fed the signal from the aperture 2051 and the appropriate signal from the frequency synthesizer 2050 through the pair of phase shifters 2054 and 2055. The outputs of the pair of phase shifters 2054 and 2055 are 90° out of phase with each other. The output signals of the two mixers 2052 and 2053 are 90° out of phase with each other and are fed respectively to low pass filters 2056 and 2057. The filters 2056 and 2057 are of sufficiently low cutoff frequency that the reflected doppler altered signals from transmitters other than the one whose reflected signal is being tracked through the particular homodyne circuit are effectively eliminated. The two-phase output signal from the filters is the entire anticipated doppler spectrum corresponding to the propagation path from the corresponding transmitter point to the moving object point and thence back to the receiver point. No tracking of the reflected signal is accomplished up to the output of the filters 2056 and 2057. The entire tracking operation is actually accomplished in the computer 2058 which is coupled to the output of the filters 2056 and 2057 through analog-to-digital converters 2059 and 2060 and digital buffer element 2061. The buffer 2061 is fed a digital timing signal from timer 2062. A function of the buffer is to assign the appropriate timing dimension to each individual signal sample from the analog-to-digital converters 2059 and 2060 and to feed the digital signals now properly coded with respect to time to the computer 2058 upon demand from the computer.

The computer performs the function of signal tracking and performs the function of determining the values of quantities linearly dependent upon the variations of the several wave propagation paths of the signals from the separate transmitters reflected by the moving object to the receiving aperture 2051. The computer then multiplies this data by the appropriate constants to convert the data to represent the variations of the lineal dimensions of the algebraic sums of ranges. These converted data are then employed in further digital processes within the computer to determine whatever dimension, or combination of dimensions, of the position-motion state of the moving object it is desired to obtain. The internal workings of the digital computer 2058 are such that the system operates either in an incremental mode (displacement mode) or in a rate mode, according to the teachings elsewhere in this disclosure.

REDUNDANT SYSTEMS

Any of the systems described in this specification can be arranged, or programmed, to employ redundancy. Under redundant conditions the dimension of the position motion state which is to be found is "over determined". More measurements or more restrictions, or conditions, are applied than is required for minimum determination. Such over determination or redundancy can be achieved whether the system employs analog or digital data processing. A sample of the application of an analog computing system for use in a triangulation type of multistatic system is shown in U.S. Pat. No. 2,535,942 issued to J. H. Lewis et al., Dec. 26, 1950, entitled: Electric Direction Finding Evaluation. Similar arrangements for combining redundant data into a system may be applied to any of the Polystation Doppler systems which employs analog computation. Polystation Doppler systems employing digital computation for determining dimensions of the position-motion state similarly can borrow from the techniques for handling redundant data that are common in the prior multistatic art of position determination. This art of combining data in redundant systems was ancient in both digital and analog aspects at the time of the filing of Patent Application Ser. No. 86,770 of which this application is a continuation in part. Application of this art to the instant invention is obvious once the teachings herein are understood.

SUMMARY

Particular examples of my invention are presented in this Specification. It is obvious that the basic principles can be applied in the creation of a wide variety of polystation doppler systems for tracking moving objects as they occur either singly or in multiple. operation may be in either two-dimensional space or in three-dimensional space, the number of stations varying accordingly. Wave transmission may be toward the moving object from the reference points. For example receiving equipment may be installed aboard the moving object sensitive to waves emitted by transmitters located at the reference points. This circumstance would correspond to the application of navigation of a moving vehicle. At least one dimension of the position-motion state of the navigating vehicle is provided at the output of apparatus located in the vehicle. In determining a single dimension of the position-motion state the apparatus internally must develop signal states, or states of being, interpretable in terms of other dimensions of the position-motion state, but these other dimensions may or may not be made available at the system output. In the most frequent practical usage a number of dimensions of the position-motion state greater than one are required, for instance the three dimensions of present position in a three-dimensional navigation system. Such as system may also require as output of the system the three dimensions of average velocity over some increment of the path of the vehicle. Such information is generally readily obtainable in the Polystation Doppler system since the information necessary for its display is inherently available within the system. In contrast it may be desired that the system display only the three dimensions of velocity, or perhaps only one of such dimensions, say the velocity of the vehicle along the X axis.

My invention may be employed to determine dimension of the position-motion state of a moving transmitter which then becomes the moving object. Receiving apparatus located at the reference points and connected to a single computing apparatus completes the system. Further options exist in reflective systems. For instance one may employ a single transmitter to illuminate the moving reflecting object and receivers located at the reference points. The illumination transmitter may be at one of the reference points or elsewhere. FIG. 57 shows a system in which the illumination is furnished by three transmitters, one located as each reference point. A common receiving equipment is located at a point remote from any of the reference points. Obviously the receiving equipment must be sensitive to the reflected emanations of all of the transmitters, i.e. it must have three channels. The receiver could have been located at one of the reference points without change of my invention. FIG. 1 shows the system arranged so that each reference point is the location of a transmitter-receiver combination so that illumination of the moving reflector is provided at each reference point for the receiver located at that reference point.

While modification of my instant invention shown in FIG. 57 has four stations it is obvious that there are only three doppler loops or wave paths in this three-dimensional system. The system comprising the positioning of one terminal of the communications loop remote from any of the three primary reference points at which are located other terminals of the three essential wave paths is a modification of the same instant invention as is modification employing a transmitter in the vehicle and three receiving stations at the reference points.

An obvious variation of my invention is the use of multiple receiving channels at each of the stations (reference points) shown in FIG. 1. One channel at each station detects the echoed signals of the co-located transmitter while the other channels detect the echoes of the transmitters located at the other reference points (station). Such a system would comprise both one-legged and two-legged wave transmission paths. Further obvious variation is the omission of any receiver channel sensitive to the signals from the co-located transmitter. Such a system would comprise only two-legged wave transmission paths.

In order to be descriptive of the invention in brief and without recitation of the vast number of possible combinations one may simply state that wave means are located at each reference point. My invention is invarient as to whether these wave means are transmitters or receivers or both. It is obvious that the moving object may be a reflecting object as it would be in the case of a missile detection system. It is also apparent that wave means on board the moving object or vehicle can be a transmitter or a receiver depending upon the purposes of the particular Polystation Doppler system, i.e. air traffic control, air navigation, etc.

An essential element of my invention is the transmission of waves across the space between each reference point and the moving object, no matter which direction the waves travel. It is further essential that the waves be detected and their doppler characteristic or its equivalent be measured or sensed.

It is obvious that if any dimension of the position-motion state of the moving object were known a priori to the desired accuracy, as by the operation of some system of the prior art say trilateration or triangulation or radar my invention would not be required. Use of such information is not contemplated in this disclosure other than as a possible device for obtaining approximate initial data and does not constitute in itself any part of my invention. Since doppler observation or sensing or measurement permits relating to each other the separate points along the trajectory the knowledge a priori of the coordinates of any such point would comprise knowledge of position dimensions of the position-motion state of the moving object if tracking were continuous through that point. Use of such position information is not contemplated in my invention and no apparatus or method is such in my invention as to employ such information.

The particular geometric parameter whose variation is determined by the basic sensing elements of my invention can be either a range, a sum of two simultaneous ranges, or the difference of two simultaneous ranges. It is only essential that some signal quantity that is linearly dependent upon at least one range variation be sensed, measured, or observed. A variety of means for measuring various signal quantities linearly related to the appropriate parameter variations are shown in this specification including cycle counting, time between arrival of pulses, etc.

The particular type of variation of geometric parameter can be either the incremental type or the rate type. The incremental type of variation of a geometric parameter involves two separate points along the path of the moving object and is equivalent to the difference in the two values of each geometric parameter associated with these two points, the difference of two ranges, the difference of the sum of two ranges, the difference of the difference of two ranges. When the geometric parameter comprises two ranges it is of course necessary that there be two reference points (wave stations) associated with that particular geometric parameter. When the parameter is a simple range only a single wave station is required.

My invention is entirely dependent upon the simultaneous sensing, measurement, or observation of variations of a plurality of separate simultaneous geometric parameters. Therefore the apparatus of my invention comprises means for operating the separate sensing, measuring, or observation means essentially simultaneously.

In some of those modifications of my invention which employ incremental type measurements, sensing, or observations it is necessary that means be employed to accurately govern the duration of each measurement, sensing, or observation so that it is as nearly identical as can be achieved to the durations of all of the other simultaneous measurements, sensing, or observations.

Apparatus for maintaining simultaneity and similarity of duration is shown and described in this specification for use in these particular modifications of my invention. The specific apparatus varies with the precise nature of the particular system. In some instances a separate frequency standard is maintained at each of the several wave stations. In other embodiments a standard frequency signal is transmitted to the several wave stations from a common source. Simultaneity is maintained easily where the receiving elements are located at the same place, either in the moving object, (as with navigation) or at a cooperating wave station. In other modifications of my invention a synchronizing signal is transmitted to various receiving wave stations. In certain pulse type stations the waves used in the doppler measurements, sensing or observations provide themselves the needed synchronizing signals.

My invention requires means for converting the information derived by the doppler sensing, measuring or observation means into orthogonal dimensions of the position-motion state. Analog means for accomplishing this function are shown and described in this specification. Such means were available and had been tested by the applicant prior to the filling of the application Ser. No. 86,770 of which this application is a continuation-in-part. All of the functions performed by the analog computing or indicating equipment can of course be performed by a similarly programmed digital machine. General purpose machines capable of being so programmed were in general use prior to the filling of the application Ser. No. 86,770. In the language of mathematics, both the analog and digital machines, or indicators, along with performing other functions, solve sets of simultaneous equations to provide the desired dimension of the position-motion state of the moving object in a suitable system of orthogonal coordinates.

Means and methods other than those of C. W. doppler exist for determining the variations, either rates or increments, of wave propagation paths, and these means and methods are employed in certain embodiments of my invention. Range rate information is available at the motor control of the Range Unit of the SCR-584 gun laying radar, and range variation information obtained in any such manner as this is useable in the indicated modifications of my invention. Any device basically capable of sensing propagation time delay can be modified to sense the variation of such time delay. For example the system called Doppler-Free Distance Measuring system described in U.S. Pat. No. 3,175,214 to W. R. Ramsay et al. can be adopted to provide range rate information by applying a time differentiator element to the range output indication signal or by taking the difference of successive range indications in a digital element, or some similar procedure. Higher ordered time derivative information can be derived directly from integrators in the control loop of a pulse delay time tracker, or a continuous wave phase tracker as shown in this specification. In the showing of such a circuit (See FIG. 66) the showing of a.g.c. and/or limiting elements is omitted for simplicity. The two-phase detection circuit shown elsewhere in this specification offers many advantages in this part of the detection system relative to a.g.c., limiting, and linearity of phase detection. However the simpler model of the loop is shown in FIG. 66 for clarity and brevity. It must be emphasized that this type of loop providing as outputs the time derivatives of the different orders can be applied to any such tracking device and is not limited to the C. W. phase locked loop. Whereas higher order phase locked loop circuits are well known in the art, the derivation directly from the loop of the time derivatives of different order simultaneously and the simultaneous use of the multiple output of the tracker so derived in subsequent apparatus for determining the dimensions of the position-motion state is a part of my invention. For the purpose of measuring variations the apparatus need not be calibrated or otherwise adjusted to determine actual range, a marked convenience in some applications. Variation determining elements employing C. W. radiation are used in certain embodiments of my invention, as well as f.m., a.m., frequency swept, sawtooth waves, pulsed waves etc. Signal trackers involving tracking loops such as shown in FIG. 66 and elsewhere are employed in various modifications of my invention for tracking such signals.

My invention comprises in some of its embodiments the placing of a standard frequency oscillator at each of the wave stations of the system. There are at least two reasons for such use of separate frequency standards instead of use of common standard frequency source with appropriate communications equipment to transmit the reference signal to the various wave stations. One of these reasons is convenience and economy in avoiding the necessity of the frequency signal links. The other is the difficulty of maintaining frequency communication links of the phase stability desired in the more accurate embodiments of my invention. In general it may be said that for shorter baseline systems the use of communications means is the more practical method. When the baselines are longer the use of separate standard frequency sources must be relied upon to attain the greatest accuracy. Both methods of attaining the reference frequency are described in this specification as well as systems (See FIG. 1) in which no frequency or phase relationship among wave stations is required.

The beat frequency signal or doppler signal, being of much lower frequency than the reference and operating signal frequency, is not so vulnerable to the instability of the communications means and may be transmitted thereby for completion of the measurement at a central point without undue requirements being placed upon the communications link. Therefor the measurements of phase variations of the beat signal or doppler signal can be carried out conveniently at a central point. To reduce the load on the communications system the measurements may be completed at the sites of the separate receiving wave stations employed in some modifications of my invention, the measured value then being transmitted to a central point. This specification shows both processes employed in separate embodiments of my invention. It is a part of my invention to employ separate standard frequency oscillators (frequency standards) at each wave station in those embodiments of my invention where it is appropriate to do so.

In some modifications acquisition of the signals of the target object is a part of my invention. When the signals are of reduced amplitude such as usually occurs in a reflective type system, the signals must be separately tracked by gating or narrow filtering means in order to be measured. (This condition is not true in those systems where sufficient signal strength exists as in some of the embodiments of my invention shown in this specification.) In some embodiments, where the signals are of such low intensity, scanning means are employed to lock on separate frequency trackers. Coordinated signals for such scanning are achieved in some modifications of my invention by computer scanning means which simulate in effect the signals of an anticipated typical real target. Correlation between these signals and the signals associated with the several wave stations is attempted and when this correlation is sufficiently great tracking is initiated. This scanning function not only provides signal acquisition for the tracking loops but also provides initial conditions for the commencement of the iterative or recursive computations for determining the dimensions of the position-motion state from the measured or sensed quantities. This combined scanning process also serves to help group the echoes according to their respective targets. In other embodiments of my invention signal acquisition is separately accomplished by each sensing means, using processes well known in the art.

All of the functions described here, scanning, acquisition, tracking, and indication of the state dimensions can be accomplished in either analog or digital machinery properly programmed.

It was old at the time of the filing of the patent application Ser. No. 86,770 that the doppler effect is observable with all types of waves: continuous waves, tone modulated waves, speech waves, TV waves, music waves, noise waves, pseudorandom waves, pulsed waves, pulse coded waves. These waves may be radio waves (electromagnetic) or they may be transmitted acoustically or by other sound waves in any suitable medium. It was similarly old that doppler measurement, observation, or sensing can be performed using any of these wave types in almost any medium permitting the necessary motion between source and receiver. My invention may also be practiced employing waves of any convenient length, from those of very low subaudio frequency to those of light. In certain applications of my invention it is desired that the detectable radiation not extend far beyond the limits of the operational boundries of the system. Such operation can be approximated by employing magnetic waves rather than the ordinary radio waves. Similarly, under suitable conditions, electric waves can be employed. Such waves fade much more rapidly with the propagation distance than do radio waves.

It was old at the time of the filing of the patent application Ser. No. 86,770 to select the particular wave form most suitable in performing a doppler measurement for a particular application. Continuous waves are the most conspicuous choice and usually the first considered. However such waves are not always the most suitable in a given application. For instance it was old at that time to employ a wave that was square-wave modulated between full on and completely off. Using such a wave it is not necessary for the transmitter of a station to be on at the same time that a receiver at the same station is receiving, thus the interference of the transmitter with the doppler receiver is eliminated. Other coding of the wave signal employed can be, and have been, used to mask the signal in warfare applications, to distribute the spectrum of the signal to accommodate atmospheric characteristics, etc. Any of these techniques and wave forms may be employed to sense the variation of the geometric parameters such as ranges, range sums, or range differences as described in this specification.

The accuracy and resolution provided by my invention of Polystation Doppler is such as to make feasible the physical interception of mortar shells, rockets, bombs, artillery rounds while these are actually in flight. With my invention the path of the shell can be so accurately determined and so accurately extrapolated that destruction of the missile by counterfile while the missile is still in flight is feasible. Weapons of sufficient accuracy are available to provide the required defensive fire. This capability of my invention was clearly evident at the time of filing of the application Ser. No. 86,770. It is evidence of the particularity of my invention that the same embodiment of my invention can also be used for detecting and accurately tracking aircraft, guiding missiles and similar applications.

It is intended that the above and other such changes and modifications shall fall within the spirit and scope of the invention as defined in the appended claims.

I claim:

1. A method for the determination of a set of unknown dimensions of the position-motion state, relative to an orthogonal coordinate system, of a moving receiver of waves propagated toward the receiver from at least four transmitting stations fixed on said orthogonal coordinate system at substantial distances from one another, said set of unknown dimensions including the velocity vector and position of said receiver, said receiver comprising but a single wave aperture, each of said transmitting stations comprising only a single wave aperture having a single location and there being only a single wave aperture at each said single location, said method comprising the steps of measuring the doppler effect caused by the motion of the receiver upon the waves arriving at the receiver from each of said transmitting stations, said measurement of the doppler effect performed relative to one transmitting station being substantially simultaneous with the measurement performed relative to each of the other transmitting stations, and each individual measurement being performed relative to waves transmitted from only one such single location, conveying the data resultant from said measurements to a computer and calculating the position and motion of the moving receiver relative to said orthogonal coordinate system from such data.

2. A method for the determination of dimensions of the motion of a moving object that is a reflector of waves, said waves being propagated between at least one transmitter and said reflector and hence to at least four measuring stations, which measuring stations are fixed in position relative to one another, each of said measuring stations comprising only a single wave aperture having a single location and there being only a single wave aperture at each said single location, comprising the steps of measuring the doppler effect caused by the motion of the reflector upon the waves arriving at each of the measuring stations said measurement of the doppler effect performed at one station being substantially simultaneous with the measurement performed at each of the other stations, and each individual measurement being performed relative to waves impinging on only one such single location, conveying the data resultant from said measurements to a common point, and calculating dimensions of the motion of the moving reflector relative to the locations of said measuring stations from such data.

3. A method for the determination of the position of a moving object without knowledge or of reference to the type of path followed by the moving object or the forces acting on the object or knowledge of any previous point occupied by the object, comprising the steps of identifying each of a plurality of fixed points in space, determining simultaneously the instantaneous value of the algebraic sum of the components of velocity of the moving object in the directions of the fixed points of each pair of a number of pairs of fixed wave station points such that the otherwise unknown and unbounded position-motion state of the moving object is uniquely defined by said determination and the known parameters related thereto, there being a number of station point pairs at least as great as the number of unknown dimensions of the otherwise unknown position-motion state of the moving object, and, using the values of said determinations and the known parameters related thereto calculating the position of said moving object relative to said identified fixed points.

4. A method of determining the motion of a moving vehicle, whose previous positions and velocity are otherwise unknown comprising the following steps:
1. establishing at separated known geographical points wave transmitting means and wave receiving means,
2. reflecting at the vehicle signals received from said transmitting means and to which signals said receiving means are responsive,
3. detecting at each of the said receiving means signals reflected from said vehicle and employing these signals to measure variation in at least one distance sum, said distance sum being the distance from a transmitting means to the vehicle and the distance from the vehicle to the receiving means,
4. performing the said measurements using a combination of stations such that the otherwise unknown and unbounded position of the moving vehicle is fully determined by said measurements and the known parameters associated therewith,
5. calculating the desired motion data relative to said geographical points in suitable coordinates from the measured and known data.

5. A method of determining at least one dimension of a set of unknown dimensions of the position-motion state of a moving object relative to an orthogonal coordinate system, said set of unknown dimensions of the position-motion state including the velocity vector and position of said moving object relative to said coordinate system, said system comprising the following elements:
Element 1. Determining the position points of each of a plurality of separate wave stations relative to said coordinate system;
Element 2. Determining simultaneous values of each of a plurality of quantities linearly related to time derivatives of the distances between said station points and said moving object, said time derivatives comprising time derivatives of order greater than one;
Element 3. Using the data determined in Element 1 and in Element 2 determining automatically in a computer at least one dimension of the position-motion state of said moving object relative to said coordinate system.

6. A method as recited in claim 5 further defined in establishing and maintaining at each of said station points a frequency standard oscillator means and further defined in using said frequency standard in determining said quantities.

7. A method for the determination of a set of unknown dimensions of the position-motion state of a moving object relative to an orthogonal coordinate system, said set of unknown dimensions of the position-motion state including the velocity vector and position of said moving object relative to said coordinate system, said method comprising the following elements:
Element 1. Identifying each of a plurality of fixed points well separated from one another in space and relative to said orthogonal coordinate system;
Element 2. Determining simultaneously quantities linearly related to changes in the unknown and unmeasured distances between the separate point of unknown position of said moving object and each of a number of said fixed points such that a plurality of dimensions of the position-motion state of the moving object are uniquely defined by said determinations and the known parameters related thereto;
Element 3. Using said determinations automatically calculating said set of unknown dimensions of the position-motion state of said moving object relative to said orthogonal coordinate system.

8. A method of recited in claim 7 further defined in that said set of unknown dimensions of the position-motion state of said moving object is a dimension of average acceleration of said moving object.

9. A method as recited in claim 7 further defined in establishing and maintaining at each of said fixed points a frequency standard oscillator means and further defined in using said frequency standard in determining said quantities.

10. A method as recited in claim 7 further defined in that said moving object is a wave emitter, and further defined in using receiving means at said fixed points to detect waves emitted by said moving object arriving at said fixed points, and further defined in determining the values of said quantities from the signals so detected.

11. A method as recited in claim 7 further defined in Element 1 by placing a wave transmitter at at least one of said fixed points and, in Element 2, employing said wave transmitter for determining simultaneous quantities linearly related to changes in the distance between the unknown position of said moving object and the position of at least one of said fixed points.

12. A method as recited in claim 7 further defined in that said moving object is a navigating vehicle, further defined in detecting waves from transmitters at said fixed points using wave receiving means aboard said navigating vehicle, and further defined in automatically determining the position of said navigating vehicle in orthogonal coordinates relative to said identified fixed points using the detected signal output of said wave receiving means.

13. A method as recited in claim 7 further defined in said moving object being a reflecting object reflecting waves from transmitters at said fixed points, and further defined in detecting the waves reflected by said moving object using receiving means remote therefrom, and further defined in determining the values of said quantities from the signals so detected.

14. A system for the automatic determination of at least one dimension of the position-motion state of a moving object relative to a frame of orthogonal coordinates, said system comprising the following elements:
Element 1. At least four wave stations fixed on said frame of orthogonal coordinates;

Element 2. At least four sensing means, each said sensing means determining the value of at least one signal quantity linearly dependent upon at least one distance difference, said distance difference being the difference of two unknown distances between a single wave station of said plurality of wave stations and each of two separate points of unknown position along the path of said moving object, the positions of which two separate points being entirely unknown relative to each other and relative to said wave stations;

Element 3. Means connected to said sensing means for controlling the operation thereof so that the operation of each of said sensing means is essentially simultaneous with the operation of the other of said sensing means;

Element 4. Means connected to said sensing means for controlling the timing thereof so that operation of said sensing means is performed over essentially identical time intervals;

Element 5. Computing means responsive to said sensing means, said computing means determining at least one dimension of the positon-motion state of said moving object, there being as many of said points along the path of said moving object as required to determine said one dimension of the position-motion state relative to said system of orthogonal coordinates.

15. A system as recited in claim 14 further defined in that said dimension of the position-motion sate is a dimension of motion of said moving object.

16. A system as recited in claim 14 further defined in that said wave stations are all wave receiving stations and said moving object is a wave transmitter.

17. A system as recited in claim 14 further defined in that said wave stations are all wave transmitting stations and said moving object is a wave receiver.

18. A system as recited in claim 14 further defined in that said moving object is a wave reflecting object.

19. A system as recited in claim 14 wherein said plurality of wave stations includes wave transmitting stations, at least one of said signal quantities being linearly dependent upon the difference between two simultaneously occuring changes of range, one of these changes of range being the difference between the two ranges from a first wave transmitting station to each of said two separate points along the path of said moving object, the other of these changes of range being the difference between each of two ranges from a second transmitting wave station to each of said separate points along the path of said moving object.

20. A system as recited in claim 14 wherein said plurality of wave stations includes wave receiving stations, at least one of said signal quantities being linearly dependent upon the difference between two simultaneously occuring changes of range, one of these changes of range being the difference between the two ranges from a first wave receiving station to said two separate points along the path of said moving object, the other of these changes of range being the difference between the two ranges from a second wave receiving station to said two separate points.

21. A system as recited in claim 14 wherein said plurality of wave stations includes wave receiving and wave transmitting stations, at least one of said signal quantities being linearly dependent upon the sum of two distance differences, one of said last mentioned two distance differences being the difference between the two distances between a wave receiving station and each of said two separate points along the path of said moving object, the other of the last mentioned two range differences being the difference between the two ranges from a wave transmitting station to said two separate points, said wave receiving station being cooperative with said wave transmitting station.

22. A system as recited in claim 14 further defined in that said moving object is a wave reflector and further defined in that said system comprises a plurality of wave transmitting stations illuminating said moving object simultaneously and further defined in that said system comprises a single wave receiving station receiving the wave eminations transmitted by said wave transmitting stations and reflected by said moving object.

23. A system as recited in claim 14 further defined in that each said wave station is a pulsed wave station.

24. A system for automatically determining at least one dimension of a set of unknown dimensions of the position-motion state of a moving object relative to a frame of orthogonal coordinates, said set of unknown dimensions of the position-motion state including the vector velocity and position of said moving object relative to said frame of orthogonal coordinates, said system comprising the following elements:

Element 1. A plurality of wave stations well separated from one another on said frame of orthogonal coordinates and separated from said moving object by a set of unknown distances;

Element 2. Plural signal sensing means operating cooperatively with said wave stations, each said signal sensing means generating automatically at least one signal quantity linearly related to the variation of at least one of said unknown distances, said variation being the variation of the unknown distance separating the moving object from one of said wave stations, and each said signal quantity being independent of the magnitude of said unknown distance;

Element 3. Computing means responsive to said plural signal sensing means, said computing means automatically producing at least one set of signal quantities said set of signal quantities representing at least one set of simultaneous values of said unknown distances.

25. A system as recited in claim 24 further defined in Element 1 in each said wave station comprising a separate standard frequency oscillator for providing the standard reference frequency of said station.

26. A system as recited in claim 24:

Said system further defined in Element 2 in that said signal sensing means generates automatically at least one signal quantity linearly related to the rate type variation of a particular order of at least one unknown distance, said variation being the time derivative, said derivative being of a particular order, of the unknown variable distance separating said moving object from one of said wave stations;

Said system further defined in Element 3 in that said computing means comprises means for generating a set of signal quantities, said set of signal quantities representing one set of simultaneous values of said distances, which values of distances occur simultaneously with said rate type variations.

27. A system as recited in claim 24 further defined in Element 2 comprises analog phase lock loop means outputting signal values linearly related to time derivatives of said unknown distances and further comprising analog-to-digital converter means for converting the instantaneous outputs of said phase locked loop means to digital signals for insertion into Element 3, and Element 3 is further defined in that said computing means are digital computing means.

28. A system as defined in claim 27 wherein said time derivatives comprise first and higher order derivatives.

29. A system as recited in claim 24 further defined in that said moving object is a wave transmitter; and further defined in Element 1 in that said wave stations are wave receiving stations.

30. A system as recited in claim 24 further defined in that said moving object is a moving receiver of waves; and further defined in Element 1 in that said wave stations are wave transmitting stations.

31. A system as recited in claim 24 further defined in that said moving object is a wave reflector; and further defined in Element 1 in that at least one of said wave stations is a wave transmitting station capable of illuminating said moving object; and further defined in Element 1 in that at least one of said wave stations is a wave receiving station capable of receiving the waves from said transmitting station reflected by said moving object.

32. A system as recited in claim 24 further defined in Element 2 wherein said signal sensing means comprises doppler signal tracking means for simultaneously and continuously tracking the doppler signals related to said plurality of wave stations.

33. A system as recited in claim 24 further defined in Element 2 wherein said signal tracking means comprise pulse signal tracking means with feedback type control elements, said pulse signal tracking means being subsequently independent of the doppler effect on each received pulse and providing from its feedback type control elements said signal quantity linearly related to the variation of at least one unknown distance.

34. A system as recited in claim 24 further defined in that said moving object is a wave transponder; and further defined in Element 1 in that at least one of said wave stations is a wave transmitting station capable of illuminating said moving object; and further defined in Element 1 in that at least one of said wave stations is a wave receiving station capable of receiving signals from said transponder.

35. A method of automatically determining a set of simultaneous instantaneous values of the distances among a plurality of points in space, no instantaneous value of any of said distances being known, each of said distances being the distance between a first point of said plurality of points in space and a second point of said plurality of points in space; said method comprising the following elements:

Element 1. Using wave means automatically sensing at least one set of values of signal quantities, each signal quantity of said set of signal quantities being linearly related to the variation of at least one unknown distance of said unknown distances and being independent of said unknown distance;

Element 2. Feeding said signal quantities to the data input of a computer;

Element 3. Computing in said computer each value of said set of simultaneous instantaneous values.

36. A method as recited in claim 35 further defined in that said points are each the position of a moving vehicle, and further defined in that said distances are the distances separating said moving vehicle positions in space from each other.

37. A method as recited in claim 35 further defined in that said first point is one of a plurality of such first points and each such first point is the position of a wave station whose position is unknown and further defined in that said second point in space is the position of a moving object; and further defined in each of said signal quantities being linearly related to the variation of at least one of the distances between said first points and said second point, and further comprising using doppler means responsive to the motion of said second point relative to said first points to derive said signal quantities automatically; and further defined in automatically computing at least one set of simultaneous values of the varying ranges from at least some of said wave stations to said moving object.

38. A method as recited in claim 37 further comprising computing the distances among said wave stations, using said signal quantities.

39. A method as recited in claim 37 further defined in Element 3 computing in a single automatic simultaneous equation solving process dimensions of the position-motion state of said moving vehicle and at least one set of simultaneous instantaneous values of the ranges from at least some of said wave stations to said moving object.

40. A method as recited in claim 35 further defined in that said first point is one of a plurality of such first points and each such first point is the position of a wave station on a system of cartesian coordinates, said second point in space being the position of an accelerating object moving on said system of cartesian coordinates, and further defined in each of said signal quantities being linearly related to the variation of at least one of the distances between said first points and said second point, and further comprising using doppler means responsive to the motion of said second point relative to said first point to derive said signal quantities automatically, and further defined in automatically computing at least one set of simultaneous values of the varying ranges from at least some of said wave stations to said moving object.

41. A method as recited in claim 35 further defined in Element 1 wherein each said signal quantity is linearly related to the time derivative of a particular order of at least one distance of said unknown distances.

42. A method as recited in claim 35 further defined in Element 1 in each said signal quantity being linearly related to the increment of at least one distance of said set of distances.

43. Means for determining at least one dimension of the position-motion state of a moving object which moving object is undergoing unknown acceleration and whose motion is otherwise unknown and unbounded and whose position is unbounded by any locus that can be defined by any single quantity which single quantity is linearly related to the value of any measurement, said moving object constituting wave means; a plurality of separate wave stations cooperative with said wave means, said stations being fixed in position relative to one another in at least two dimensions of space and operating simultaneously with one another; measuring means cooperative with said wave stations and said wave means, each said measuring means measuring at least one signal quantity which signal quantity is linearly related to the variations of at least one distance of the unknown distances between one of said wave stations and said moving object and which signal quantity is independent of any magnitude of any of said unknown distances; computing means responsive to output signals of said measuring means for computing said unknown distances and said dimension of the position-motion state of said moving object in a suitable coordinate system relative to said stations, said output signals collectively defining physically the position-motion state of said moving object.

44. In an automatic position determining system a method of determining in three-dimensional space the position-motion state of a moving vehicle relative to well separated reference points whose positions are known and relative to which the position of said vehicle is entirely unknown at all points along its path including the end points of said path, waves being simultaneously transmitted across the entirely unknown distances between said moving vehicle and said reference points, doppler sensitive means being used to perform simultaneous measurements on said waves, which measurements collectively define physically the position-motion state of said moving vehicle, the position-motion information contained in said measurements being converted to a more useful coordinate system relative to which the position-motion states of said reference points are known, said system comprising wave communications apparatuses at the locations of all of the reference points and aboard the moving vehicle, said method comprising the following non-mental elements:
1. Establishing at the locations of each of at least four non-colinear reference points wave transmitting communications means cooperative with wave receiving communications means installed aboard said moving vehicle;
2. Installing aboard said moving vehicle wave receiving communications means cooperative with wave transmitting communications means established at each of said reference points;
3. Transmitting continuous waves between said cooperative communications apparatuses;
4. Detecting said waves using mixing means and filter means to create alternating current electrical signals whose instantaneous time rates of phase change are linearly dependent upon the time rates of change of the simultaneous distances between said reference points and said moving vehicle;
5. Automatically measuring the magnitudes of the time variations of phase of said alternating current electrical signals and generating physical representations of the magnitudes resultant of said measuring;
6. Automatically introducing said physical representations into automatic computing means;
7. Introducing into said automatic computing means physical representations of the dimensions of the position-motion state of said reference points;
8. Computing automatically in said automatic computing means the dimensions of the position-motion state of said moving vehicle in said useful coordinate system;
9. Automatically extracting from said automatic computing means a physical representation of said dimensions of the position-motion state of said vehicle.

45. In an automatic position determining system a method of determining in three-dimensional space dimensions of the position-motion state of a moving object relative to well separated reference points, said moving object being capable of reflecting waves, the position-motion state of each said reference point being known and the position of said moving object relative to said reference points being entirely unknown at all points along its path including the end points of said path, waves being simultaneously transmitted across the entirely unknown distances between said moving object and said reference points, said moving object being illuminated by wave radiation means, doppler sensitive means being used to perform simultaneous measurements on the waves reflected from said moving object, the position-motion information contained in said measurements being converted to a more useful coordinate system relative to which the position-motion states of said reference points are known, said system comprising wave communications apparatuses at the locations of all of the reference points, said method comprising the following non-mental elements:
1. Establishing at the locations of each of at least four non-colinear reference points wave communications means providing at least one separate wave path for each reference point;
2. Illuminating the moving object by continuous wave radiation means;
3. Detecting waves reflected from said moving object using mixing and filter means to create alternating current electrical signals whose instantaneous time rates of phase change are linearly dependent upon the time rates of change of the simultaneous distances between said reference points and said moving object;
4. Automatically measuring the magnitudes of the time rates of change of phase of said alternating current electrical signals and generating physical representations of the magnitudes resultant of said measuring;
5. Automatically introducing said physical representations into automatic computing means;
6. Introducing into said automatic computing means physical representations of the dimensions of the position-motion state of said reference point;
7. Computing automatically in said automatic computing means the dimensions of the position-motion state of said moving object;
8. Automatically extracting from said automatic computing means a physical representation of said dimensions of the position-motion state of said object.

46. In an automatic tracking system a method of determining in three-dimensional space dimensions of the position-motion state of a moving vehicle relative to well separated reference points whose positions are known and relative to which the position of said moving vehicle is entirely unknown at all points along its path including the end points of said path, pulse waves being transmitted and received across the entirely unknown distances between said moving vehicle and said reference point, doppler sensitive means being used to perform simultaneous measurements on said wave pulses, which measurements collectively define physically the position-motion state of said moving vehicle, the position-motion information contained in said measurements being converted to a more useful coordinate system relative to which the position-motion states of said reference points are known, said system comprising wave apparatuses at the locations of all of the reference points and aboard the moving vehicle, said method comprising the following non-mental elements:

1. Establishing at the locations of each of at least four non-colinear points pulse wave receiving means cooperative with pulse wave transmitting means installed aboard said moving vehicle;
2. Installing aboard said moving vehicle pulse wave transmitting means cooperative with said pulse wave receiving means established at each of said reference points;
3. Transmitting wave pulses to said cooperative pulse wave receiving means recited in Element 1 from cooperative pulse wave transmitting means recited in Element 2;
4. Detecting said wave pulses to create signals dependent upon the time rates of change of the simultaneous distances between said reference points and said moving vehicle;
5. Automatically measuring the magnitudes of variations of said signals and generating physical representations of the magnitudes resultant of said measuring;
6. Automatically introducing said physical representations into automatic computing means;
7. Introducing into said automatic computing means physical representations of the dimensions of the position-motion state of said reference points;
8. Computing automatically in said automatic computing means the dimensions of the position-motion state of said moving vehicle in said useful coordinate system;
9. Automatically extracting from said automatic computing means a physical representation of said dimensions of the position-motion state of said vehicle.

47. In an automatic position determining system a method of determining in three-dimensional space dimensions of the position-motion state of a moving object relative to well separated reference points whose positions are known and relative to which the position of said moving object is entirely unknown at any point of the path of said object including the end points of said path, pulse waves being simultaneously transmitted across the entirely unknown distances between said moving object and said reference points, said moving object being illuminated by pulse wave radiation means, doppler sensitive means being used to perform simultaneous measurements on the pulse waves reflected from said moving object which simultaneous measurements collectively define the position-motion state of said moving object, the position-motion information contained in said simultaneous measurements being converted to a more useful coordinate system relative to which the position-motion states of said reference points are known, said system comprising pulse wave apparatus at the locations of all of said reference points, said method comprising the following non-mental elements:
1. Establishing at the locations of each of at least four non-colinear reference points pulse wave means providing at least one separate wave path for each reference point;
2. Illuminating the moving object by pulse wave radiation means;
3. Detecting pulse wave signals reflected from said moving object to create signals dependent upon the time rates of change of the simultaneous distances between said reference points and said moving object;
4. Automatically measuring the magnitudes of time variations of said signals and generating physical representations of the magnitudes resultant of said measuring;
5. Automatically introducing said physical representations into automatic computing means;
6. Introducing into said automatic computing means physical representations of the dimenions of the position-motion states of said reference points;
7. Computing automatically in said automatic computing means the dimensions of the position-motion state of said moving object;
8. Automatically extracting from said automatic computing means a physical representation of said dimensions of the position-motion state of said object.

48. In an automatic position determining system, apparatus for determining in three-dimensional space dimensions of the position-motion state of a moving vehicle relative to well separated reference points whose positions are known and relative to which the position of said vehicle is entirely unknown at all points along the path of said vehicle including the end points of said path, said apparatus transmitting waves across the entirely unknown distances between said moving vehicle and each said reference point, said apparatus also performing simultaneous doppler measurements on said waves which measurements collectively define physically the position-motion state of said moving vehicle, said apparatus also converting by computing means the position-motion information contained in said measurements to a more useful coordinate system relative to which the position-motion states of said reference points are known, said apparatus comprising the following elements:
1. At least four wave stations serving as space reference points and as terminals for performing doppler measurements relative to said reference points, said stations cooperative with wave means aboard said moving vehicle;
2. Aboard said moving vehicle wave means cooperative with said wave stations recited in Element 1;
3. Detecting means detecting waves transmitted along at least four paths between the apparatuses recited in Element 1 and the apparatus recited in Element 2, said means for detecting waves creating at least four signals whose instantaneous time rates of phase change are linearly dependent upon the time rates of change of the simultaneous distances between said reference points and said moving vehicle;
4. Measuring means connected to said detecting means automatically measuring the magnitudes of the time variations of phase of said signals and generating physical representations of the magnitudes resultant of said measuring;
5. Automatic computing means connected to said measuring means and responsive to said physical representations;
6. Automatic data processing means automatically introducing into automatic computing means physical representations of the dimensions of the position-motion state of said reference points;
7. Second automatic data processing means automatically extracting from said automatic computing means a physical representation of said dimensions of the position-motion state of said vehicle.

49. An apparatus as recited in claim 48 further limited in that said wave stations serving as reference points are wave transmitters, further limited in that the wave means aboard said moving vehicle is a wave receiving means sensitive to each of said wave transmitting means.

50. An apparatus as recited in claim 48 further limited in that the wave means aboard said moving vehicle is a wave transmitting means, further limited in that said wave stations serving as reference points are wave receiving means sensitive to the waves emitted by said transmitting means, said receiving means being connected by communications means to a common location, and further limited in performing the recited automatic functions at said common location.

51. In an automatic position determining system, apparatus for determining in three-dimensional space dimensions of the position-motion state of a moving object relative to well separated reference points whose positions are known and relative to which the position of said object is entirely unknown at all points along the path of said object including end points of the path, said moving object being capable of reflecting waves, said apparatus transmitting waves across the entirely unknown distances between said moving object and each said reference point, said apparatus performing simultaneous doppler measurements on waves reflected by said moving object which measurements collectively define physically the position-motion state of said moving object, said apparatus also converting by computing means the position-motion information contained in said measurement to a more useful coordinate system relative to which the position-motion states of said reference points are known, said apparatus comprising the following elements:
1. At least four wave stations serving as noncolinear space reference points and as terminals for performing doppler measurements relative to said reference points;
2. Wave radiation means illuminating said moving object;
3. Detecting means detecting waves reflected from said moving object, said waves being originally transmitted by said radiation means illuminating said moving object, said detecting means creating at least four signals whose instantaneous time rates of change are linearly dependent upon the time rates of change of the simultaneous distances between said reference points and said moving object;
4. Measuring means connected to said detecting means automatically measuring the magnitudes of the time variations of phase of said signals and generating physical representations of the magnitudes resultant of said measuring;
5. Automatic computing means connected to said measuring means and responsive to said physical representations;
6. Automatic data processing means automatically introducing into said automatic computing means physical representations of the dimensions of the position-motion states of said reference points;
7. Second automatic data processing means automatically extracting from said automatic computing means physical representations of said dimensions of the position-motion state of said moving object.

52. In an automatic position determining system, apparatus for determining in three dimensional space dimensions of the position-motion state of a moving vehicle relative to well separated reference points whose positions are known and relative to which the position of said moving vehicle is entirely unknown at all points along the path of said vehicle including end points of said path, said apparatus transmitting pulse waves across the entirely unknown distance between said moving vehicle and each said reference point, said apparatus also performing simultaneous doppler measurements on said pulse waves which measurements collectively define physically the position-motion state of said moving vehicle, said apparatus also converting by computing means the position-motion information contained in said measurements to a more useful coordinate system relative to which the position-motion states of said reference points are known, said apparatus comprising the following elements:
1. At least four pulse wave stations serving as noncolinear space reference points and as terminals for performing doppler measurements relative to said reference points, said stations cooperative with pulse wave means aboard said moving vehicle;
2. Aboard said moving vehicle pulse wave means cooperative with said stations recited in Element 1;
3. Detecting means detecting pulse waves transmitted along at least four paths between the apparatuses recited in Element 1 and the apparatus recited in Element 2, said detecting means creating at least four signals whose time rates of change are linearly dependent upon the time rates of change of the simultaneous distances between said reference points and said moving vehicle;
4. Measuring means connected to said detecting means automatically measuring the magnitudes of the time variations of said signals and generating physical representations of the magnitudes resultant of said measuring;
5. Automatic computing means connected to said measuring means and responsive to said physical representations;
6. Automatic data processing means automatically introducing into said automatic computing means physical representations of the dimensions of the position-motion state of said reference points;
7. Second automatic data processing means automatically extracting from said automatic computing means a physical representation of said dimensions of the position-motion state of said vehicle.

53. An apparatus as recited in claim 52 further limited in that said pulse wave stations serving as reference points are pulse wave transmitters, further limited in that the pulse wave means aboard said moving vehicle is a pulse wave receiving means sensitive to each of said pulse wave transmitting means.

54. An apparatus as recited in claim 52 further limited in that the pulse wave means aboard said moving vehicle is a pulse wave transmitting means, further limited in that said pulse wave stations serving as reference points are pulse wave receiving means sensitive to the pulse waves emitted by said transmitting means, said receiving means being connected by communications means to a common location, and further limited in performing the recited automatic functions at said common location.

55. In an automatic position determining system, apparatus for determining in three dimensional space dimensions of the position-motion state of a moving object relative to well separated reference points whose positions are known and relative to which the position of said moving object is entirely unknown at all points along the path of said object including the end points of said path, said moving object being capable of reflecting waves, said apparatus transmitting pulse waves across the entirely unknown distances between said moving object and each said reference point, said apparatus also performing simultaneous doppler measurements on pulse waves reflected by said moving object which measurements collectively define physically the position-motion state of said moving object, said apparatus also converting by computing means the position-motion information contained in said measurement to a more useful coordinate system relative to which the position-motion states of said reference points are known, said apparatus comprising the following elements:

1. At least four pulse wave stations serving as noncolinear space reference points and as terminals for performing doppler measurements relative to said reference points;
2. Pulse wave radiation means illuminating said moving object;
3. Pulse wave detecting means detecting pulse waves reflected from said moving object, said pulse waves being originally transmitted by said pulse wave radiation means illuminating said moving object, said pulse wave detecting means creating at least four signals whose variations with respect to time are linearly dependent upon the variations with respect to time of the simultaneous distances between said reference points and said moving object;
4. Measuring means connected to said pulse wave detecting means automatically measuring the magnitudes of the time variations of said signals and generating physical representations of the magnitudes resultant of said measuring;
5. Automatic computing means connected to said measuring means and responsive to said physical representations;
6. Automatic data processing means automatically introducing into said automatic computing means physical representations of the dimensions of the position-motion state of said reference points;
7. Second automatic data processing means automatically extracting from said automatic computing means a physical representation of said dimensions of the position-motion state of said moving object.

56. A method of determining the entirely unknown position and the entirely unknown velocity of a moving object in three dimensional space, comprising the following elements:
1. Establishing wave communications means at each of at least six separate known sites deployed in at least two space dimensions in three-dimensional space;
2. Employing the wave communications means of Element 1 performing a measurement of a signal quantity linearly related to the rate of change of the distance between each of said wave communications means and said moving object;
3. Performing said measurements simultaneously with the performance of each other said measurement;
4. Using the data resultant of said measurements, computing the position and velocity of said moving object in three-dimensional space.

57. An apparatus for determining at least one dimension of the position-motion state of a moving object comprising the following elements:
Element 1. A plurality of wave stations linked to said moving object by wave propagation paths,
Element 2. A plurality of wave detecting means detecting waves transmitted over said wave propagation paths,
Element 3. Analog-to-digital conversion means connected to said wave detecting means,
Element 4. Digital means coupled to said analog-to-digital conversion means for isolating digital signals corresponding to said moving object from digital signals corresponding to noise and other interfering signals, for determining the values of quantities linearly dependent upon variations of the continuously unknown and unmeasured wave propagation path lengths, and for determining from these quantities at least one dimension of the position-motion state of said moving object, said position-motion state being relative to the position points of said plurality of wave stations.

58. The apparatus as defined in claim 57 wherein said wave transmitters are continuous wave transmitters and said digital means comprise digital phase lock loop means.

59. In a system for tracking moving objects, means for tracking simultaneously the time derivatives, said derivatives comprising derivatives of higher order than the first order, of a varying signal parameter comprising a signal feedback loop, said loop comprising an integrator chain, the input of each integrator of said chain other than the first integrator being linearly related to the ouptut signal of the preceeding integration arranged so that said loop is a tracking loop of higher order than the first order, said loop having multiple separate output signals each of said separate signals representing the value of a time derivative of a separate particular order of said varying signal parameter, and computer means responsive to said output signals.

60. The system as defined in claim 59 wherein said loop is a phase lock loop.

61. The system as defined in claim 59 wherein said loop is a pulse tracking loop.

62. In a system as recited in claim 59, said means for tracking further defined in comprising, at its input, synchronous detection means, said synchronous detection means feeding error signals to multiplier means, further comprising a chain of integrator elements and adder elements, said integrator elements being successively connected to one another along the chain by said adder elements, the first integrator element of the chain being supplied its input signal from a separate output of said multiplier means, each adder element being supplied its input from one of said integrator elements and from a separate output of said multiplier means, each integrator element along the chain after the first integrator element being supplied its input from a separate one of said adder elements, the last of said adder elements of the chain feeding its output signal to frequency controlled oscillation means so as to control the frequency thereof, the output of said oscillation means feeding its signal to said synchronous detection means, separate outputs of said chain of integrator elements and adder elements providing the output signals of said means for tracking.

* * * * *